Oct. 31, 1961 K. K. SPJELDNES ET AL 3,007,008

AUTOMATIC TELEPHONE SYSTEM

Filed July 15, 1955 63 Sheets-Sheet 1

INVENTORS.
KARE K. SPJELDNES
JACK E. CALLENDER
ROBERT H. SLEMMER
WILLIAM H. BLASHFIELD

BY: Brown, Jackson, Boettcher & Dienner

INVENTORS.
KARE K. SPJELDNES
JACK E. CALLENDER
ROBERT H. SLEMMER
WILLIAM H. BLASHFIELD
BY:
Brown, Jackson, Boettcher & Dienner INVENTORS.
KARE K. SPJELDNES
JACK E. CALLENDER
ROBERT H. SLEMMER
WILLIAM H. BLASHFIELD
BY:
Brown, Jackson, Boettcher & Dienner

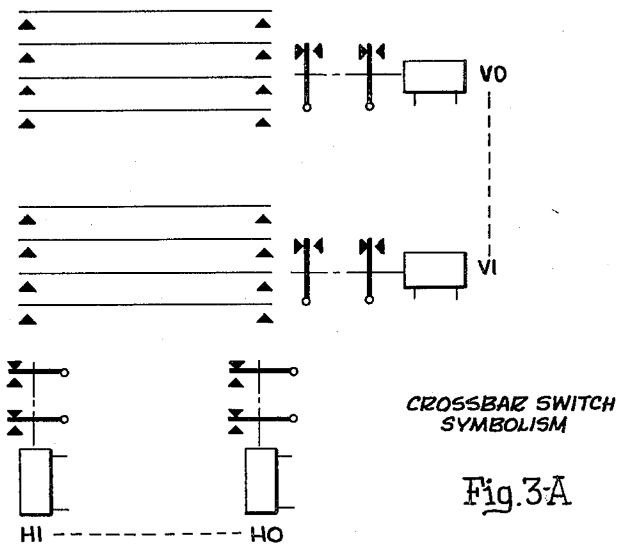
CROSSBAR SWITCH SYMBOLISM
Fig. 3-A
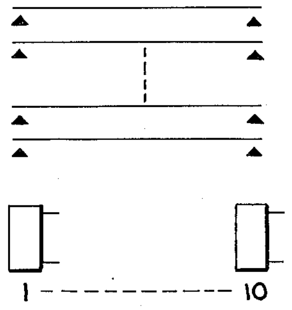
MULTIPLE RELAY SYMBOLISM
Fig. 3-B
INVENTORS.
KARE K. SPJELDNES
JACK E. CALLENDER
ROBERT H. SLEMMER
WILLIAM H. BLASHFIELD
BY:
Brown, Jackson, Boettcher & Dienner INVENTORS.
KARE K. SPJELDNES
JACK E. CALLENDER
ROBERT H. SLEMMER
WILLIAM H. BLASHFIELD
BY:
Brown, Jackson, Boettcher & Dienner Oct. 31, 1961 K. K. SPJELDNES ET AL 3,007,008

AUTOMATIC TELEPHONE SYSTEM

Filed July 15, 1955 63 Sheets-Sheet 6

INVENTORS.
KARE K. SPJELDNES
JACK E. CALLENDER
ROBERT H. SLEMMER
WILLIAM H. BLASHFIELD

BY: Brown, Jackson, Boettcher & Dienner

INVENTORS.
KARE K. SPJELDNES
JACK E. CALLENDER
ROBERT H. SLEMMER
WILLIAM H. BLASHFIELD
BY:
Brown, Jackson, Boettcher & Dienner Oct. 31, 1961 K. K. SPJELDNES ET AL 3,007,008

AUTOMATIC TELEPHONE SYSTEM

Filed July 15, 1955 63 Sheets-Sheet 8

INVENTORS.
KARE K. SPJELDNES
JACK E. CALLENDER
ROBERT H. SLEMMER
WILLIAM H. BLASHFIELD

BY:
Brown, Jackson, Boettcher & Dienner

INVENTORS.
KARE K. SPJELDNES
JACK E. CALLENDER
ROBERT H. SLEMMER
WILLIAM H. BLASHFIELD
BY:
Brown, Jackson, Boettcher & Dienner Oct. 31, 1961 K. K. SPJELDNES ET AL 3,007,008

AUTOMATIC TELEPHONE SYSTEM

Filed July 15, 1955 63 Sheets-Sheet 10

INVENTORS.
KARE K. SPJELDNES
JACK E. CALLENDER
ROBERT H. SLEMMER
WILLIAM H. BLASHFIELD

BY: Brown, Jackson, Boettcher & Dienner

INVENTORS.
KARE K. SPJELDNES
JACK E. CALLENDER
ROBERT H. SLEMMER
BY: WILLIAM H. BLASHFIELD
Brown, Jackson, Boettcher & Dienner INVENTORS.
KARE K. SPJELDNES
JACK E. CALLENDER
ROBERT H. SLEMMER
WILLIAM H. BLASHFIELD
BY: Brown, Jackson, Boettcher & Dienner INVENTORS.
KARE K SPJELDNES
JACK E. CALLENDER
ROBERT H. SLEMMER
WILLIAM H. BLASHFIELD
BY:
Brown, Jackson, Boettcher & Dienner INVENTORS.
KARE K. SPJELDNES
JACK E. CALLENDER
ROBERT H. SLEMMER
WILLIAM H. BLASHFIELD
BY:
Brown, Jackson, Boettcher & Dienner INVENTORS.
KARE K. SPJELDNES
JACK E. CALLENDER
ROBERT H. SLEMMER
WILLIAM H. BLASHFIELD
BY:
Brown, Jackson, Boettcher & Dienner INVENTORS.
KARE K. SPJELDNES
JACK E. CALLENDER
ROBERT H. SLEMMER
WILLIAM H. BLASHFIELD
BY
Brown, Jackson, Boettcher & Dienner Oct. 31, 1961 K. K. SPJELDNES ET AL 3,007,008

AUTOMATIC TELEPHONE SYSTEM

Filed July 15, 1955 63 Sheets-Sheet 17

INVENTORS.
KARE K. SPJELDNES
JACK E. CALLENDER
ROBERT H. SLEMMER
WILLIAM H. BLASHFIELD

BY:
Brown, Jackson, Boettcher & Dienner

Oct. 31, 1961 K. K. SPJELDNES ET AL 3,007,008

AUTOMATIC TELEPHONE SYSTEM

Filed July 15, 1955 63 Sheets-Sheet 18

INVENTORS.
KARE K. SPJELDNES
JACK E. CALLENDER
ROBERT H. SLEMMER
WILLIAM H. BLASHFIELD

BY:

Brown, Jackson, Boettcher & Dienner

Oct. 31, 1961 K. K. SPJELDNES ET AL 3,007,008

AUTOMATIC TELEPHONE SYSTEM

Filed July 15, 1955 63 Sheets-Sheet 19

INVENTORS
KARE K. SPJELDNES
JACK E. CALLENDER
ROBERT H. SLEMMER
WILLIAM H. BLASHFIELD

BY.
Brown, Jackson, Boettcher & Dienner

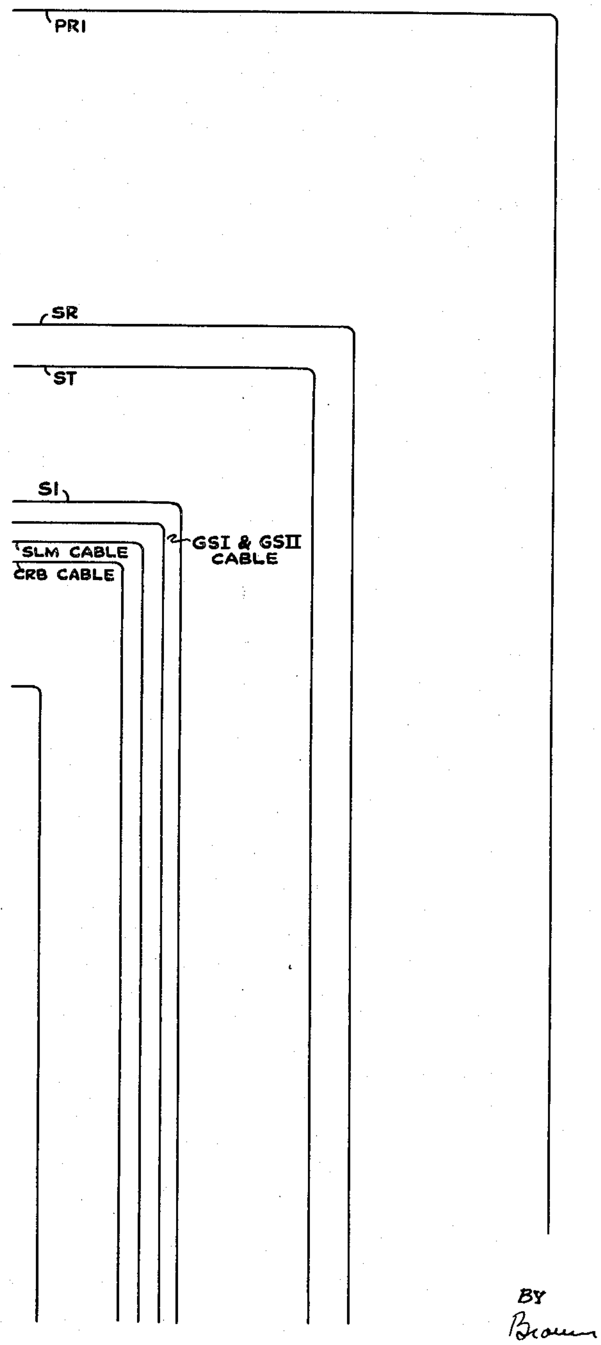
FIG.-18-A
INVENTORS.
KARE K. SPJELDNES
JACK E. CALLENDER
ROBERT H. SLEMMER
WILLIAM H. BLASHFIELD
BY
Brown, Jackson, Boettcher & Dienner INVENTORS.
KARE K. SPJELDNES
JACK E. CALLENDER
ROBERT H. SLEMMER
WILLIAM H. BLASHFIELD
BY:
Brown, Jackson, Boettcher & Dienner Oct. 31, 1961 K. K. SPJELDNES ET AL 3,007,008

AUTOMATIC TELEPHONE SYSTEM

Filed July 15, 1955 63 Sheets-Sheet 22

INVENTORS.
KARE K. SPJELDNES
JACK E. CALLENDER
ROBERT H. SLEMMER
WILLIAM H. BLASHFIELD

BY:
Brown, Jackson, Boettcher & Dienner

ASSEMBLY for Fig's. 22 to 31

INVENTORS.
KARE K. SPJELDNES
JACK E. CALLENDER
ROBERT H. SLEMMER
WILLIAM H. BLASHFIELD
BY:
Brown, Jackson, Boettcher & Dienner INVENTORS.
KARE K. SPJELDNES
JACK E. CALLENDER
ROBERT H. SLEMMER
WILLIAM H. BLASHFIELD
BY:
Brown, Jackson, Boettcher & Dienner INVENTORS.
KARE K. SPJELDNES
JACK E. CALLENDER
ROBERT H. SLEMMER
WILLIAM H. BLASHFIELD
BY:
Brown, Jackson, Boettcher & Dienner INVENTORS
KARE K. SPJELDNES
JACK E. CALLENDER
ROBERT H. SLEMMER
WILLIAM H. BLASHFIELD
BY: Brown, Jackson, Boettcher & Dienner INVENTORS.
KARE K. SPJELDNES
JACK E. CALLENDER
ROBERT H. BLEMMER
WILLIAM H. BLASHFIELD
BY:
Brown, Jackson, Boettcher & Dienner Oct. 31, 1961 K. K. SPJELDNES ET AL 3,007,008

AUTOMATIC TELEPHONE SYSTEM

Filed July 15, 1955 63 Sheets-Sheet 28

INVENTORS:
KARE K. SPJELDNES
JACK E. CALLENDER
ROBERT H. SLEMMER
WILLIAM H. BLASHFIELD.

BY:
Brown, Jackson, Boettcher & Dienner

INVENTORS.
KARE K. SPJELDNES
JACK E. CALLENDER
ROBERT H. SLEMMER
WILLIAM H. BLASHFIELD
BY:
Brown, Jackson, Boettcher & Rienner INVENTORS.
KARE K. SPJELDNES
JACK E. CALLENDER
ROBERT H. SLEMMER
WILLIAM H. BLASHFIELD
BY:
Brown, Jackson, Boettcher & Dienner Oct. 31, 1961 K. K. SPJELDNES ET AL 3,007,008

AUTOMATIC TELEPHONE SYSTEM

Filed July 15, 1955 63 Sheets-Sheet 31

INVENTORS.
KARE K. SPJELDNES
JACK E. CALLENDER
ROBERT H. SLEMMER
WILLIAM H. BLASHFIELD

BY:

Brown, Jackson, Boettcher & Dienner

INVENTORS.
KARE K. SPJELDNES
JACK E. CALLENDER
ROBERT H. SLEMMER
WILLIAM H. BLASHFIELD
BY:
Brown, Jackson, Boettcher & Dienner INVENTORS.
KARE K. SPJELDNES
JACK E. CALLENDER
ROBERT H. SLEMMER
WILLIAM H. BLASHFIELD BY: Brown, Jackson, Boettcher & Dienner INVENTORS,
KARE K. SPJELDNES
JACK E. CALLENDER
ROBERT H. SLEMMER
WILLIAM H. BLASHFIELD
BY: Brown, Jackson, Boettcher & Dienner Oct. 31, 1961 K. K. SPJELDNES ET AL 3,007,008

AUTOMATIC TELEPHONE SYSTEM

Filed July 15, 1955 63 Sheets-Sheet 35

INVENTORS.
KARE K. SPJELDNES
JACK E. CALLENDER
ROBERT H. SLEMMER
WILLIAM H. BLASHFIELD

BY: Brown, Jackson, Boettcher & Dienner

INVENTORS.
KARE K. SPJELDNES
JACK E. CALLENDER
ROBERT H. SLEMMER
WILLIAM H. BLASHFIELD
BY:
Brown, Jackson, Boettcher & Dienner INVENTORS.
KARE K. SPJELDNES
JACK E. CALLENDER
ROBERT H. SLEMMER
WILLIAM H. BLASHFIELD
BY Brown, Jackson, Boettcher & Dienner

INVENTORS.

KARE K. SPJELDNES

JACK E. CALLENDER

ROBERT H. SLEMMER

WILLIAM H. BLASHFIELD

BY:

Brown, Jackson, Boettcher & Dienner

INVENTORS.
KARE K. SPJELDNES
JACK E. CALLENDER
ROBERT H. SLEMMER
WILLIAM H. BLASHFIELD
BY:
Brown, Jackson, Boettcher & Dienner INVENTORS.
KARE K. SPJELDNES
JACK E. CALLENDER
ROBERT H. SLEMMER
WILLIAM H. BLASHFIELD
BY:
Brown, Jackson, Boettcher & Dienner INVENTORS.
KARE K. SPJELDNES
JACK E. CALLENDER
ROBERT H. SLEMMER
WILLIAM H. BLASHFIELD
BY:
Brown, Jackson, Boettcher & Dienner INVENTORS.
KARE K. SPJELDNES
JACK E. CALLENDER
ROBERT H. SLEMMER
WILLIAM H. BLASHFIELD
BY:
Brown, Jackson, Boettcher & Dienner INVENTORS.
KARE K. SPJELDNES
JACK E. CALLENDER
ROBERT H. SLEMMER
WILLIAM H. BLASHFIELD
BY:
Brown, Jackson, Boettcher & Dienner INVENTORS.
KARE K. SPJELDNES
JACK E. CALLENDER
ROBERT H. SLEMMER
WILLIAM H. BLASHFIELD
BY:
Brown, Jackson, Boettcher & Dienner INVENTORS.
KARE K. SPJELDNES
JACK E. CALLENDER
ROBERT H. SLEMMER
WILLIAM H. BLASHFIELD
BY:
Brown Jackson Boettcher & Dienner Oct. 31, 1961 K. K. SPJELDNES ET AL 3,007,008
AUTOMATIC TELEPHONE SYSTEM
Filed July 15, 1955 63 Sheets-Sheet 46
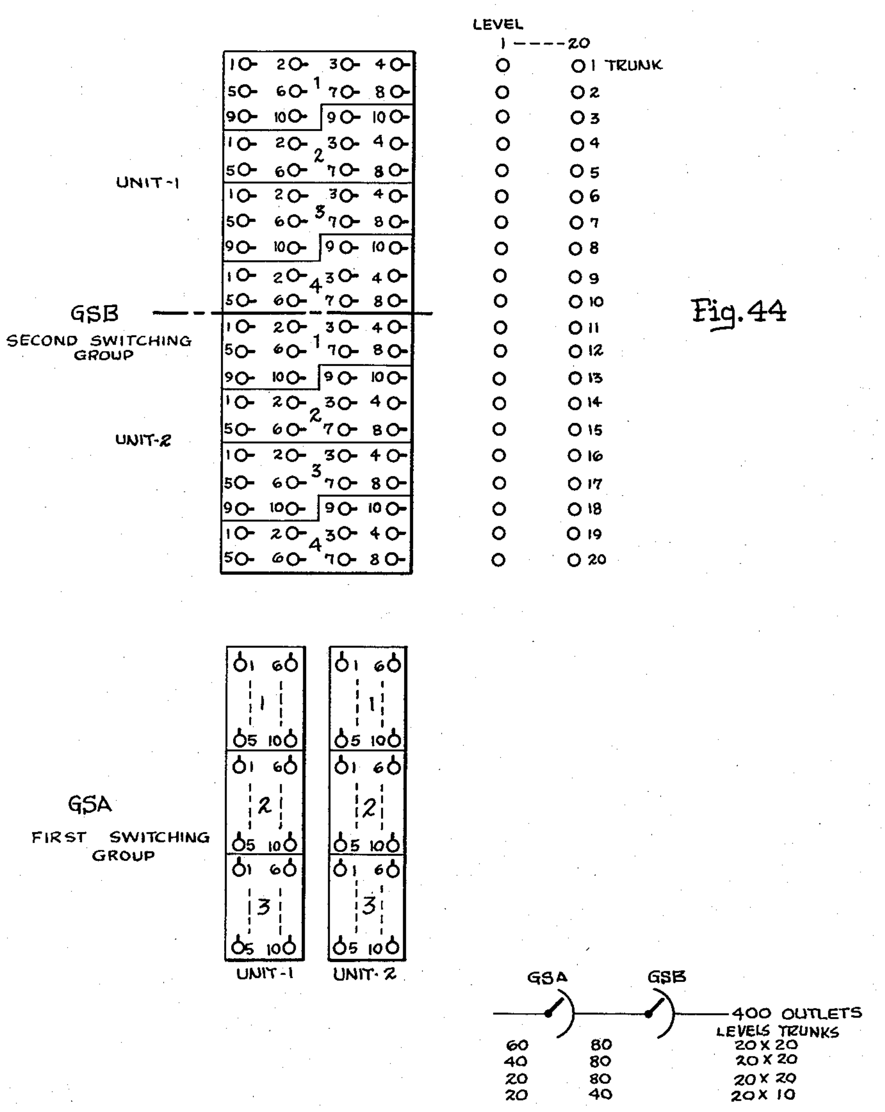
Fig. 44, Fig. 44-A
INVENTORS.
KARE K. SPJELDNES
JACK E. CALLENDER
ROBERT H. SLEMMER
WILLIAM H. BLASHFIELD
BY:
Brown, Jackson, Boettcher & Dienner Oct. 31, 1961 K. K. SPJELDNES ET AL 3,007,008
AUTOMATIC TELEPHONE SYSTEM
Filed July 15, 1955 63 Sheets-Sheet 47
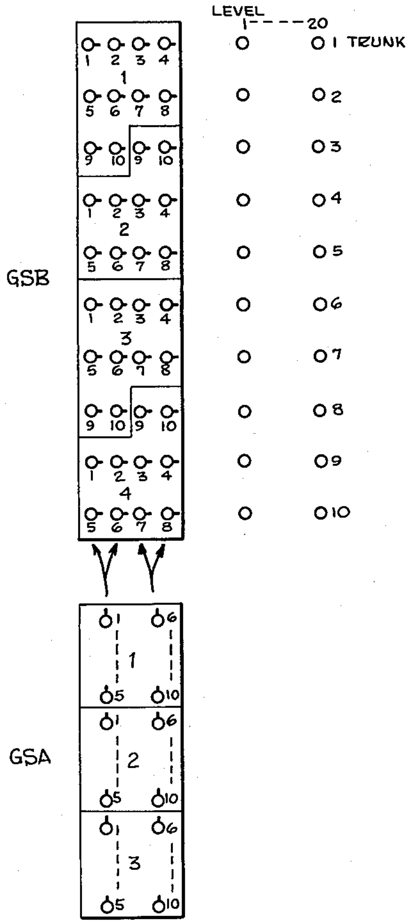
Fig. 44-B
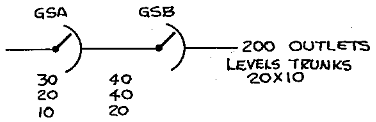
Fig. 44-C
INVENTORS.
KARE K. SPJELDNES
JACK E. CALLENDER
ROBERT H. SLEMMER
WILLIAM H. BLASHFIELD
BY:
Brown, Jackson, Boettcher + Dienner Oct. 31, 1961 K. K. SPJELDNES ET AL 3,007,008

AUTOMATIC TELEPHONE SYSTEM

Filed July 15, 1955 63 Sheets-Sheet 48

INVENTORS.
KARE K. SPJELDNES
JACK E. CALLENDER
ROBERT H. SLEMMER
WILLIAM H. BLASHFIELD

BY:
Brown, Jackson, Boettcher + Dienner

INVENTORS,
KARE K. SPJELDNES
JACK E. CALLENDER
ROBERT H. SLEMMER
WILLIAM H. BLASHFIELD
BY:
Brown, Jackson, Boettcher & Dienner INVENTORS.
KARE K. SPJELDNES
JACK E. CALLENDER
ROBERT H. SLEMMER
WILLIAM H. BLASHFIELD
BY:
Brown, Jackson, Boettcher & Dienner INVENTORS.
KARE K. SPJELDNES
JACK E. CALLENDER
ROBERT H. SLEMMER
WILLIAM H. BLASHFIELD
BY:
Brown Jackson Boettcher & Dienner Oct. 31, 1961 K. K. SPJELDNES ET AL 3,007,008

AUTOMATIC TELEPHONE SYSTEM

Filed July 15, 1955 63 Sheets-Sheet 52

INVENTORS.
KARE K. SPJELDNES
JACK E. CALLENDER
ROBERT H. SLEMMER
WILLIAM H. BLASHFIELD

BY:

Brown Jackson Boettcher & Dienner

INVENTORS.
KARE K. SPJELDNES
JACK E. CALLENDER
ROBERT H. SLEMMER
WILLIAM H. BLASHFIELD
BY:
Brown, Jackson, Boettcher & Dienner INVENTORS.
KARE K. SPJELDNES
JACK E. CALLENDER
ROBERT H. SLEMMER
WILLIAM H. BLASHFIELD
BY:
Brown Jackson, Boettcher & Dienner INVENTORS.
KARE K. SPJELDNES
JACK E. CALLENDER
ROBERT H. SLEMMER
WILLIAM H. BLASHFIELD
BY:
Brown, Jackson, Boettcher & Dienner INVENTORS.
KARE K. SPJELDNES
JACK. E. CALLENDER
ROBERT H. SLEMMER
WILLIAM H. BLASHFIELD.
BY:
Brown, Jackson, Boettcher & Dienner INVENTORS.
KARE K. SPJELDNES
JACK E. CALLENDER
ROBERT H. SLEMMER
WILLIAM H. BLASHFIELD
BY:
Brown, Jackson, Boettcher & Dienner INVENTORS.
KARE K. SPJELDNES
JACK E. CALLENDER
ROBERT H. SLEMMER
WILLIAM H. BLASHFIELD
BY:
Brown, Jackson, Boettcher & Dienner INVENTORS.
KARE K. SPJELDNES
JACK E. CALLENDER
ROBERT H. SLEMMER
WILLIAM H. BLASHFIELD.
BY:
Brown, Jackson, Boettcher & Dienner Oct. 31, 1961 K. K. SPJELDNES ET AL 3,007,008

AUTOMATIC TELEPHONE SYSTEM

Filed July 15, 1955 63 Sheets-Sheet 60

INVENTORS.

KARE K. SPJELDNES
JACK E. CALLENDER
ROBERT H. SLEMMER
WILLIAM H. BLASHFIELD

BY: Brown, Jackson, Boettcher & Dienner

INVENTORS.
KARE K. SPJELDNES
JACK E. CALLENDER
ROBERT H. SLEMMER
WILLIAM H. BLASHFIELD
BY:
Brown, Jackson, Boettcher & Dienner INVENTORS.
KARE K. SPJELDNES
JACK E. CALLENDER
ROBERT H. SLEMMER
WILLIAM H. BLASHFIELD
BY:
Brown, Jackson, Boettcher & Dienner INVENTORS.
KARE K. SPJELDNES
JACK E. CALLENDER
ROBERT H. SLEMMER
WILLIAM H. BLASHFIELD
BY:
Brown, Jackson, Boettcher & Dienner 3,007,008

AUTOMATIC TELEPHONE SYSTEM

Kare K. Spjeldnes, Jack E. Callender, Robert H. Slemmer, and William H. Blashfield, Galion, Ohio, assignors to North Electric Company, a corporation of Ohio
Filed July 15, 1955, Ser. No. 522,233
43 Claims. (Cl. 179—22)

The present application relates to automatic telephone systems in general and more particularly to automatic telephone systems of the cross-bar type.

One object of the present application is the arrangement of a crossbar switch in such fashion that twenty-five lines can be connected to twelve horizontals.

Another object of the present application is the provision of a plug-in unit comprising twenty-five line circuits, the associated cross-bar switch to which the twenty-five lines are connected, and other associated circuitry.

Another object of the present application is the provision of an arrangement for transmitting signals from a sender to a terminating subscriber's cord circuit by means of codes over the tip and ring conductors. These signals contain information as to the type of origin of the call for accomplishing adjustment of the cord circuit accordingly, and also contain information which causes the cord circuit accordingly, and also contain information which causes the cord circuit to ring the called subscriber with the proper ringing frequency and code.

Another object of the present application is the provision of a telephone system in which the registers have access to a lesser number of senders than is conventionally accessed.

Another object of the present application is the provision of a telephone system in which senders have direct access to number groups whereby dialled directory numbers are translated into equipment locations of called lines.

Another object of the present application is the provision of a novel line circuit whereby busy, idle, and lockout conditions can be ascertained over the sleeve conductor.

Other objects will appear from a reading of the specification.

Referring to the drawings:

FIGS. 1, 2, and 3 constitute a block diagram of the crossbar system of the application;

FIG. 3–A sets forth crossbar switch symbolism and FIG. 3–B sets forth multiple relay symbolism used in the drawings;

Figures 10, 10A:
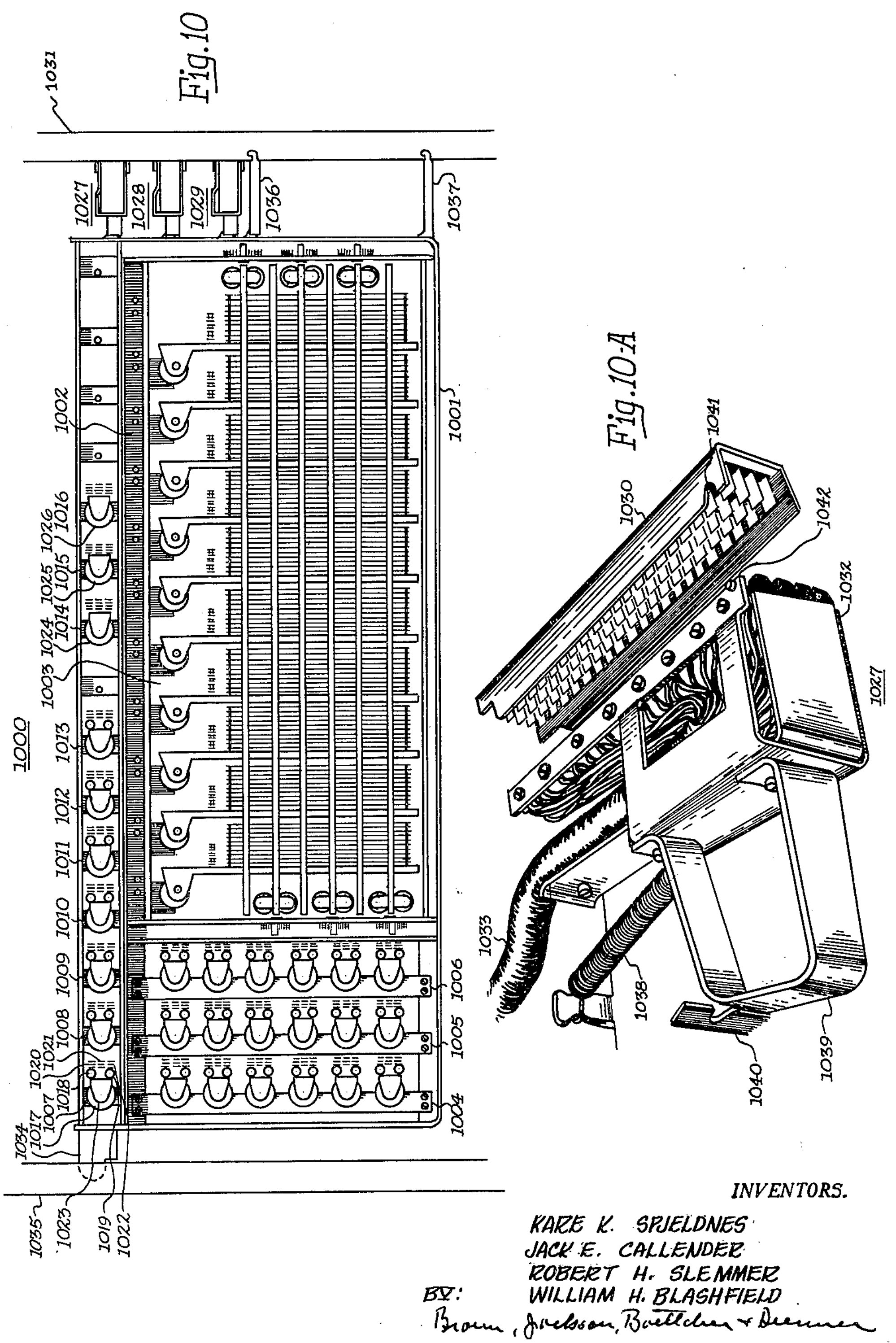
FIG. 10 is a schematic representation of the front of a plug-in twenty-five line unit including line relays, associated crossbar switch, and miscellaneous relays.
Figure 11:
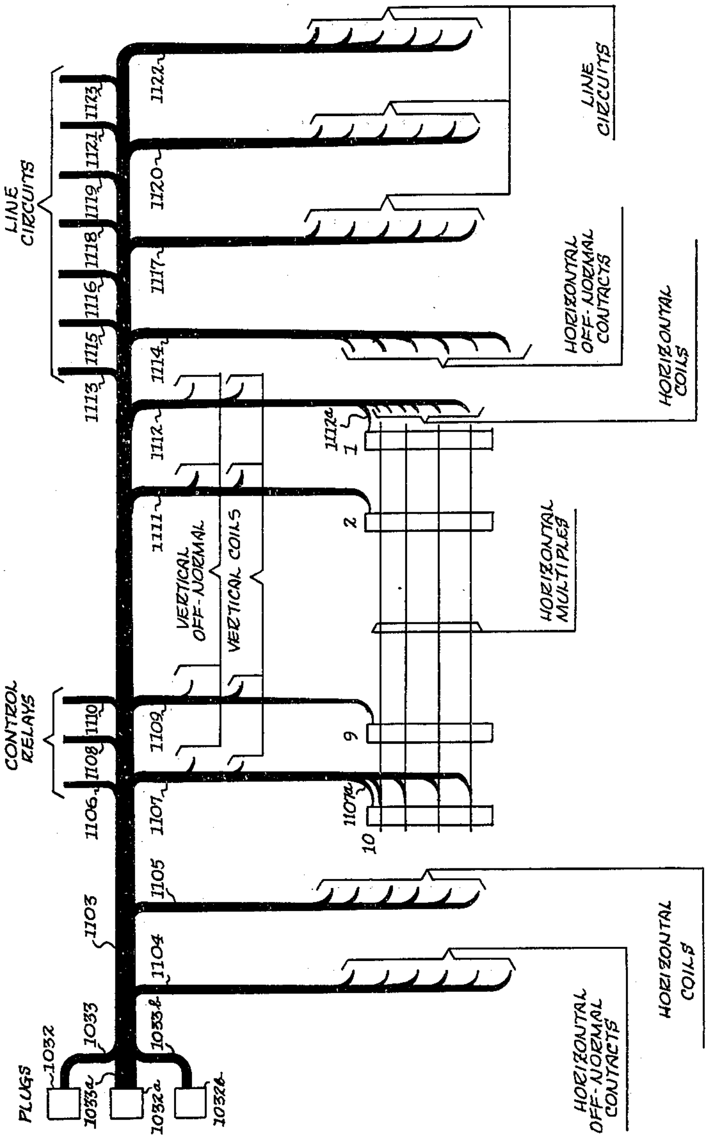
Figure 12:
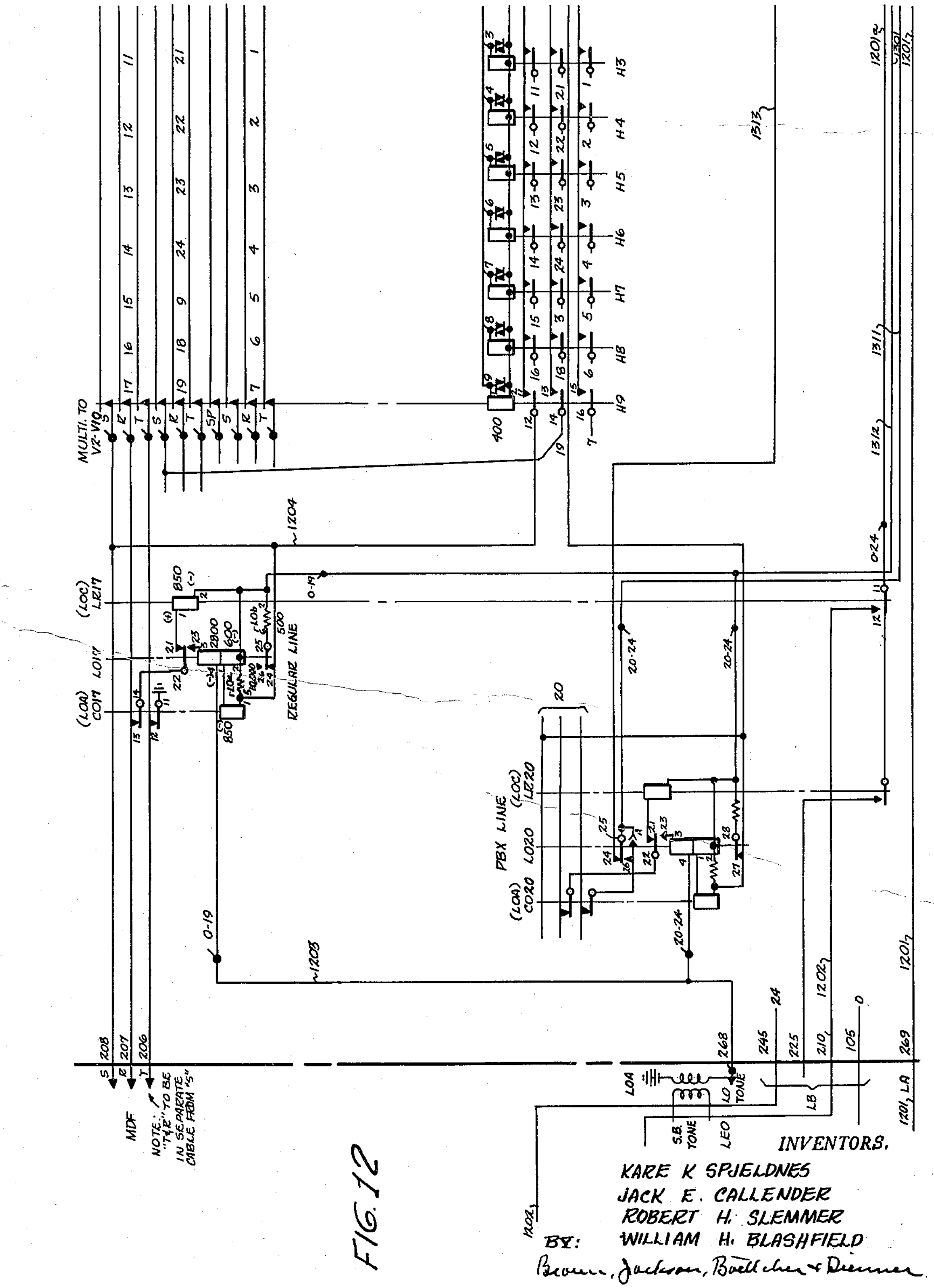
Figure 13:
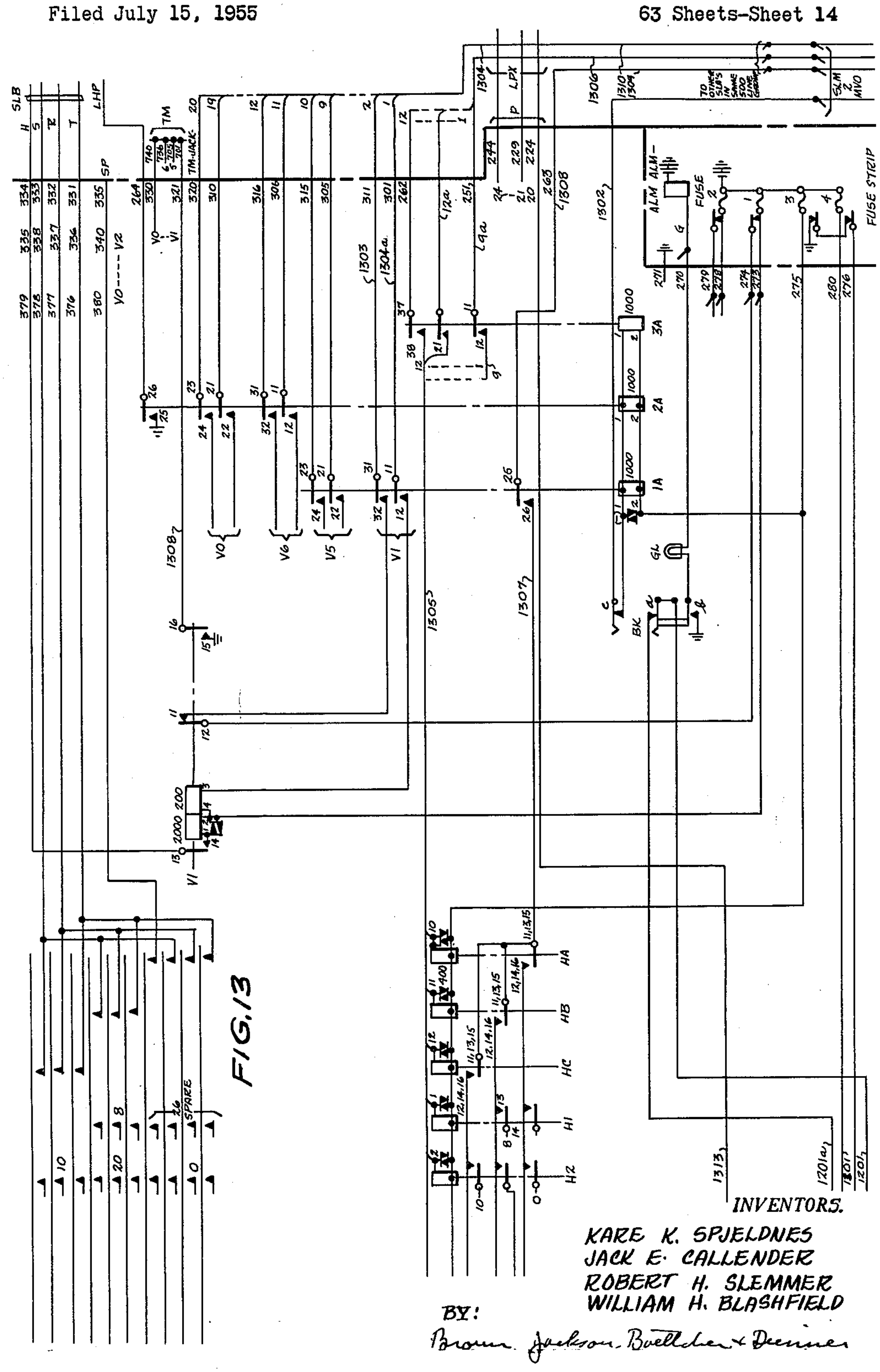
Figure 14:
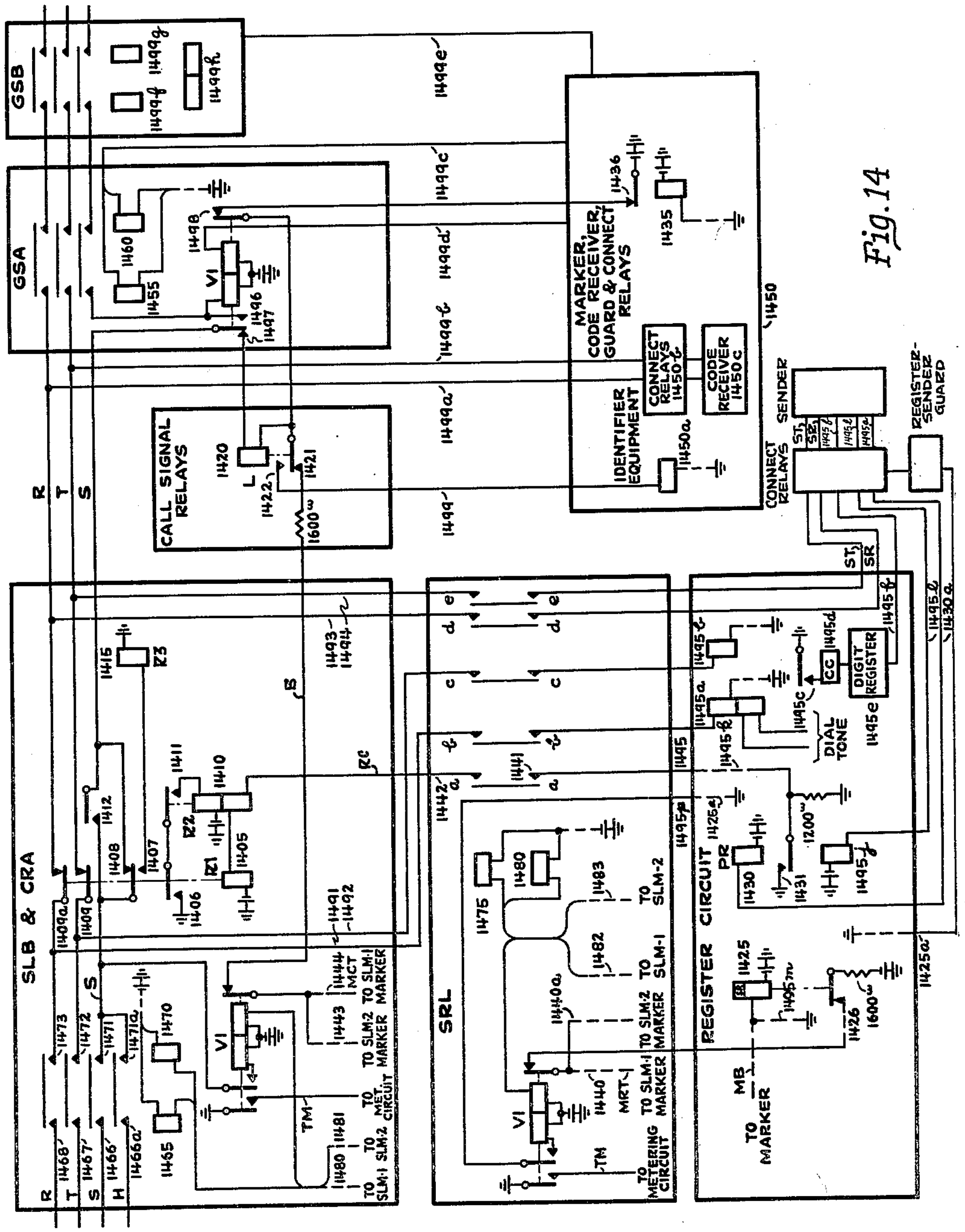
Figure 15:
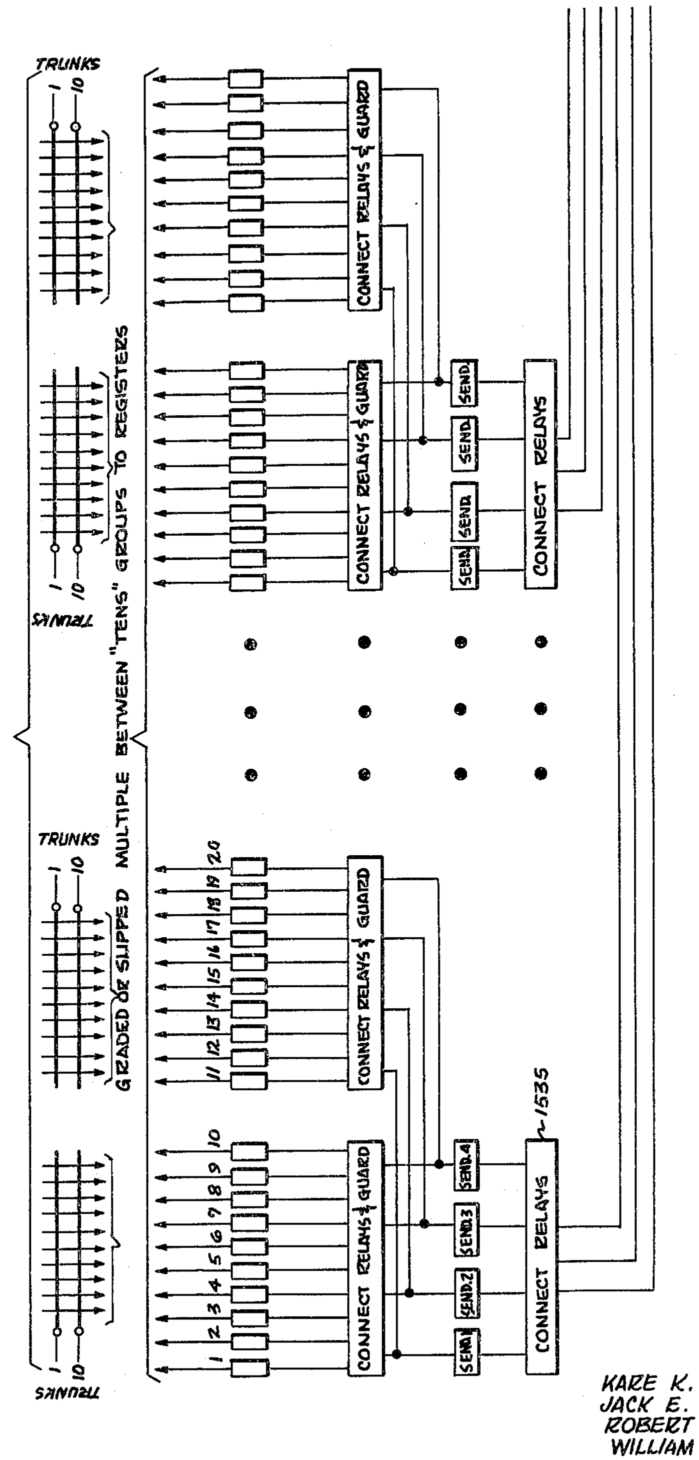
Figure 16:
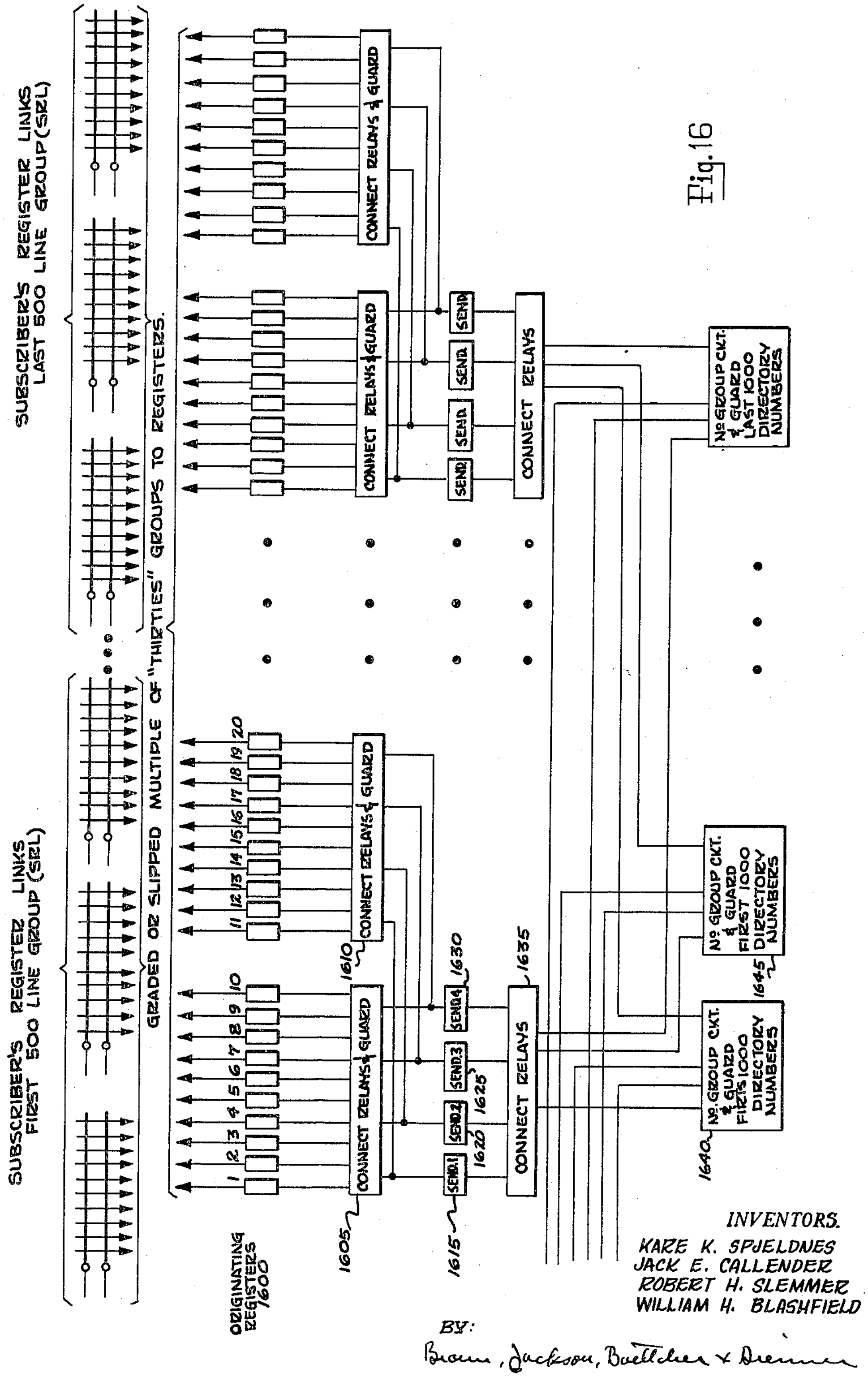
Figure 17:
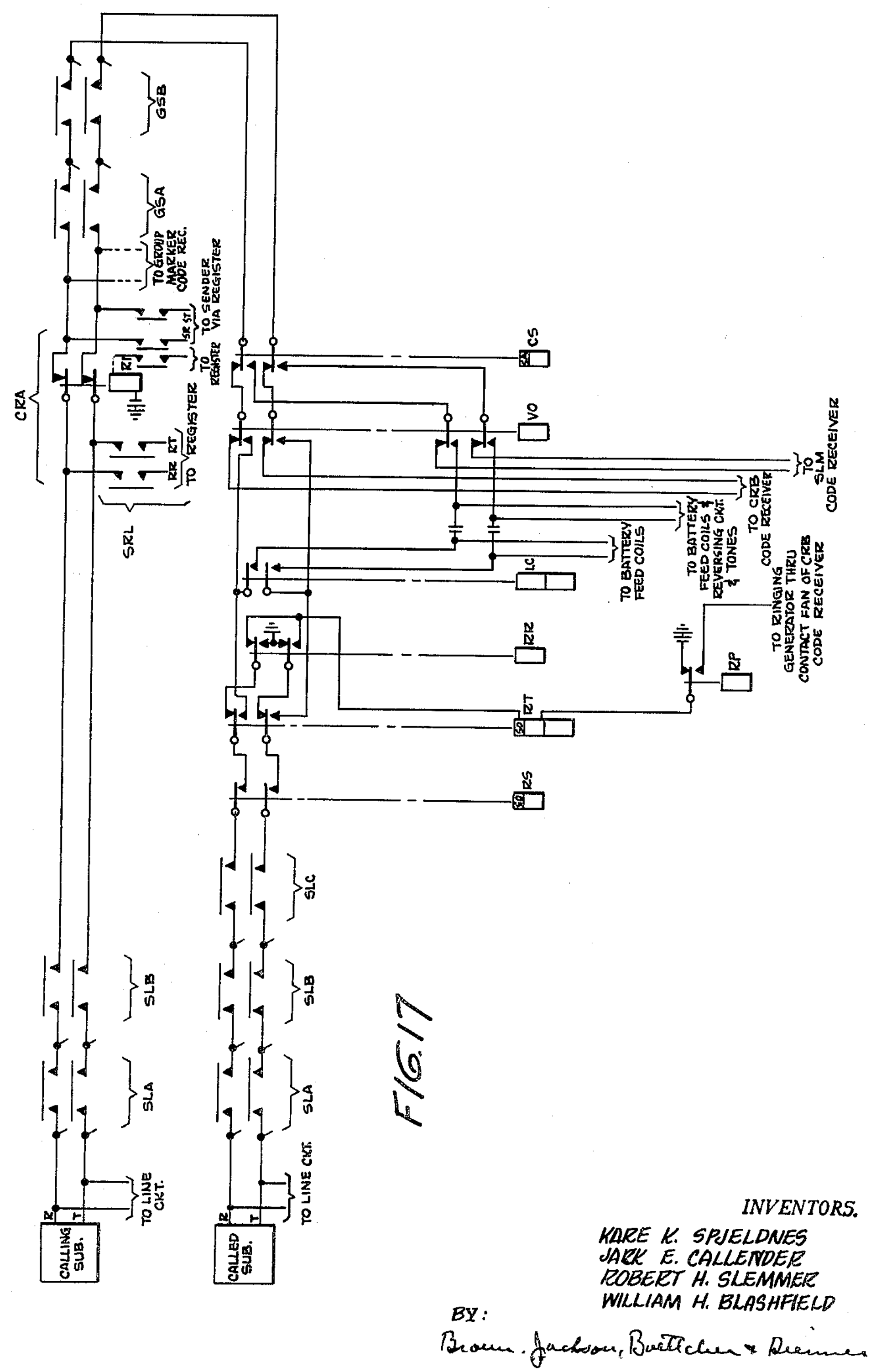
Figure 18:
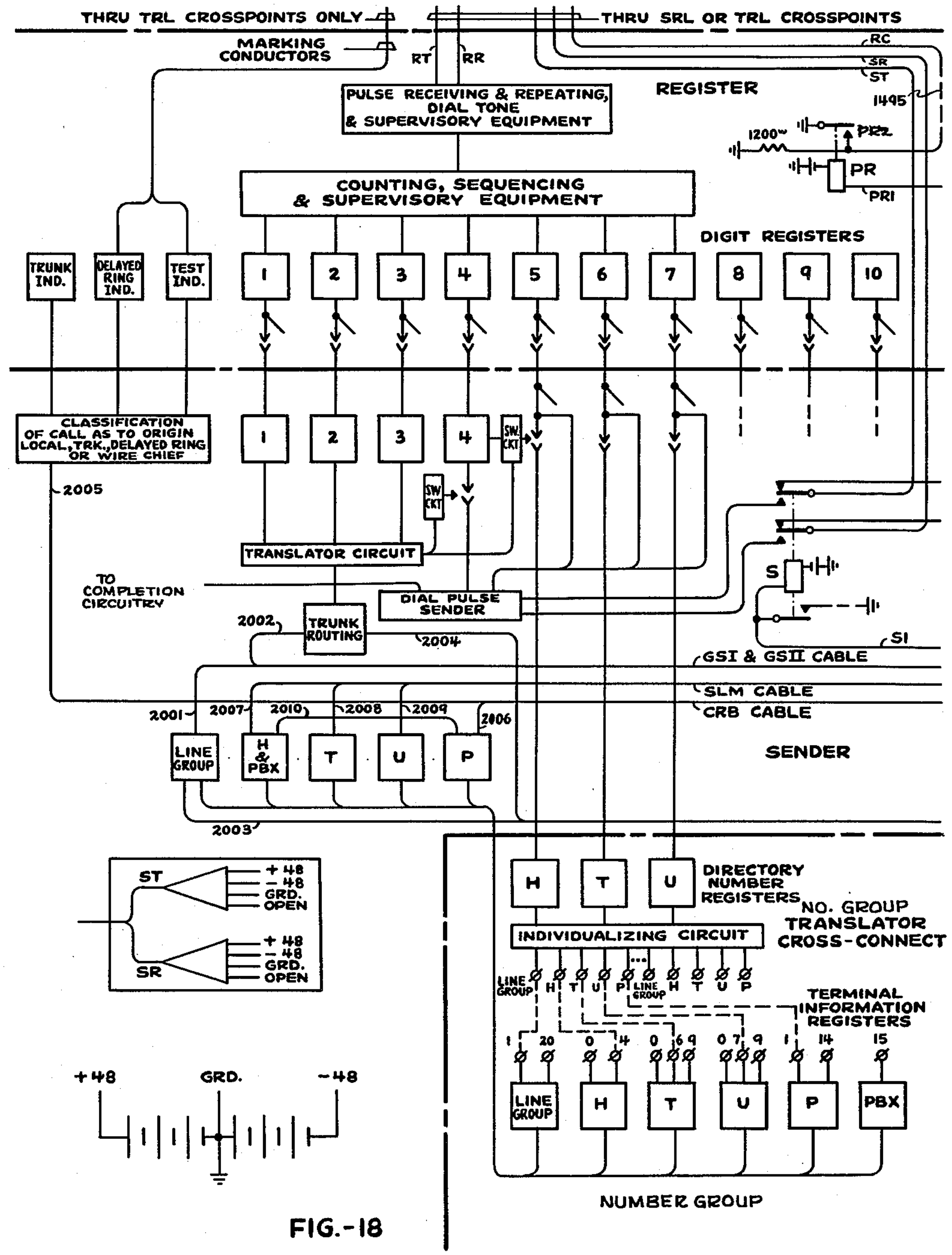
Figure 20:
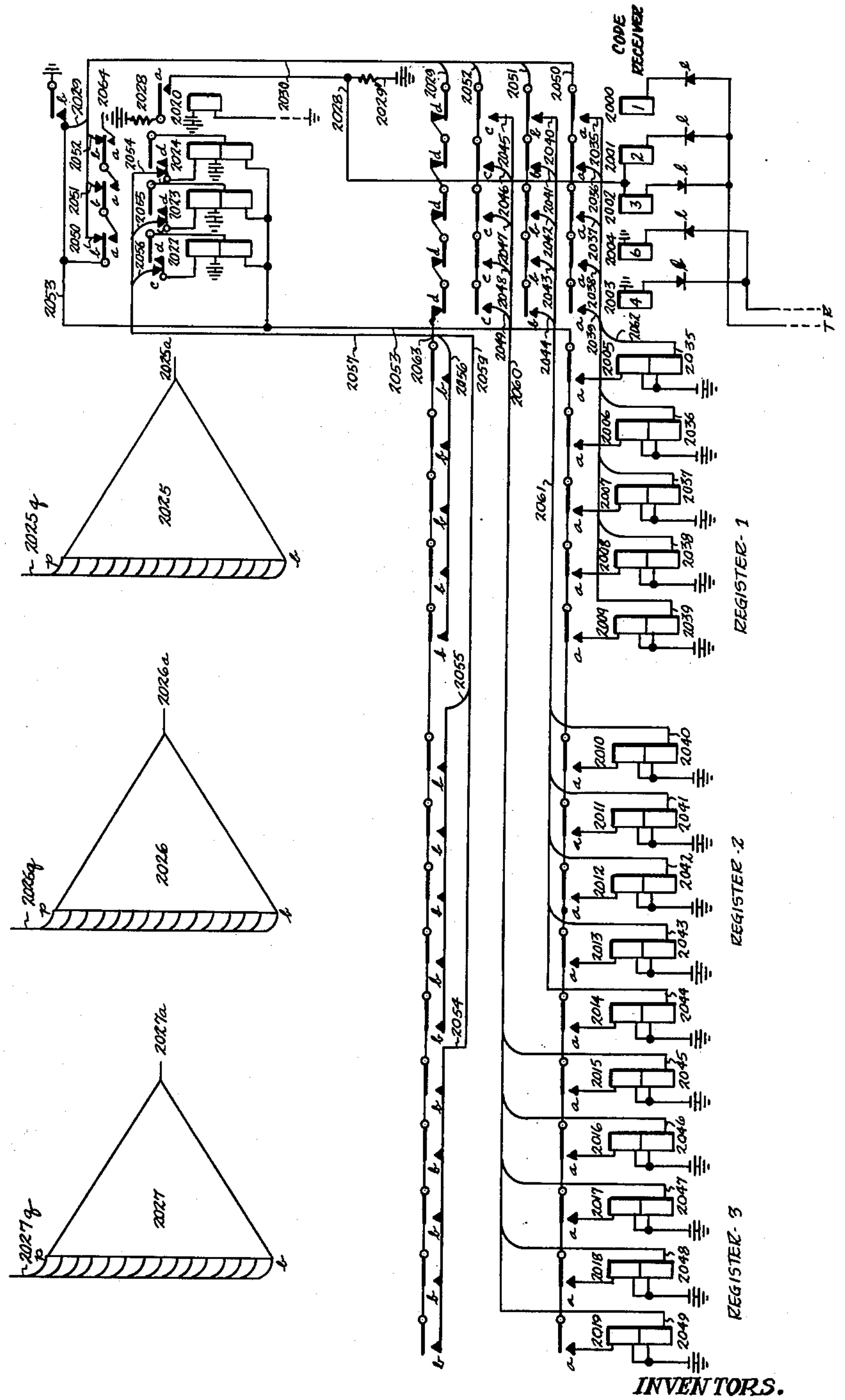
Figure 21:
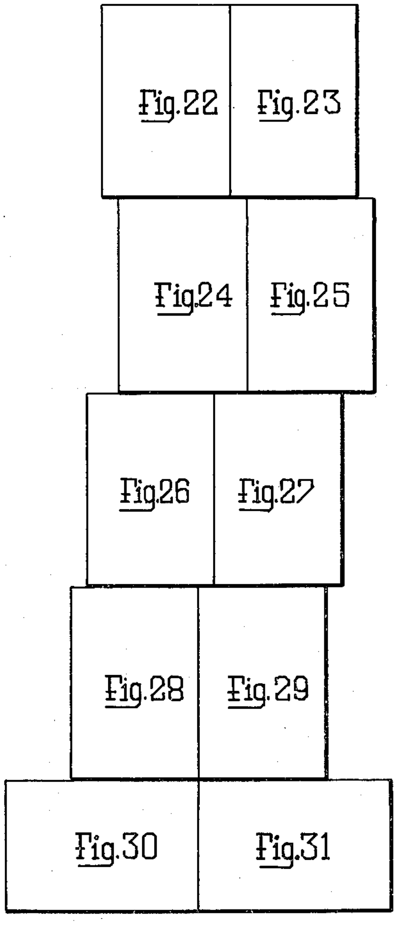
Figure 22:
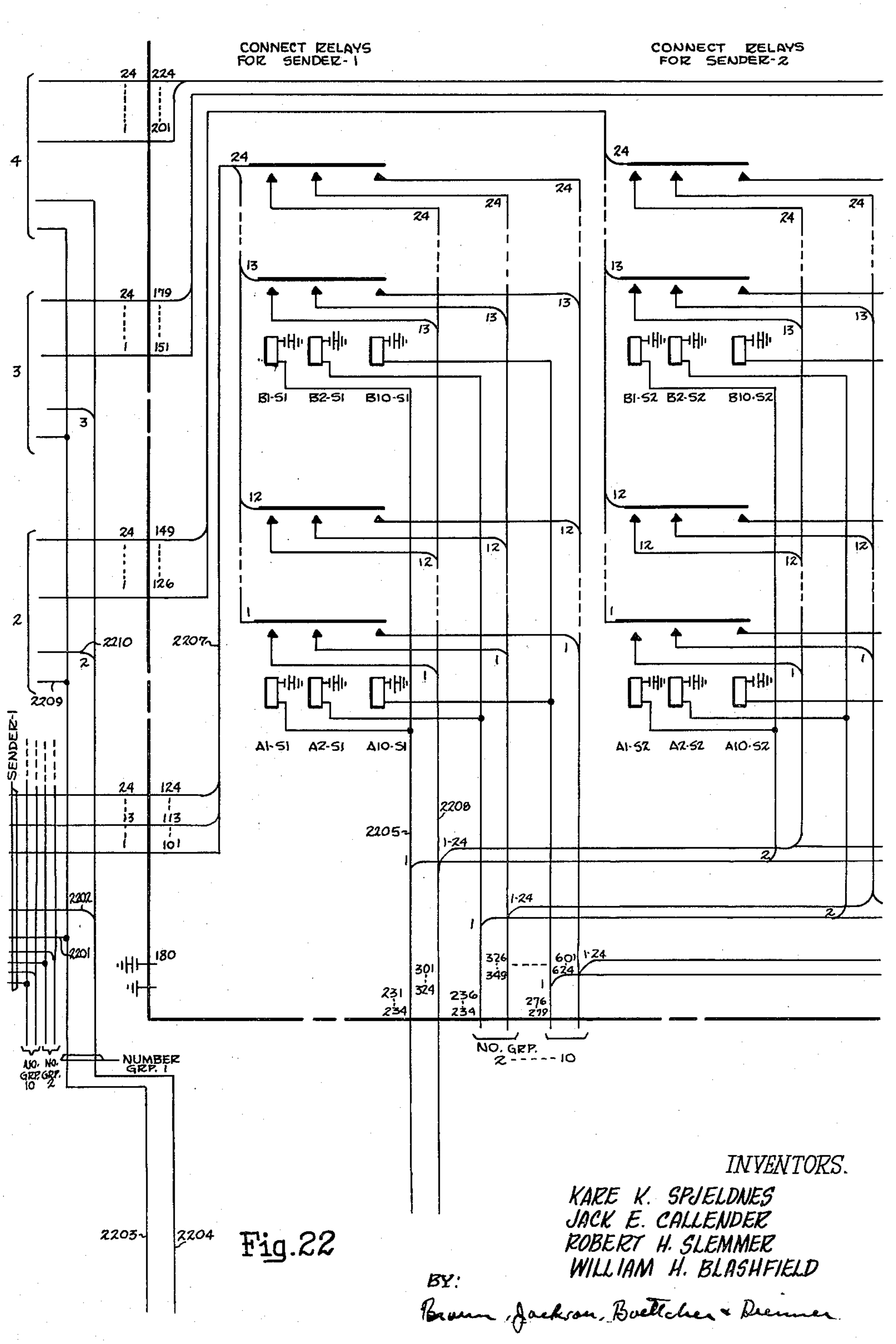
Figure 23:
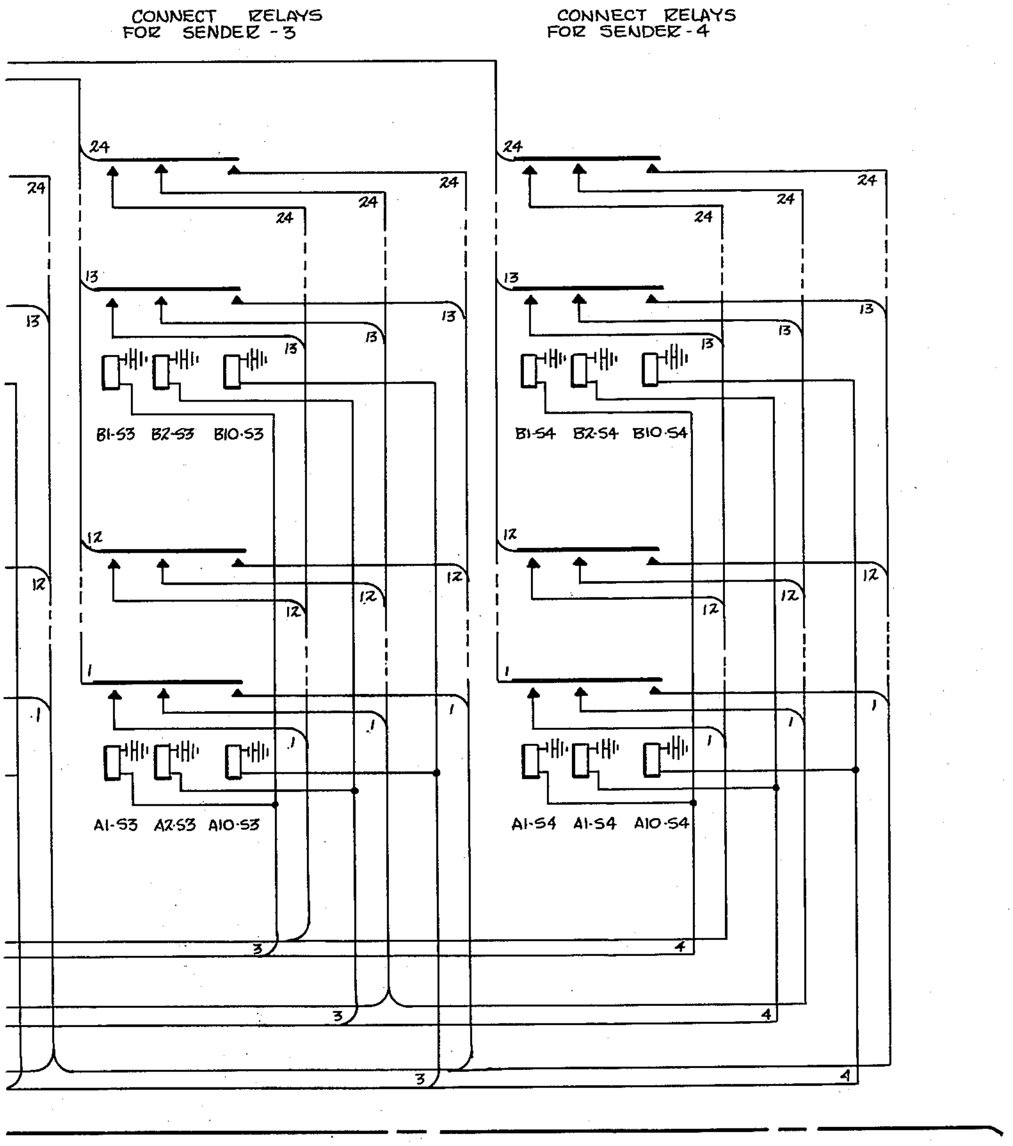
Figure 32:
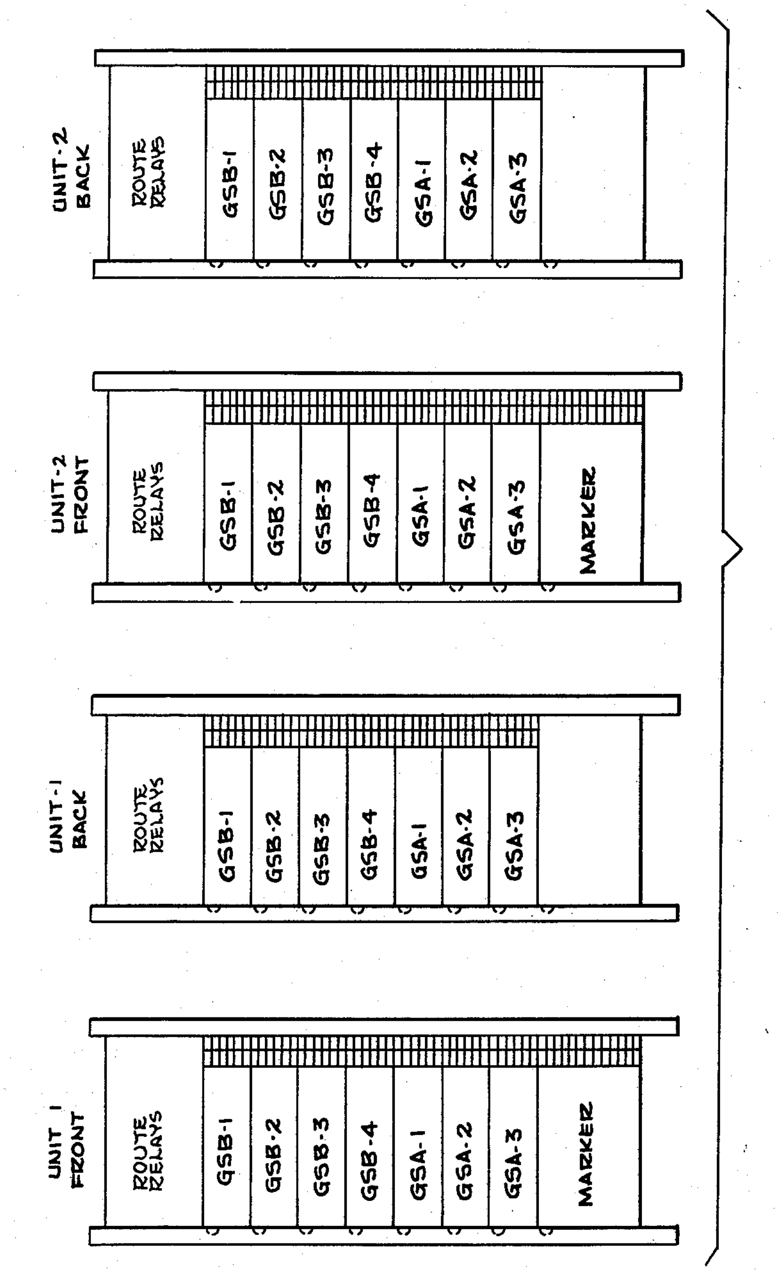
Figure 33:
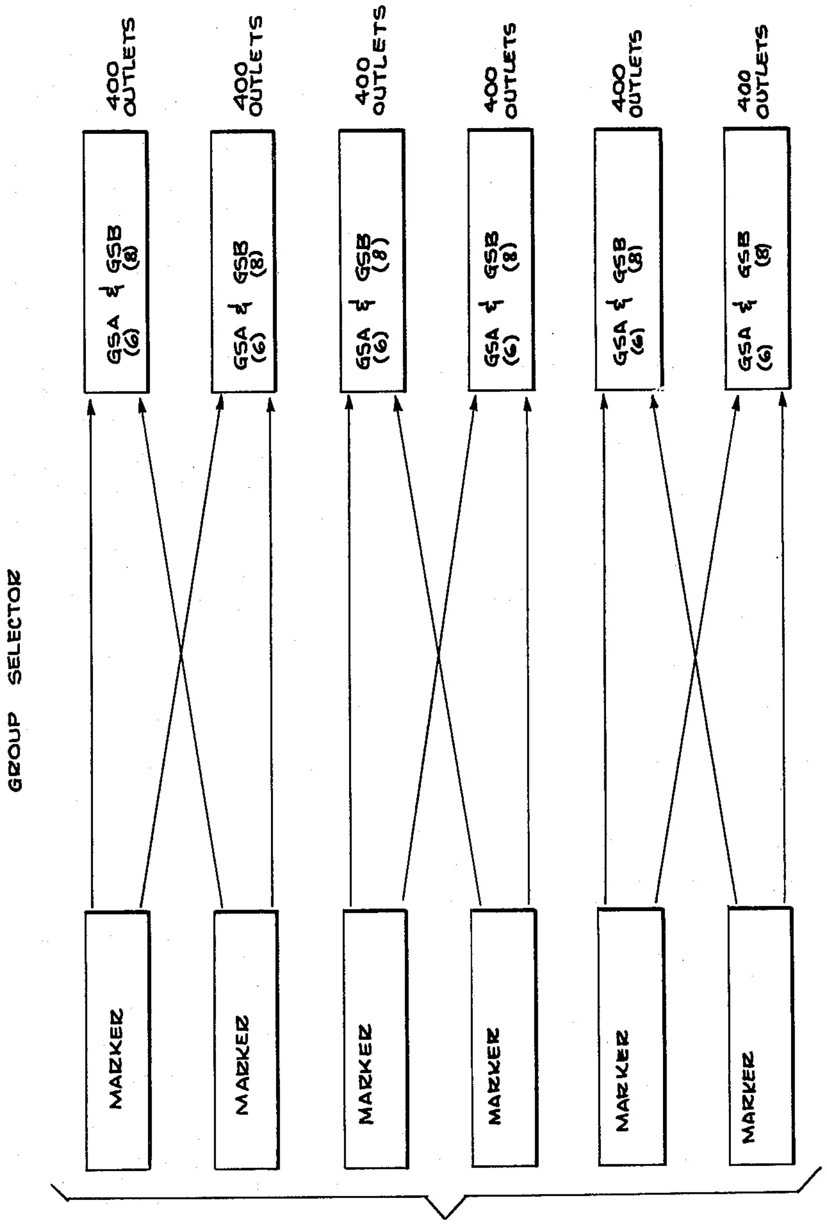
Figure 34:
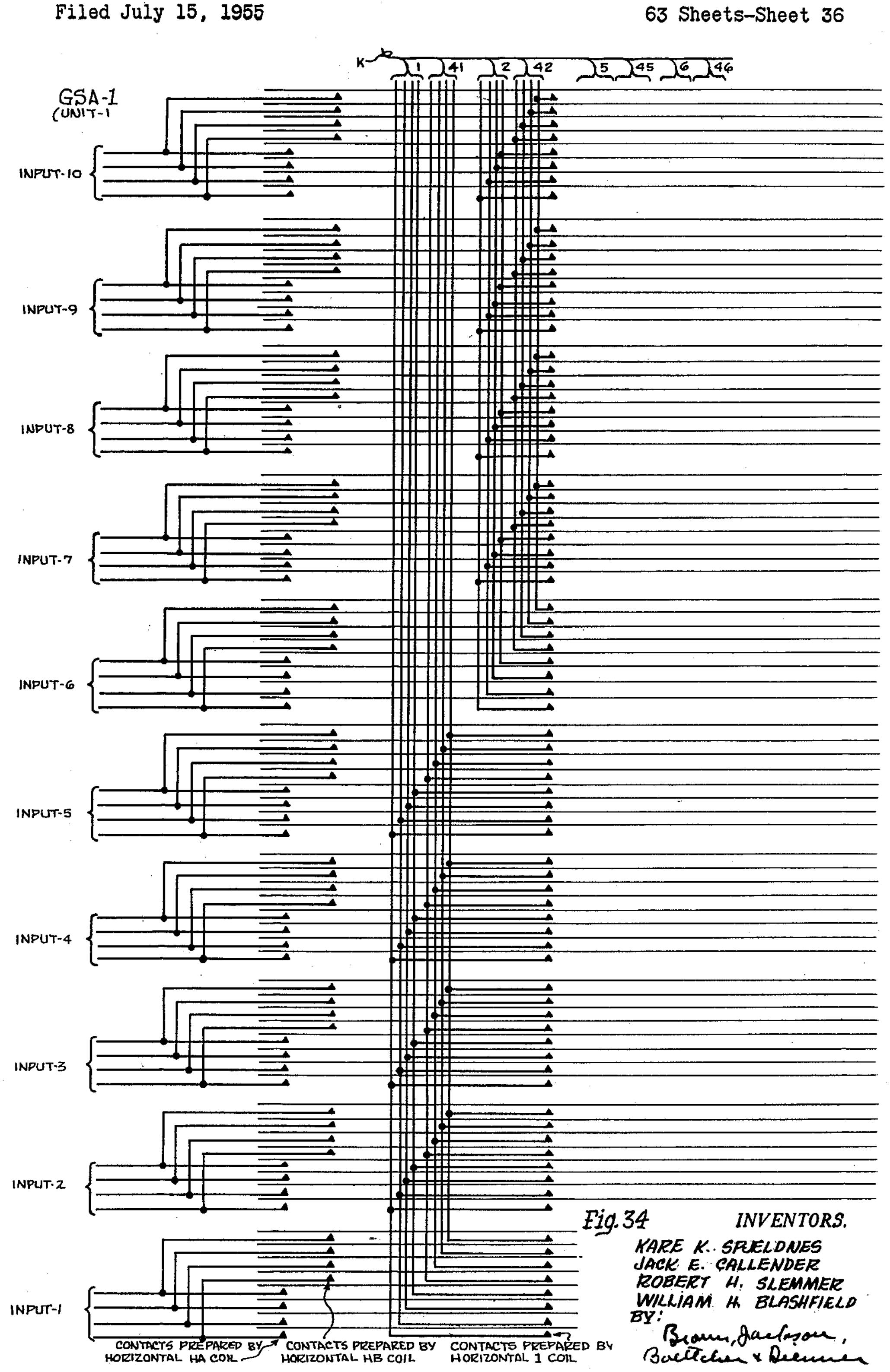
Figure 35:
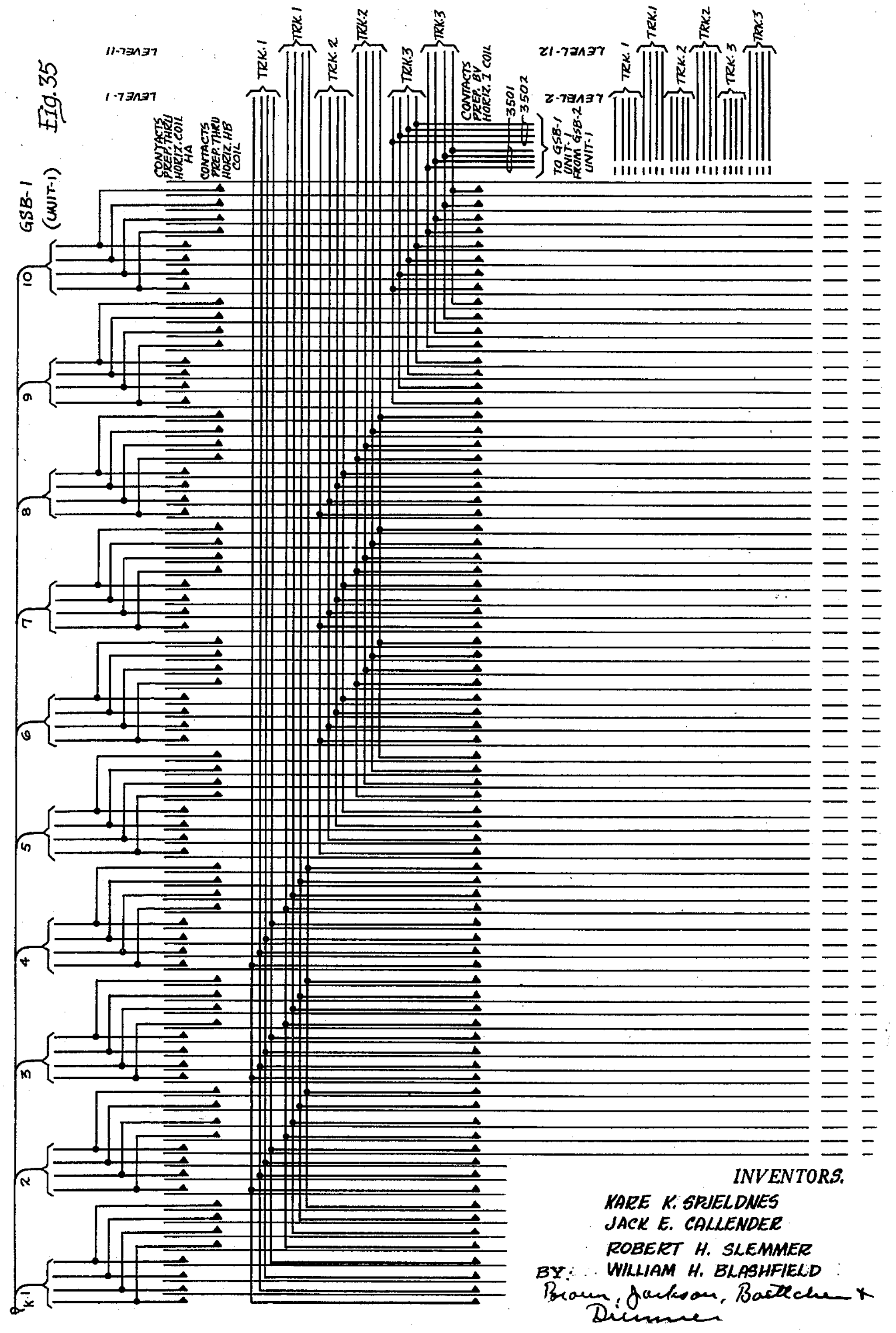
Figures 36, 37, 38, 39, 40, 41, 42, 43:
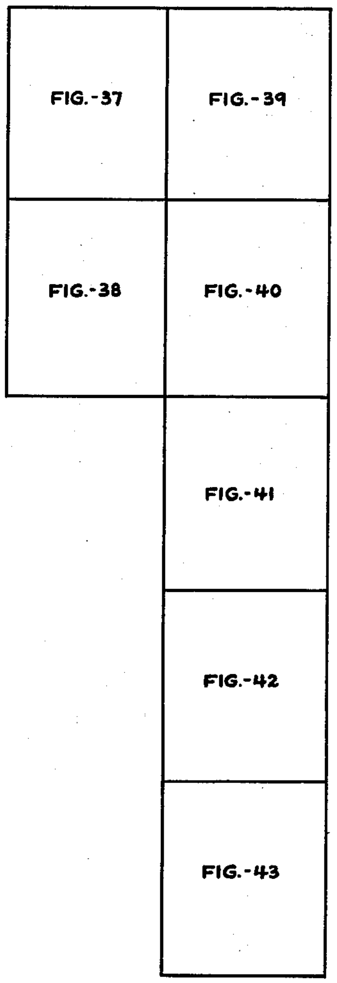
Figure 37:
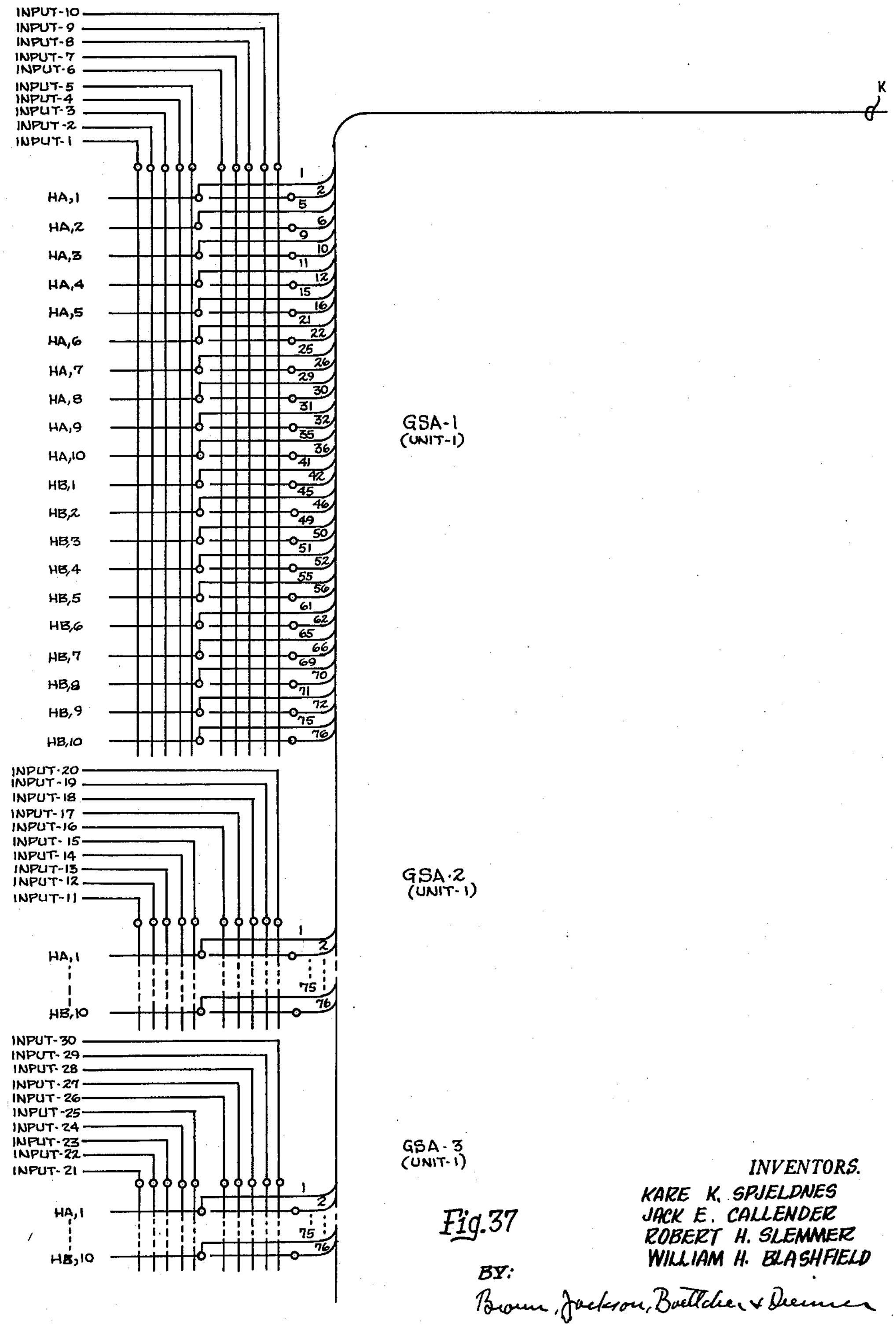
Figure 38:
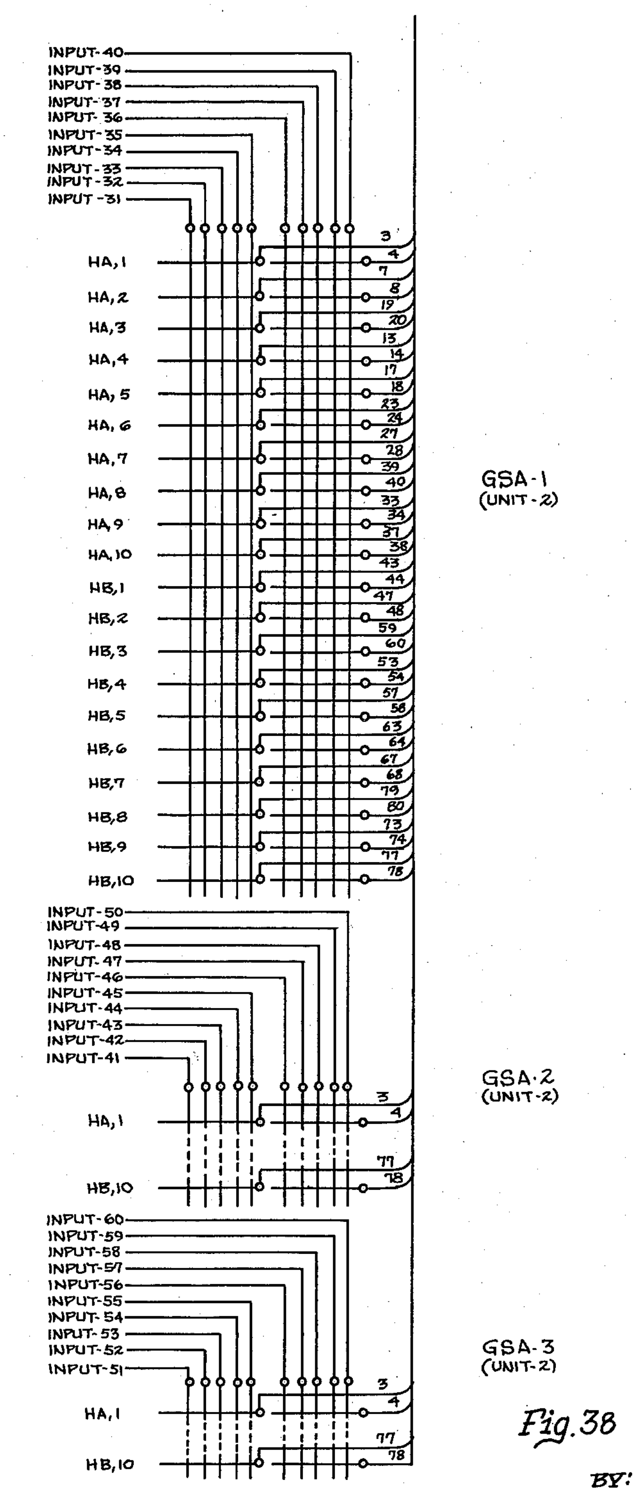
Figure 39:
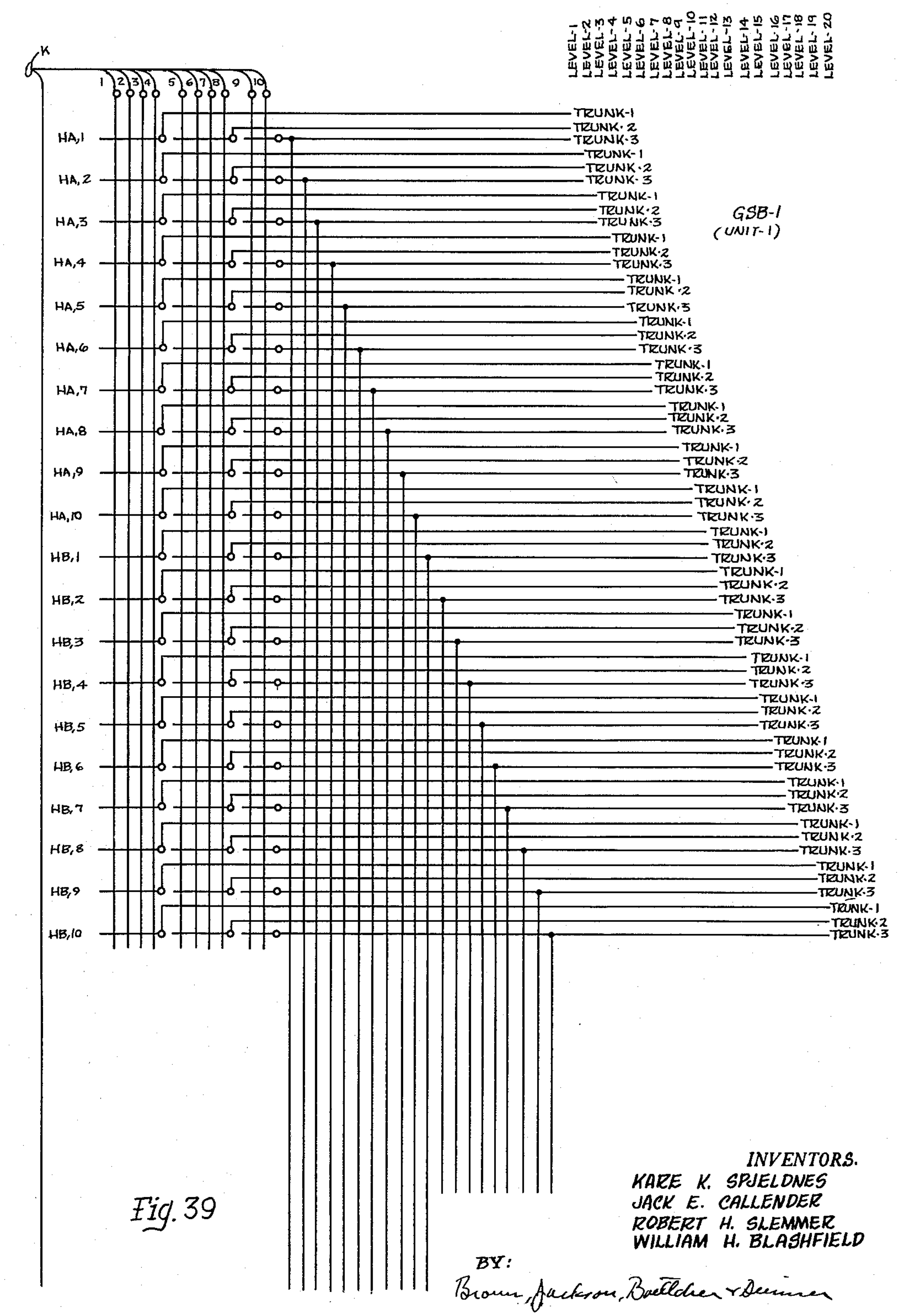
Figure 40:
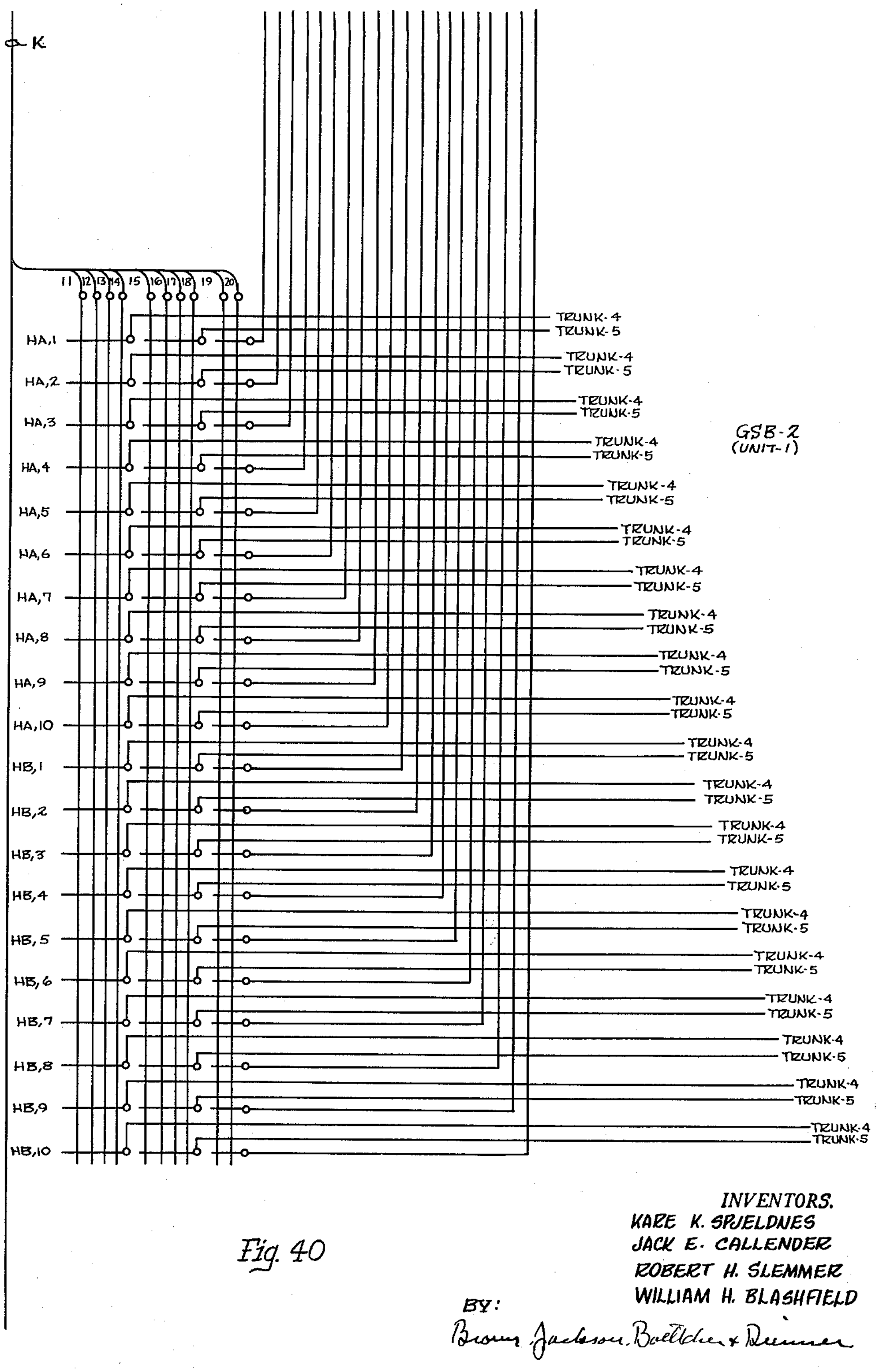
Figure 41:
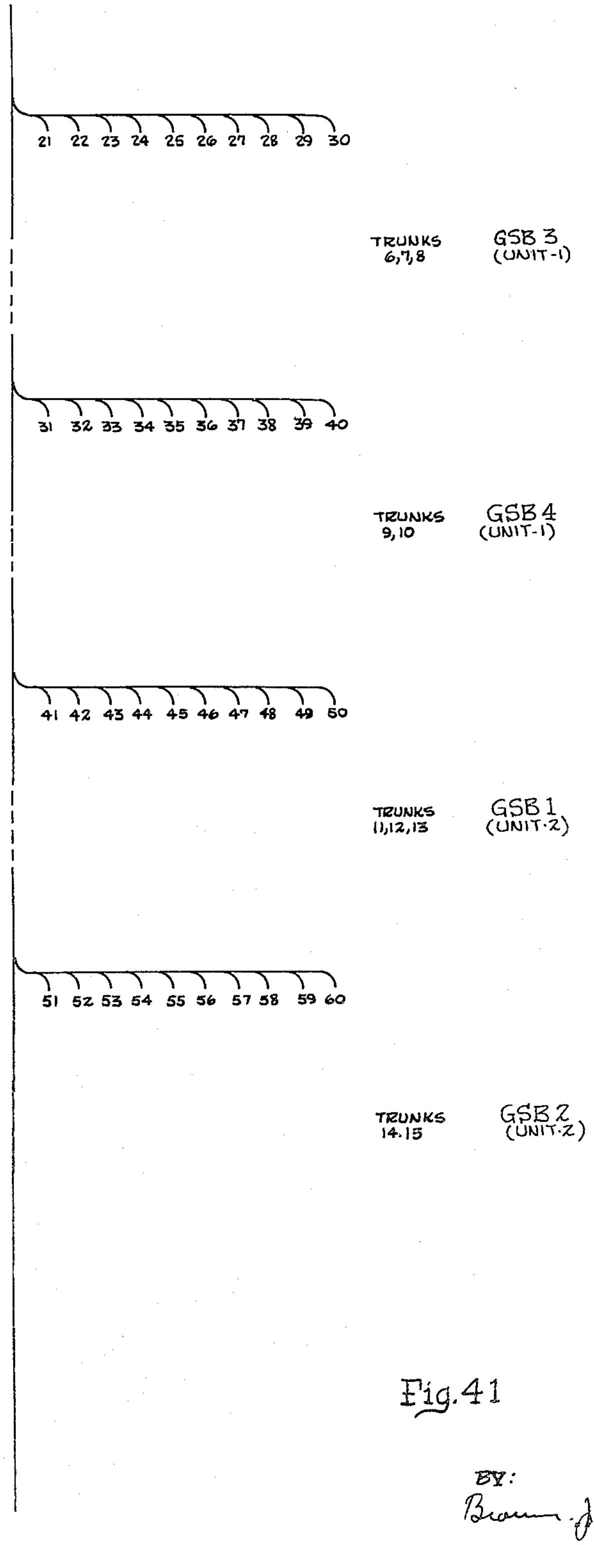
Figure 42:
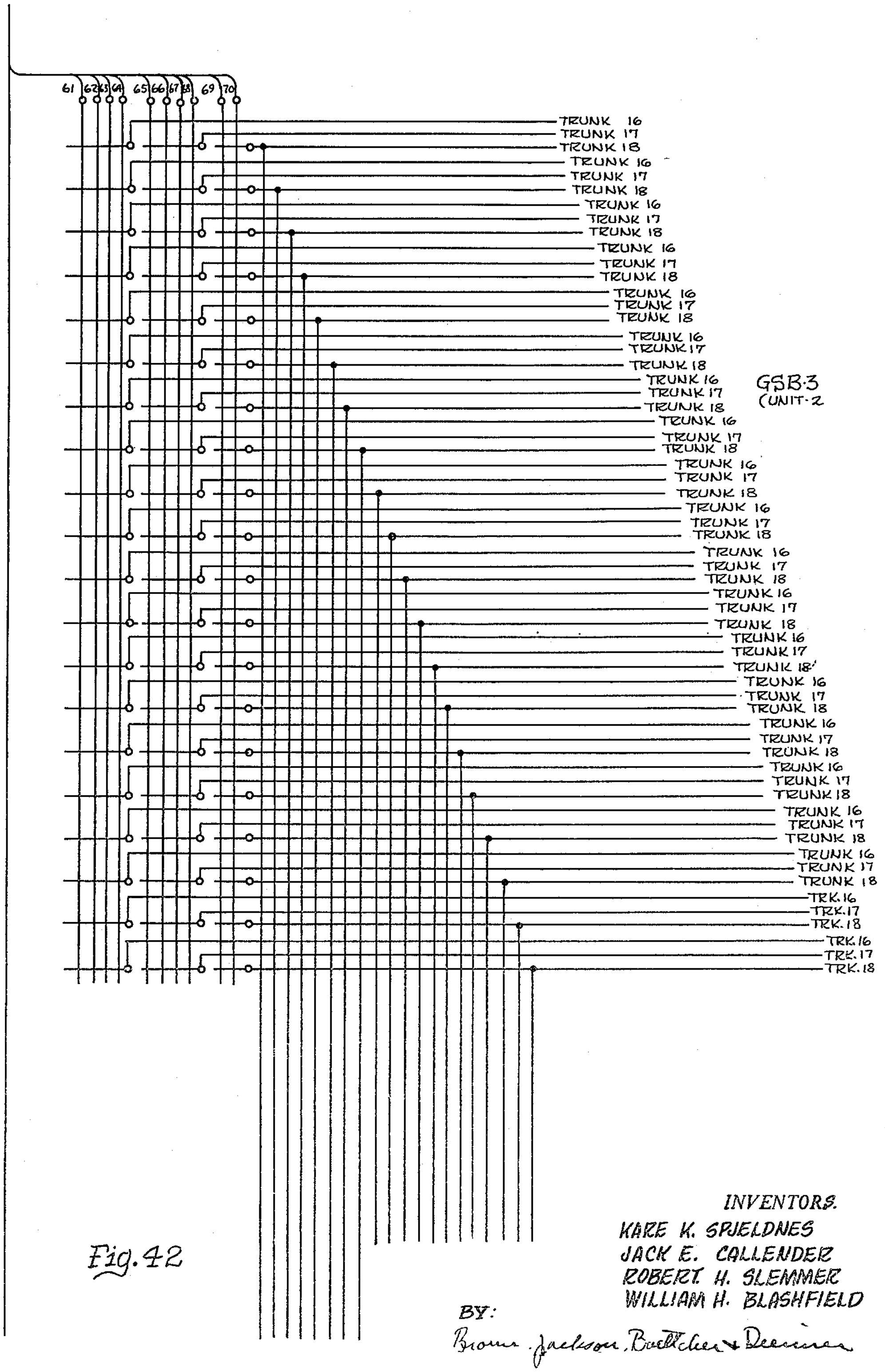
Figure 43:
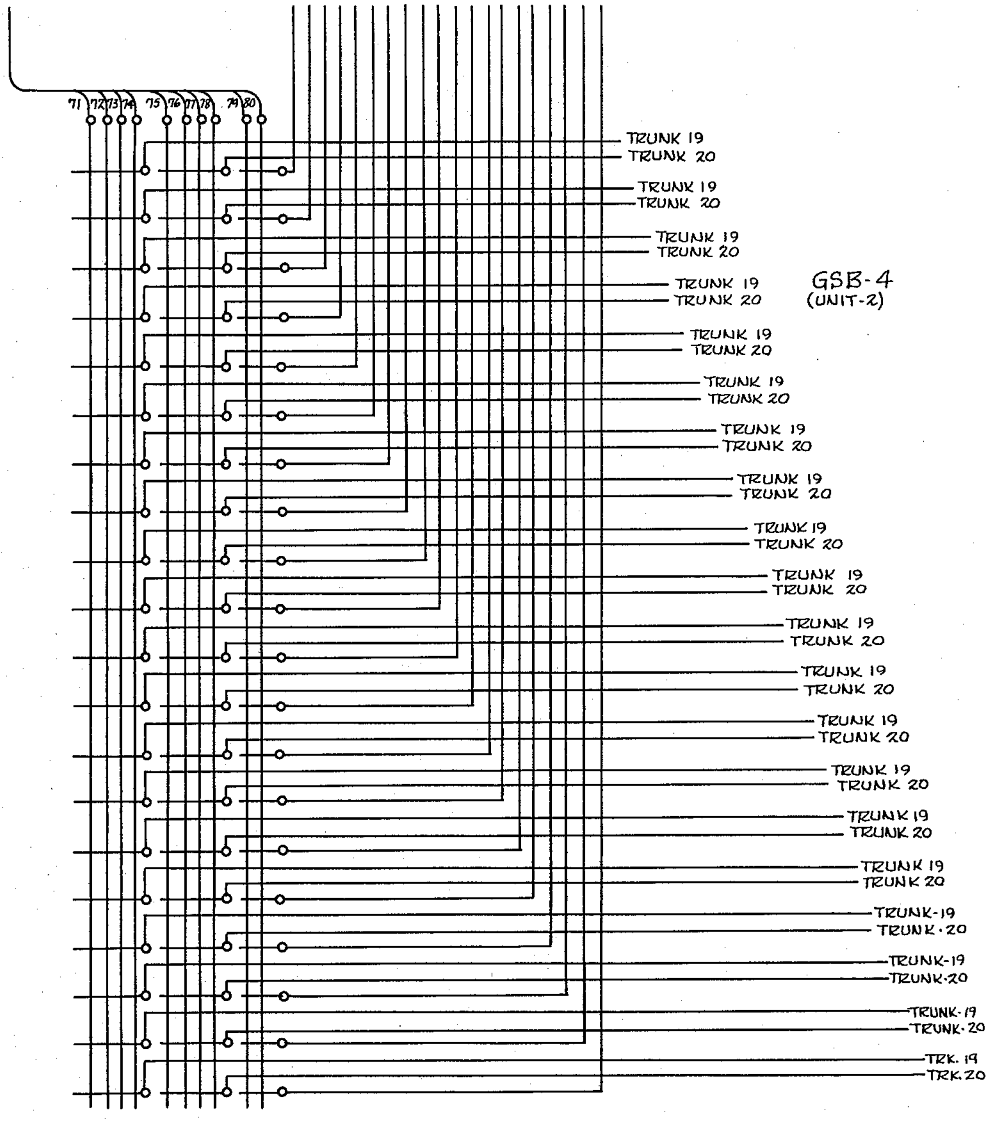
Figure 45:
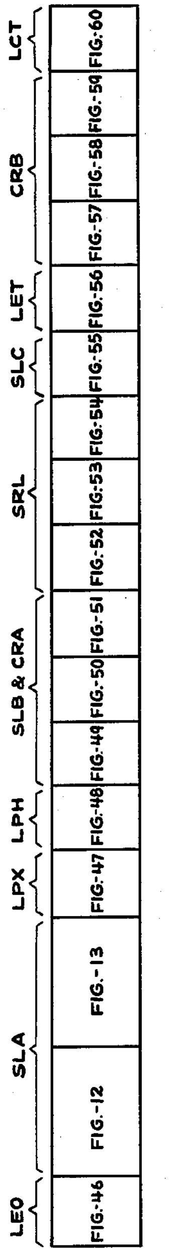
Figure 46:
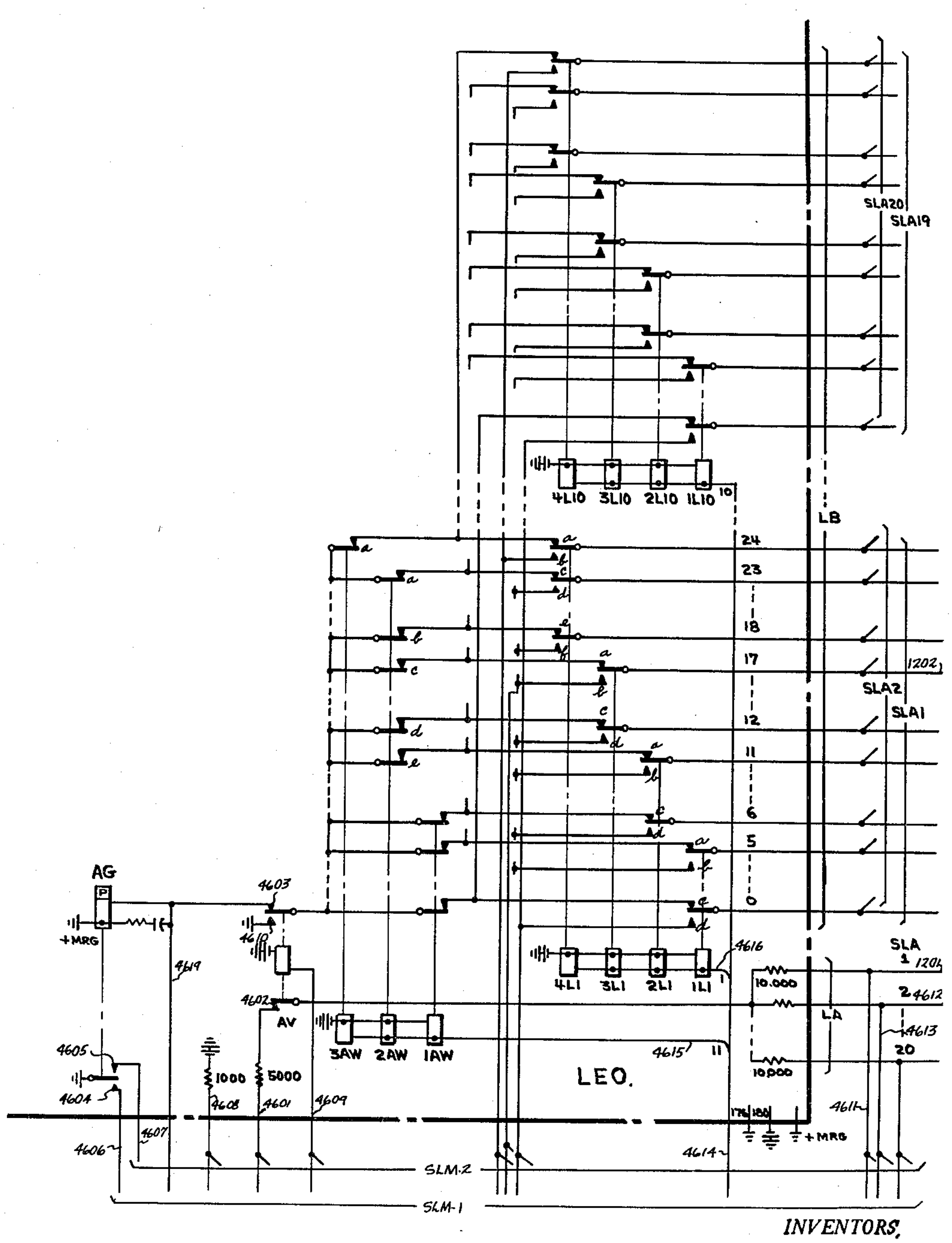
Figure 47:
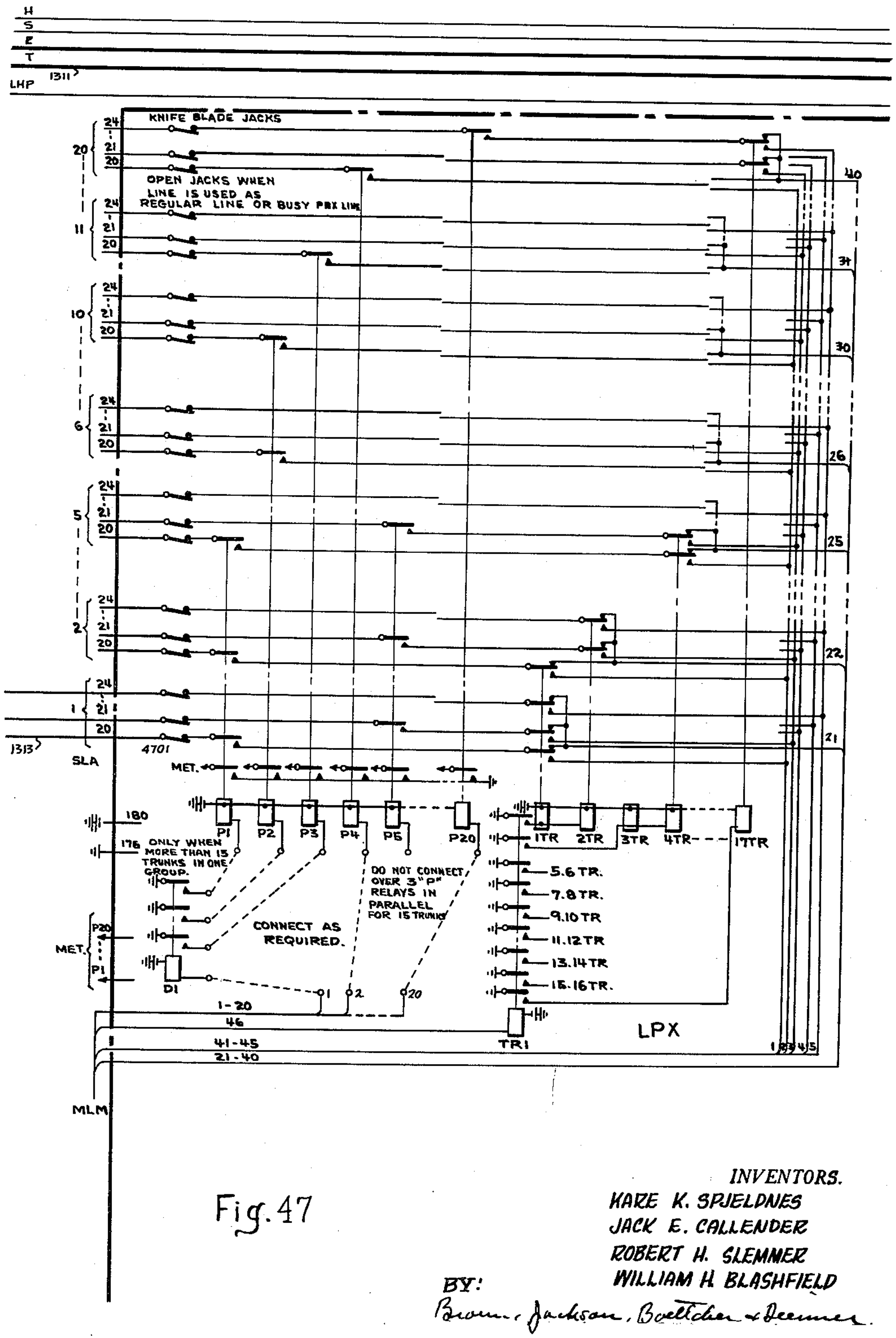
Figure 48:
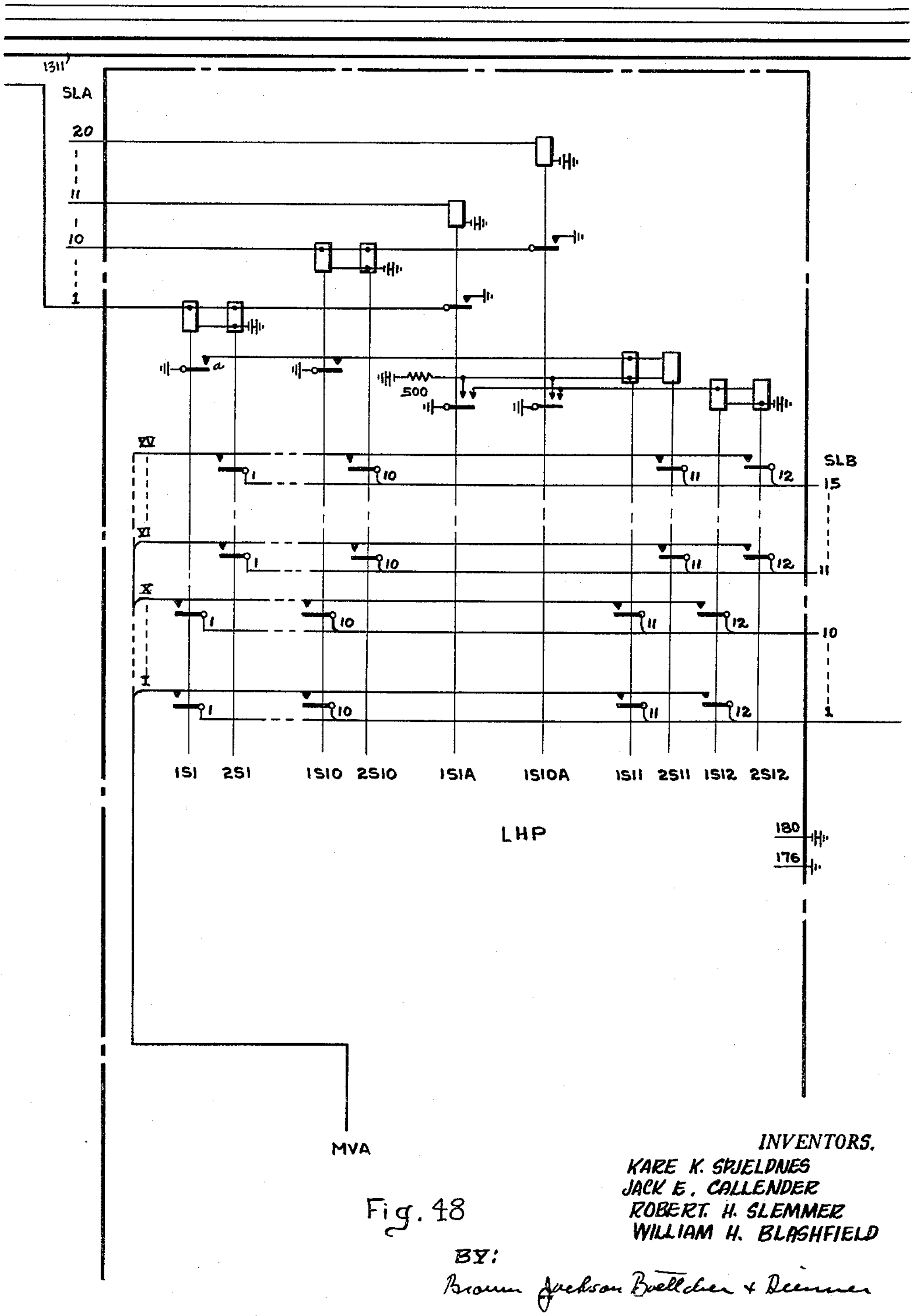
Figure 49:
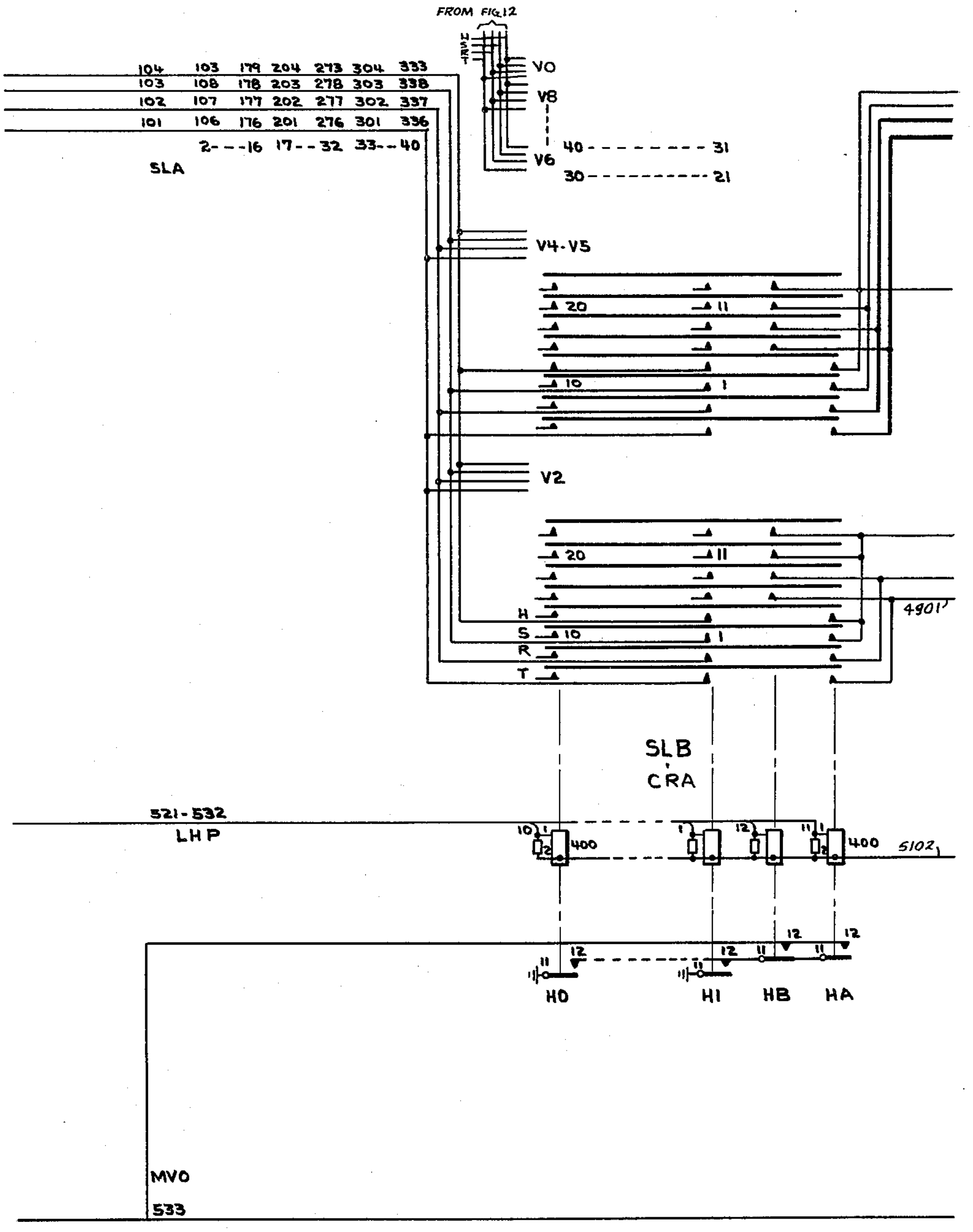
Figure 50:
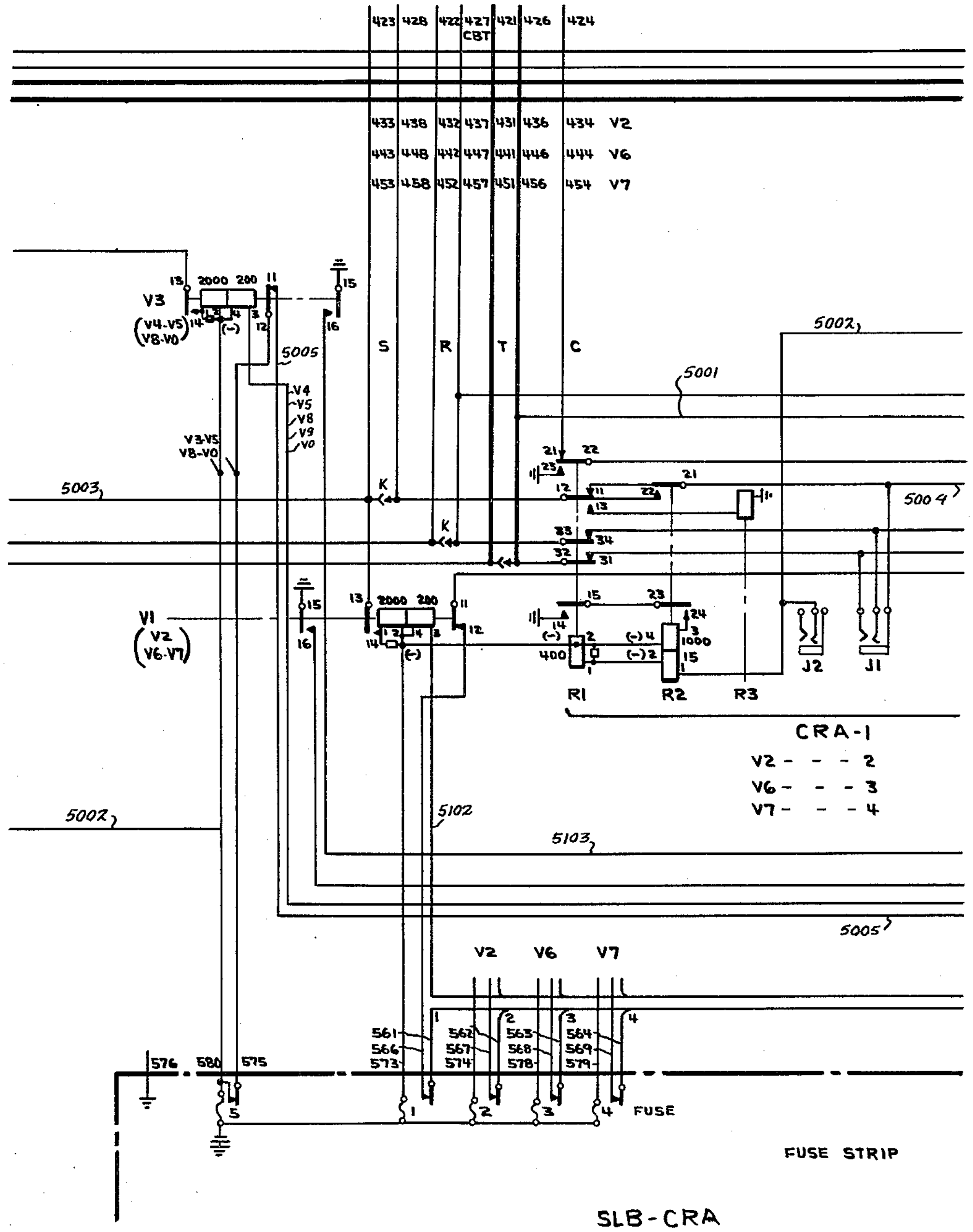
Figure 51:
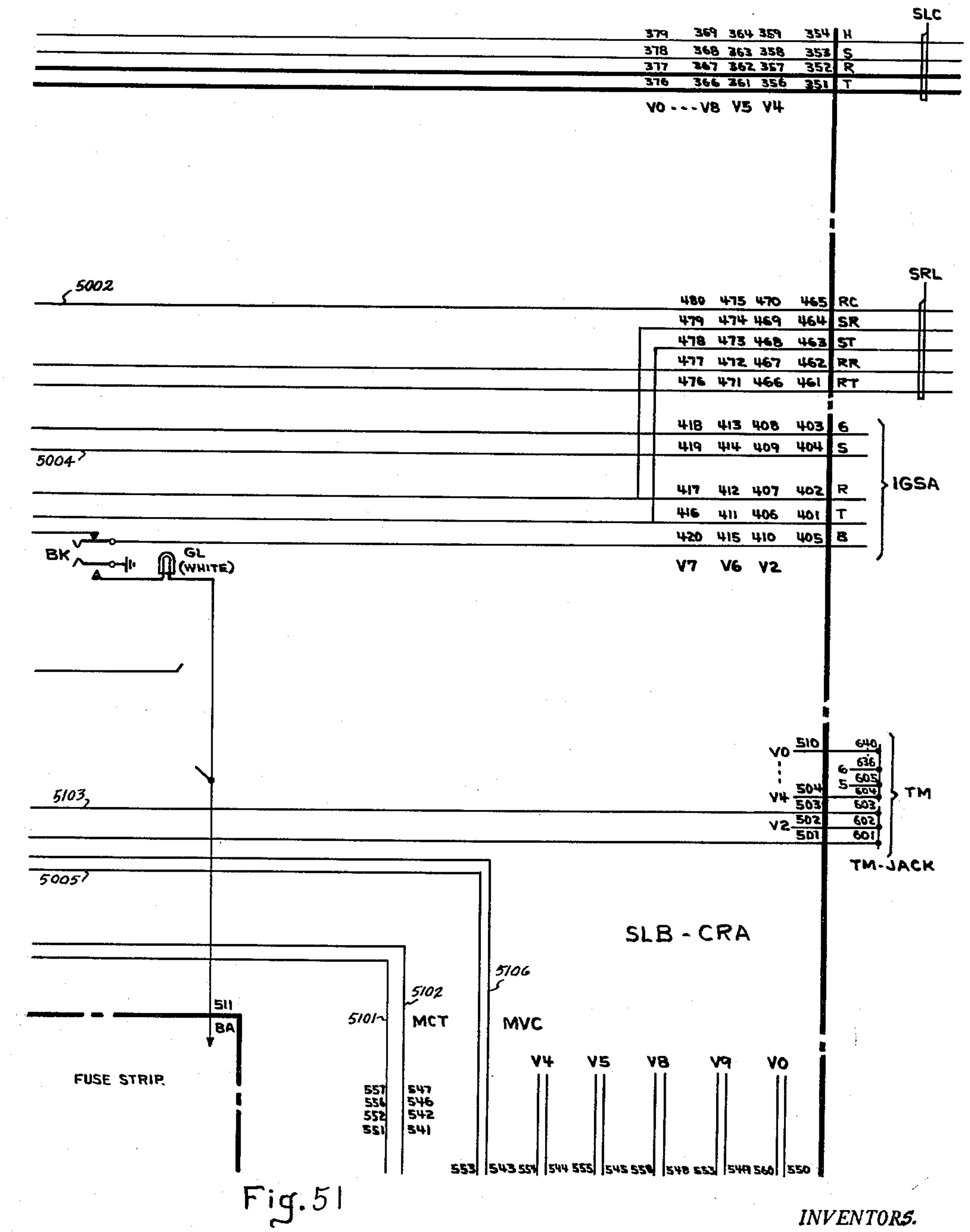
Figure 52:
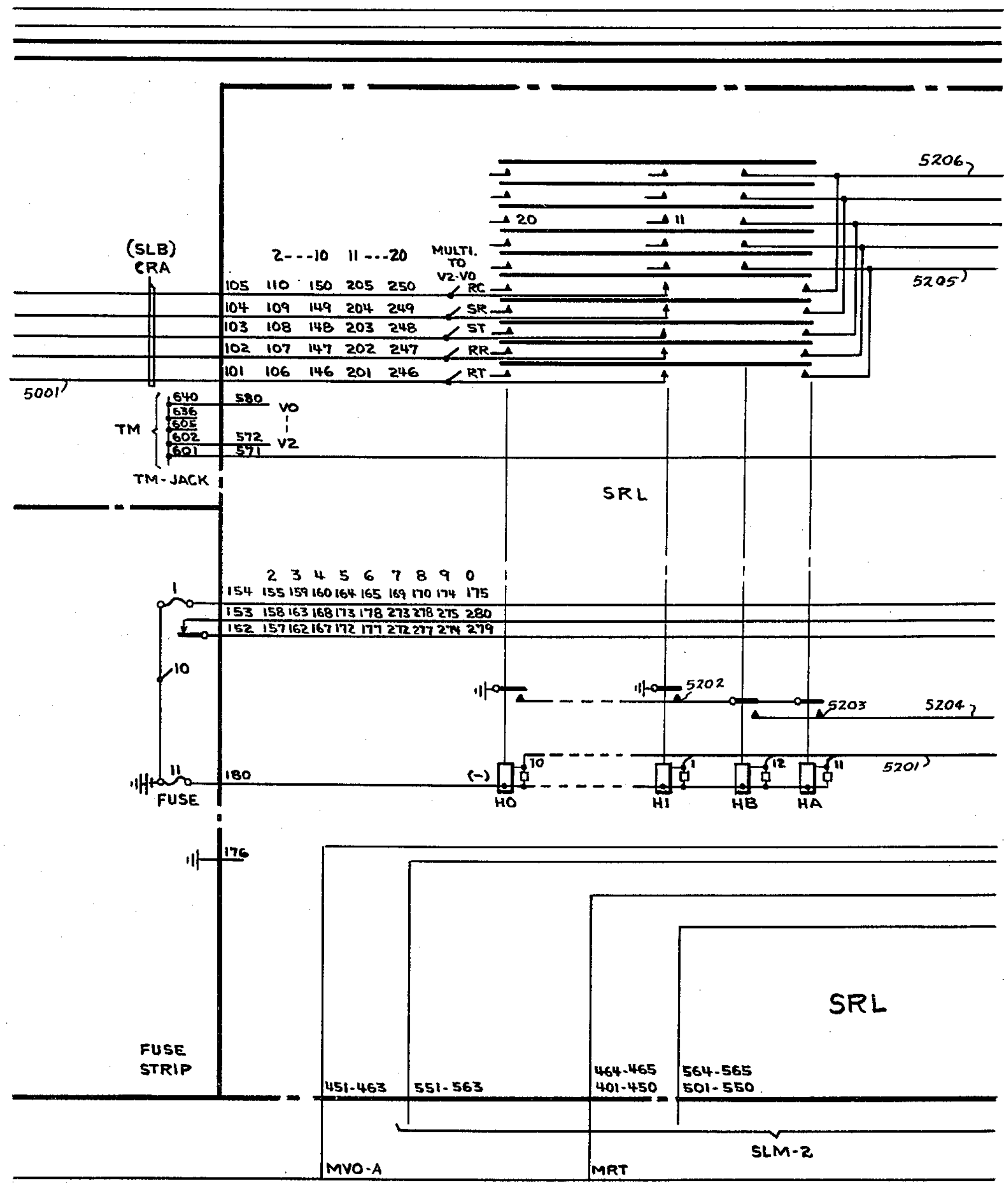
Figure 53:
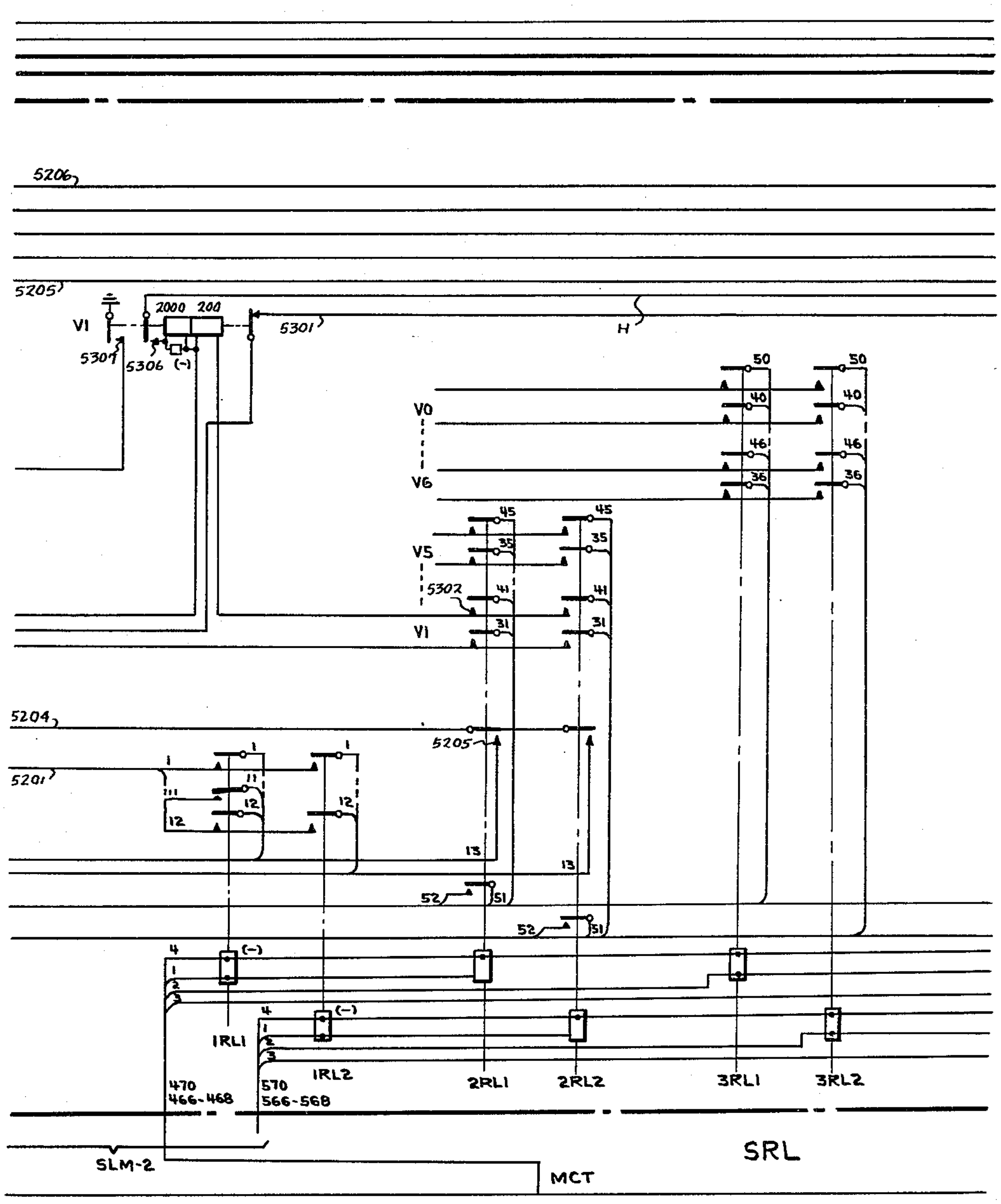
Figure 54:
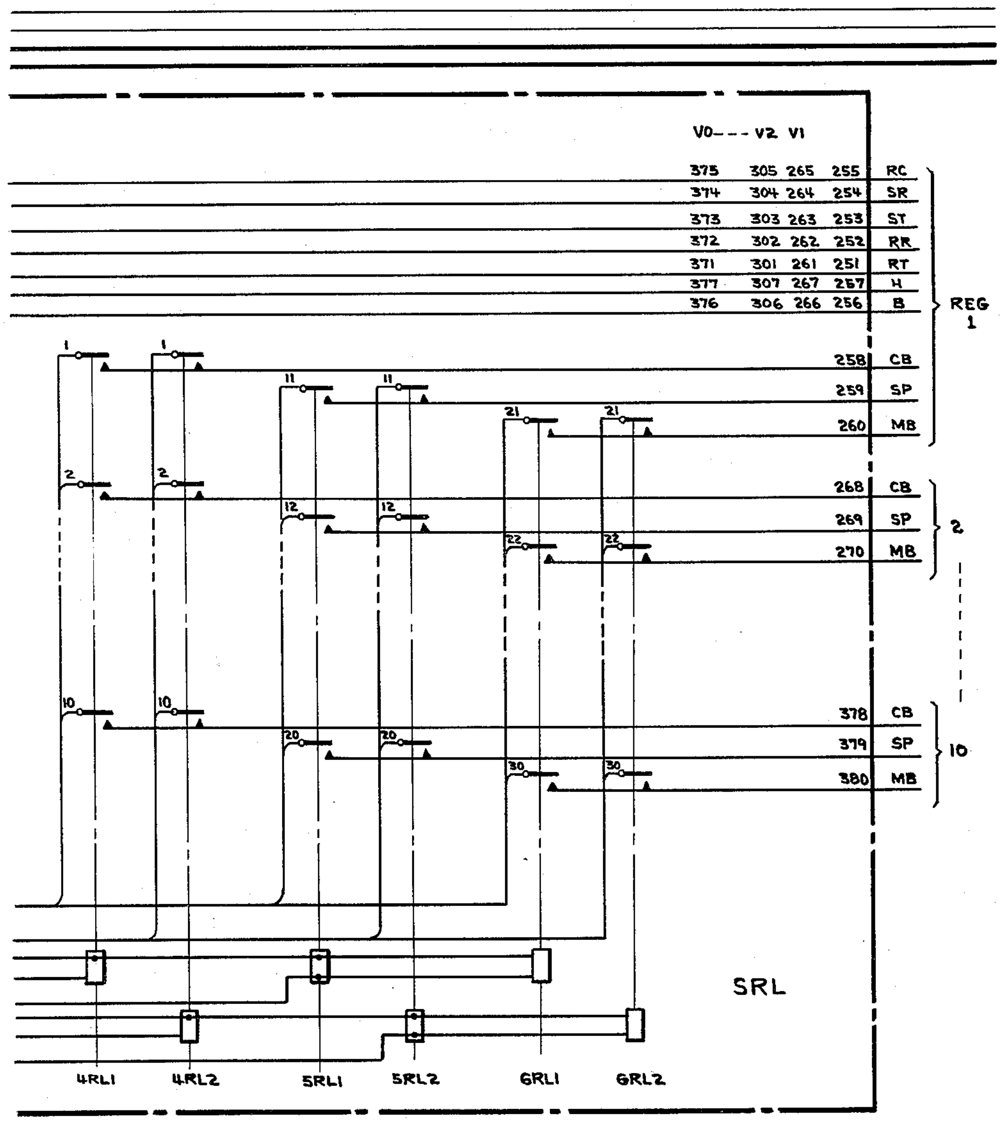
Figure 55:
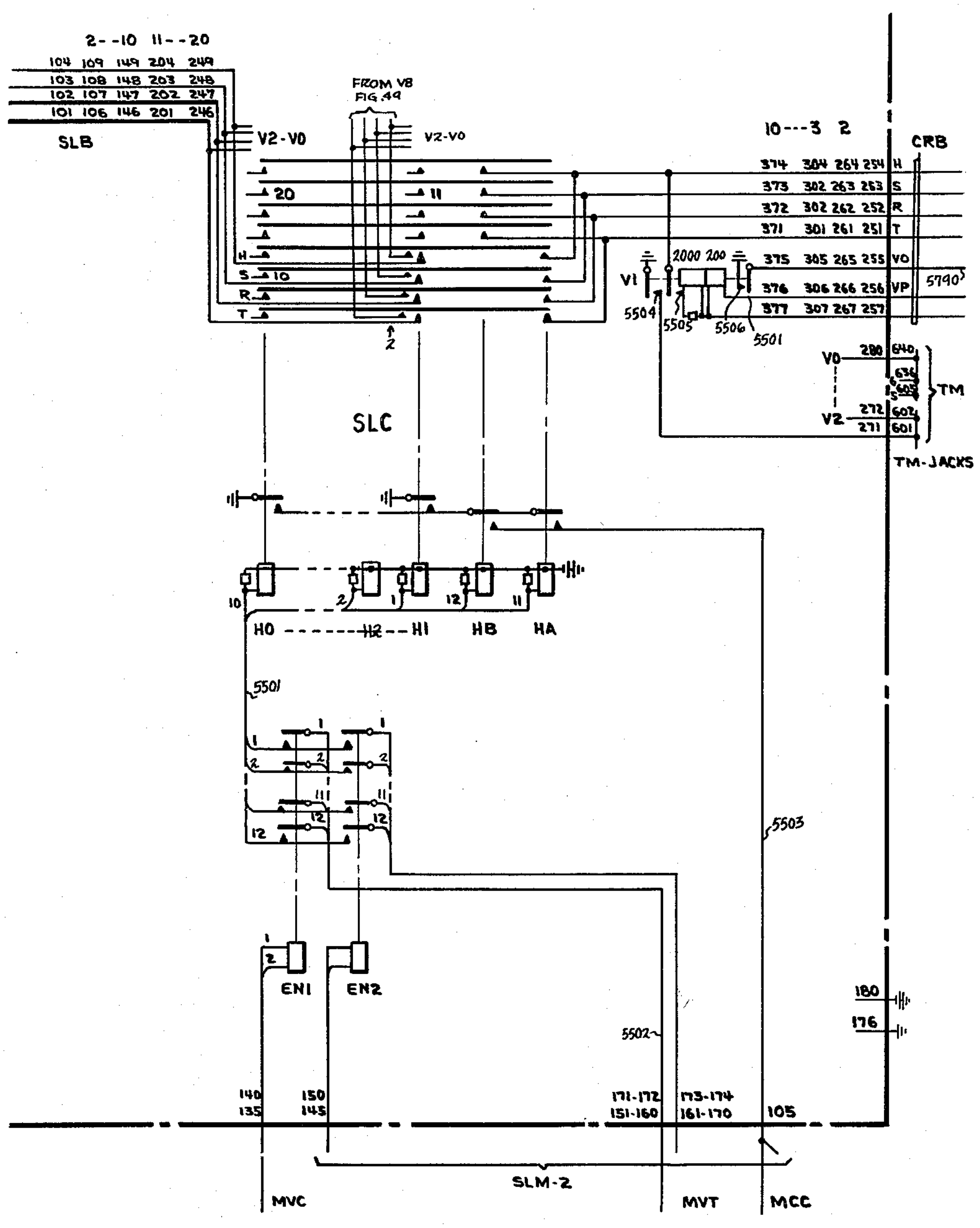
Figure 56:
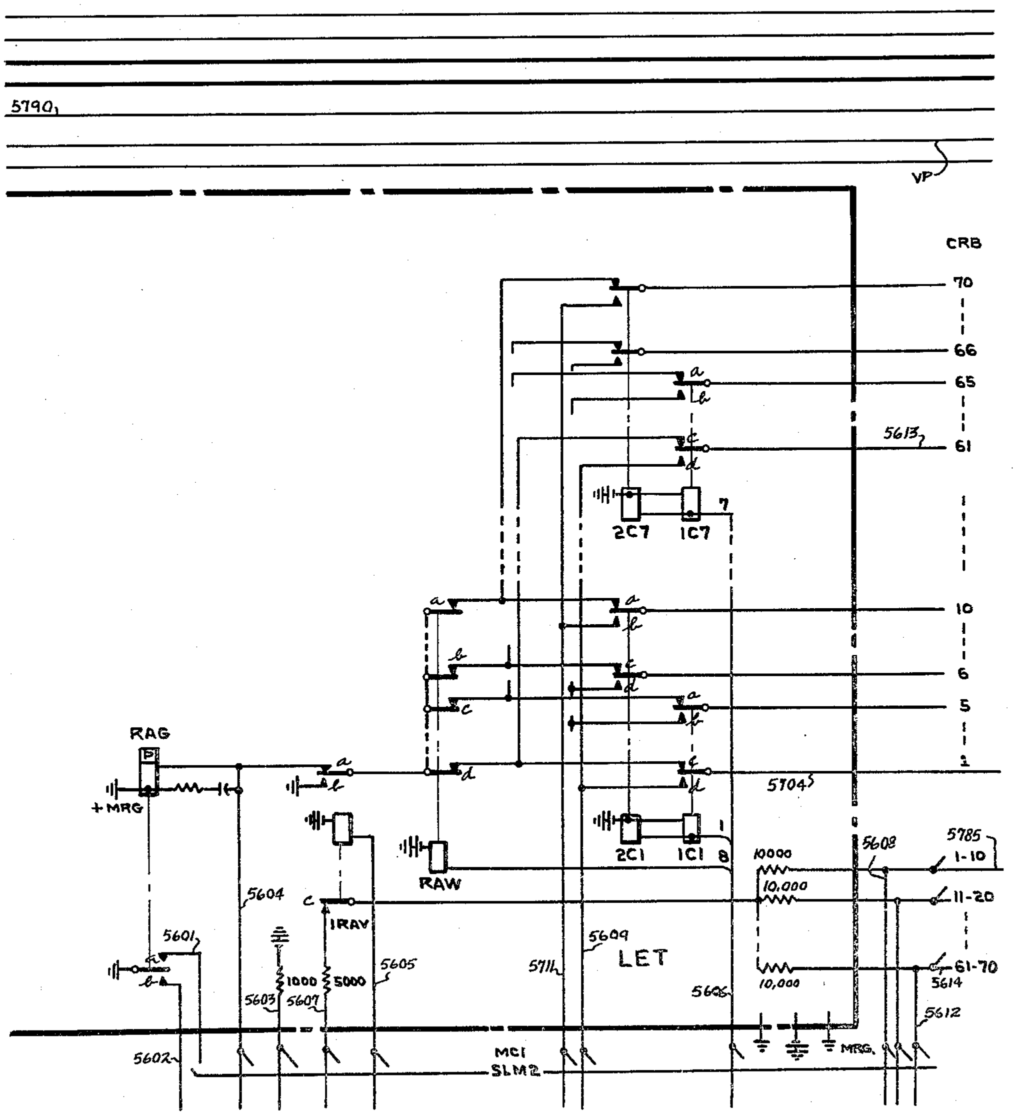
Figure 57:
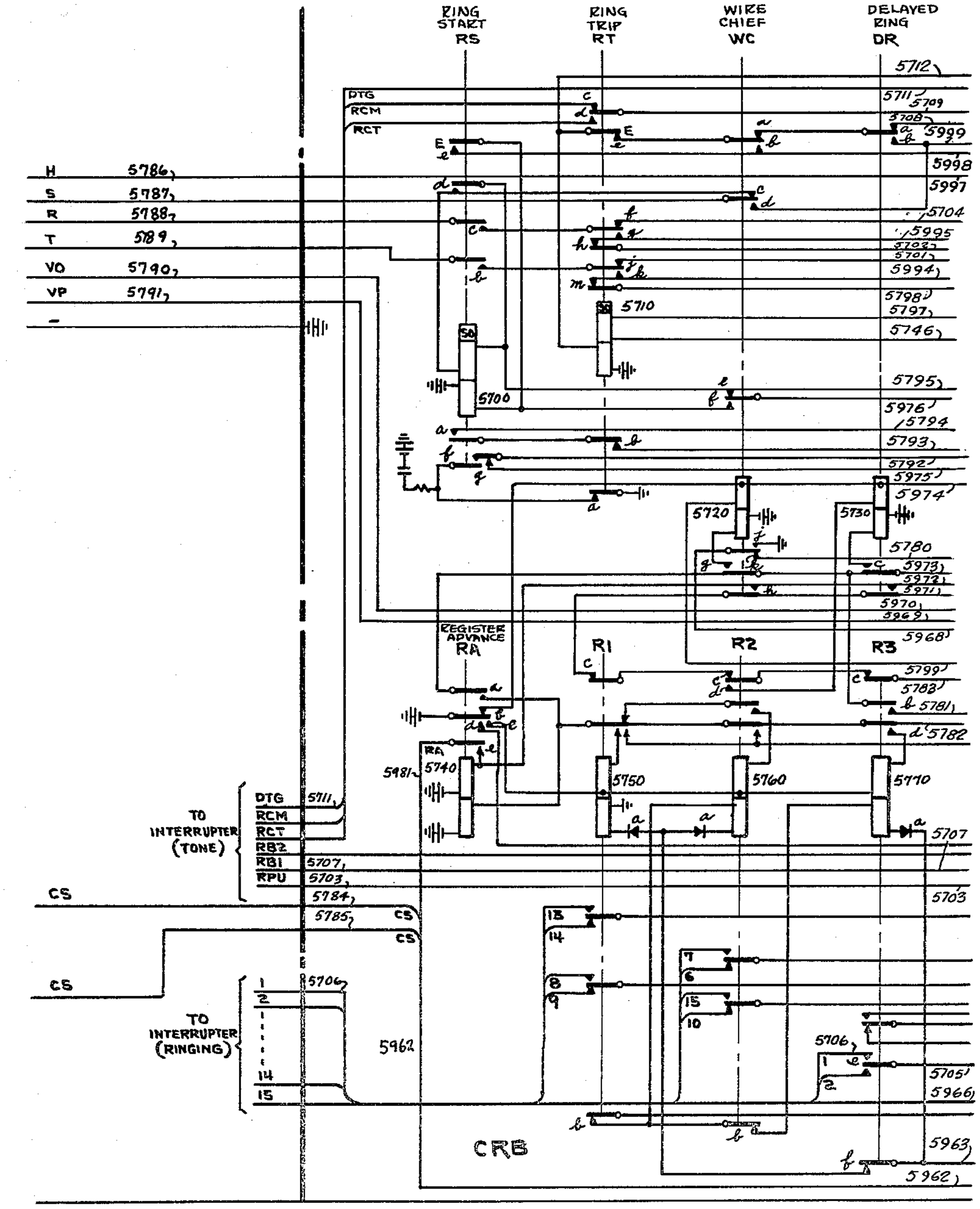
Figure 58:
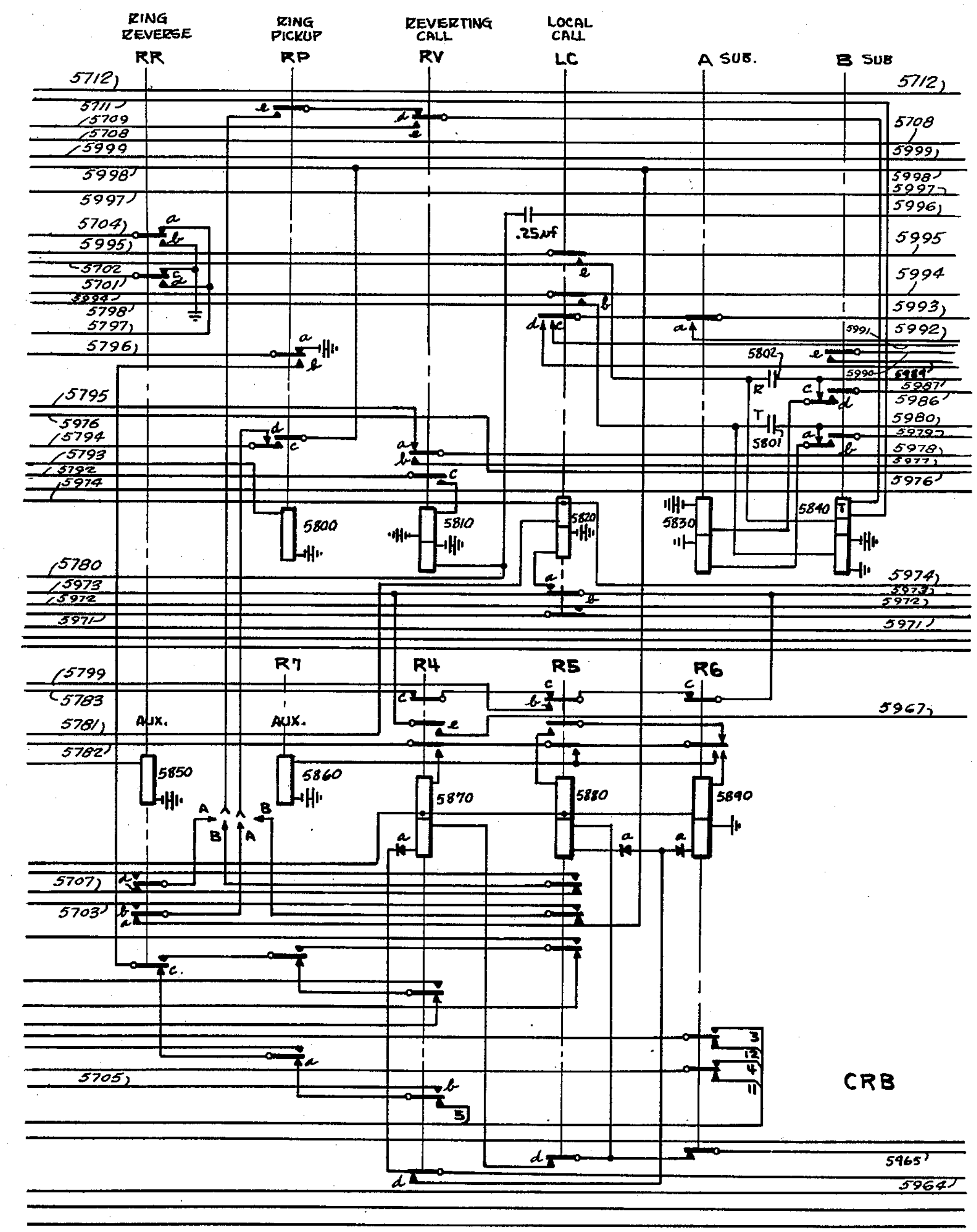
Figure 59:
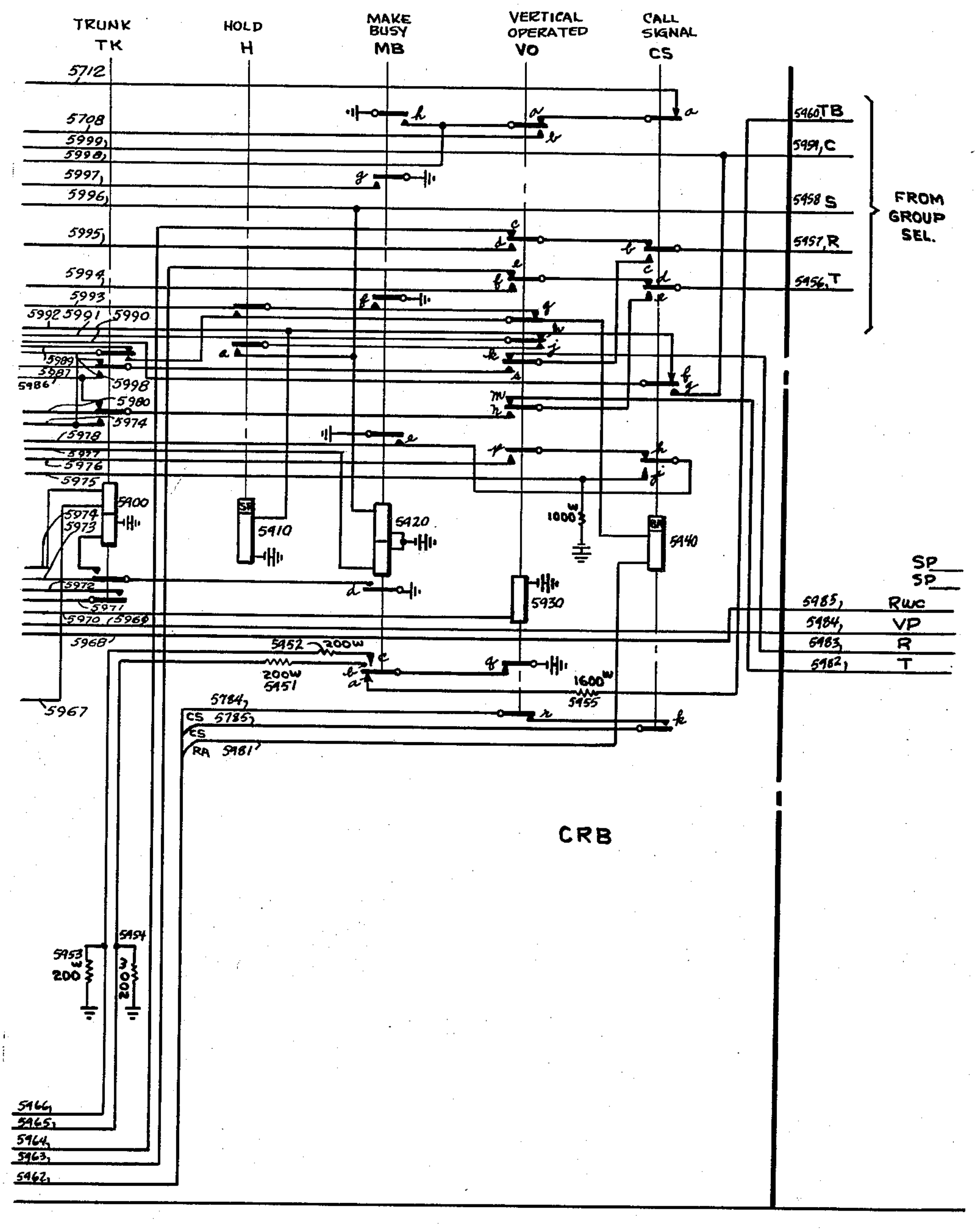
Figure 60:
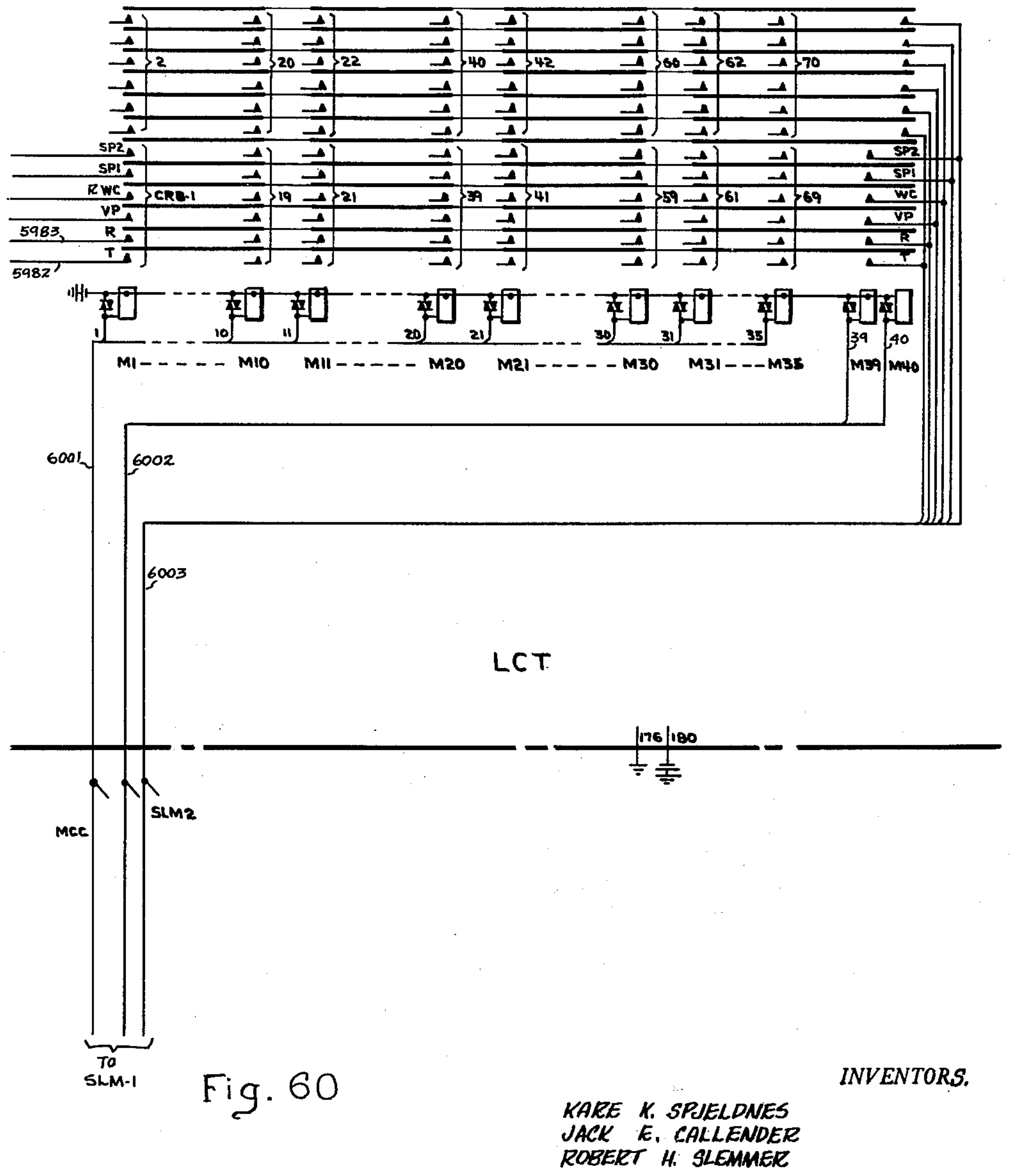

FIG. 10–A is a perspective drawing of the jack and plug associated with FIG. 10;

FIG. 11 is a schematic representation of the cabling between the three jack and plug assemblies used to plug-in the unit of FIG. 10 and associated components;

FIGS. 12 and 13 comprise a circuit schematic diagram of unit of FIG. 10;

FIG. 14 sets forth test and seizure circuits;

FIGS. 15 and 16 comprise a box diagram showing in general connections between subscriber and trunk register links and registers, senders, and number groups;

FIG. 17 comprises a circuit schematic diagram of tip and ring connections in the system;

FIGS. 18, 18–A and 19 comprise a part schematic and part box diagram representation of sending arrangements in the system;

FIG. 20 comprises a schematic circuit diagram illustrating code receiving arrangements in the group selector and subscriber's line marker;

FIG. 21 sets forth the manner of assembling the FIGS. 22–31;

FIGS. 22 and 23 comprise a detailed circuit schematic of the number group link arrangement comprising connect relays between senders and number groups;

FIGS. 24, 25, 26, and 27 comprise a detailed circuit schematic of the sender finder, the directory number directory registers (NGD) and number group identified (NGI);

FIGS. 28, 29, 30, and 31 comprise a detailed circuit schematic of the number group translator (NGT);

FIG. 32 sets forth the frame arrangement of plug-in group selectors and markers;

FIG. 33 sets forth the cooperative relationship between markers and group selectors;

FIG. 34 sets forth the group selector switch GSA wiring;

FIG. 35 sets forth the group selector switch GSB wiring;

FIG. 36 sets forth the assembly diagram for FIGS. 37–43;

FIGS. 37–43 set forth the relationships between group selector switches GSA and GSB;

FIG. 44 sets forth the group selector routing diagram chart (60 group);

FIG. 44–A sets forth the group selector numerical diagram to accompany FIG. 44;

FIG. 44–B sets forth the group selector routing diagram chart (30 group);

FIG. 44–C sets forth the group selector numerical diagram to accompany FIG. 44–B;

FIG. 45 sets forth the assembly diagram of FIGS. 12–13, 46–60;

FIG. 46 sets forth the specific line entrance originating circuitry (LEO);

FIG. 47 sets forth the specific line PBX equipment circuitry (LPX);

FIG. 48 sets forth the specific line horizontal pull circuitry (LHP);

FIGS. 49–51 set forth the specific subscribers link B circuitry (SLB);

FIGS. 52–54 set forth the specific subscribers register link circuitry (SRL);

FIG. 55 sets forth the specific subscribers link C circuitry (SLC);

FIG. 56 sets forth the specific line entrance terminating circuitry (LET);

FIGS. 57–59 set forth the specific cord relays B circuitry (CRB);

FIG. 60 sets forth the specific line connector terminating circuitry (LCT).

An outline is included herewith for the purpose of facilitating the location of the description of the various components of the novel telephone system herein.

OUTLINE

I. Introduction
II. General Description
III. Crossbar Switches and Pileups
- A. General
- B. Subscribers Link A (SLA) Crossbar Switch
- C. Other Crossbar Switches (SLB, SRL, SLC, GSA, GSB)
- D. Trunk Register Link (TRL) Crossbar Switch IV. Trunking Arrangements (SLA, SLB, SLC, SRL)
V. Subscribers Link A
- A. General Arrangement of Plug-In Unit
- B. Circuitry VI. Certain Test and Seizure Circuits
VII. Trunking Between Register Links and Number Groups
VIII. Tip and Ring Circuits
IX. Sending Arrangements
- A. Call to Local Subscriber
  1. Sending to Code Receiver in First Stage of Group Selection
  2. Sending to Code Receiver in Second Stage of Group Selection (Parenthetic)
  3. Sending to Code Receiver in CRB
  4. Sending to Code Receiver in Subscribers Line Marker
- B. Call to Multiple Line Group Such as P.B.X Group
- C. Call From Trunk
- D. Call to Trunk X. Code Receivers for Group Selector Marker and Subscribers Line Marker
XI. More Detailed Description of Connections Between Senders and Number Groups
- A. Finding the Calling Sender and Connecting It to Number Group
- B. Registration of the Directory Number in the Number Group
- C. Translation from Directory Number to Terminal Location XII. More Detailed Description of Group Selection Arrangements
XIII. More Detailed Description of Certain Other Circuits: LEO, SLA, LHP, SLB, SRL, SLC, LET, CRB, LCT
XIV. Claims

II. GENERAL DESCRIPTION

Figure 1:
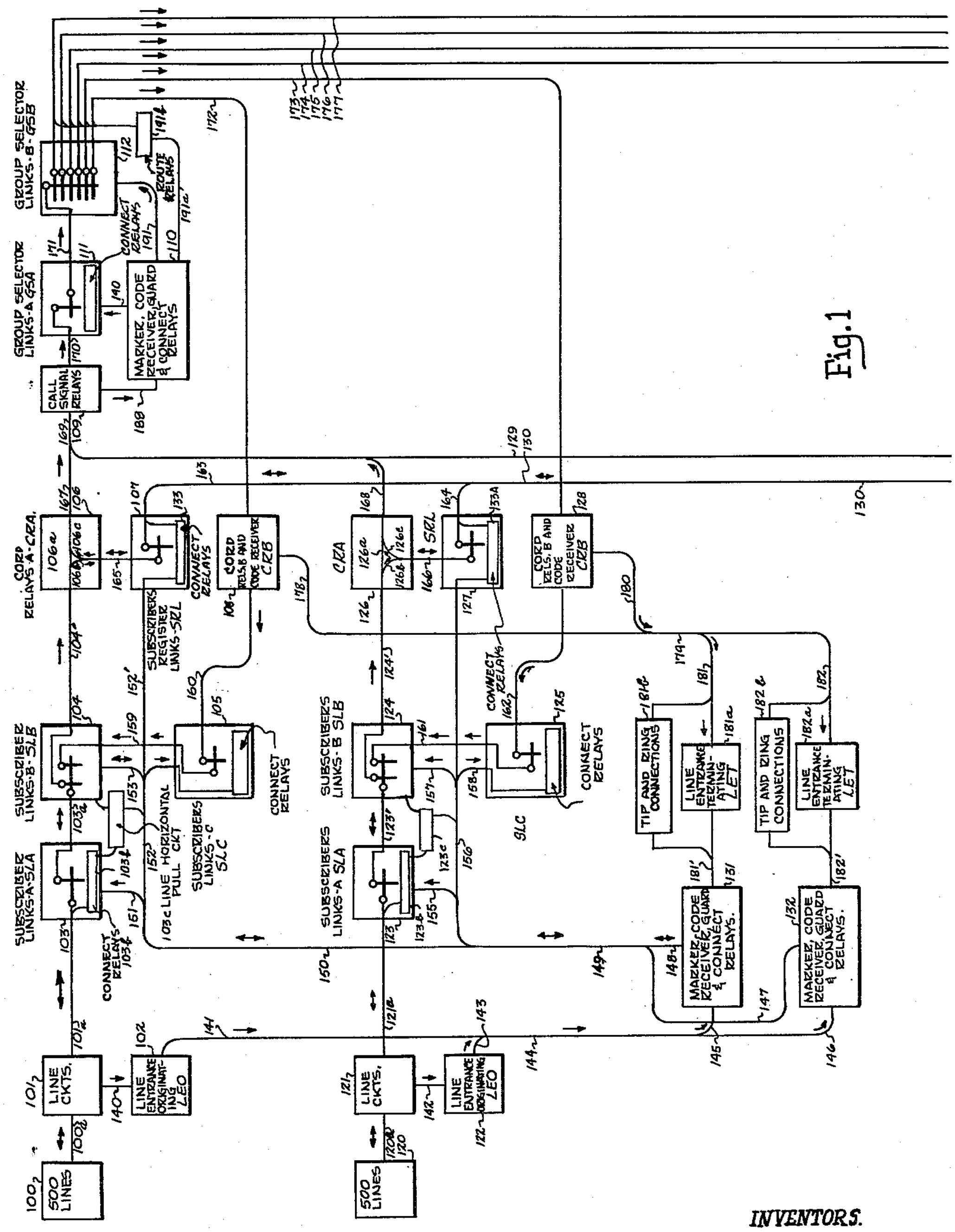
Figure 2:
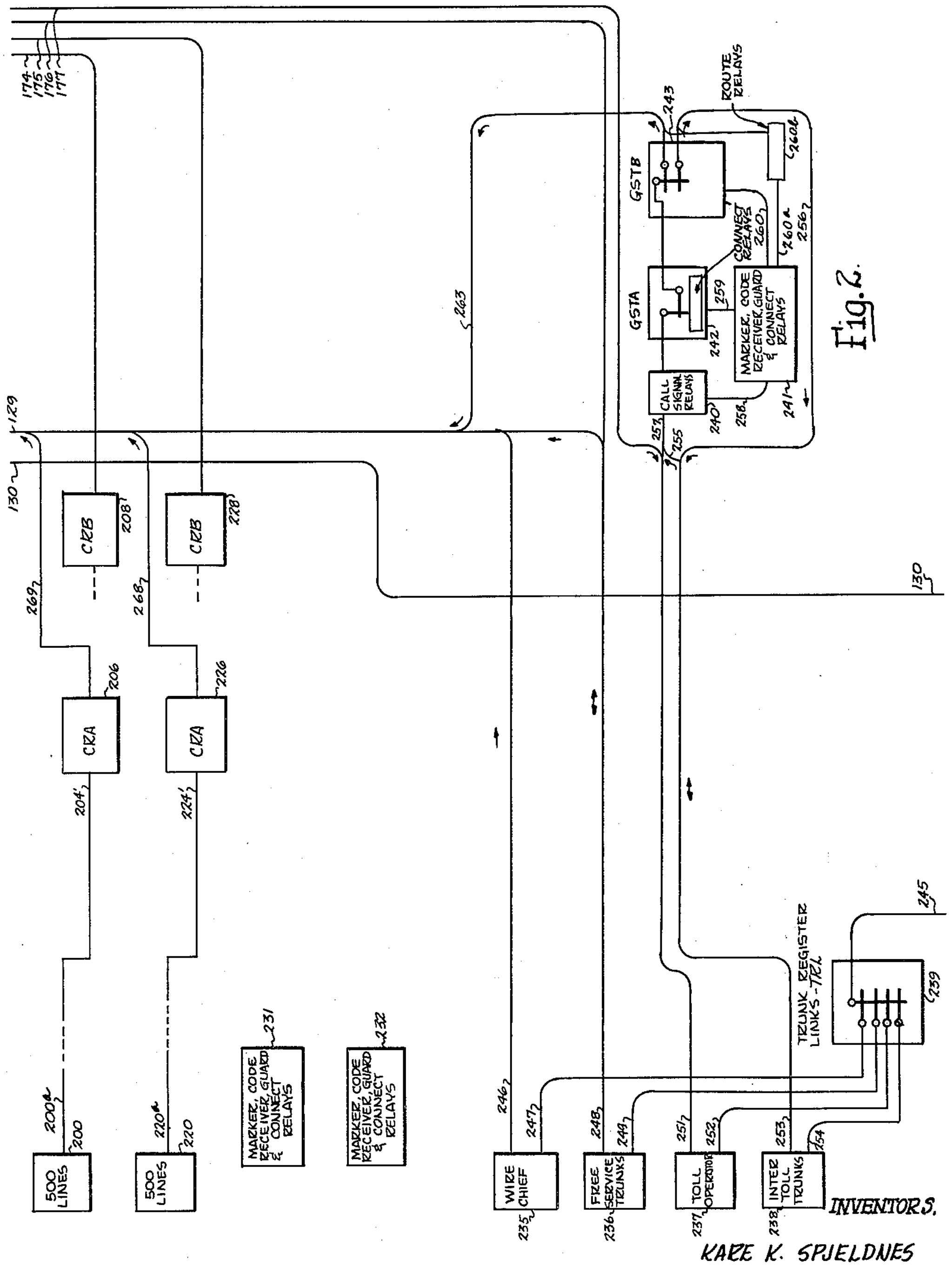
Figure 3:
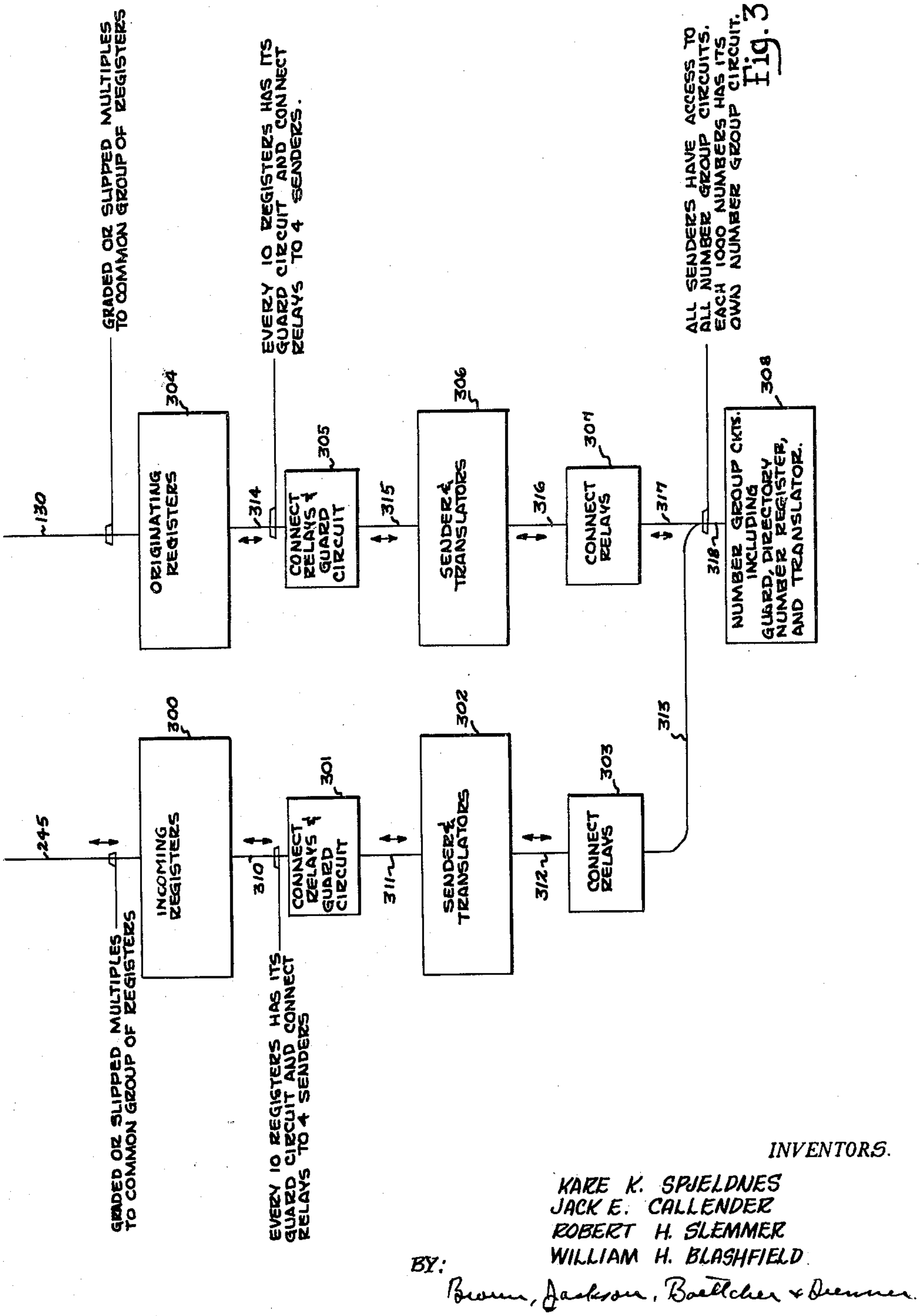

Referring now more specifically to the block diagram of FIGS. 1, 2, and 3, let us assume that a line in the five hundred line group designated by the block 100 originates a call by lifting the receiver. The associated line circuit in the group of line circuits 101 is actuated over the path 100, and signals the line entrance originating circuit 102 over path 140.

The line entrance originating circuit 102 over path 141, 144, and 145 or 146 calls in one of the subscriber line markers circuits 131 and 132 each comprising marker, code receiver, and connect relays groups and indicates to the seized marker the twenty-five line group origin of the calling line (i.e. the particular subscribers crossbar switch or link SLA designated 103 to which the calling line is connected) and also extends signaling circuits into the seized marker by means of which the marker identifies the calling line. In the present example, it will be assumed that marker 131 is seized.

Marker 131 by "by-path" principles examines and seizes a register in the group indicated as 304 over paths indicated as 148, 149, 150 and 152; test, guard and connect relays indicated as 133 in subscribers register link SRL which is indicated as 107; and paths 163 and 130. The seized register is connected to the vertical of the seized one of a plurality of subscribers register links, indicated generally as 107.

The calling subscribers line is connected to the horizontal of the SLA switch assigned to the twenty-five line group indicated generally as 103 in the present example.

The marker accordingly has the problem of connecting the horizontal of the calling switch 103 with the vertical of the SRL switch 107 associated with the seized register.

It should be observed at this point that in effect each subscribers line is connected to a particular horizontal of a single SLA switch, each five hundred group of lines having twenty SLA switches. Each SLA switch has in effect ten verticals which are in effect connected in a certain pattern to the horizontals of a plurality of subscribers links B (SLB) indicated generally at 104. The number of SLB switches is determined by traffic considerations. Each SLB switch has 10 verticals, four of which are connected to cord relays A (CRA) indicated generally as 106, and six of which are connected to horizontals of subscribers link C (SLC), indicated generally as 105. Each CRA is connected to the vertical of a group selector link A (GSA) of a plurality of group selector switches indicated generally as 111. It should also be observed that each CRA circuit is connected in effect to a horizontal of a subscriber's register link (SRL) of a plurality of such crossbar links indicated generally as 107. Accordingly a CRA circuit is represented by a vertical in an SLB crossbar switch, a vertical in a GSA crossbar switch, and a horizontal in an SRL crossbar switch.

The marker 131 now tests as to whether the calling SLA has an idle vertical (S) leading to the SLB switches, the tested verticals being represented in effect by certain horizontals in the SLB switches. The marker also tests for an idle CRA connectable to an idle SLB horizontal and an idle SRL vertical; since the SLA horizontal has been operated at an earlier stage, the marker now operates the SLB and SRL horizontals. This is followed by the operation of the vertical magnets of the SLA, SLB, and SRL switches. It should be understood that the horizontal magnets are "select" magnets and that the vertical magnets are "hold" magnets. After the hold magnets are operated, the select magnets are released. The testing and operating above described is accomplished over paths 148, 149, 150, 151, 152, 153, and 152'. It should also be understood that leads entering a box such as 107 may have other connections inside the box than those specifically shown.

At this stage of operations, the calling line is extended over path 100a and 101a, an SLA switch 103 (primary crossbar switch), path 103a, an SLB switch 104 (secondary crossbar switch), path 104', through a CRA circuit, or subscriber's originating trunk (such as 106), path 165, an SRL switch, and paths 163 and 130 to a register 304.

Further relationships between the SRL switches and registers will be described hereinafter.

Upon connection of a register 304 to a CRA–106 a signal to the CRA operates a relay in the CRA which holds open the tip and ring circuits, represented by path 106a, between the CRA and the GSA switch 111. This relay also connects ground to a third wire "S" to operate the calling line cut-off relay and lockout relay and holds the vertical magnets of the SLA and SLB switches when the marker subsequently releases. The marker 131 is now dismissed.

The calling subscriber then receives dial tone from the originating register 304 and dials the 2–5 directory number into the register over the described path including circuit 106*b* in the CRA. This 2–5 number comprises a three digit exchange code plus a four digit called number. (Under certain circumstances a preliminary three digit area code may also be dialled into the register.)

After the register has received all of the dialled digits, it signals a guard circuit 305 which connects the register through connect relays in 305 to one of a group of sender-translators indicated as 306, there being a lesser number of senders than registers. The register then forwards the first four digits to the seized sender-translator, which analyzes the first three digits to determine whether the call is an inter-office or intra-office call.

If the call is an intra-office call, the sender operates in accordance with the value of the fourth (thousands) digit received to seize the number group circuit 308 associated with the indicated thousands group. The circuit is specifically seized via connect relays 307 and a sender-finder arrangement in the number group circuit 308 which establishes connections between the register and the number group circuit. The number group circuit then translates the hundreds, tens, and units directory digits received into five pieces of information which are fed back into registers in the sender-translator circuit, these five pieces of information being: (1) the five hundred group of the called subscriber, (2) the equipment hundreds digit location of the called subscriber, (3) the equipment tens digit location of the called subscriber, (4) the equipment units digit location of the called subscriber, and (5) the party-on-the-line designation of the called subscriber, or in the case of private branch exchange lines the fact that the called subscriber is associated with private branch exchange lines. It should be noted that all senders have access to all number groups.

If the call is an inter-office call the sender does not engage a number group circuit. In the case of an inter-office call the sender is set-up in preparation to out-pulse part or all (if necessary) of the first three exchange code digits received (also area code under certain circumstances) and to prefix a tandem routing digit or digits if necessary.

When the sender is ready to send it signals the CRA, operating a second relay in CRA which forwards the "S" wire ground over path 106*c*, 167, and 169, actuating a call signal relay associated with the calling CRA in the group 170 which over path 188 engages a group selector marker circuit 110 comprising marker, code receiver, guard and connect relays. When the sender has received a 24 volt negative battery via "dial start" signal on the tip lead from the marker 110 upon engagement of the marker, the sender sends routing signals via the tip and ring conductors over path 106*c*, 167, 169, and 188 to the code receiver in marker 110. (These routing signals are for the purpose of enabling the group marker 110 to set the primary group selector crossbar switch 111 and the secondary group selector crossbar switch 112 to extend the call to a CRB in a local line group or to an outgoing trunk.)

These signals comprise the application of positive 48 volt battery, negative 48 volt battery, ground, or nothing to the tip conductor; and simultaneously, positive 48 volt battery, or negative 48 volt battery, or nothing to the ring conductor; wherein zero volts is ground. Two such signals are sent to represent the tens and units decimal digits. Thus with the various combinations of two of such digits any one of one hundred values can be selected by two rapid signal applications. Twenty of these combinations can be used to represent the various called five hundred groups and trunk groups. Others of these combinations can be used for alternate trunk routing.

On a local call, as a result of the two signals transmitted from the sender 306 to the group marker 110, the group selector marker over a "by-path" examines the possible idle routes from the calling CRA to an idle CRB in the called line group and over "by-path" connections 190 and 191 actuates first the horizontal select magnets and then vertical hold magnets of switches 111 and 112 to extend a connection from the calling CRA through a primary group selector crossbar switch 111 and a secondary group selector crossbar switch 112 to an idle cord relay B circuit or subscriber's terminating trunk (CRB), such as 108 or 128, in the called five hundred line group.

On a trunk call, as a result of the two signals transmitted from the sender to the group selector marker 110, the marker similarly extends a connection through crossbar switches 111 and 112 to an idle trunk in the required outgoing group of trunks.

The group selector marker 110 then releases. If outpulsing over the selected trunk is indicated by the senders translation of the first three digits, the sender outpulses to repeat exchange or area digits and to route through tandem points if necessary.

In the case of a call to local, the seized CRB circuit such as 108, for example, then gives a negative 24 volt battery signal over tip back over the connection to the sender which then sends two signals to the code receiver in the seized CRB circuit in a similar manner to which it sent signals to the group selector marker 110. These signals comprise positive 48 volt potential, negative 48 volt potential, ground or nothing on the tip conductor and the same signals on the ring conductor according to combinations. The first of these signals indicates according to the combination of the signal any one of four possibilities as to the origin of the call and one possibility as to the destination of the call and the adjustment in the CRB necessitated thereby. Thus according to one combination, if the call is of local origin, the CRB is conditioned to insert calling and called battery feed coils and condenser bridge. If another combination indicates that the call is of trunk origin the CRB is conditioned to cut the tip and ring conductors through metallic in which case the battery feed coils are located in the calling trunk circuit. If another combination indicates that the call requires a delayed ring feature, the CRB pre-trips the ring for delayed ring, the operator reclosing the ring trip relay over the "C" wire. Also if the call is of wire chief or test origin, the CRB is conditioned to cause the subscribers line marker such as 131 or 132 on a terminating call to disregard the busy condition of a called line, to pre-trip the ring, and to disable the CRB sleeve test in disregard of an open sleeve or grounded sleeve. The wire chief can then proceed with his tests.

The second signal to the CRB takes any one of fourteen combinations to condition the CRB in preparation to ring any one of fourteen ringing combinations of frequencies and codes on the called line to signal the called phone which may be any of a plurality of phones on the called line.

After these signals have been received by the CRB and are properly registered, the CRB, such as 108, extends a call signal over 178, 179 and 181 or 182 to seize the code receiver of one of the two markers such as 131 and 132. It should be understood that the code receiver of a given marker can be receiving on a terminating call simultaneously with the use of the marker in setting up an originating call.

After the code receiver of a line group marker such as 131 has been seized and the tip and ring conductors extended thereto, the line group marker 131 gives negative 24 volt battery supervision on the tip lead to the sender as a signal to begin sending.

The sender thereupon sends three coded signals to the line group marker code receiver in a manner similar to that effected in the sending of signals to the group selector marker code receiver and the CRB code receivers.

Each of these signals can have ten decimal values according to the particular combinations used.

The first signal can have any one of five values to indicate the decimal hundreds value of the equipment location of the called line. The first signal can have any one of five other values to indicate the decimal hundreds value of the equipment location of the called line and additionally the fact that the called line is in a multiple selection group such as a P.B.X group.

The second signal can have any one of ten values to indicate the decimal tens value of the equipment location of the called line.

The third signal can have any one of ten values to indicate the decimal units value of the equipment location of the called line.

Upon receiving the three signals the marker code receiver seizes its associated marker which operates connecting relays in the desired SLA switch and operates the horizontal magnets on the SLA switch over paths 148, 149, 150 and 151 thereby getting an indication as to the busy, idle, or lockout condition of the called line. If the called line is busy, the line group marker then determines whether or not the called line is identical to the calling line, that is, a reverting call. This is accomplished by testing the continuity of the sleeve wire by means of a tone oscillator. If the call is of a reverting nature, the line group marker establishes connections from CRB–108 through crossbar switches SLC, SLB, and SLA over paths 160, 159, 103*a* and 101*a* to the called line. At the same time, a signal is sent to the CRB from the line group marker, indicating to the CRB that the call is a reverting call. If the call is not of a reverting nature, the line group marker does not complete the connections from the CRB 108 to the called line through switches SLC, SLB, and SLA, but instead sends a signal to the sender 306 which releases. The release of the sender causes the release of the two relays in the CRA, removing ground from the "S" lead, thereby releasing all switches which have been used in establishing the connection, and placing the calling line on lockout. This gives busy tone to the calling subscriber until he replaces his receiver.

If the called line is on lockout, the line group marker determines this fact by making a marginal test on the sleeve wire of the called line, and immediately sends a busy signal to the sender 306 (except in the case of a wire chief test call), which then releases as described in the case of a non-reverting busy line.

If the called line is idle, the line group marker establishes connection thereto from CRB–108 over a crossbar switch SLC of the group 105 and over connection of the same or other SLB and SLA switches to the called line. The SLA and SLB switches are bi-directional and are used for both originating and terminating calls.

The CRB then gives a reverse battery supervision signal over the tip and ring to the sender which causes the sender to release, in turn causing the release of the register, the subscriber's register link, such as 107, and the dropping of the first mentioned relay into the CRA circuit 106 which extends the calling loop into the CRB.

After the called connections have been extended into the CRB circuit, the marker dismisses itself and all connections are held by ground on the "S" wire in the CRB relay group which is under the control of the calling line loop.

The CRB circuit then rings the called party over tip and ring and the calling party receives ring-back tone over tip and ring.

When the called party answers, the ring trip relay operates in the CRB to connect the calling and called tip and ring to battery fed relays so that conversation can then ensue.

Assuming the calling and called parties to be in the same five hundred group of lines: the loop extends from the handset of the calling party in line group 100, paths 100*a* and 101, SLA primary crossbar switch of group 103, path 103*a*, SLB secondary crossbar switch of group 104, path 104', CRA path 106*a*, paths 167, 169 and 170, GSA group selector primary crossbar switch 111, path 171, GSB group selector secondary crossbar switch 112, path 172, CRB circuit 108, path 160, SLC crossbar switch of group 105 used in terminating calls only, path 159, SLB crossbar switch of group 104, path 103*a*, SLA crossbar switch of group 103, paths 101*a* and 100*a* (which comprise distinct calling and called tip and ring circuits), to the called party in the line group 100.

If the called party had been in the five hundred line group 120 this path would be completed from the GSB switch 112 as follows: path 173, CRB circuit of the group 128, path 162, SLC switch of the group 125, path 161, SLB switch of the group 124, path 123', SLA switch of the group 123, and paths 121*a* and 120*a* to the called party in the line group 120.

Other five hundred line groups, such as 200 and 220, (FIG. 2), originate calls respectively over paths 204' and 224', CRA's 206 and 226, paths 269 and 268, and paths 129 and 169 into the call signal relays 109 (FIG. 1). These 500 line groups receive calls from the group selector GSB switches such as 112 respectively over paths 174 and 175, and CRB's 208 and 228. Additionally these 500 line groups are served by subscriber line markers 231 and 232.

A "Wire Chief" circuit, such as 235; "Toll Operator" circuits, such as 237; "Free Service Trunks," such as 236; and "Inter-Toll Trunks," such as 238, have access via trunk register links (TRL) designated 239 and path 245 to incoming registers 300 (FIG. 3), which in turn have access over path 310, connect relays 301 and path 311 to sender and translator circuits, designated 302, and thence over path 312 and connect relays 303 to the various number groups, designated 308, over path 313 and 318 to which the senders 306 also have access as previously described.

Senders 302 seize and send via "Wire Chief" circuit 235, paths 246, 129, and 169; via "Free Service Trunks" 236, paths 248, 129, and 169; via "Toll Operator" circuits 237 and paths 251, 257; and via "Inter-Toll Trunks" 238 and paths 253, 255, and 257.

Thus the "Wire Chief" and "Free Service Trunks" complete connections over regular GSA switches 111 and GSB switches 112, while "Toll Operator" and "Inter-Toll Trunks" complete connections by means of call signal relays 240, group selector marker 241, GSTA group selector primary crossbar switches 242 and GSTB group selector secondary crossbar switches 243.

Out of secondary switches 243 "Toll Operator" and "Inter-Toll Trunks" have access over paths 263, 129, 169, call signal relays 109, and regular group selector crossbar switches 111 and 112 to the various outlets from switches 112.

"Inter-Toll Trunks" and "Toll Operator" have access from outlets of switches 243 and path 256 to "Inter-Toll Trunks" 238 which may comprise several groups of trunks extending to and from various toll exchanges.

The following comments are included at this point to indicate generally the arrangement and number of switch members used under different traffic conditions:

(1) Each line group marker 131 and 132 can serve originating and terminating calls in both five hundred groups 100 and 120. Calls are alternated at random between line group markers.

(2) There may be one or a plurality of group selector markers, such as 110 in each group selector.

(3) The maximum number of SLA switches per five hundred line group is twenty, but a lesser number may be originally equipped. As additional lines are needed, SLA switches may be added up to the maximum.

(4) The number of SLB switches per five hundred line group is determined by the amount of originating and terminating traffic.

(5) The number of GSB switches is determined to a great extent by the number of outlets.

(6) The number of GSA switches is determined by the amount of originating traffic.

(7) Each SRL crossbar switch has access to ten registers.

(8) Each five hundred line group has access to three SRL switches maximum and accordingly to thirty registers.

(9) A graded or slipped multiple exists between the various groups of thirty outlets from SRL switches and a common group of registers.

(10) Every ten registers has its guard and connect relay circuit for access to four sender-translators.

Figure 6:
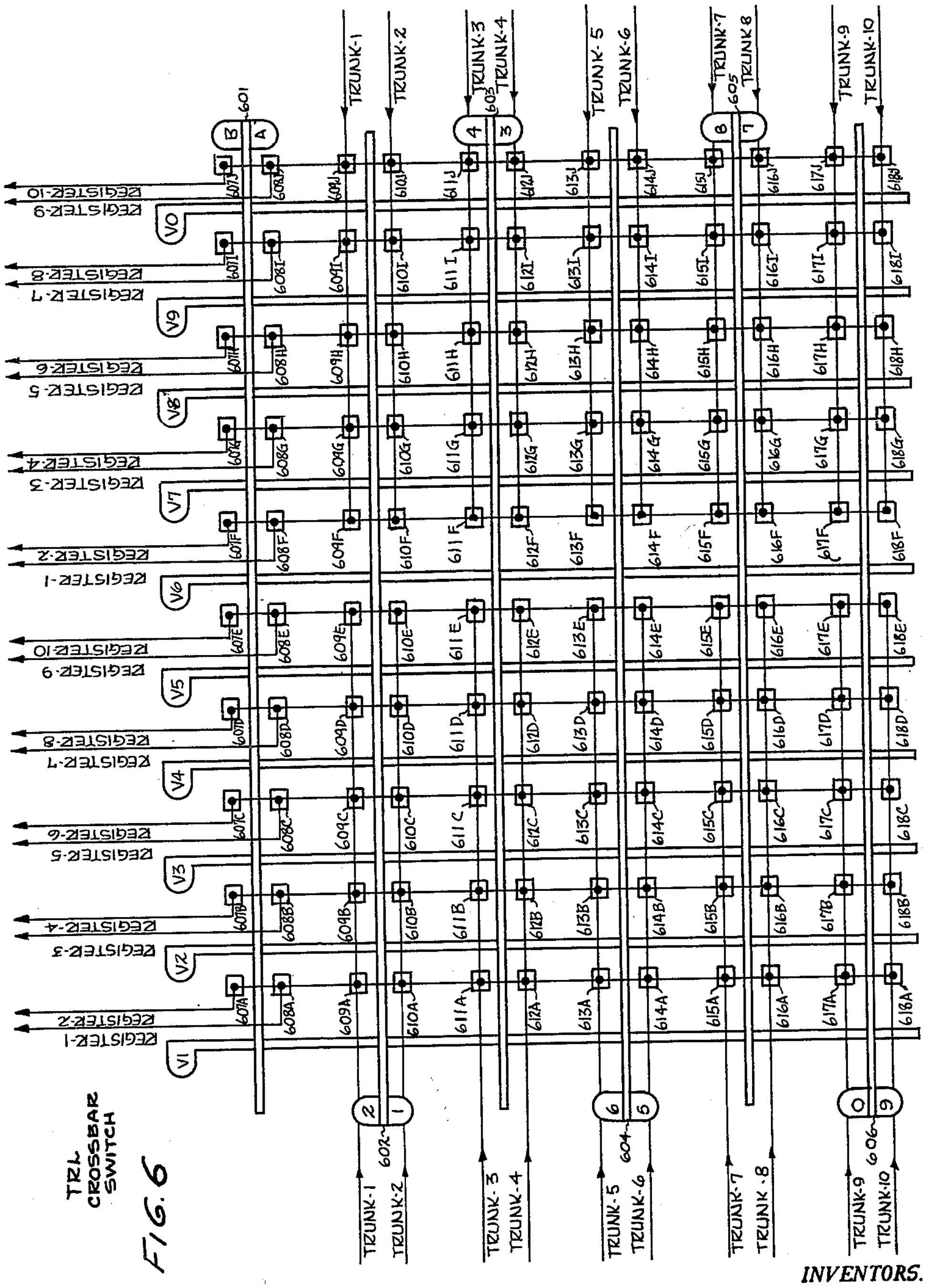
FIG. 6 is a front schematic view of a twelve horizontal and ten vertical crossbar switch arranged to be split in the middle vertically whereby ten incoming trunks can have access through one-half of the switch to ten registers and ten other incoming trunks can have access through the other half of the switch to ten other registers.

(11) The crossbar switching arrangement indicated by box 239 TRL is seen in more detail in FIG. 6 whereby groups of ten trunks have access to ten registers. Additionally it should be observed that a slip multiple exists between outlets from the TRL switches and a common group of incoming registers. As in the case of originating registers, each ten incoming registers has its guard circuit and connect relays whereby it has access to four sender-translators.

(12) Each 1,000 called directory numbers has its associated number group circuit. Large systems having over 10,000 directory numbers usually have number groups accommodating 2,000 directory numbers each.

(13) All sender-translators have access to all number group circuits; sender translators of the group 306 through connect relays 307 and sender translators of the group 302 through connect relays 303.

(14) On local to local calls, the battery feed for calling and called lines are in the CRB circuit.

(15) On local to trunk or trunk to local calls, the subscribers line battery feed is located in the trunk.

(16) On trunk to trunk calls the incoming trunk presents a loop condition to the outgoing trunk.

(17) Busy signals are returned from the marker to the sender which signals the trunk. The register sender and marker are then released, and the trunk is placed in a lockout condition.

III. CROSSBAR SWITCHES AND PILEUPS

A. *General*

All crossbar switches in the system have six horizontal actuating bars, three of which are actuated by coils and armatures on the left and the other three of which are actuated by coils and armatures on the right. The number of vertical hold bars is ten, each vertical hold bar having its associated coil and armature means at the top. Each horizontal bar has a neutral position and two rotated operating positions occasioned by two operating coils. Each vertical bar has a neutral position and one rotated operating position occasioned by one operating coil. Each horizontal bar has two sets of off-normal contacts corresponding to its two operated positions. Each vertical bar has one set of off-normal contacts corresponding to its operated position.

Associated with each vertical bar is a multiple set of contacts extending vertically transversely of the horizontal bars. The operation of a horizontal bar to one operated position prepares associated contacts in each vertical set of contacts. The operation of a horizontal bar to the other operated position prepares different associated contacts in each vertical set of contacts.

Subsequent to the operation of a horizontal bar to one of its operated positions, the operation of a vertical bar to its operated position causes the prepared contacts in its vertical set to close.

Thereafter the horizontal bar is released to its normal position, the vertical bar holding the aforementioned contacts closed.

B. *Subscriber's link A (SLA) switch*

Figure 4:
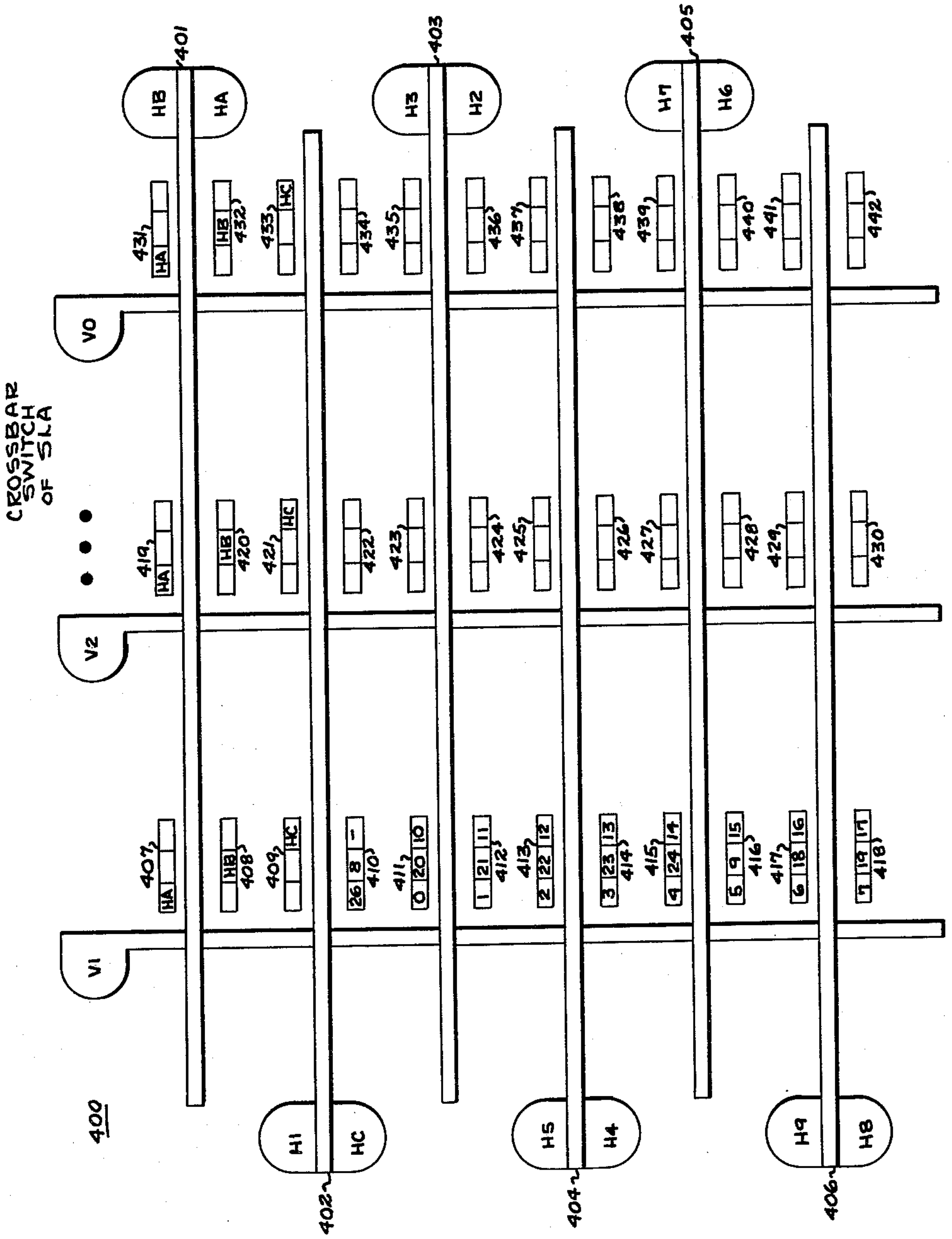
FIG. 4 is a front schematic view of a twelve horizontal and ten vertical crossbar switch arranged to accommodate twenty-five lines on the horizontals.

Referring to FIG. 4, we find a crossbar switch of the aforedescribed embodiment arranged to connect twenty-five lines to its horizontals. This is accomplished by dividing each crosspoint contact set into three parts and wiring between contact sets according to a certain pattern to be disclosed hereinafter.

At this point we shall indicate in general the operation of the switch arranged according to FIG. 4.

It is initially noted that combinational outlets for the different vertical sets of contacts is accomplished by movement of the horizontal bar associated with armature 401 to one position responsive to the operation of its HA coil (not shown, but located behind the HA portion of the centrally pivoted armature 401) or by the operation of the HB coil (not shown, but located behind the HB portion of the centrally pivoted armature 401); and movement of the horizontal bar associated with armature 402 in its HC operated position as controlled by the operation of its HC coil.

The operation of the horizontal bar associated with armature 402 to its HI operated position as well as the operation of the remaining armatures 403, 404, 405, 406 in their operated positions prepare subscriber line inlets to the various vertical set of contacts. Thus in the vertical bank of contacts associated with vertical magnet V1, contacts HA of set 407, contacts HB of set 408, and contacts HC of set 409 are multipled together as outlets to the link associated with vertical V1.

Twenty-five incoming subscriber lines are connected to the various contact sets as follows: line 26 to the left contacts of set 410; line 8 to the center contacts of set 410; line 0 to the left contacts of set 411; line 20 to the center contacts of set 411; line 10 to the right contacts of set 411; etc.

The left contacts of each set are multipled to the HA contacts of set 407; the center contacts of each set are multipled to the HB contacts of set 408; and the right contacts of each set are multipled to the HC contacts of set 409.

To illustrate how an incoming line is routed through the switch 400 to an outgoing link, let it be assumed that line 0 originates a call and that this call is routed to the link associated with vertical V1. The subscriber's line marker energizes the H2 coil to cause armature 403 to be attracted to its H2 position. Inasmuch as the preparing finger associated with the horizontal bar prepares a contact set on the opposite side of the bar as is understood by those skilled in the art, the contacts 0 of set 411 are prepared for operation.

The marker also operates the HA coil to cause the armature 401 to be attracted to its HA position, and the operating finger associated with the horizontal bar in its V1 position, prepares contacts HA of set 407 for operation as is understood by those skilled in the art. The marker then operates the V1 coil to cause armature V1 to be attracted thereto. Rotating its vertical bar which causes the fingers on the horizontal bars to close contacts 0 of set 411 and HA of set 407.

The marker then releases the horizontal coils. The vertical coil remains operated and is held over the "S" wire ground independent of the marker.

The path of line 0 into the link associated with vertical bar V1 is then as follows: line 0, contacts 0 of set 411, multiple to contacts HA of set 407, to the link associated with vertical V1.

The path of line 0 into the link associated with vertical bar V2 is as follows: line 0, corresponding contacts 0 in set 423, multiple to contacts HA of set 418, to the link associated with vertical V2.

Thus it can be seen that contacts HA are associated with all left contacts in the vertical bank below it; HB with all center contacts in the vertical bank below it; and HC with all the right contacts in the vertical bank below it. This makes a total of twenty-seven sets of incoming contacts, one of which, 26, is a spare and one of which is unworkable (the right hand contacts of set 410) inasmuch as the armature 402 cannot turn two ways at the same time and it is operative as a combination selector (HC) and as a line entry selector (H1).

Figure 7:
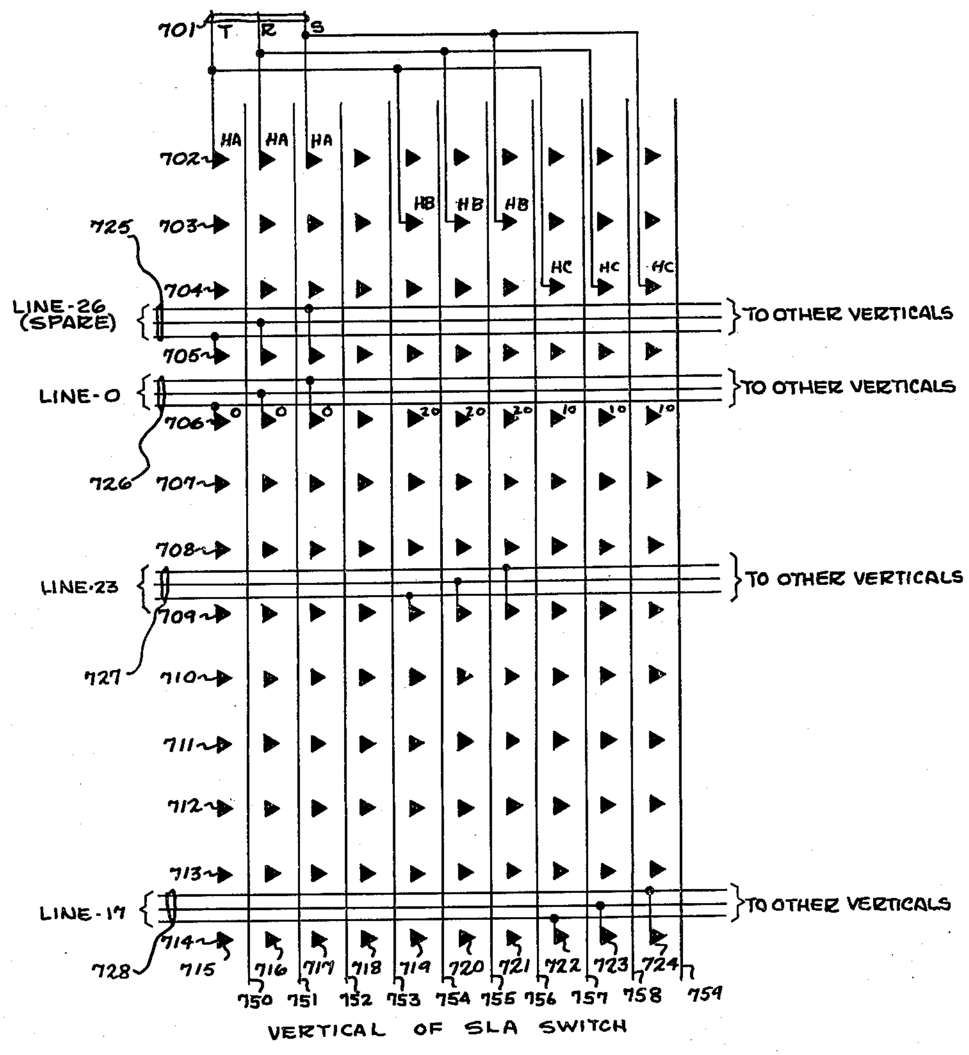
FIG. 7 is a schematic diagram of each vertical contact set associated with the horizontals of the switch of FIG. 4.

The above described contacts are shown in more detail in FIG. 7. Here it will be noted that there are ten vertical stationary common conducting bars, against which the horizontal bars prepare associated contacts for engagement and against which the vertical bar actually brings the contacts into engagement.

Line 0 for example, comprising tip, ring, and sleeve conductors connected to three individual contacts in row 706 and columns 715, 716, and 717. These three contacts are those schematically shown aggregatively in FIG. 4 as contacts 0 of set 411.

Link 701 comprises tip, ring, and sleeve conductor, the tip being connected to the contacts of row 702, 703, and 704, represented in columns 715, 719, and 722 respectively, the ring being connected to the contacts of rows 702, 703, and 704, represented in columns 716, 720, and 723, respectively, and the sleeve being connected to the contacts of rows 702, 703, and 704, represented in columns 717, 721, and 724 respectively. Thus the HA contacts of FIG. 4 are the tip, ring, and sleeve as found in row 702 and columns 715, 716, and 717. The HB contacts of FIG. 4 are the tip, ring, and sleeve as found in row 703 and columns 719, 720, and 721. The HC contacts of FIG. 4 are the tip, ring, and sleeve as found in row 704 and columns 722, 723, and 724.

It should be noted that the contacts in column 718 and vertical bar conductor 753 are not used. In other words, there are ten contacts at each crosspoint, one is not used, and the remaining nine are divided into three groups of three each.

In order to further elucidate connections, the tip of line 0 will be traced as follows: tip of line 0, contact in row 706 and column 715, conducting bar 750, contact in row 702 and column 715, tip of link 701. The ring of line 0 is traced as follows: ring of line 0, contact in row 706 and column 716, conducting bar 751, contact in row 702 and column 716, ring in link 701. The sleeve of line 0 is traced as follows: sleeve of line 0, contact in row 706 and column 717, conducting bar 752, contact in row 702 and column 717, sleeve in link 701.

It is believed that the other line paths will be obvious from the foregoing description.

It should be understood that each vertical bar has a bank of contacts as shown in FIG. 7 and that corresponding contacts in each bank are multipled as indicated in FIG. 7.

C. *Other crossbar switches* (*SLB, SRL, SLC, GSA, GSB*)

Figure 5:
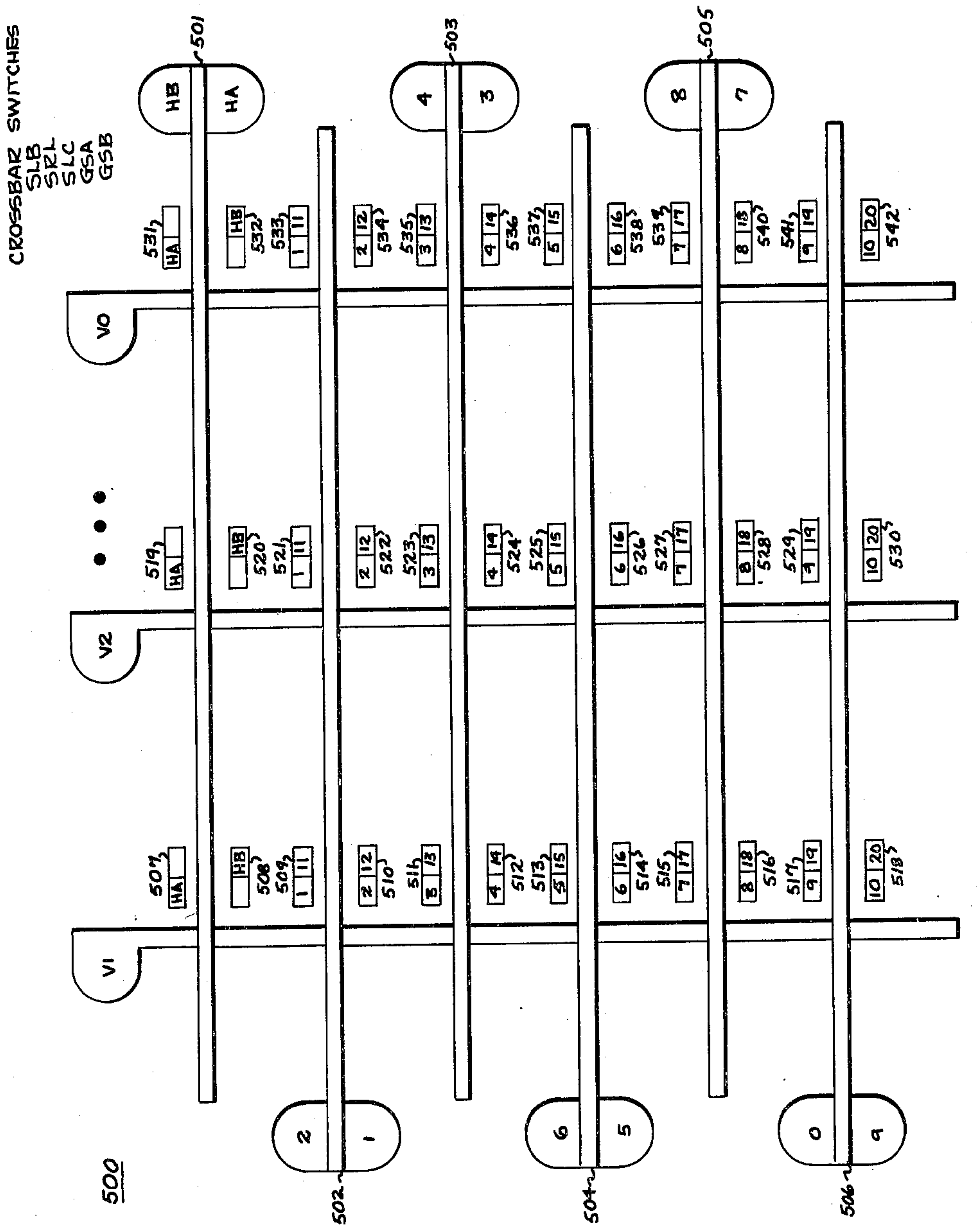
FIG. 5 is a front schematic view of a twelve horizontal and ten vertical crossbar switch arranged to accommodate twenty lines on the horizontals and used in other places in the system than in conjunction directly with subscribers' lines.

Referring to FIG. 5, a crossbar arrangement is schematically shown whereby twenty incoming lines horizontally anywhere in the system can be switched to from one to ten links as represented by vertical bars V1–V0.

This is accomplished by using one horizontal bar as represented by its associated armature 501 in its two operated positions HA and HB for outgoing combination purposes and the other horizontal bars in their two operated positions for line entry purposes with the contact sets at each crosspoint divided into two parts.

Thus incoming line 1 is connected to the outgoing link associated with vertical V1 by the operation of horizontal armature 501 to its HA position and horizontal armature 502 to its 1 position. Incoming line 11 may be connected to the link associated with vertical bar V1 by the operation of horizontal armature 501 to its HB position and horizontal armature 502 to its 1 position. Incoming line 2 may be connected to the link associated with vertical V1 by the operation of armature 501 to its HA position and armature 502 to its 2 position. Also incoming line 12 may be connected to the link associated with vertical V1 by the operation of armature 501 to its HB position and armature 502 to its 2 position. The connectors of the other lines to the different links will be obvious from the foregoing description.

The incoming lines are multipled horizontally to corresponding contacts in other vertical banks.

Figure 8:
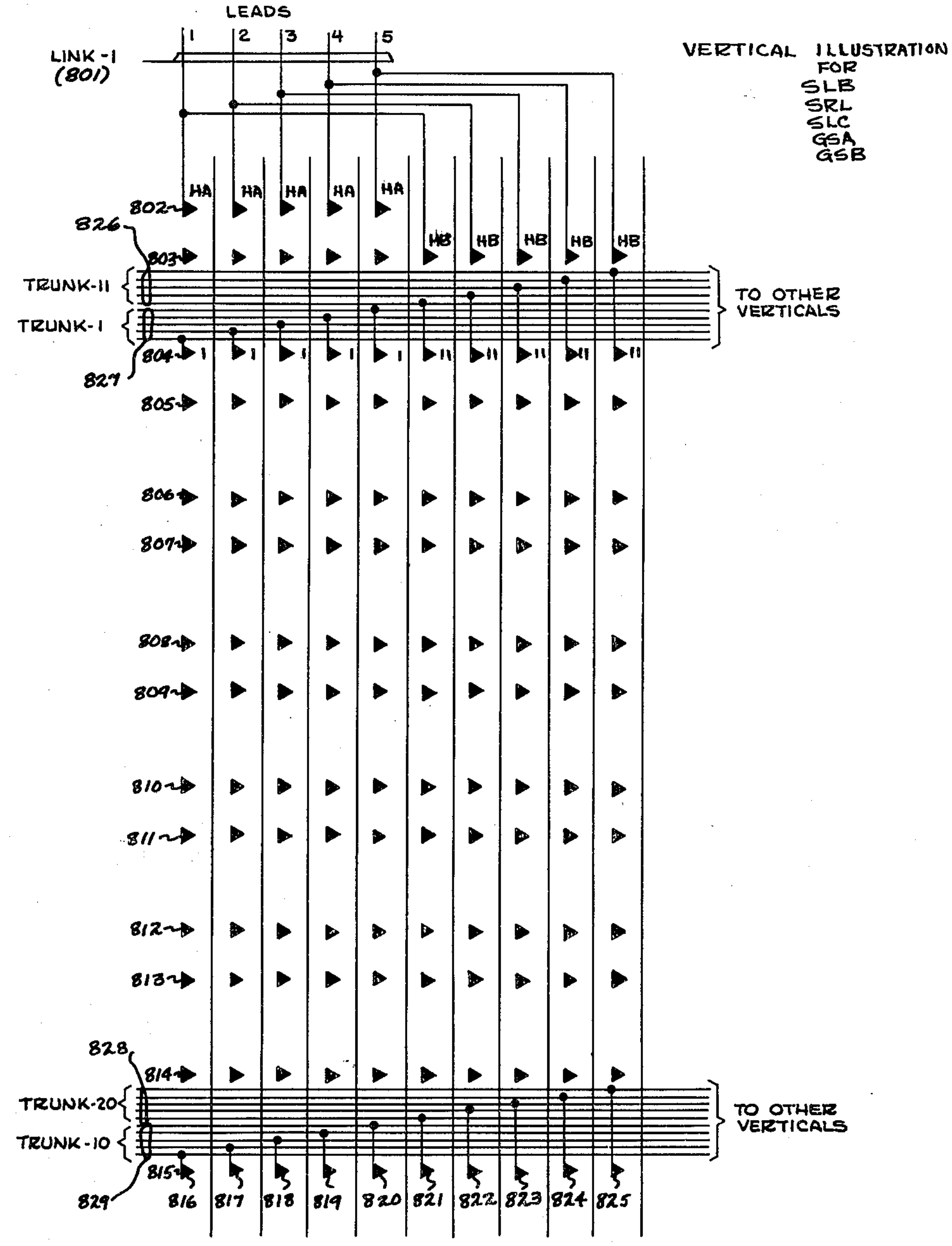
FIG. 8 is a schematic diagram of each vertical contact set associated with the horizontals of the switch of FIG. 5.

A more detailed showing of a vertical contact bank extending transversely across the horizontals is shown in FIG. 8. As shown thereat the five conductors of trunk 1 are connected respectively to five contacts in row 804 and columns 816, 817, 818, 819, and 820; that the five conductors of trunk 11 are connected respectively to five contacts in row 803 and columns 821, 822, 823, 824 and 825; that the five conductors of the link are connected respectively to five contacts in row 802 and columns 816, 817, 818, 819, and 820; and that the five conductors of the link are also connected respectively to five contacts in row 803 and columns 821, 822, 823, 824, and 825.

Incoming contacts in one vertical are multipled to corresponding contacts in other verticals. It should be understood that a varying number of conductors per incoming line may be used.

The SLB switch arrangement may vary slightly from the foregoing pattern and will be discussed more completely hereinafter.

D. *Trunk register link* (*TRL*) *crossbar switch*

Referring to FIG. 6, the arrangement of the crossbar switches TRL indicated generally by reference character 239 in FIG. 2, is more specifically set forth. In this arrangement, a crossbar switch having twelve horizontal magnets and ten vertical magnets is essentially split in the middle vertically. As far as contacts are concerned the switch appears to be two switches, but the two switches are operated by the same set of horizontal and vertical magnets. As a result only one connection can be in the process of being set up at a time.

This is accomplished by using one horizontal bar such as that represented by armature 601 as a combination bar, and the other horizontal bars as incoming trunk select bars. Additionally, two registers are associated with each horizontal.

More specifically, the trunk 1 on the left can reach register 1 on the left by the operation of armature 601 to its A position, armature 602 to its 1 position, and by the operation of armature V1. The connection then extends as follows: trunk 1, left contacts of set 609A, vertical conducting bars (not shown) left contacts of set 607A to register 1.

Trunk 1 can reach register 2 by the operation of armature 601 to its HB position, armature 602 to its 1 position, and by the operation of armature V1. The connection then extends as follows: trunk 1, right contacts of set 609A, vertical conducting bars (not shown), right contacts of set 608A to register 2.

Trunks 2 can reach register 1 by the operation of armature 602 to its A position, armature 602 to its 2 position, and by the operation of armature V1. The connection then extends as follows: trunk 2, left contacts of set 610A, vertical conducting bars, left contacts of set 607A to register 1, etc.

Similarly trunk 1 on the right can be connected to register 1 on the right by the operation of armature 601 to its A position, armature 602 to its 1 position, and by the operation vertical V6. The connection then is as follows: trunk 1, left contacts of set 609E, vertical conducting bars, left contacts of set 607E to register 1, etc.

It should be noted that horizontal multiples do not extend between verticals V5 and V6.

IV. TRUNKING ARRANGEMENTS (SLA, SLB, SLC, SRL)

Figure 9:
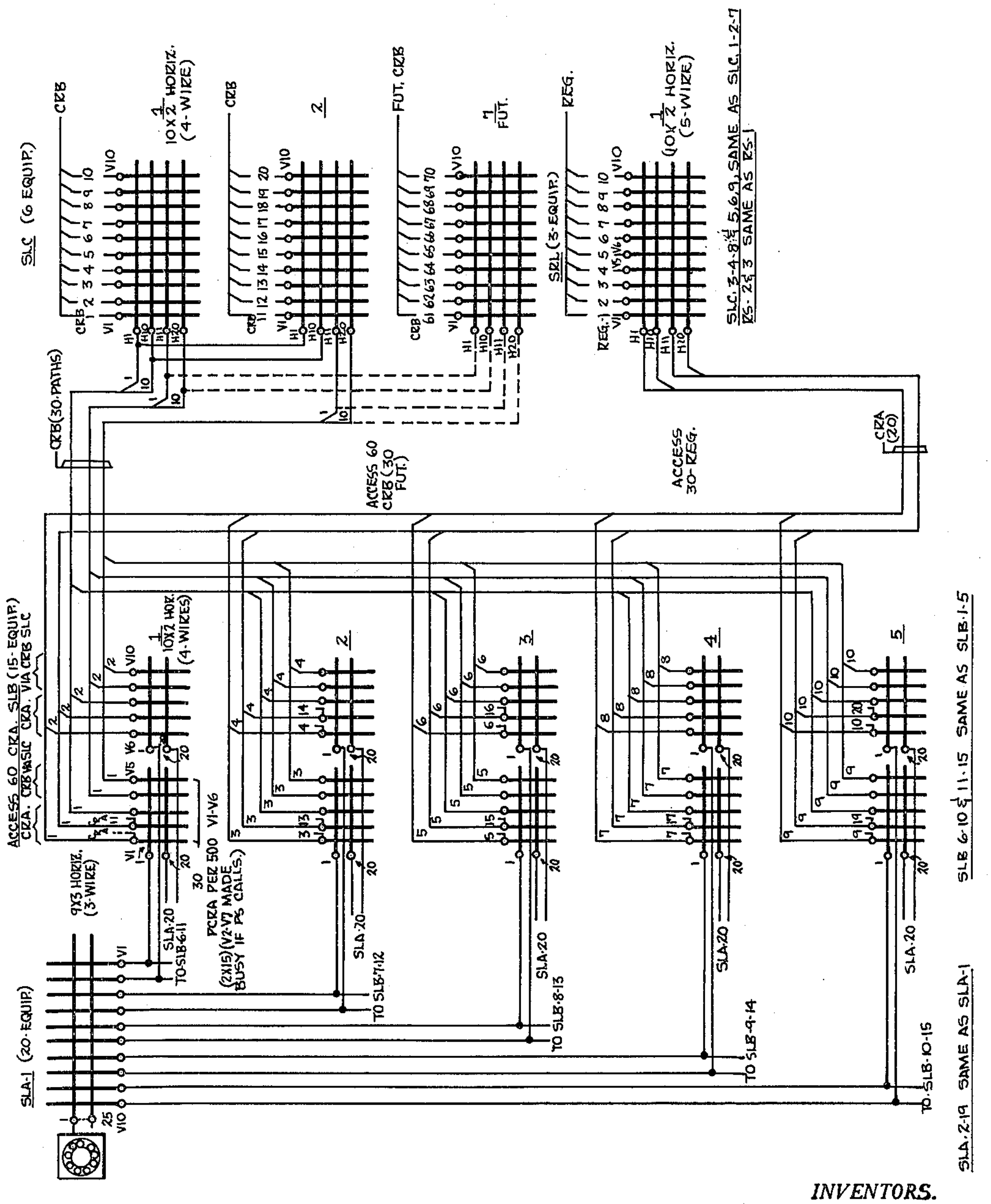
FIG. 9 is a trunking diagram of incoming and outgoing connections through certain crossbar switches of the system with more detail than found in FIGS. 1, 2, and 3.

Referring now to FIG. 9, the manner of arranging and interconnecting the crossbar switches SLA, SLB, SLC, and SRL is set forth in a schematic representation.

At the upper left of the figure each subscriber line of a group of twenty-five lines is connected in effect to a horizontal of an SLA switch. (It should be understood that the combination arrangement as set forth in section III–B and illustrated in FIGS. 4 and 7 is the electrical equivalent of a twenty-five horizontal crossbar switch which passes three conductors through each crosspoint set.) Accordingly, as has been previously mentioned, twenty SLA switches each connected to twenty-five lines are necessary to service 500 subscriber lines.

Each vertical 1–10 (i.e. outputs) of the first SLA switch shown is connected to a horizontal of an SLB switch.

The horizontal multiple of the SLB crossbar switches do not extend between verticals V5 and V6 (in the manner of the TRL switches), but each vertical bar is associated with only one outgoing trunk.

Thus V1 of the first SLA switch is connected to the first horizontal of the first SLB switch on the left side; V2 of SLA to the first horizontal on the first SLB switch on the right side; V3 of the first SLA switch is connected to the first horizontal of the second SLB switch on the left side; V4 of SLA to the first horizontal on the second SLB switch on the right side, etc.; and V9 of the first SLA switch is connected to the first horizontal of the fifth SLB switch on the left side; and V10 of the first SLA switch is connected to the first horizontal of the fifth SLB switch on the right side.

Thus the ten verticals of the first SLA switch are connected to the first horizontals of a group of five SLB switches.

Similarly the ten verticals of the second SLA switch are connected to the second horizontals of the same group of five SLB switches.

In like fashion the ten verticals of the other of the twenty SLA switches are connected to corresponding horizontals on the same group of SLB switches, the ten verticals of the twentieth of the SLA switches being connected to the twentieth horizontals of the same group of SLB switches.

In like fashion, the verticals of the twenty SLA switches are multipled to corresponding horizontals of a second group of five SLB switches (not shown) and to corresponding horizontals of a third group of five SLB switches (not shown).

Each half of the SLB switches is identical as far as connections are concerned. Verticals V1, V2 in the left half and verticals V6 and V7 in the right half are used for originating calls and lead individually to a CRA and a horizontal of a subscriber register link SRL. Verticals V3, V4, and V5 in the left half and verticals V8, V9, and V0 in the right half are used for terminating calls and lead individually to a horizontal of a SLC switch.

Thus V1 of the first SLB switch which we shall call SLB–1 leads to the first CRA which we shall call CRA–1 circuit, horizontal H1 of the first SRL crossbar switch, which we shall call SRL–1 and to the first vertical of a group selector switch GSA (not shown in FIG. 9). V6 leads to the second CRA and to horizontal H2 of the first SRL crossbar switch (the connections to GSA are apparent from the foregoing description).

Similarly V1 of SLB–2 leads to CRA–3 and H3 of SRL–1; V6 of SLB–2 to CRA–4 and H4 of SRL–1.

This same pattern is followed concluding with V1 of SLB–5 which leads to CRA–9 and H9 of SRL–1 and V6 of SLB–5 which leads to CRA–10 and H10 of SRL–1.

Similarly V2 and V7 of SLB–1 lead to CRA–11 and CRA–12 and H11 and H12 of SRL–1; V2 and V7 of SLB–2 to CRA–13 and CRA–14 and to H13 and H14 of SRL–1, etc.; and V2 and V7 of SLB–5 to CRA–19 and CRA–20 and to H19 and H20 of SRL–1.

In similar fashion verticals V1, V2, V6 and V7 of crossbar switches in the next group of five SLB switches SLB–6 to SLB10 (not shown) connect to a second group of twenty CRA's and a second subscriber register link crossbar switch SRL–2.

In like manner verticals V1, V2, V6 and V7 of crossbar switches in the third group of five SLB switches, SLB–11 to SLB–15 (not shown) connect to a third group of 20 CRA's and to a third subscriber's register link SRL–3.

As there are three SRL switches serving a 500 group of lines, there are thirty outlets from the SRL switches and these 30 outlets are graded or slipped with other groups of 30 outlets to a common group of registers, the number of registers being determined by traffic considerations.

The terminating calls vertical V3 and V8 of SLB–1, V3 and V8 of SLB–2, V3 and V8 of SLB–3, V3 and V8 of SLB–4, and V3 and V8 of SLB–5 are connected individually to horizontals H1 to H10 of SLC–1.

Verticals V4 and V9 of SLB–1, V4 and V9 of SLB–2, V4 and V9 of SLB–3, V4 and V9 of SLB–4, and V4 and V9 of SLB–5 are connected individually to horizontals H1 and H10 of SLC–1.

Verticals V5 and V10 of SLB–1, V5 and V10 of SLB–2, and V5 and V10 of SLB–3, V5 and V10 of SLB–4, and V5 and V10 of SLB–5 are connected individually to horizontals H11 to H20 of SLC–2.

To utilize horizontals H1 to H10 of SLC–2 to obtain better traffic rotation and use, horizontals H1 to H10 of SLC–1 are multipled to horizontals H1 to H10 of SLC–2.

Verticals V3, V4, V5, V8, V9, and V10 of SLB's 6–10 (not shown) are similarly connected to two other SLC's.

Verticals V3, V4, V5, V8, V9 and V10 of SLB's 11–15 (not shown) are similarly connected to other SLC's.

The verticals of SLC's are connected to CRB's. Thus with six CRB's containing ten verticals each, sixty CRB's per 500 group termination through the SLB's and SLA's can be given.

If future terminating traffic demands additional service, an additional SLC switch may be connected to serve each group of five SLB's with horizontals H11 to H20 of SLC–1 multipled to horizontals H1 to H10 of the additional SLC; and horizontals H11 to H20 of SLC–2 multipled to horizontals H11 to H20 of the additional SLC.

With this arrangement ninety CRB's per 500 group can be given termination through SLB's and SLA's.

Each five hundred group of lines has similar arrangements.

Thus on an originating call a horizontal such as horizontal 1 of SLA–1 can be extended over the ten verticals of SLA–1 to horizontals in the two sections of every SLB switch 1–15; verticals of both sections of each SLB switch SLB–1 and SLB–6 can be extended to horizontals of the associated SRL–1 switch which has access to ten registers; similarly V1A SLB–6 to SLB–10 to SRL–2 and another ten registers; and similarly V1A SLB–11 to SLB–15 to SLR–3 and another ten registers. Accordingly every line has access to each of thirty originating registers through three banks of crossbar switches.

Also on terminating calls, a horizontal such as horizontal 1 of SLA–1 can be extended over the ten verticals of SLA–1 to horizontals in the two sections of every SLB switch 1–15; both sections of each SLB switch SLB–1 to SLB–5 can be extended to horizontals of each associated SLC switch SLC–1, SLC–2, and SLC–3 (if equipped); similarly for SLB–6 through SLB–10 to two (or three) other associated SLC switches; and similarly for SLB–11 through SLB–15 to two (or three) other associated SLC switches. Accordingly every line has access to each of sixty (or ninety if the third SLC switch in each group is equipped) CRB circuits.

Thus on an originating call the seized subscriber's line marker seizes an idle register associated with the first SRL, tests for idle verticals in the calling SLA switch, tests for CRA's and horizontals on the first SRL to which the idle verticals of the SLA can be connected, operates the first and calling SLA horizontal and selected SLB and SRL horizontals, then closes selected SLA, SLB and SRL verticals, and then releases the SLA, SLB, and SLC horizontals. The vertical magnets then hold the cross-point contacts closed.

If no idle CRA of the four CRA's which it is possible to connect to each predetermined idle SLA vertical, is found, the marker releases the seized register, seizes a register accessible from SRL–2 and tests for idle CRA's associated with each idle vertical of SRL–2 which can be connected to the SLA idle verticals.

If no idle CRA of the CRA's which it is possible to connect to the predetermined idle SLA verticals is found, the marker releases the seized register and places the calling line on lockout and the marker releases. The calling line receives busy tone through its line circuit.

On a terminating call, the marker operates the horizontal of the called line to make a busy test. If the line is busy the marker signals the CRB which releases the connection, placing the calling line on lockout. If the called line is idle, the marker tests for idle verticals in the called SLA. The marker also knows the vertical SLC location of the calling CRB. The marker then tests for idle SLB verticals which can be connected to the idle SLA verticals. If it finds none, the marker signals the CRB which signals the sender. The sender releases the connections placing the calling line on lockout. If an idle path is found, the marker operates the SLB and SLC horizontals, operates the SLA, SLB, and SLC verticals, and then releases the horizontals. Thereupon the marker releases, and the calling CRB rings the called party over the established connection.

V. SUBSCRIBERS LINK A

A. *General arrangement of plug-in unit*

Referring to FIG. 10, a demountable twenty-five line and associated SLA switch and relays unit is indicated generally by the reference numeral 1000. The unit comprises a rectangular frame 1001 to which a mounting bar 1002 is attached by conventional means such as by welding. A crossbar switch indicated generally by reference character 1003 of the type illustrated in FIGS. 4 and 7 is supported by conventional means between the bar 1002 and the frame 1001 in the lower and left portion of the frame 1001. The switch comprises six horizontal bars and associated twelve operating coils by means of which each horizontal bar can be operated from the neutral position to either of two operated positions, and ten vertical bars and associated ten operating coils by means of which each vertical bar can be operated from its neutral position. Adjacent the armature of each horizontal bar are found two sets of off-normal contacts corresponding to positions of the armature in the same fashion as explained in relation to FIG. 4 relative to cross point contacts. Adjacent to the armature of each vertical bar is found a single set of off normal contacts. Associated with each vertical is found a bank of contacts transverse to the horizontal bars. Supported by conventional means between bar 1002 and the lower horizontal part of frame 1001 are three bars 1004 and 1005, and 1006. A plurality of bars 1007–1016 are supported by conventional means between bar 1002 and the upper horizontal part of frame 1001.

A relay 1017 having armature 1023 and an associated center pileup of contacts indicated schematically by reference numeral 1021 is mounted on bar 1006. Mounted on relay 1017 on either side of the center pileups are two smaller relays 1018 and 1019 having associated contact pileups 1020 and 1022 respectively. The large relay 1017 is the lockout relay of a subscriber's line circuit such as the twin-wound lockout relay found in the upper part of FIG. 12. Similarly the small relay 1018 is the line relay of the line circuit and the relay 1019 is the cut-off relay of the line circuit.

Similar line relays are mounted on bars 1008 to 1016. Additionally, six such relays are mounted on each of the bars 1004, 1005, and 1006. Thus twenty-five line circuits are provided and are numbered as follows:

| | | | | | | |
|---|---|---|---|---|---|---|
| 0 | 7 | 14 | 21 | 22 | 23 | 24 |
| 1 | 8 | 15 | | | | |
| 2 | 9 | 16 | | | | |
| 3 | 10 | 17 | | | | |
| 4 | 11 | 18 | | | | |
| 5 | 12 | 19 | | | | |
| 6 | 13 | 20 | | | | |

These numbers correspond to the numbered contacts of FIG. 4 by which tip, ring, and sleeve conductors of the associated line circuits are extended over SLA switches.

In addition to the line relays, three relays 1024, 1025, and 1026 are mounted on bars 1014, 1015 and 1016 respectively and are the relays 1A, 2A, and 3A of FIG. 13.

Connections between the unit 1000 and other circuitry of the switchboard are effected by means of jack and plug units indicated generally by reference characters 1027, 1028 and 1029. An enlarged perspective view of 1027 is provided in FIGURE 10–A. The jack unit containing a plurality of individual connectors to which circuits exterior to switch 1000 are connected is indicated by reference character 1030, this jack being fixedly supported to switchboard vertical channel member 1031 by conventional means. The plug unit is indicated by reference character 1032 and contains a plurality of registering individual connectors to which circuits in unit 1000 are connected via flexible cable 1033.

The frame of switch 1000 has a solidly attached metal protrusion 1034 which is arranged to be inserted in a registering slot in switchboard vertical channel member 1035 to support the switch 1000 at the left side.

The frame of switch 1000 also has solidly attached protrusions 1036 and 1037, the ends of which slide sideways into registering slots in channel member 1031. In assembling the switch, the member 1034 is first inserted in its registering slot in member 1035 and then the right end is pivoted about 1034 so that members 1036 and 1037 enter their registering slots and slide as far as they can. A locking member (not shown) is provided. Thereupon pin 1042 of plug unit 1032 is inserted in slot 1041 of jack 1030 against the spring action of coil spring 1038 and the plug unit is pivoted about the pin 1042 by pushing handle 1039 until all contacts engage and the handle frictionally engages the member 1040 which springs slightly holding the jack and plug engaged. Jack and plug units 1028 and 1029 are engaged in a similar fashion. The contact sets of units 1030 and 1032 may comprise a plurality of units as described in U.S. Patent No. 2,664,552.

The cabling and wiring on the reverse side of switch 1000 between the elements of the switch unit of FIG. 10 is shown in brief schematic form in FIG. 11.

Plugs represented by reference characters 1032, **1032*a*, and 1032*b* correspond to plug and jack units 1027, 1028 and 1029** of FIG. 10.

Cables 1033, **1033*a* and 1033*b* from the jacks merge into cable 1103. From cable 1103 emerges cable 1104 with emerging cables containing wires to the six sets of horizontal off normal contacts on one end of the crossbar switch; and cable 1105 from which emerges cables containing wires to the horizontal select coils on the same end of the switch. Similar cables 1114 and 1112 serve the horizontal off normal contacts and coils respectively at the other end of the crossbar switch. Cable 1107 emerges from cable 1103 and via cable 1107*a* extends HA, HB, and HC connections associated with vertical No. 10 (see FIGS. 4 and 7); via other cables below extends tip, ring, and sleeve connections to the line contacts associated with vertical No. 10 and to the multiple between verticals. Cable 1109** extends HA, HB, and HC connections to the contact bank associated with vertical No. 9. Other cables (not shown) emerge from cable 1103 and extend the HA, HB, and HC connections of verticals No. 8 to No. 3. Cable 1111 extends HA, HB, and HC connections of vertical No. 2. Cable 1112 emerges from cable 1103 and extends HA, HB, and HC connections to vertical No. 1 over cable 1112*a* and over other emerging cables extends wires to the horizontal coils on the corresponding end of the crossbar switch as previously mentioned. Cables 1117, 1120, 1122 and emerging cables serve the various line circuits mounted on bars 1006, 1005, and 1004 respectively of FIG. 10. Cables 1113, 1115, 1116, 1118, 1119, 1121, and 1123 serve the line circuits mounted on bars 1013, 1012, 1011, 1010, 1009, 1008, and 1007 of FIG. 10 respectively. Cables emerging from cables 1107, 1109, 1111, 1112, and other corresponding cables not shown serve the vertical off-normal contacts and vertical coils as illustrated.

B. *Circuitry*

Referring now to FIGS. 12 and 13, the circuitry associated with the SLA switch of FIGS. 1, 4, 7, 9, 10, and 11 is shown.

The outside line circuit of line 17 for example, comprising tip and ring conductors, enters the exchange at the main distributing frame (MDF) and is connected at the MDF referred to in the upper left of FIG. 12 to the corresponding tip and ring conductors inside the exchange. It may be noted that the sleeve conductor of line 17 inside the exchange extends to the MDF for special marking purposes.

The tip, ring, and sleeve conductors of line 17 extend to the contacts designated 17 of the banks of contacts associated with various verticals V1 to V0 of which V1 is shown in detail. This is actually the reverse side of contact bank of FIG. 7 which is also turned around horizontally for convenience in drawing the schematic.

When a call is originated by a party on line 17 lifting his receiver, a loop is placed across the tip and ring conductors operating the line relay LR associated with line 17 over the following circuit (see also FIG. 13): battery, fuse 4, lead 1301, winding of relay LR, break contact 21 of lockout relay LO, break contacts 13 of cut-off relay CO, ring conductor 207, the calling line loop, tip conductor 206, and break contacts 12 of relay CO to ground.

The line relay LR operates and at its contacts 12 closes a loop circuit to the line entrance originating circuit (LEO) over the following path: conductor 1201*a*, make contacts 12 of line relay LR, conductor 1202 to LEO.

It should be observed that lead 1201 is common to all twenty-five lines but that each line has its individual lead such as 1202.

As a result of the closure of this loop to LEO, a subscriber's line marker is engaged. By signals transmitted to the seized marker, the identification of the calling SLA switch and the identification of the calling line (and accordingly horizontals) in the SLA switch are ascertained by the marker.

Thereupon, the marker (assume SLM–1) operates relays 1A, 2A and 3A (relays 1024, 1025 and 1026 of FIG. 10) over the following circuit: battery over fuse 3, relays 1A, 2A and 3A in parallel, break contacts of busy key BK, to lead 1302 to the marker. It should be noted that this lead is multipled to the other subscriber's line marker (SLM–2). Relays 1A, 2A, and 3A operate from ground supplied by the marker over lead 1302 in a manner to be more fully described in copending application having Serial Number 561,975, which was filed January 27, 1956.

Thereupon the marker in accordance with principles previously described tests the idle routes from the calling SLA switch to an idle register and in so doing tests the condition of the verticals of the calling SLA switch. The test for vertical V1 extends from batttery over fuse 1, off-normal break contacts 11 of vertical magnet V1, contacts 32 of relay 1A, conductor 1303 and cable 1304 to ground supplied by the marker SLM–1. If vertical magnet V1 is non-operated, a relay operates in the marker, indicating to the marker that the vertical is idle.

Assuming that an idle path to an idle register has been found via vertical V1 of the calling SLA switch, the marker operates one of the horizontal coils H1 to H9 and the combination coil HA, HB, or HC, assigned to line 17. It should be observed that the designations of the horizontal and vertical coils correspond to the designations of FIGS. 4 and 7, the HA and HB designations of the pivoted armature ends of FIG. 4, for example, corresponding to the HA and HB coils of FIG. 13 which attract the respective armature ends thus operating the horizontal bar to one of its two operated positions. It should also be observed that the contacts which the coil prepares for operation are in line with the horizontal coils of FIG. 13. It should be recalled that these contacts do not actually operate until the vertical magnet operates.

More specifically, the marker operates horizontal coil H9 (FIG. 12) over the following circuit: battery, fuse, coil H9, conductor 9, cable 1305, conductor 9, contacts 12 of relay 3A, conductor 9*a*, cable 1306, to ground in the marker. Also the marker operates coil HC over the following circuit: battery, fuse, coil HC, lead 12, cable 1305, lead 12 from the cable and contacts 38 of relay 3A, lead 12*a*, cable 1306, to ground in the marker.

The marker then operates vertical magnet V1 over the following circuit: battery, fuse, 200 ohm winding of V1, contacts 12 of relay 1A, conductor 1304*a* of cable 1304 to ground in the marker.

Before the marker opens the original 200 ohm operating circuit of coil V1, ground will obtain on leads H and S from the CRA circuit via the SLB switch and as coil V1 is energized, it is effective at its contact 14 to close a locking circuit over its 2000 ohm winding as follows: battery, fuse, 200 ohm winding, contacts 14 of V1, to the H lead which leads to SLB, and thence to ground in the CRA circuit. Relay V1 at contacts 15 closes ground to conductor 1308 which actuates a metering circuit.

When V1 operates, it closes the tip, ring, and sleeve contacts prepared by horizontal coils H9 and HC as described heretofore and the tip, ring, and sleeve conductors are thereby extended to the SLB switch, and thence via the CRA circuit to the selected idle register, whereupon the calling line receives dial tone from the register. Simultaneously ground on the S-lead from the CRA via the SLB switch operates the cut-off relay CO and the lockout relay LO of line 17, the circuit extending from battery, over fuse 4, conductor 1301, the 600 ohm winding of the lock-out relay LO17 through the 850 ohm cut-off relay winding and the 10,000 ohm resistor in parallel to the ground on the S-lead 208. The cut-off relay CO operates and at its contacts 12 and 13, opens the circuit of the line relay. The line relay now releases. (It should be understood that the exchange operating battery potential is normally negative 48 volts). Lock-out relay LO17 operates and at its contacts 23, prepares a self-holding circuit; and at its contacts 24 disconnects 500 ohm battery from the S-lead.

Line relay restores and at its contacts 12 opens the loop to the line entrance originating circuit which signals the marker to dismiss itself.

It must be noted that once the marker is engaged a self-holding circuit is provided which permits the marker to go through its entire sequence of operation before it can be released. This is quite necessary to prevent flashing lines from seizing, releasing, and then reseizing the marker, which could prevent legitimate calls from seizing the marker.

If a call is attempted to line 17 while it is in use, the marker tests the S-lead of this line by operating coils H9 and HC temporarily whereupon direct ground on the S-lead over off-normal contacts 11 of coil H9, off-normal contacts 12, 14, 16 of HC, conductor 1307, contacts 26 of relay 1A, and conductor 1308 to the testing marker indicates to this marker that the line is busy. If line 17 had been idle, battery through fuse 4, and over C1301 passes over three paths in parallel to the S-lead, the first path extending over the 500 ohm resistor and break contacts 24 of lock-out relay LO, the second path extending over the 10,000 ohm resistor, and the third path extending over the 600 ohm winding of lockout relay LO17 in series with the 850 ohm winding of the cut-off relay CO17. The combined effective resistance of these parallel circuits is approximately 360 ohms. This 360 ohm battery signal to the marker via lead 1308 indicates to the testing marker that the called line is idle.

In the marker, lead 1308 goes through a relay to ground. The resistance of this relay is such that on a busy test the cut-off relay CO and lock-out relay LO of the tested line operate, disconnecting the line relay LR. Thus during the busy test, a party on line 17 is prevented momentarily from operating the line relay LR and throwing a call into the line entrance originating circuit LEO.

The calling line has control. When the calling party hangs up, the calling loop extending into the CRB circuit is opened, which causes the CRB circuit to release itself and the connection, removing ground from the H and S leads. The circuits of CO and LO are thus opened allowing these relays to release, reconnecting the line relay LR to the line in preparation for another call.

If ground disappears from the S-lead while the calling loop remains established, as for example, when the register releases the connections on a call to a busy line, the cut-off relay CO releases but the lockout relay LO holds. This is accomplished as follows. The removal of ground from S-lead disconnects ground from the 850 ohm winding of relay CO17 and the 600 ohm winding of relay LO17. The cut-off relay CO17 has much less iron in its core than the lock-out relay LO17. Accordingly current circulates through the 850 ohm winding of relay CO17 and the 600 ohm winding LO17 in series with the 10,000 ohn resistor for a period of time determined by the circuit constants. Relay CO17 having little iron in its core drops its armature before relay LO17 can drop its armature, and contacts 12 and 13 of relay CO17 are closed while contacts 23 of relay LO17 are still closed. Relay LO17 accordingly holds over its 2800 ohm winding as follows: ground, contacts 12 of relay CO17, calling line loop, contacts 13 of relay CO17, contacts 23 of relay LO17, the 2800 ohm winding of relay LO17, conductor 1203 to battery through a busy tone circuit. The calling party accordingly receives busy tone.

If a short originates a call by closing the line loop, the call lands in a register where it is timed out. The register releases the CRA circuit which removes ground from the H and S-leads, dropping the connections and placing the calling line on lockout as just described.

If a marker makes a busy test to the calling line while the calling line is on lockout, the marker finds 1200 ohm (approximate) battery on the S-lead as a lockout indication. This may be traced as follows: battery, fuse 4, conductor 1301, through two parallel circuits to lead 1204, one path through the 10,000 ohm resistor and the other path through the 600 ohm winding of relay LO17 and the 850 ohm winding of relay CO17 in series, off-normal contacts 11 of relay H9, off-normal contacts 12, 14, 16 of relay HC, lead 1307, contacts 26 of relay 1A, lead 1308 to the marker.

On a terminating call, the subscriber's line marker SLA–1 or SLA–2 places ground on conductor 1302 which operates relays 1A, 2A, and 3A. The marker also places ground on the proper conductors of cable 1306 to operate the horizontal coils which give access to the called line to be tested. If line 17 is to be tested, ground is placed on conductors 9*a* and 12*a* which ground through contacts 12 and 21 respectively of relay 3A, conductors 9 and 12, cable 1305, and conductors 9 and 12 operate coils H9 and HC. The condition on the called line S-lead indicates to the marker the condition of the called line.

The marker also tests the verticals in its procedure of testing idle paths and selecting one between the calling SLA and a register. Vertical V1 is tested from battery over fuse 1, break contact of the alarm relay ALM, off-normal break contacts 11 of vertical V1, contacts 32 of relay 1A, conductor 1303, cable 1304, through a relay in the marker to ground. If vertical coil V1 is idle, off-normal contacts 11 of vertical V1 are closed and the relay in the marker operates to indicate that vertical coil V1 is idle. Assuming that vertical coil V1 is chosen to extend the telephone connection, the marker operates vertical coil V1 over its 200 ohm winding as described previously for an originating call, and vertical coil V1 locks over its 2000 ohm winding, off-normal contacts 14 of vertical V1, lead H via the SLB and SLC crossbar switches to ground in the CRB circuit.

When vertical coil V1 operates the circuits prepared by coils H9 and HC are closed extending the tip, ring, and sleeve conductors through the SLA switch. Ground on the S-lead operates the lock-out relay LO17 and cut-off relay CO17 as previously described for an originating call. These relays remove line relay LR17 from the line at contacts 12 and 13 of relay CO17 and contacts 21 of relay LO17 in preparation for ringing the called substation.

When the calling subscriber replaces the receiver and the CRB circuit releases, ground is removed from the S-lead releasing the SLA switch and returning the line circuit to normal.

If the calling party hangs up first, the called line goes on lockout momentarily until the called party replaces his receiver, whereupon the holding circuit of the lock-out relay LO17 over its 2800 ohm winding is opened and the lockout relay releases.

Summarizing, when a subscriber's line marker makes a busy test of a called line, it may encounter three conditions on the associated S-lead, these conditions being indicated as follows:

(1) If the called line is busy, direct ground will be encountered.
(2) If the called line is on lockout 1200 ohm (approximate) battery will be encountered.
(3) If the called line is idle, 360 ohm (approximate) battery will be encountered.

The marker upon receiving busy or lockout indication will dismiss the calling connections. The marker upon receiving idle indication will continue the process of completing connections. One feature of the invention is the provision of a line circuit which indicates busy, idle, and lockout indication over the same lead in a line circuit which operates both cut-off and lockout relays on an established connection and only the lock-out relay on a lock-out condition. In known commercial systems no distinction is made between the idle and lock-out condition and a loop test over tip and ring is made to distinguish.

VI. TEST AND SEIZURE CIRCUITS (FIGURE 14)

When a subscribers line marker has been seized and has registered therein the information as to which 500 line group which it serves is calling, the SLA switch in the 500 group which is calling, and the calling line represented by the horizontals in the SLA switch, the marker tests for all idle verticals in the calling SLA switch, tests for and seizes an idle register associated with the first SRL switch, tests all idle paths between SLA verticals and the seized register, selects one of the idle paths in accordance with the rotation in the marker, operates the appropriate SLB, and SRL horizontals, operates the appropriate SLA, SLB, and SRL verticals, and releases the seized SLA, SLB, and SRL horizontals. The calling connection is thereby routed to a register and receives dial tone. The subscriber's line marker releases. The seizure of an SLB vertical also results in the seizure of the associated CRA switch and SRL horizontal. If the subscriber's line marker does not find an idle register associated with the first SRL, it tests for an idle register in the second SRL. If it does not find an idle register associated with the second SRL it tests for an idle register associated with the third SRL.

Back-tracking and referring now to FIGURE 14, the seized marker, for example SLM–1, tests for an idle register by closing relay contacts 1440 in the SRL circuit. The register associated with vertical V1 of the SRL switch is thereby tested over a circuit extending from battery, over 1600 ohm resistor, contacts 1436, break-off normal contacts of vertical coil V1 of SRL, other contacts in SRL closed by the marker, to the marker SLM–1. If the seized marker had been SLM–2, this path would be extended by SLM–2 into SLM–2 over contacts 1440*a*.

An idle register such as just described is seized by the SLM marker (SLM–1 for example), by the marker placing ground on lead MB which completes an energizing circuit for slow release relay 1425, which operates and at its contacts 1426 interrupts the test battery circuit so that the register will test busy on subsequent tests while in use.

The marker now tests for an idle SLB vertical and associated CRA, SRL horizontal, and GSA vertical. Specifically as the testing marker, SLM–1 for example, is ready to test an SLB vertical, it extends a circuit over conductor 1444 to the SLB circuit. If the SLB vertical V1, the associated CRA and SRL horizontal, and associated group selector vertical V1 are idle, battery in the group selector marker 1450 is extended back to the SLM–1 marker over break contacts 1436 of relay 1435, off-normal break contacts 1498 of vertical coil V1 of the GSA crossbar switch, break contacts 1421 of call signal relay 1420 associated with verticals V1 of the GSA and SLB crossbar switches, a 1600 ohm resistor, off-normal break contacts of vertical coil V1 of the SLB switch, conductor 1444 to the SLM–1 marker. The marker SLM–1 in advancing the call through these switches operates complete circuits for horizontal coils 1465 and 1470 which extend from ground in the marker over conductor 1480 in the SLB; operates horizontal coils 1475 and 1480 and V1 in the SRL switch extending by ground in the marker over respective conductor shown collectively as 1482; operates V1 in the SLB switch by extending ground in the marker over conductor 1480. Vertical V1 of SRL locks over its own off-normal make contacts to ground in the register over contacts 1425*a* of relay 1425.

Horizontal coils 1465 and 1470 operate and at their contacts 1466, 1466*a*, 1467, 1467*a*, 1468, 1471, 1471*a*, 1472 and 1473 extend the tip, ring, and sleeve conductors to the SSA. Horizontal coils 1475 and 1480 operate and at their contacts 1441*a* and 1442*a* extends ground through a 1200 ohm resistor in the seized register, through contacts 1441*a* and 1442*a* in the SRL switch, the lower winding of relay 1405 in the CRA part of the SLB circuit to battery. High resistance relay 1405 operates but relay 1410 (low resistance lower winding) does not.

Relay 1405 in the CRA operates and at its contacts 1406 prepares a circuit to hold relay 1410 when it subsequently operates, at its contacts 1409 and 1409*a* holds the tip and ring conductors open, and at its contacts 1407 places ground on the S-lead through impedance coil 1415 which holds the SLB vertical magnet, and operates the calling line cut-off and lockout relays. The same ground is extended over contacts 1471*a* and 1466*a* to the incoming H lead to hold the SLA switch.

The pulses of the digits of the called directory number received by the SLB from the calling dial over the incoming ring and tip conductors R and T are extended over contacts 1467, 1468 and 1472, 1473, C1491 and C1492, SRL crossbar contacts 1442*b*, 1422*c*, 1441*b*, 1441*c*, to battery and ground through relays 1495*a* and *b* in the register. Relay 1495*a* operates in response to these pulses and at contacts 1495*c* repeats same to a counting chain 1495*d* which actuates digit registers 1495*e* in a manner well known in the art.

When registration is complete in the register, the register closes ground over lead 1425*a* to a register-sender guard circuit which identifies the register, guards the connection and operates appropriate connect relays which extend to ring and tip conductors, and connects register relay 1430 over conductor 1430*a* and the digit registers 1495*e* over conductors 1495*f* to the selected sender.

The sender translates certain ones of the digits received and on a local call uses a number circuit to translate certain other incoming digits. When the sender is ready to start sending it signals the register by connecting ground to C1430*a*. Relay 1430 operates and at its contacts 1431 connects ground over lead 1495*k*, and contacts 1441*a* and 1442*a* of the SRL crossbar switch to hold high resistance relay 1405 operated and at this time operates relay 1410 over its low resistance lower winding. Relay 1410 locks through its contacts 1411 and contacts 1406 to ground. Relay 1410 operates and at its contacts 1412 forwards the S-wire ground to operate call signal relay 1420 associated with the calling CRA, the circuit extending from ground over relay 1415, contacts 1407, 1412, S-wire, off-normal break contacts 1497, the winding of call signal relay 1420, off-normal break contacts 1498 of GSA vertical coil V1, and break contacts 1436 of group selector marker busy relay 1435 to battery.

Relay 1420 operates and at its contact 1421 opens the SLB vertical busy test circuit and extends battery over contacts 1436, 1498, 1422 and conductor 1499 to identifier equipment 1450*a* in the group marker. This identifier equipment acts to identify the calling CRA and to guard against simultaneous seizures. Also this identifier equipment causes the marker to assume a receiving condition by extending ring and tip conductors 1499*a* and 1499*b* through connect relays 1450*b* into code receiver 1450*c* (see FIGURE 21).

The group selector marker now extends a 24 volt negative battery signal over leads 1499*a*, 1499*b*, ring and tip conductors, contacts 1442*d*, 1442*e*, 1441*d*, 1441*e*, through the register to the sender.

The sender then sends signals via tip and ring conductors through the register and crossbar contacts 1441*d*, 1441*e*, 1442*d*, 1442*e*, conductors 1493, 1494, ring and tip conductors R and T, conductors 1499*a* and 1499*b* to the code receiver (see FIGURE 21) in the group marker 1450. These signals will be discussed in more detail hereinafter.

The group selector marker 1450 in accordance with these signals tests and selects an idle path from the calling CRA as represented by the calling GSA vertical V1 and connects same to an idle GSB horizontal representing a GSB circuit in the required 500 line group or trunk. The group selector GSA and GSB crossbar switches are tandem groups of crossbar switches arranged to connect a given number of inlets to a given number of outlets.

Thereupon the group selector marker 1450 provides ground over leads 1499*c* to energize GSA horizontal coils 1455 and 1460 in preparation of the extension of the ring, tip, and sleeve conductors to the GSB. The group selector marker also extends ground over cable 1499*e* to the selected GSB crossbar switch to operate appropriate horizontal coils 1499*f* and 1499*g* therein, and ground over conductor 1499*d* to operate GSA vertical magnet V1 which locks over its contacts 1496 to the S conductor; and ground over cable 1499*e* to the selected GSB crossbar switch to operate an appropriate vertical coil 1499*h* therein. Coils 1455, 1460, and the vertical V1 coil in the GSA switch operate to close the GSA ring, tip and sleeve contacts in the manner previously described herein. Coils 1499*f*, 1499*g*, and 1499*h* in the GSB switch close the GSB ring, tip, and sleeve contacts in a similar manner. The S wire ground is thus extended over the GSA and GSB sleeve contacts to the selected CRB or trunk. In the case of a CRB, or trunk, this ground causes the CRB or trunk to be conditioned for receiving.

The vertical coil V1 of the GSA crossbar switch operates and at its contacts 1497 opens the circuit of associated call signal relay 1420 which releases and at its contacts 1427 removes its calling condition indicating signal from group selector marker 1450 which responsively releases the identifier guard circuit **1450*a*. Guard circuit 1450*a* in turn releases the connect relays 1450*b* which disconnect ring and tip leads 1499*a* and 1499*b* from the code receiver 1450*c*.** The group selector marker is returned to normal.

The CRB sends a 24 volt negative battery dial start signal to the sender, as described more fully hereinafter, and the sender then transmits signals via leads SR and ST, the register, crossbar contacts **1480*d*, 1480*e*, 1475*d*, 1475*e*, conductors 1493 and 1494**, ring and tip conductors, the crossbar contacts of GSA and GSB to the code receiver in the seized CRB.

The CRB calls in a subscriber line marker SLM–1 or SLM–2 and identifies itself to the marker by closing a loop to the marker. The marker through an identifier guard circuit extends the ring and tip conductors into its code receiver (see FIGURE 21 and subsequent description thereof).

The code receiver in the marker gives a 24 volt negative battery supervision signal over the tip conductor connections to the sender. The sender sends signals to the code receiver marker, via leads SR and ST which signals will be discussed in more detail later.

Upon completion of the sending of these signals, the sender connects ground to lead **1495*l* to operate relay 1495 and thereby effect registration. Relay 1495*j* restores and opens holding grounds in the register which causes the register to release any relays operated, and also opens contacts 1495*k* (shown detached) which opens the circuit for relays 1405 and 1410 in the SLB–CRA unit. Relay 1405** restores.

The removal of ground from lead **1425*a*** releases the connect relays which release the connections between the register and sender.

In the SLB–CRA unit, relay 1410 has been held over a circuit which extends over contacts 1411 and 1406 to ground. When relay 1405 releases, the S-wire connection is switched through break contacts 1408 and the calling ring and tip conductors are extended all the way into the CRB circuit. Also the circuit of relay 1410 is opened at contacts 1406, releasing relay 1410 which opens its contacts 1412, the sleeve conductor having previously been switched in continuity at contacts 1408.

VII. TRUNKING BETWEEN REGISTER LINKS AND NUMBER GROUPS

A prior art arrangement of connecting to registers in a crossbar system is disclosed in U.S. Patent 2,583,848. The registers of this cited patent also include senders. The present arrangement utilizes more switches and less registers.

Referring now to FIGURES 15 and 16, the trunking arrangements between crossbar register links and number group circuits is set forth in block diagram schematic form. This system utilizes less switches and more registers with access to a lesser number of senders.

In the upper left part of FIGURE 16 we find three subscribers' register crossbar links (SRL's) which serve a 500 line group. On the horizontals of each of these crossbar switches we find twenty CRA's entering. Ten outgoing paths, registers, emerge from the verticals of each of these crossbar switches.

In the upper right we find a similar arrangement for the last 500 line group.

In between, as indicated by three dots in a line, are similar arrangements for intermediate 500 line groups.

Below the paths leading from the SRL switch verticals are a number of paths whereby extend from a common group of originating registers (such as illustrated group 1600), of a lesser number than the total number of paths from the SRL switch verticals, the number of registers being determined by traffic considerations.

The thirty paths from the verticals of the SRL's serving the first 500 group are connected to the paths leading to thirty registers.

The thirty paths from verticals of each of the SRL's serve each intermediate group are connected to paths leading to thirty registers.

Finally the paths from verticals from each of the SRL's serving the last 500 group of lines are connected to the paths leading to thirty registers.

A slip or graded multiple exists between groups of thirty SRL verticals and the common group of originating registers indicated by designation 1600.

Thus, for example, the thirty leads from the thirty verticals of the three SRL crossbar switches associated with the first 500 group might be connected respectively to registers 1–30; the thirty leads from the thirty verticals of the three SRL crossbar switches associated with the second 500 group might be connected respectively to registers 21–50; etc. Of course the pattern of slipping or grading might be varied considerably according to principles understood by those skilled in the art.

For 6500 lines (that is 13 groups of 500 lines) 40 to 50 registers may provide satisfactory service for normal traffic.

Each group of ten registers has its associated common guard and connect relay circuit by which it has access to four senders by allotting principles. Thus registers 1–10 of the group 1600 have access through circuit 1605 to sender-translator circuits 1615, 1620, 1625, and 1630. Also registers 11–20 of the group 1600 have access through circuit 1610 to the same senders 1615, 1620, 1625, and 1630.

Similarly the next group of twenty registers has access to next group of four senders and the last group of twenty registers has access to the last group of four senders.

Each group of four senders such as 1615, 1620, 1625, and 1630 has access to its own group of connect relays such as 1635.

Each group of 1000 directory numbers has its own number group circuit containing an identification and guard circuit, directory number registers, and a translator.

Each group of connect relays such as 1635 accordingly has access to each number group circuit 1640, 1645, etc.

In operation, a marker seizes a register. Assuming the CRA horizontal (which is connected to an SRL horizontal, the first in the upper left hand corner) is the calling horizontal and the register is the seized register, a connector is extended in the seized register to the calling horizontal. The calling party receives dial tone from the register and dials the called number into the register. The register then seizes connect relays 1605, for example, which extend a connection between register 1 and an idle sender (sender 1, for example). Information is transferred by the system to sender 1, and from this information sender 1 extends a connection over a lead in connect relay set 1635 (which lead is not shown) to the correct number group (group 1640, for example). The identification and guard circuit of this number group then operates the correct connect relays in circuit 1635 to extend connections between sender 1 and the number group 1640. Directory information is transferred to the number group which translates this information and returns the translated information as to the terminal location and party designation of the called line to the sender.

Referring to the upper left corner of FIGURE 15, there is shown thereat a split TRL crossbar switch (see section III–D and FIGURE 6) which serves as a trunk register link. On the left side of the TRL switch, ten trunks enter the ten horizontals and emerge on the ten outlets associated with the first five verticals. On the right side of the TRL crossbar switch, ten trunks enter the ten horizontals and emerge on the ten outlets associated with the last five verticals. In the upper right a similar arrangement is provided for the last twenty trunks. In between as indicated by three dots in a line are similar arrangements for twenty trunks.

Below the paths leading from the SRL switch verticals paths extend from a common group of incoming registers of a lesser number than the total number of paths from the TRL switches, the number of registers being determined by traffic considerations.

The manner of operation of the trunk register link and its overall arrangement will be apparent from the foregoing description of the subscriber register link in FIGURE 16.

VIII. TIP AND RING CONNECTIONS

In order to further elucidate tip and ring connections, the tip and ring paths on a call from a local subscriber to another local subscriber are shown schematically in FIGURE 17.

In the upper left of FIGURE 17 is found the calling substation to which tip and ring conductors extend.

When the calling subscriber lifts his receiver a metallic loop is placed across the tip and ring conductors through the subscriber's substation set. This signals the associated line circuit via connections extending from the tip and ring.

The line circuit through the line entrance originating circuits seizes one of two markers associated with the calling 500 group which tests routes and extends the tip and ring connections over SLA, SLB, and CRA crossbar switches to a register, whereupon relay R1 in the CRA operates, holding tip and ring connections open.

The calling party receives dial tone from the register and dials the directory number of the called subscriber into the register. The register seizes a sender which seizes a number group which translates hundreds, tens, units digits of the directory number into terminal equipment locations.

The sender seizes a group selector marker and upon receiving a signal from the marker over the tip and ring sends coded signals via the register over leads SR and ST into the group marker code receiver via certain connect relays.

The group marker then tests routes between a calling CRA and an idle CRB circuit in the called 500 group and closes GSA and GSB tip and ring circuits. The connection to the group marker is then released.

When the circuits are cut through the GSA and GSB switches, a relay in the selected CRB circuit (not shown in FIGURE 17 but shown in FIGURE 59 as relay MB) operates from ground on the S-lead (not shown in FIGURE 17) extended through other GSA and GSB crosspoint contacts (not shown in FIGURE 17). Also the tip and ring are extended over break contacts of relays CS and VO into the code receiver of the CRB, which signals the sender by placing 24 volt negative battery on the tip conductor.

Thereupon the sender transmits signals over the established tip and ring connections into the CRB code receiver.

Thereafter call signal relay CS in the CRB operates to call in a subscriber's line marks and the tip and ring conductors are switched from the code receiver of the CRB over make contacts of relay CS and break contacts of relay VO and connect relays not shown in FIGURE 17 to the code receiver of a subscriber's line marker which has been seized.

The subscriber's line marker signals the sender by placing 24 volt negative battery on the tip conductor and the sender transmits signals over the established tip and ring connections to the code receiver in the marker.

The marker then tests the idle, busy, or lockout condition of the called line and if the line is idle tests for idle paths between the calling CRB and the called horizontal on the called SLA and closes the SLA, SLB, and SLC tip and ring contacts of an idle path, which extends the called tip and ring into the CRB. The subscriber's line marker and sender are dismissed.

Relay VO in the CRB circuit operates over an off-normal make contact of the SLC switch indicating that the call has been set up. Relay CS remains operated or is released according to signals which have been received by the CRB code receiver from the sender.

If relay CS is held operated, the calling tip and ring are routed to battery feed coils and a condenser bridge on the other side of which are called party battery feed coils. These tip and ring circuits are completed by the operation of local call relay LC which is operated in accordance with certain signals which have been received by the CRB from the sender if the call is to a local subscriber.

If relay CS is released, the tip and ring conductors are routed over make contacts of relay VO, independent of battery feed coils and condenser bridge. As this is a call to a local subscriber, relay CS is held operated.

When the CRB is ready to ring it operates ring start relay RS which extends the called tip and ring conductors into the CRB. The CRB also extends the circuit of ring pickup relay RP to the ringing machine which operates RP at the appropriate time to begin ringing at the beginning of a ringing cycle. The CRB rings the called line with a frequency and code as determined by codes which have been received by the CRB code receiver from the sender over the following circuit: battery through ringing generator, make contacts of relay RP, upper winding of slow operate ring trip relay RT, break contacts of ring reverse relay RR, break contacts of ring trip relay RT, make contacts of ring start relay RS, contacts of crossbar switches SLC, SLB, and SLA, called line ringer, contacts of crossbar switches SLA, SLB, and SLC, make contacts of relay RS, break contacts of relay RT, and break contacts of relay RR to ground.

When the called party answers, the ring trip relay operates over the called metallic loop, disconnecting the called tip and ring from the ringing circuit and connecting the called tip and ring circuit to the calling tip and ring circuit. Conversation can then take place.

It should be understood that the terminating SLA and SLB switches can be the same as the originating ones or they can be different ones in the same 500 line group or a different 500 line group. In any case different verticals are involved however.

On reverting calls, only the terminating connection from the CRB to the called line is maintained, battery feed for calling and called parties coming from the CRB.

A more detailed description of the operation of the CRB circuit may be found in section XIII. The foregoing description having been indicated hereat to facilitate an understanding of the overall switching pattern.

IX. SENDING ARRANGEMENTS

In routing calls through the local crossbar exchange to local subscribers, the sender has facilities for sending:

(1) Signals to the code receiver in the group selector marker to enable the said code receiver to set the GSA and GSB crossbar switches to route the calling CRA to an idle CRB in the called line group.

(2) Signals to the code receiver in the selected CRB to adjust the CRB to the nature of the call and to inform the CRB as to the party on the line to be rung.

(3) Signals to the code receiver in the selected SLM marker to inform the marker as to the equipment location of the called line and also whether the called line is in a multiple line group such as a P.B.X group. This enables the marker to first operate horizontal magnets in the proper SLA switch to test for the busy or idle condition of the called line and if idle to set the SLA, SLB, and SLC switches to connect the calling CRB to the called line. In the case of multiple line selection such as P.B.X lines, these signals enable the marker to select an idle line in a group of lines by means other than by operating SLA horizontal magnets and then to set the SLA, SLB, and SLC switches accordingly.

In routing calls through the local exchange and over trunks to called subscribers in other exchanges, the sender has facilities for sending:

(1) Signals to the code receiver in the group selector marker to enable the group selector marker to set the GSA and GSB crossbar switches to route the calling CRA to an idle trunk in a group of trunks leading to the next exchange.

(2) Signals over the seized trunk to route the call to the called subscriber. This involves minimally the repeating of the four digits of the called subscriber number (assuming 2–5 numbering). Additionally it may require the repeating of any or all of the first three digits of the exchange code and/or the transmission of routing digits derived therefrom.

The circuitry for accomplishing such operation is now set forth in more detail.

Referring now to FIGURES 18, 18–A, and 19, there is shown thereat a schematic representation of a register circuit which may represent an originating register or an incoming register. Incoming to the register through SRL or TRL crosspoints are leads RT, RR, ST, SR, and RC.

If these leads come through SRL crosspoints, these leads come from an SLB–CRA unit (see FIGURES 14, 17, 18).

However if these leads come through TRL crosspoints, these leads come from either a "Wire Chief" trunk, a toll operator's trunk, a free service trunk or an inter-toll trunk (see FIGURES 1, 2, and 3).

Also incoming to this register through TRL crosspoints only we find a cable of marking conductors which branch out in the register into blocks designated "delayed ring indication" and "test indication".

If the call is from a "Wire Chief" trunk (see FIGURES 1, 2, and 3), cable marking connections extend from the "Wire Chief" trunk over the TRL crosspoints to the "Test Indication" box which contains equipment and circuitry to indicate to the sender, when seized, that the call is a test call.

If the call is from a toll operator (see FIGURES 1, 2, and 3), cable marking connections extend from the toll operator's trunk over the TRL crosspoints to the "Delayed Ring Indication" box which contains equipment and circuitry to indicate to the sender, when seized, that the call is a delayed ring call.

In all incoming registers (used with trunks) as contrasted with originating registers (used with subscriber originated calls), is equipment and circuitry represented by box "Trunk Indication" which indicates to the sender, when seized, that the call is from a trunk.

It should be noted that the boxes "Trunk Indication," "Delayed Ring Indication," and "Test Indication" and associated marking cables are absent from originating registers used with subscriber originated calls.

When the incoming leads including tip and ring conductors RT and RR have been extended into the register, leads RT and RR connecting to the box designated "pulse receiving and repeating, dial tone, and supervisory equipment," the calling line receives dial tone from this equipment.

Thereupon the calling party dials the 2–5 directory number of the called subscriber and pulses of the digits of this number are received by the pulse receiving relays and repeated to the counting equipment which may comprise a relay counting chain or the equivalent. Each digit is stored in its appropriate digit register 1–7 by cooperative operation between the counting means and sequencing means. If a three digit area code precedes the 205 number, registers 8, 9, and 10 will be used in addition to registers 1–7. In any case the digits will fill up the registers sequentially 1—2—3 etc. as received.

Returning to the case of a 2–5 number received, registers 1 to 7 will contain the stored information as to the value of each digit.

A. *Call to local subscriber*

We shall consider first, a call to a local subscriber.

As previously discussed, a register circuit when it has registered therein all information to be registered, calls in a sender via a guard circuit and connect relays.

Information from registers 1, 2, 3, and 4 of the register circuit is transferred to registers 1, 2, 3, and 4 of the seized sender through contacts of the connect relay circuit.

The translator in the sender circuit analyzes the three digits in sender registers 1, 2, and 3 and determines from this analysis that the call is to a local subscriber.

In the fourth register of the sender is information as to the thousands group of the called party.

The translator in conjunction with register 4 of the sender calls in the correct number group circuit which finds the calling sender and causes proper connect relays between the sender and number group to operate.

Thereupon the information as to the hundreds, tens, and units digits stored in registers 5, 6, and 7 is transferred to hundreds, tens, and units registers in the selected number group circuit. Leads from contact fans in the hundreds, tens, and units registers enter an individualizing circuit from which issue five terminals corresponding to each directory number. A group of five terminals for the first directory number 000 is shown at the left and a group of five terminals for the last directory number 999 is shown at the right. Three dots indicate groups of terminals for the intermediate directory numbers. These five terminals are designated "Line Group," "H," "T," "U," and "P." The designations "H," "T," "U," and "P" mean respectively "hundreds," "tens," "units," and "party."

These five terminals for each line are cross-connected over a cross-connect panel to cooperating terminals extending from registers designated "Line Group," "H," "T," "U," "P," and "PBX."

Let us suppose that the directory number dialed is 000 and is to be translated into equipment location as follows:

Line group—1—cross-connect terminal 1
Hundreds group—4—cross-connect terminal 4
Tens group—6—cross-connect terminal 6
Units group—7—cross-connect terminal 7
Party—1—cross-connect terminal 1

The terminal "Line Group" will be cross-connected to "Line Group" terminal "1"; terminal "H" will be connected to H terminal "4"; terminal "T" will be connected to T terminal "6"; terminal "U" will be connected to U terminal "7"; and terminal "P" will be connected to P terminal "1".

Accordingly, the terminal information registers will have registered therein that the called subscriber is in the "1" or first line group, the hundreds group designated "4" in the indicated line group, the tens group designated "6" of the indicated hundreds group, the line designated "7" in the indicated tens group, and is party 1.

If the called directory number is a multiple line number such as P.B.X number, terminal "P" will be connected to P.B.X terminal "15" instead of of to a party terminal. Accordingly register P.B.X will have information registered therein that the called subscriber is in a P.B.X group.

Information from these registers in the number group circuit is transferred to registers in the sender designated "Line Group," "H & PBX," "T," "U," and "P."

Assume first that terminal designations for the aforesaid called regular subscriber are stored in these registers, that is:

"Line Group" registers—1
"H" register—4
"T" register—6
"U" register—7
"P" register—1

1. SENDING TO CODE RECEIVER IN FIRST STAGE OF GROUP SELECTION

When the sender has registered therein all information necessary, it closes the circuit of relay A (FIGURE 19) through contacts indicated by the broken line in the circuit of relay A. This circuit extends from ground through the contacts just mentioned, break contacts of relay B, winding of relay A to battery.

Sending relay A in operating connects ground over make contacts A5 to the call signal lead PR1 which operates relay PR in the register. The operation of relay PR operates and at its contacts PR2 places direct ground on lead RC and over the SRL crosspoints to the CRA circuit and the lower winding of relay R2, relay 1410 in FIGURE 14) to operate same in the extension of the S-wire ground to the group marker to effect seizure thereof as previously explained.

Sender relay A in operating is effective at its contacts A1 and A3 to disconnect the SR and ST leads from the sender relays 1–5 and at its contacts A4 connects the ST lead to the winding of code start relay B.

Sender relay A also closes make contacts A6 to A10 to extend ground through the coils of register relays 3, 4, and 5 in parallel to battery. Relays 3, 4, and 5 operate; relay 3 placing a holding circuit on relay 4, and relay 4 placing a holding circuit on relay 5 over obvious circuits.

Relay 5, at its make contacts 5*c* extends ground over the coil of sequencing relay I to battery to operate same.

Relay I in operating at make contacts I*a* prepares an operating circuit for relay II which is shunted by the operating ground of relay I, and extends ground through break contacts II*a* of relay II, make contacts I*a* of relay I, through the coil of code start relay B and make contacts of relay A to the ST lead. The sender is now conditioned for sending.

When the code receiver in the group selector marker is ready to receive, it connects 24 volt negative battery to the tip conductor ST, operating relay B, which locks to 24 volt negative battery through its make contacts B1, and at its contacts B2 releases relay A.

Relay A restores and at its contacts A1 and A3 transfers the tip and ring conductors ST and SR back to the control of the contact relays 1–5, and at its contacts A6–A8 opens the original energizing circuits of relays 3, 4, and 5.

At this point the tip conductor ST is routed as follows: break contacts A3 of relay A, break contacts 1*a* of relay 1, break contacts 2*a* of relay 2, make contacts 3*b* of relay 3, break contacts 2*c* of relay 2, conductor 1903, cable 1901, cable designated "GSI & GSII," and branches, going through cable 2001 to the register in the under-designated "Line Group" and through cable designated 2002 to the register in the sender designated as "Trunk Routing." The ring conductor SR extends through break contacts A1 of relay A, break contacts 1*c* of relay 1, break contacts 2*b* of relay 2, make contacts 3*d* of relay 3, break contacts II*e* of relay II, conductor 1904, and cable 1901 to the same destinations as tip conductor ST. The tip and ring conductors however maintain their respective identity in entering registers "Line Group" and "Trunk Routing."

Similarly the tip and ring conductors ST and SR are conducted in various combinations through relay contacts of relays 1–5, and cables designated "GSI & GSII," "CRB," and "SLM," to the registers in the sender designated "Trunk Routing," "Line Group," "H & PBX," "T," "U," and "P" (FIGURE 18).

In going through these contacts and cables and entering these registers, the tip and ring contacts ST and SR maintain their individual identity.

Below these registers is shown a representative block which may serve to illustrate any of the registers in the senders just mentioned. By reference to this representative block it can be seen that upon entering a register, the tip and ring ST and SR individually enter the apex end of fans of relay contacts in the registers, through which in combination any one of four conditions may obtain on tip and ring conductors ST and SR.

While the representative box shown the tip conductor ST and SR entering the apex of a single fan of contacts, it should be understood that these conductors may enter a plurality of fans of contacts.

The four conditions indicated on the tip and ring conductors are as follows: +48 volts, −48 volts, ground or nothing which is called "open" in the schematic representation.

Immediately below the representative box +48 volts and −48 volts, and ground are illustrated as two 48 volt batteries in series with the middle connection grounded, the +48 volt lead issuing from the left end which engages a positive plate, the −48 volt lead issuing from the right end, and the ground lead issuing from the common center tie conductor between batteries which is grounded.

Thus when sending is ready to begin, the relays in the registers in the sender have been operated in the correct combinations as a result of translation in the sender and number group circuit to connect the appropriate signals to the contact fans to appropriately signal on the tip and ring conductors SR and ST as relays 1–5 and I–VIII go through their operations.

As the call being presently described is to a local subscriber, the SR and ST conductors traced through break contacts of relay A, break contacts of relay 1, break contacts of relay 2, make contacts of relay 3, break contacts of relay II, conductors 1903 and 1904 cable 1901, cable designated "GSI & GSII" will get their indications over cable 2001 and contact fans in the register designated "Line Group," where conductors 1903 and 1904 individually emerge into their respective fans of contacts.

Digressing briefly, it should be observed that each group selector crossbar switch GSB has twenty horizontal levels to the various subscriber line groups and trunk groups (each GSA crossbar switch has ten inlets associated with verticals and twenty outlets associated with horizontals; horizontals of GSA's are connected to verticals of GSB's, each GSB crossbar switch has ten inlets associated with verticals and twenty levels (bearing a total of 50 outlets) associated with horizontals; the number of GSA's is determined by the number of inlets; the number of GSB's is determined by traffic considerations).

Accordingly, to designate any one out of twenty possible levels from the group selector, the sender transmits sequentially variations of two decimal signals to the group selector marker code receiver according to the following pattern for example, only two values of the tens digit such as 0 and 1 and ten values of the units digit 0–9 being necessary to select one out of twenty, the other tens digits 2–9 being available for other purposes. That is twenty combinations are normally assigned for full level selection and 80 spare combinations may be used for any purposes desired. These signals may be summarized as follows:

| Signal No. | Tip | Ring | Tens digit | Units digit |
|---|---|---|---|---|
| 0 | ---------- | −48 | 0 | 0 |
| 1 | Grd | −48 | 1 | 1 |
| 2 | −48 | −48 | 2 | 2 |
| 3 | +48 | −48 | 3 | 3 |
| 4 | Grd | ---------- | 4 | 4 |
| 5 | ---------- | +48 | 5 | 5 |
| 6 | Grd | +48 | 6 | 6 |
| 7 | −48 | +48 | 7 | 7 |
| 8 | +48 | +48 | 8 | 8 |
| 9 | +48 | ---------- | 9 | 9 |

Thus for the first level, tens digits 0 is used and units digit 0; for the second level, tens digit 0 and units digit 1, etc. according to the following table:

| Line group "Level" | Tens digit | Units digit |
|---|---|---|
| 1 | 0 | 0 |
| 2 | 0 | 1 |
| 3 | 0 | 2 |
| 4 | 0 | 3 |
| 5 | 0 | 4 |
| 6 | 0 | 5 |
| 7 | 0 | 6 |
| 8 | 0 | 7 |
| 9 | 0 | 8 |
| 10 | 0 | 9 |
| 11 | 1 | 0 |
| 12 | 1 | 1 |
| 13 | 1 | 2 |
| 14 | 1 | 3 |
| 15 | 1 | 4 |
| 16 | 1 | 5 |
| 17 | 1 | 6 |
| 18 | 1 | 7 |
| 19 | 1 | 8 |
| 20 | 1 | 9 |

Returning from the digression, let us recall that it was specified in the given example that the called subscriber is in the line group requiring tens digit 0 followed by units digit 0. With the tip and ring conductors extended from the code receiver of the group selector marker into the sender and over contacts of relays 1–5, I–VIII, and certain cables into the register designated "Line Group" in the sender as just described, 48 volts negative battery will be found on the ring conductor 1904 and nothing on the tip conductor 1903, as a signal to the code receiver in the group marker that the tens digit of the required level is 0.

It is recalled now that sender relay A in restoring interrupted original operating circuits of relays 3, 4, and 5. However these relays in sequence by reason of the inter control circuits provided at their contacts 3*e* and 4*d*.

Specifically as relay 3 releases, the tip and ring conductors from the group marker code receiver will be transferred over break contacts 3*a*, 3*c* of relay 3 to the levers of relay 4 (which is operated by reason of the circuit extending over contacts 3*e*) holding the tip and ring conductors open, and thus ending the tens digit signal and inserting a pause before the units digits signal.

The release of relay 3 removes the holding ground from relay 4, which releases to end the pause and initiate the units digit signal. The ring and tip conductors SR and ST now will be found extended over break contacts A1, A3 of relay A, break contacts 1*a*, 1*c* of relay 1, break contacts 2*a*, 2*b* of relay 2, break contacts 3*a*, 3*c* of relay 3, break contacts 4*a*, 4*b* of relay 4, make contacts 5*a*, 5*b* of relay 5, break contacts II*g*, II*j* of relay II, conductors 1906 and 1905, cable 1901, cable designated "GSI & GSII," cable 2001 into the "Line Group" register in the sender where the ring and tip conductors 1906 and 1905 respectively and individually emerge into their associated relay contact fans.

Units digit 0 is designated as shown by the table above by 48 volt negative battery on the ring conductor 1906 and nothing on the tip conductor 1905. Such signals are now applied over the tip and ring connections to the group marker code receiver to indicate the units digit 0 thereto. This information enables the group selector marker to extend connections through the GSA and GSB crossbar switches.

As relay 4 restores, contact 4*d* interrupts the holding ground to relay 5 which releases and at its contacts 5*a*, 5*b* interrupts tip and ring conductor circuits.

Relay 5 at its make contacts 5*c* removes the shunt on relay II, and relay II thereupon operates in series with relay I over the following circuit: ground, winding of relay II, make contact of relay I, winding of relay I to battery.

2. SENDING TO CODE RECEIVER IN SECOND STAGE OF GROUP SELECTORS (WHEN SUCH IS PROVIDED)

When relay II operates, the SR and ST tip and ring connections are shifted from cable 1901 to cable 1902 assuming for the present that a second stage of group selection with an associated group selector marker including code receiver is to be passed through in completing the call, and that the extension of the S-wire ground through first stage of group selection causes the group selector marker of the second stage to be used. Actually, the block diagram in FIGS. 1, 2, and 3 does not illustrate such arrangement, but the manner of its connection of the operation of a sender when such second group selection is incorporated will be obvious from the following disclosure. Briefly, when such arrangement is provided selection through the first stage of group selection would not route the calling connection immediately into the called line group, but instead would route same into the second stage of group selection.

Also when relay II operates it is effective at its make contacts II*k* to prepare a circuit for relay III, and at its contacts II*l* opens the circuit of relay B. Relay B releases, in turn reestablishing the operating circuit of relay A which reoperates.

Relay A reoperates relays 3, 4, and 5 in the manner previously described, and transfers the SR and ST leads with ST connected to one side of the winding of relay B. Relay 5 then operates relay III over the circuit extending from ground, make contacts 5*c* of relay 5, make contacts II*k* of relay II, break contacts IV*m* of relay IV, and the winding of relay III to battery.

Relay III closes ground over the break contacts IV*k* of relay IV and make contacts III*a* of relay III to the winding of relay B.

When the code receiver of the second group selector marker returns 24 volt negative battery on the ST lead, relay B reoperates and releases relay A, which opens the original operating circuits of relays 3, 4, and 5 which release in the order 3, 4, 5 as previously described.

In the interval between the release of relay A and the release of relay 3, the ring and tip conductors SR and ST will be found extended over make contacts 3*b*, 3*d* of relay 3, make contacts II*b*, II*d* of relay II, break contacts IV*e*, IV*g* of relay IV, conductors 1908 and 1907 respectively, cable 1902, cable designated "GSI & GSII," and cable 2001 to the register "Line Group" where conductors 1908 and 1907 emerge individually into their other discrete fans of relay contacts through which the proper polarity, ground or nothing will be found connected to them to give the code receiver of the second group selector marker the tens digit signal according to the same pattern previously described.

During the interval between the release of relays 3 and 4, a pause ensues as previously described.

During the interval between the release of relays 4 and 5, the ring and tip conductors will be found extended over make contacts 5*a*, 5*b* of relay 5, make contacts II*f*, II*h* of relay II, contacts IV*a*, IV*c*, conductors 1910 and 1909 respectively, conductor 1902, cable designated "GSI & GSII," and cable 2001 to the register designated "Line Group," where conductors 1910 and 1909 emerge, and through their respective discrete relay contact fans have connected thereto the proper polarities, ground or nothing to give the proper signal to the code receiver in the second group marker to indicate the proper units digit. This enables the group marker of the second stage of group selection to extend the connection through its associated crossbar switches similar to GSA and GSB switches.

Relay 5 restores and at its contact 5*c* removes the shunt on relay IV, which then operates in series with relay III.

The operation of relay IV releases relay B which reoperates relay A in the manner previously described. Relay A operates 3, 4, and 5. Relay 5 operates relay V from ground over make contacts 5*c* of relay 5, make contacts II*k* of relay II, make contacts IV*l* of relay IV, break contacts VI*n* of relay VI, and winding of relay V to battery. Relay V operates and connects ground over break contacts VI*k* of relay VI and make contacts V*a* of relay V to the winding of relay B to prepare same for operation.

Figure 19:
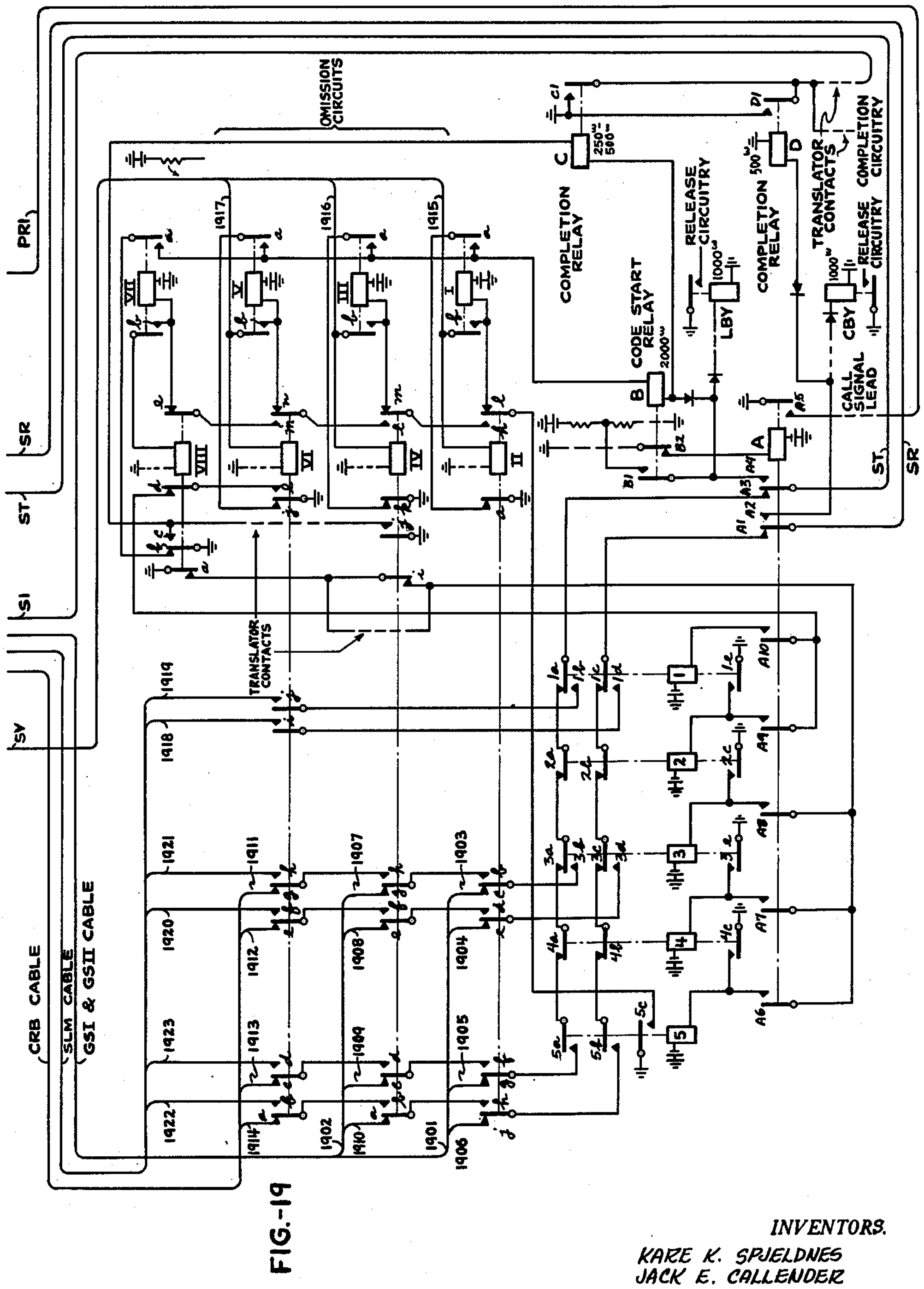

At this point to conform to our illustration not involving a second stage of group selection, it should be observed that upon originally receiving its information from the number group circuit, the line group register in the sender can connect battery through a resistor to the appropriate lead 1916 in cable 2003 to operate relay IV in FIG. 19 before sending starts and the transmission of signals corresponding to the second stage of group selection is thereby omitted. With relay IV preoperated relay II operates, following sending of signals to the first code receiver to extend an operating circuit through make contacts II*k* of relay II and make contacts IV*l* of relay IV preparatory to extension of the tip and ring conductors SR and ST to cable CRB instead of to cable 1902. Relay II also prepares a circuit so that upon the subsequent operation of relay 5, relay V instead of relay III will be operated from ground over make contacts 5*c* of relay 5, make contacts II*k* of relay II, make contacts IV*l* of relay IV, break contacts VI*n* of relay VI, winding of relay V to battery.

Alternatively stated, in the illustration not involving a second stage of group selection, relay II, its associated contacts and cable 1901 could have been omitted.

3. SENDING TO CODE RECEIVER IN CRB

It is assumed, however, for simplicity of description, that the register designated "Line Group" has caused relay IV to be preoperated to eliminate sending to a marker associated with the second stage of group selection. With the operation of relay II after transmission of code signals to the first group selector marker has been completed relay B is released by opening of the break contact II*b* on relay II. The release of relay B causes the re-operation of relay A, in turn causing the reoperation of relays 3, 4 and 5. Relay 5 operates relay V over the circuit extending from battery, over the winding of relay V, break contact VI*n* of relay VI, make contact IV*l* of relay IV, make contact II*k* of relay II, make contact 5*c* of relay 5, to ground. When twenty-four volt negative battery appears on the ST conductor from the code receiver in the CRB circuit, relay B operates in the same manner as before described.

Relay B releases relay A, which releases relays 3, 4, and 5 in order as previously described.

During the interval between the release of relay A and the release of relay 3, the ring and tip conductors will be found extending over break contacts A1, A3 of relay A, break contacts 1*a*, 1*c* of relay 1, break contacts 2*a*, 2*b* of relay 2, make contacts 3*b*, 3*d* of relay 3, make contacts II*b*, II*d* of relay II, make contacts IV*f*, IV*h* of relay IV, break contacts VI*e*, VI*g* of relay VI, conductors 1912 and 1911 respectively, the cable designated "CRB", through cable 2005 into the register in the sender designated "Classification of Call as to Origin: Local, Trunk, Delayed Ring, or Test." In this register the ring and tip conductors 1912 and 1911 emerge individually and enter the apex end of discrete relay contact fans through which the proper condition as to polarity, ground, or nothing is connected to the respective leads.

Digressing, the sender has facilities for sending the following signals to the CRB.

| Signal No. | Tip | Ring | Marking signal | Ringing or PBX signal |
|---|---|---|---|---|
| 0 | | −48 | 0=Trunk | 0=party 2. |
| 1 | Grd | −48 | | 1=party 7. |
| 2 | −48 | −48 | | 2=party 1. |
| 3 | +48 | −48 | | 3=party 6. |
| 4 | Grd | | 4=Delayed Ring | |
| 5 | | +48 | | 5=party 4. |
| 6 | Grd | +48 | | 6=party 9. |
| 7 | −48 | +48 | | 7=party 3. |
| 8 | +48 | −48 | | 8=party 8. |
| 9 | +48 | | | 9=party 10. |
| 10 | −48 | | 10=Normal Call | 10=party 5. |
| 11 | | Grd | 11=Wire Chief Test | 11=party 11. |
| 12 | −48 | Grd | | 12=party 12. |
| 13 | +48 | Grd | | 13=party 13. |
| 14 | Grd | Grd | | 14=party 14. |

Thus with the tip and ring conductors SR and ST routed into the register in the sender designated "Classification of Call as to Origin: Local, Trunk, Delayed Ring, or Test," the indication for a normal call or call from a local subscriber, i.e. 48 volts negative potential is connected to the tip conductor ST.

Subsequently relay 3 releases, ending the signal, and releases relay 4 as previously described.

During the interval between the release of relay 4, and the release of relay 5, the ring and tip conductors are extended over break contacts 4*a*, 4*b* of relay 4, make contacts 5*a*, 5*b* of relay 5, make contacts II*f*, II*h* of relay II, make contacts IV*b*, IV*d* of relay IV, break contacts VI*a*, VI*a* of relay VI conductors 1914 and 1913 respectively, cable designated "CRB," branching in parallel from the conductors which entered the register designated "Classification, Etc.," and passing through cable 2006, into the register "P", wherein the tip and ring conductors emerge individually from the cable "CRB" into the apex end of fans of relay contacts by means of which they are marked accordingly to the previous table to indicate to the CRB circuit code receiver the appropriate party ringing condition.

According to the assumed example the party code signal from the sender to the CRB is to be signal "2" which indicates party 1 on the line. Thus, at this time, 48 volts negative potential will be found connected to the ring and tip conductors as the signal to the CRB circuit code receiver. It is apparent therefrom that signal 0, i.e. −48 volts on the ring and nothing on the tip would indicate party 2; signal 1, i.e. ground on the tip and −48 volts on the ring would indicate party 7, etc.

As relay 5 releases, the tip and ring conductors SR and ST are disconnected at the open contacts 5*a*, 5*b* of relay 5.

Relay 5 at its contacts 5*c* also removes the shunt from relay VI and this relay operates in series with relay V over the following circuit: ground, winding of relay VI, make contact V*b* of relay V to battery.

Relay VI operates and at its contacts VI*k* removes ground from relay B, which releases and reoperates relay A.

Relay VI operates and at contacts VI*l* extends operating ground toward relays 1 and 2. Accordingly, when relay A operates, ground through make contacts VI*l* of relay VI, make contacts A9, A10 of relay A in parallel and the windings of relays 1 and 2 to battery in parallel operates these relays. Relays 3, 4, and 5 operate as usual when relay A operates.

Relay 5 operates and at its contacts 5*c* extends ground over the make contacts II*k*, IV*l* and VI*m* of relays II, IV, and VI, break contacts VIII*e* of relay VIII through the winding of relay VII to battery which operates to prepare to lock in series with relay VIII through its make contacts VII*b*, and connects ground through its make contacts VII*a* to relay B in preparation for the operation of relay B.

The CRB circuit upon the completion of receipt of the aforementioned signals from the sender closes a loop to engage a "Line Entrance Terminating" circuit (LET)

to obtain connection to the code receiver section of a subscriber's line group marker circuit in a similar manner to which, on an originating call, the calling line signals a "Line Entrance Originating" circuit that the calling line requires connection to a marker (see FIGS. 1, 2 and 3).

Circuit LET causes the random selection of the code receiver of one of the two subscriber's line group markers (the other part of the marker may even be engaged simultaneously with an originating call) and identifies the calling CRB (i.e. SLC vertical) to the marker. The selected marker thereupon closes connect relay contacts which extend the tip and ring conductors of the calling CRB into the subscriber's line group marker code receiver (see FIGS. 1, 2, and 3).

Thereupon, the selected marker code receiver places 24 volt negative battery on the tip conductor operating relay B in the sender.

Relay B releases relay A. It should be noted that relay 1 has placed a holding circuit through its contacts on relay 2.

Relay 2 has placed a holding circuit through its contacts on relay 3; etc.

Accordingly, relay A releases relay 1, which releases relay 2, which releases relay 3, which releases relay 4, which releases relay 5, which removes the shunt from relay VIII. Relay VIII locks in series with relay VII from ground through the winding of relay VIII, make contacts VII*b* of relay VII, and winding of relay VII to battery.

In the interval between the release of relay A and the release of relay 1, the tip and ring conductors SR and ST will be found extended through break contacts A1, A3 of relay A, make contacts 1*b*, 1*d* of relay 1, make contacts VI*i*, VI*j* of relay VI, conductors 1918 and 1919, cable designated "SLM," and cable 2007, with the conductors 1918 and 1919 individually entering the register designated "H." Each conductor tip and ring, enters the apex of a discrete relay contact fan by means of which the correct signaling potential, ground, or nothing is connected to the respective lead.

At this point we shall digress to consider the various signals which the sender is prepared to send to the subscribers line marker.

As 500 equipment locations are necessary to reach 500 called directory numbers, it is convenient for the sender to send the marker three decimal digits, hundreds, tens, and units (translated from the received directory number by the number group circuit).

Only five values of the hundreds digit are necessary—0, 1, 2, 3, and 4. Ten values of the tens digit are necessary—0–9. Also, ten values of the units digits are necessary—0–9.

The last five values of the hundreds, 5, 6, 7, 8, and 9 are reserved to indicate to the marker that the received code is for a multiple line group such as a P.B.X line group.

In interpreting the hundreds, tens, and units digits received on calls to multiple line groups such as P.B.X marker derives therefrom three pieces of information: (1) the particular SLA of twenty containing the called line; (2) the particular horizontal combination coil HA, HB or HC which must be actuated to reach the called line; and (3) the particular horizontal line selecting coil H1–H9 which must be actuated to reach the called line. The subscriber line marker in testing for idle paths by the "by-path" principle of course, determines which vertical coil shall be operated.

In interpreting the hundreds, tens, and units digits received on calls to multiple line groups such as P.B.X groups, the marker determines therefrom the one of the twenty possible multiple line groups for which the call is destined, which line groups are distributed among the SLA's. Accordingly the fact that the hundreds digit is 5–9 causes the marker to switch the SLA determination to multiple line group determination (P.B.X for example) and disregards HA, HB, and HC determination and horizontal 1–9 determination, until selection of an idle line in the multiple line group (P.B.X) has been made by the marker.

The signals from the sender to the subscriber's line marker therefore are summarized in the following table:

| Signal No. | Tip | Ring | Hundreds digit | Tens digit | Units digits |
|---|---|---|---|---|---|
| 0 | | −48 | [1]0 | 0 | 0 |
| 1 | Grd | −48 | [1]1 | 1 | 1 |
| 2 | −48 | −48 | [1]2 | 2 | 2 |
| 3 | +48 | −48 | [1]3 | 3 | 3 |
| 4 | Grd | | [1]4 | 4 | 4 |
| 5 | | +48 | [2]5 | 5 | 5 |
| 6 | Grd | +48 | [2]6 | 6 | 6 |
| 7 | −48 | +48 | [2]7 | 7 | 7 |
| 8 | +48 | +48 | [2]8 | 8 | 8 |
| 9 | +48 | | [2]9 | 9 | 9 |

[1] Individual line selection.
[2] Multiple line selection (P.B.X).

Returning from the digression, during the interval, between the release of relay A and the release of relay 1 as the hundreds destination designation has assumed to be "4," the ring conductor SR will be found connected to nothing, i.e. "open" in register "H" and the tip conductor ST will be found connected to ground.

When relay 1 releases, a pause is introduced with the tip and ring conductors disconnected at the open contacts of relay 2 until relay 2 releases.

During the interval between the release of relay 2 and the release of relay 3, the ring and tip conductors SR and ST will be found connected through break contacts A1, A3 of relay A, break contacts 1*a*, 1*c* of relay 1, break contacts 2*a*, 2*b* of relay 2, make contacts 3*b*, 3*d* of relay 3, make contacts II*b*, II*d* of relay II, make contacts IV*f*, IV*h* of relay IV, make contacts VI*f*, VI*h* of relay VI, conductors 1920 and 1921 respectively, cable designated "SLM" and cable 2008 containing the conductors 1920 and 1921 which individually enter the apex of relay contact fans whereby in accordance with the assumed tens digit 6, positive 48 volts will be found connected to the ring conductor and ground to the tip conductor as the signal to the SLM marker that the tens digit is 6.

When relay 3 releases, a pause is introduced with the ring and tip conductors being disconnected at the open contacts of operated relay 4.

During the interval between the release of relay 4 and the release of relay 5, the ring and tip conductors SR and ST will be found extended over break contacts A1, A3 of relay A, break contacts 1*a*, 1*c* of relay 1, break contacts 2*a*, 2*b* of relay 2, break contacts 3*a*, 3*c* of relay 3, break contacts 4*a*, 4*b* of relay 4, make contacts 5*a*, 5*b* of relay 5, make contacts II, II*h* of relay II, make contacts IV*b*, IV*d* of relay IV, make contacts VI*b* of relay VI, conductors 1922 and 1923 respectively, cable designated "SLM," cable 2009 containing conductors 1922 and 1923, into register designated "U" in which the conductors 1922 and 1923 individually enter the apex end of relay contact fans whereby according to the assumed units digit 7, positive 48 volt battery will be found connected to the ring conductor and negative 48 volt battery will be found connected to the tip conductor as the signal to the SLM marker that the units digit is 7.

When relay 5 releases, the ring and tip conductors SR and ST will be found disconnected at open contacts 5*a*, 5*b* of relay 5.

Relay 5 releases and at contacts 5*c* removes the shunt from relay VIII, which operates in series with relay VII.

Relay VIII releases relay B at its break contacts VIII*b*; at its break contacts VIII*d* holds open the ground circuit for energizing relays 3, 4, and 5. When the subscriber's line group marker has completed its operation and the SLA, SLB, and SLC switches on the terminating end of the call have been properly operated, a circuit through make off-normal contacts of the SLC switch vertical coil signals, the CRB circuit which returns −48 volt battery on the SR lead to operate relay D in the sender circuit. The operation of relay D, through certain contacts in the translator, causes first the release of the two relays in the CRA, and subsequently the release of the originating register, the sender, and the SRL switch.

Digressing, it should be noted at this point that in relation to a call to a trunk, the operation of relay VIII at its make contacts VIII*c* connects ground to the winding of relay C in preparation for receiving a completion signal from a trunk which may be in a dial stop condition. When the group selector marker has completed its operation and the GSA and GSB switches have been properly operated to extend the tip and ring conductors to a trunk in the desired group, the trunk circuit will return −48 volts on the ring conductor SR, if it is in a dial start condition, which through make contacts A2 of A, rectifier in the proper direction, and the winding of relay D to ground, operates relay D. If the trunk is in a dial stop condition, it will return −48 volts on the tip conductor ST which operates relay C through make contacts A4 of relay A, rectifier in the proper direction, winding of relay C, and make contacts VIII*c* of relay VIII to ground. The operation of either relay C or D places ground, through translator contacts indicated, to completion circuitry in the case of a trunk not requiring outpulsing, and over other contacts of the translator which are indicated, conductor S1, winding of relay S to ground. Relay S operates to connect the dial pulse sender in the case of a trunk requiring outpulsing.

Returning from the digression, relay B releases, and in turn reoperates relay A. With relay VIII operated, none of the relays 1–5 reoperate. It should be noted that the various energizations of the call signal lead by relay A after the first, pulse relay PR pulse is direct ground on the RC lead to the CRA, but this has no effect inasmuch as relay R2 (relay 1410 in FIG. 14) in the CRA is locked over its other winding through contacts of R1 to ground.

Relay A connects the ring conductor SR to relays D and CBY (FIG. 19) and the tip conductor ST to relay B (which has ground disconnected from the other side thereof by relay VIII) and to relay C (which has ground connected to the other side thereof by relay VIII), and through a rectifier to relay LBY.

The −48 volt battery which was placed on conductor SR through the rectifier and winding of relay D to ground operates relay D.

Ground through make contacts D1 of relay D through translator contacts indicated actuates completion circuitry indicated, which signals the register to open its contacts 1495*k* by supplying ground to operate relay 1495*j* (see FIG. 14), causing the release of relays R1 (1405 in FIG. 14) and R2 (C1410 in FIG. 14) in the CRA circuit in that order. Relays 1405 and 1410 in turn switch the ring and tip conductors through the GSA and GSB switches into the CRB circuit; and also open holding grounds to release the components of the sender, register, and SRL switch in the proper order. By reference to FIG. 14 it can be seen that the holding ground of the vertical magnet VI of SRL extends into the register, so that the register releases SRL by opening this ground.

Digressing, if the marker had found the called line busy, it would have signaled the sender by placing positive 48 volt battery on the tip conductor to operate relay LBY in the sender which closes ground through its make contacts to certain release circuitry which causes the entire calling connections to collapse, placing the calling line on lockout. The calling line then receives busy tone from the lockout relay in the line circuit.

If the marker had found it impossible to find an idle route from the called idle line to the calling CRB circuit, it would have signaled the sender by placing positive 48 volts on the ring conductor to operate relay CBY in the sender which closes ground to certain release circuitry which causes the entire calling connections to collapse, placing the calling line on lockout. The calling line then receives the busy tone.

When connections collapse, all operated relays in the sender and register release.

B. *Call to multiple line group such as PBX group*

When the directory number dialed indicates a multiple line group such as a P.B.X. group, the five terminals associated with this directory number issuing from the individualizing circuit are connected in a similar manner to the cross-connections for a call to a regular subscriber with the exception that the terminal "P" from the individualzing circuit is cross-connected to terminal 15 associated with the terminal information register PBX instead of to one of the terminals 1–14 associated with the terminal information register "P."

Information in the terminal information registers "Line Group," "H," "T," and "U" are transferred to the corresponding registers in the sender. Information from the terminal register PBX is transferred to the register "P" in the sender, which actuates relay means in register "H & PBX" over conductor 2010 to alter its contact fans so that the codes for digits 5–9 are sent instead of the corresponding digit 0–4. Additionally in response to receipt of the P.B.X. indication, register P in the sender adjusts its contact fans so that the code for a particular party ring is sent to the CRB at the regular time of signaling to the CRB. For example, on all P.B.X. calls the sender might send the signal for party 1 to the CRB, i.e. negative 48 volts potential on the tip and negative 48 volts potential on the ring.

As previously described in section IX–A–4 this enables the marker to select the proper multiple line group.

C. *Call from trunk*

On a call from a trunk, the register used is one of a group of incoming registers reached through TRL crosspoints (FIG. 18) instead of SRL crosspoints. The register seizes a sender, after all dialed digits have been received.

The incoming register by means of signaling equipment indicated in the box "Trunk Ind." signals the register in the sender designated "Classification of Calls as to Origin: Local, Trunk, Delayed Ring, or Test" that the call is of trunk origin. If the call is from a toll operator an indication over TRL crosspoints from the toll operator's trunk to the register "Delayed Ring Indication," signals this register accordingly, which in turn so signals the register in the sender designated "Classification, Etc." If the call is from a test trunk, an indication over TRL crosspoints from the test trunk to the register "Test Ind." signals the register accordingly, which in turn so signals the register in the sender designated, "Classification, Etc."

Assuming the call to be from the trunk to a local subscriber, the operation of the sender and number group circuit is as previously described with two main exceptions.

(1) The first signals sent to the CRB over the ring and tip conductors SR and ST are determined by markings on the ring and tip different than those "normal" calls such as from local subscribers. Accordingly the ring and tip conductors through makes of relay A, breaks of relay 1, breaks of relay 2, makes of relay 3, makes of relay II, makes of relay IV, breaks of relay VI, conductors 1912 and 1911 respectively, cable designated "CRB," cable 2005 to register designated "Classification, Etc." enter discrete contact fans, through which the appropriate condition will be found on the ring and tip. Thus to indicate a call from a toll operator requiring delayed ring the ring conductor will be found to open and the tip conductor connected to ground; to indicate a call from a test trunk indicating a test call, ground will be found connected to the ring and the tip open; to indicate a call from a trunk other than from a toll operator or test trunk, 48 volt negative battery will be found on the ring and the tip will be found open.

(2) On a call from a toll trunk the operation of sender relay LBY causes the release circuitry to mark the calling trunk before the release of the exchange equipment so that the calling trunk returns 60 i.p.m. busy tone and 60 i.p.m. busy flash to the operator; and the operation of sender relay CBY causes the release circuitry to mark the calling trunk before the release of the exchange equipment so that the calling trunk returns 120 i.p.m. busy flash to the operator.

D. *Call to trunk*

When the information in the first four digit registers 1, 2, 3, and 4 in the register circuit has been transferred to the digit registers 1, 2, 3, and 4 in the sender, the translator circuit in the sender determines from the information in the first three registers 1, 2, and 3 that the call is to a trunk group. In this case the sender does not call in a number group circuit.

The translator circuit indicates to the trunk routing circuit the level from 1 to 20 off the GSB horizontals circuit on which the desired trunk group is to be found.

Also, as a result of the translation, the translator circuit operates a switching circuit which extends connections from register 4 in the sender and registers 5, 6, and 7 in the register circuit into the dial pulse sender circuit indicating to the dial pulse sender circuit what the last four directory digits of the called number are.

We shall consider first a trunk call extending over two stages of group selection. When the sender is ready to send, it closes the circuit of relay A (FIG. 18) which calls in the group marker of the first group selection stage at its make contacts. Relay A also operates relays 3, 4, and 5 from ground through break contacts of relay VIII, break contacts of relay IV (which are paralleled by a shunt in the translator circuit on calls to local subscribers), in parallel through make contacts of relay A and windings of relays 3, 4, and 5 to ground. Relay A also transfers the ring and tip conductors SR and ST as indicated before.

Relay I is operated over a circuit extending from ground over the make contacts of relay 5, and break contacts III of relay II and relay I to battery.

When 24 volt negative battery is received from the code receiver in the first selection stage group marker, relay B operates from 24 volt negative battery on lead ST, make contacts A4 of relay A, rectifier, winding of relay B, make contacts I*a* of relay I, and break contacts II*a* of relay II to ground.

Relays A, 3, 4, and 5 release in turn, operating relay II which releases relay B as described heretofore. During this releasing operation, the first group codes are sent to the group selector marker.

Relay A reoperates, in turn operating relays 3, 4, and 5, and III, again closing ground to relay B in preparation for its reoperation.

As a result of the extension of leads through the GSA and GSB crosspoints by the group selector marker, the extension of the S-wire ground calls in the marker of the second stage of group selection.

When 24 volt negative battery appears on lead ST from the code receiver in this marker, relay B reoperates.

Relay B releases relay A, and in turn relays 3, 4, and 5. During this release the second group selection codes are sent. The release of relay 5 removes the shunt from relay IV which operates.

Relay IV releases relay B which reoperates relay A but relays 3, 4, and 5 do not reoperate inasmuch as the ground supply is opened at break contacts of relay IV. Contacts in the translator shunt these contacts on calls to local subscribers. Relay A also transfers the tip and ring contacts SR and ST.

The operation of relay IV closes ground through contacts which have been closed by the translator circuit in preparation for a trunk call, to the winding of relay C. Ground is permanently connected to the winding of relay D.

When the group selector marker has finished its operation and a trunk in the desired group of trunks is connected to the sender tip and ring conductors, ST and SR, the trunk circuit will return —48 volt battery on the ring lead SR, operating relay D over the following path: —48 volt battery on lead SR, make contacts A2 of relay A, rectifier in the proper direction, and the winding of relay D to ground. If the trunk circuit had been in a dial stop condition when first seized, it would have returned —48 volt battery on the tip lead ST instead of ring lead SR. In this case, relay C would have operated over the following path: —48 volt battery on lead ST, make contacts A2 of relay A, rectifier in the proper direction, winding of relay C, contacts closed in the translator circuit, make contacts of relay IV to ground. In either case, ground through the make contacts of relay C or D and through contacts closed in the translator circuit will operate relay S in the sender.

Relay S transfers the ring and tip connections of the crosspoints from the code sender to the dial pulse sender. After a short pause to allow the trunk circuits to become conditioned for the receipt of dial pulses, the dial pulse sender begins sending over the tip and ring leads ST and SR to the trunk. If, however, the trunk circuit had been in dial stop condition when seized, the dial pulse sender will withhold pulsing until the receipt of a dial start signal.

When all out-pulsing is completed, the dial pulse sender causes the CRA to cut through and the sender, register, and TRL circuit to release, in the proper order.

Considering next a call to a trunk extending over a single stage of group selection, resistance battery will be extended from the trunk routing circuit and conductor 1915 to pre-operate relay II.

When the sender is ready to start sending, it operates relay A which operates relays 3, 4, and 5 from ground through break contacts VIII*a* of relay VIII, break contacts IV*i* of relay IV and make contacts A6–A8 of relay A. Relay 5 closes ground through its make contacts 5*c*, make contacts II*k* of relay II, break contacts IV*m* of relay IV, to the winding of relay III to battery.

When 24 volt negative battery appears on lead ST from the code receiver in the group selector marker for the first stage of group selection, relay B operates, in turn releasing relays A, 3, 4, and 5, during which release, codes are sent to the said marker.

Thus during the interval between the release of relay A and the release of relay 3, the ring and tip conductors will be extended over make contacts of relay A, break contacts of relay 1, break contacts of relay 2, make contacts of relay 3, make contacts of relay II, break contacts of relay IV, conductors 1908 and 1907 respectively, cable 1902, cable designated "GSI & GSII" and cable 2002 to the trunk routing register in which the leads 1908 and 1907 individually emerge into the apex of discrete relay contact fans through which the proper polarity, ground, or nothing is connected to the respective leads to apprise the group selector marker associated with the first stage of group selection as to the value of the tens digit used for group selection. During the interval between the release of relays 4 and 5, the ring and tip conductors SR and ST are extended over break contacts A1, A3 of relay A, break contacts 1*a*, 1*c*; 2*a*, 2*b*; 3*a*, 3*c*; 4*a*, 4*b*; of relays 1, 2, 3 and 4, make contacts 5*a*, 5*b* of relay 5, make contacts II*h*, II*f* of relay II, break contacts 2*a*, 2*c* of relay IV, conductors 1910 and 1909, cable 1902, cable designated "GSI & GSII," cable 2002, to the trunk routing register where conductors 1910 and 1909 emerge individually into the apex of discrete relay contact fans where they are marked according to the proper second signal (i.e. units digit) to be given to the code receiver of the group marker associated with the first selection stage to complete the indication to said marker as to the GSB level containing the calling trunk group.

It should be appreciated that the translator is cognizant of the fact that these trunks are reached over only one stage of group selection, and accordingly conditions the trunk routing equipment to place the correct conditions on the ring and tip conductors to so signal the first selection stage marker over cable 1902 instead of 1901.

When relay 5 releases, the shunt is removed by contacts 5*c* from relay IV which relay then operates in series with relay III.

Relay IV holds the circuits of relays 3, 4, and 5 open at its break contacts IV*k*, and releases relay B, and at its make contacts IV*j* through translator contacts indicated extends ground to the coil of relay C in preparation for the operation thereat.

The release of relay B operates relay A which transfers the ring and tip conductors SR and ST.

When the negative polarity signal appears on lead SR, relay D operates from this potential encountered in a trunk in the dial start condition.

If the negative polarity signal appears on lead ST this potential over make contacts of relay A, rectifier, winding of relay C, and make contacts of relay IV to ground, operates relay C.

Relay C or D operates sender relay S through contacts prepared in the translator circuit for trunk calls.

The further operation of the equipment is the same as that previously described.

X. CODE RECEIVER FOR GROUP MARKER AND SUBSCRIBERS LINE MARKER

The code receiver proper in the group selector markers and subscribers line markers are quite similar. Accordingly FIG. 20 shows the rudiments of the code receiving system and in general applies to both. Certain differences will become apparent as FIG. 20 is described.

The code receiver relays 2000, 2001, and 2002 (called 1, 2, and 3 for simplicity) are connected to be operated over the tip conductor; whereas code receiver relays 2003, and 2004 are connected to be operated over the ring conductor (called 4 and 6 for simplicity).

Relay 1 operates from 48 volts positive potential on the tip conductor T, rectifier 1*e* properly poled, winding of relay 1 to ground.

Relay 2 operates from ground on the tip conductor T, rectifier 2*e*, winding of relay 2 to negative 24 volt potential between the resistors of the following voltage divider when contacts 2020*a* are closed as will be described: battery, resistor 2028, contacts 2020*a*, resistor 2029′, ground. The resistors are chosen to give 24 volts negative potential and allow the proper value of current.

Relay 3 operates from 48 volts negative potential on the tip conductor T, rectifier 3*e*, winding of relay 3, to 24 volts negative potential at the voltage divider.

Relay 4 operates from 48 volts negative potential on the ring conductor, rectifier 4*e*, winding of relay 4 to ground.

Relay 6 operates from 48 volts positive potential on the ring conductor, rectifier 6*e*, winding of relay 6 to ground.

The first actuation of relays 1–6 by the first code received results in their registration being stored in register 1.

The second actuation of relays 1–6 by the second code received results in their registration being stored in register 2.

The third actuation of relays 1–6 by the third code received results in their registration being stored in register 3.

Relay 2020 initiates the operation and relays 2022–2024 advance the operation sequentially.

A fan of contacts 2025 associated with the relays of register 1 and indicated schematically provides connection between a single lead 2025*a* and any one of fifteen output leads *b–p* in cable 2025*q*.

Fans 2026 and 2027 are similarly related to registers 2 and 3 respectively.

It should be understood that while only one fan of contacts is shown associated with each register 1, 2, and 3, a plurality of fans may be assumed.

When the code receiver of FIG. 20 has been seized and the ring and tip connections have been established to the code receiver of the associated marker the associated marker closes contacts to operate relay 2020 which closes its contacts 2020*a* to energize the aforedescribed voltage divider to establish a potential of twenty-four volts negative battery at point 2028. This potential through the coil of relay 2 and rectifier 2*e* on the tip conductor constitutes the start signal to the sender.

If the code receiver of FIG. 20 is the code receiver in a group selector marker, it receives two consecutive signals and registers 1 and 2 are activated. However if the code receiver of FIG. 21 is the code receiver in a subscriber's line marker, it receives three consecutive signals and registers 1, 2, and 3 are activated.

The signals transmitted by the sender and received by the code receiver in a group selector marker were given earlier and will not be repeated at this point.

The signals transmitted by the sender and received by the CRB circuit will be considered hereinafter in conjunction with a more detailed description of the CRB circuit.

Similarly the signals transmitted by the sender and received by the code receiver in a subscribers line marker were set forth earlier and will not be repeated at this point.

Let us assume the illustration assumed previously, i.e. that the called party is defined termination-wise as follows with only one stage of group selection.

Line group—1
Hundreds group—4
Tens group—6
Units group—7
Party ring—1

As indicated heretofore the sender, in order to apprise the code receiver in the group selector marker that the call is to the first line group which could be level 1 off the GSB switches, sequentially transmits two signals which represent the two digits "0" and "0."

This involves sending a first signal to represent digit "0" comprising negative 48 volts on the ring conductor and nothing on the tip conductor; and a second signal to represent digit "0" comprising negative 48 volts on the ring conductor and nothing on the tip conductor.

We shall assume that relay 2020 has operated, placing 24 volts negative potential through the winding of relay 2 and rectifier 2*e* on the tip conductor, constituting the start signal to the sender.

When the first signal, i.e. 48 volts negative on the ring and nothing on the tip is received by the code receiver, relay 4 (2003) operates. Relay 2009 operates over a circuit extending from ground over make contacts 2020*b* of operated relay 2020, break contacts 2022*b*, conductor 2050, cable 2030, conductor 2050, make contacts 2003*a* of relay 4, conductor 2039, cable 2062, and conductor 2039, lower winding of relay 2009 of register 1 to battery. Relay 2009 locks over the following circuit: battery, upper winding of relay 2009, contacts 2009*a*, conductor 2053, contacts 2029*b* to ground. The contact fan 2025 (or fans) is thereby placed in a certain configuration.

When relay 4 releases due to the sender removing negative 48 volt potential from the ring conductor R, relay 2022 operates over a circuit extending from ground over contacts 2020*b*, conductor 2029, cable 2030, conductor 2029, break contacts *d* of relays 1–6, conductor 2063 to which levers associated with *b* contacts of each relay 2005–2019 are connected, contacts 2009*b*, conductor 2056, cable 2057, conductor 2056, break contacts 2022*c*, and the upper winding of relay 2022 to battery. Relay 2022 operates and locks over a circuit extending from battery over the upper winding of relay 2022 over its make-before-break contacts *c*—*d*, lower winding of relay 2022, conductor 2053 and contacts 2020*b* to ground. Relay 2022 at its break contacts 2022*b*, disconnects ground from conductor 2050 and connects ground through contacts 2020*b*, 2022*a*, and 2023*b* to conductor 2051 in preparation for the next signal received.

When the sender transmits the second digit "0" i.e. negative 48 volts on the ring conductor for the group selector code marker, relay 4 reoperates and at its contacts 2003*b* completes an operating circuit for relay 2014, the circuit extending from ground over conductor 2051 as traced above, cable 2030, conductor 2051, contacts 2003*b* of relay 4, conductor 2044, cable 2061, conductor 2044, lower winding of relay 2014 to battery.

Relay 2014 operates and locks to battery through its upper winding, contacts 2014*a*, conductor 2053 to which all levers *a* of relays 2005 to 2019 are connected, and contacts 2020*b*, to ground.

When relay 4 subsequently releases, a circuit is completed for relay 2023 which extends from ground over contacts 2020*b*, conductor 2029, cable 2030, conductor 2029, break contacts *d* of each relay 1–6, conductor 2063 to which all levers *b* of registers 1, 2, and 3 are connected, contacts 2014*b*, conductor 2055, cable 2059, cable 2057, conductor 2055, contacts 2023*c*, upper winding of relay 2023 to battery.

Relay 2023 operates and locks over the following circuit: battery, upper winding of relay 2023, make-before-break contacts *c*—*d* of relay 2023, lower winding of relay 2023, conductor 2053, contacts 2020*b*, to ground.

Relay 2023 at its contacts 2023*b* disconnects ground from conductor 2051 and at contacts 2023*a* connects ground to conductor 2052.

The operation of register 2 results in the adjustment of its contact fan 2026 (or fans) accordingly.

As two information code signals only are received by the code receiver of the group marker we shall not proceed with further discussion at this point relative to the group selector marker but shall proceed to describe the code receiver of FIG. 20 in relation to the subscriber line marker which receives three information code signals.

The first information code signal received in the SLM marker is the hundreds signal, the next the tens signal, and the last the units signal.

We shall assume as stated before, that the hundreds signal has the value 4, that the tens digit has the value 6, and that the units digit has the value 7.

Assuming that the code receiver, FIG. 20, is associated with the subscriber's line group marker, when the services of this code receiver are needed, circuitry in the subscriber's line group marger causes tip and ring connections from the sender to be extended to the code receiver, and additionally causes the operation of relay 2020 in the code receiver to prepare the code receiver for the reception of codes from the sender.

Relay 2020 connects ground through contacts 2020*b* to conductor 2029 and closes contacts 2020*a* which places 24 volts negative potential on the winding of relay 2 which constitutes the start signal to the sender.

The sender places ground on the tip and nothing on the ring as the signal for hundreds digit 4. (See earlier description for signals transmitted by the sender and received by the SLM code receiver.)

Relay 2 (2001) operates from ground on the tip through rectifier 2*e*, winding of relay 2, to 24 volts negative potential at the voltage divider.

Relay 2006 is operated by ground through contacts 2020*b*, conductor 2050, cable 2030, conductor 2050, contacts 2001*a*, conductor 2036, cable 2062, conductor 2036, lower winding of relay 2006, to battery, relay 2006 operates and locks from battery, over its upper winding, contacts 2006*a*, conductor 2053, and contacts 2020*b* to ground.

When relay 2 releases, relay 2022 is operated by ground extending over contacts 2020*b*, conductor 2029, cable 2030, conductor 2029, break contacts *d* of each relay 1–6, contacts 2006*b*, conductor 2056, cable 2057, conductor 2056, contacts 2022*c*, and the upper winding of relay 2022 to battery. Relay 2022 operates and locks as before described.

The sender then places 48 volts positive potential on the ring conductor and ground on the tip conductor to constitute the signal for tens digit 6 to the code receiver.

Relay 2 operates over the circuit before traced. Relay 6 operates from positive 48 volts on the ring conductor, rectifier 6*e*, winding of relay 6 to ground.

Relay 2013 is operated over the circuit which extends from ground on conductor 2051 through contacts 2004*b*, conductor 2051, cable 2030, conductor 2051, contacts 2001*b*, conductor 2041, cable 2061, conductor 2041, the lower winding of relay 2011, to battery. Relay 2011 operates and locks to battery through its upper winding contacts 2011*a*, conductor 2053, contacts 2020*b*, and ground.

Relay 2013 operates over the circuit which extends from ground on conductor 2051 through contacts 2004*b*, conductor 2043, cable 2061, conductor 2043, lower winding of relay 2013 to battery. Relay 2013 operates and locks from battery over its upper winding, contacts 2013*a*, conductor 2053, and contacts 2020*b* to ground.

When relays 2 and 6 release, relay 2023 operates over the circuit extending from ground through contacts 2020*b*, conductor 2029, cable 2030, conductor 2029, break contacts of relays 1–6, make contacts 2011*b* and 2013*b*, conductor 2055, cable 2059, cable 2057, conductor 2055 and contacts 2023*c* and relay 2023 which operates and locks as before described, transferring ground from conductor 2051 to conductor 2052.

When the sender connects positive 48 volt battery to the ring conductor and negative 48 volt battery to the tip conductor as the signal for units digit 7, relays 3 and 6 operate.

Relay 2017 operates over a circuit extending from ground through contacts 2020*b*, 2022*a*, 2023*a*, and 2024*b*, conductor 2052, cable 2030, conductor 2052, contacts 2002, conductor 2047, cable 2060, conductor 2047, the lower winding of relay 2017 to battery. Relay 2017 operates and locks over a circuit extending from battery over its upper winding, contacts 2017*a*, conductor 2053, and contacts 2020*b* to ground.

Relay 2018 operates over a circuit extending from ground on conductor 2052 through contacts 2004*c*, conductor 2048, cable 2060, conductor 2048, lower winding of relay 2018 to battery. Relay 2018 operates and locks over the circuit from battery over the upper winding of relay 2018, contacts 2018*a*, to the ground on conductor 2053.

Registers 1, 2 and 3 adjust their contact fan (or fans) 2025, 2026, and 2027 accordingly.

When the operating potentials are removed from the ring and tip conductors, relays 3 and 6 release.

Relay 2024 operates over a circuit extending from ground over contacts 2020*b*, conductor 2029, cable 2030, conductor 2029, break contacts *d* of each relay 1–6, conductor 2063, contacts 2017*b* and 2018*b*, conductor 2054, cable 2059, cable 2057, conductor 2054, break contacts 2024*c*, upper winding of relay 2024 to battery, operates relay 2024.

Relay 2024 operates and locks from battery over the upper winding of relay 2024 over make-before-break contacts *c*—*d* of relay 2024, and the lower winding of relay 2024 to ground on lead 2053.

Ground through contacts 2020*b*, 2022*a*, 2023*a*, and

2024*a* on lead 2064 signals the marker that receiving is complete.

It should be understood that in the code receiver as applied to the group selector marker, the sequence relays would be so arranged as to give this signal to the group marker when the receiving of two signals has been completed.

XI. MORE DETAILED DESCRIPTION OF CONNECTIONS BETWEEN SENDERS AND NUMBER GROUPS

A. *Finding the calling sender and connecting it to the number group*

Every four senders have access to each number group circuit through a set of connect relays. Reference is now made to FIGURES 22–31 for a more complete disclosure of the relationship therebetween, FIGS. 22–31 being arranged in the manner of FIG. 21.

At the left of FIG. 22 are seen groups of leads entering from four senders. The lowermost group of leads are from sender 1. When this sender is ready to call in the number group, for the first 1000 called directory numbers which is shown and designated "Number Group 1," it places 48 volt negative potential on each of leads 2201 and 2202 associated with number group 1. Lead 2201 is directly connected to other similar leads from the other three senders in the same group of senders. Lead 2202 (otherwise designated "1") enters cable 2204 in common with corresponding leads 2, 3, and 4 from the other three senders in the same group of senders. It should be observed that similar leads extend from sender 1 and the other three senders in the group to each of the other number groups, 2–10.

Figure 24:
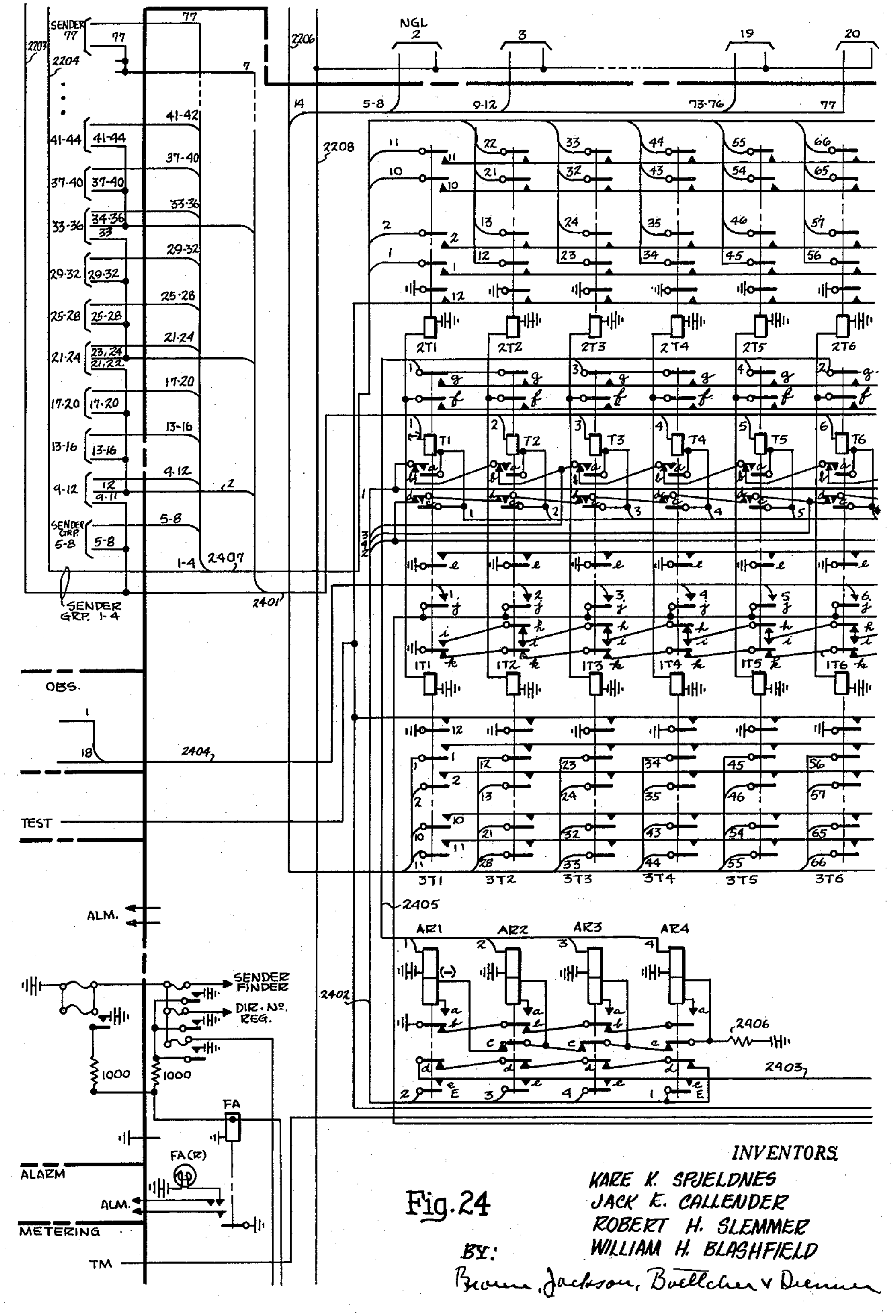

Relay T1 (FIG. 24) is operated by application of 48 volts negative battery by the sender on lead 2201 which extends same over lead 2203 to which corresponding leads from the other three senders in the group, and also corresponding leads from senders 5–11, are connected, and which becomes conductor 1 in FIG. 24, cable 2401, conductor 1, winding of relay T1, conductor 1, cable 2501 (FIG. 25), conductor 1 associated break contacts TC1 of relay TC, conductor 2502, and break contacts *e* of 40 millisecond slow operate relay K3 and break contacts *c* of relay K1 to ground.

Relay T1 has two locking circuits. One of these locking circuits extends over its make contacts *a*, conductor 1, cable 2402, conductor 1, break contacts in series of relays AR4 to AR1, conductor 2403, break contacts *a* of relay K3 to ground. Break contacts *b* of relay T1 open the corresponding locking circuits of relays T2 to T7.

Relay T1 operates TC from ground over make contacts *e* of relay T1, winding of relay TC to battery. Relay TC opens the original operating circuit of relay T1; operates relays 1T1 and 1T2 from battery through the winding of each, through make contacts *f* of relay T1, make contacts *a* of relay TC, break contacts *h* of relays T2–T7, make contacts *i* of relay T1 to ground; and operates relay K1 from ground over its make contacts *b*, winding of relay K1 to battery. Relay K1 opens the circuit of 10,000 ohm relay K2 which is connected through a condenser and resistor to release its contacts after 500 milliseconds, thus initiating a timing interval. If relay K2 releases, ground through its *b* contacts actuates an alarm circuit; ground through its *c* contacts, contacts *j* and conductor 1 of relay T1, cable 2404, conductor 1 actuates a visual observation circuit or count circuit; and ground through its contacts *a* and left winding of relay K3 to battery energizes relay K3 which requires 40 milliseconds to operate due to its shorted second winding. If relay K3 operates it removes locking ground from relays T1 to T7 at contacts *a*, operating ground for these relays at contacts *e*, and opens similar operating and locking circuits for relays U1–U11 at contacts *c* and *d*, releasing the number group circuit. The standing call then comes in again and another trial is made.

It should be noted that anywhere in the drawings that an "E" appears adjacent a relay contact such contact closes or opens before the other contacts. Where "L" appears adjacent a contact the contact closes or opens before the other contacts. If both E and L are found near a relay contact it means that with reference to each other and not with reference to the other contacts, the one marked E closes or opens before the one marked L closes or opens.

Relay TC also operates relay AR1 (FIG. 24) over the following circuit: battery, winding of relay AR1, conductor 1, cable 2405, conductor 1, contacts *g* of relay T1, contacts *a* of relay TC, break contacts *h* of relays T2–T7, make contacts *i* of relay T1, to ground. Relay AR1 operates and locks to ground over its make contacts *a*, lower winding, break contacts *c* of relays AR2–AR4, resistor 2406 to battery.

Relay T1 then has a second locking circuit to ground over its make contacts *c*, break contacts *d* of relays T2–T7, conductor 2, cable 2402, conductor 2 and make contacts *e* of relay AR1, conductor 2403, and contacts *a* of relay K3 to ground. Relay T1 opens a point in the *c* contacts locking circuit of relays T2 and T7 which will be described further hereinafter. It should be observed that contacts *e* of relay AR1 close before contacts *d* of relay AR1 open.

When relay 2T1 (FIG. 24) operates, a circuit is completed to operate relay U1 (FIG. 25) as follows: ground on conductor 2202, cable 2204 which carries similar leads from three other senders in the group directed to relays U2 to U4, cable 2407 which contains similar leads from all the other senders, conductor 1 (which represents sender 1), contacts 1 of relay 2T1, conductor 2504, winding of relay U1, conductor 1, cable 2515, conductor 1 and associated break contacts of relay UC, conductor 2503, break contacts *d* of relay K3 and break contacts of relay K1 to ground.

Relay U1 locks over two circuits, one locking circuit extending over its make contacts *a*, conductor 1, cable 2516, conductor 1, break contacts *d* of each relay BR4 to BR1, conductor 2520, break contacts *c* of relay K3 to ground. Relay U1 at its break contacts *b* opens the locking circuits of all relays U2–U11.

Relay U1 operates relay UC from ground, contacts *e* of relay U1, conductor 2517 and winding of relay UC to battery.

Relay UC opens the original operating circuit of relay U1 and holds open the operating circuits of relays U2–U11 at the associated contacts; connects ground to the circuit of relay K1; and operates relay BR1 from battery over the upper winding of relay BR1, conductor 1, cable 2518, conductor 1, make contacts *g* of relay U1, make contacts *a* of relay UC, break contacts *h* of relays U11 to U2, make contacts *i* of relay U1 to ground.

Relay BR1 locks to ground over the circuit extending over its make contacts *a*, its lower winding, break contacts *c* of relays BR2 to BR4 in series, resistor 2519 to battery. Contacts *e* of relay BR1 close before contacts *d* open. Consequently, relay U1 has a second locking circuit from its winding over make contacts *c* of relay U1 and break contacts *d* of relays U2 to U11 in series, conductor 2, cable 2516, conductor 2, contacts *e* of relay BR1, conductor 2520, break contacts *c* of relay K3 to ground. Relay U1 opens a point in the *i* contacts locking circuits of relays U1–U11 which will be described further hereinafter.

When relay UC operated, a circuit was completed to energize windings A1–S1 and B1–S1 of FIG. 22 as follows: battery windings of relays A1–S1 and B1–S1 in parallel, conductor 2205 otherwise designated 1, cable 2206, conductor 1 and associated contacts 1 of relay 1T1, contacts 1 of relay U1, make contacts *a* of relay UC, break contacts *h* of relays U2–U11 in series, make contact *i* of relay U1, to ground.

Windings A1–S1 to A10–S1 (FIG. 22) are associated with the ten coils of a multiple relay, the symbolism of which is shown in FIG. 3B.

Windings B1–S1 to B10–S1 are associated with the ten coils of a multiple relay, the symbolism of which is shown in FIG. 3B.

Whereas in the operation of all other relays of this application, the armatures whether shown above the relay coil or below are assumed to be attracted toward the coil, when the winding of a multiple relay such as the winding A1–S1 is energized, the associated contacts shown vertically are assumed to be moved by linkage in the multiple relay so that these contacts engage the conducting bars common to the other windings and contacts of the relay. This symbolism is in line with the symbolism of the crossbar switch which shows the cross-point contacts engaging common conducting bars.

Accordingly when winding A1–S1 is energized, the twelve contacts shown above this winding make contact with the twelve horizontal conducting bars. Also when winding B1–S1 is energized, the twelve contacts shown above this winding make contact with the twelve horizontal conducting bars.

Figure 25:
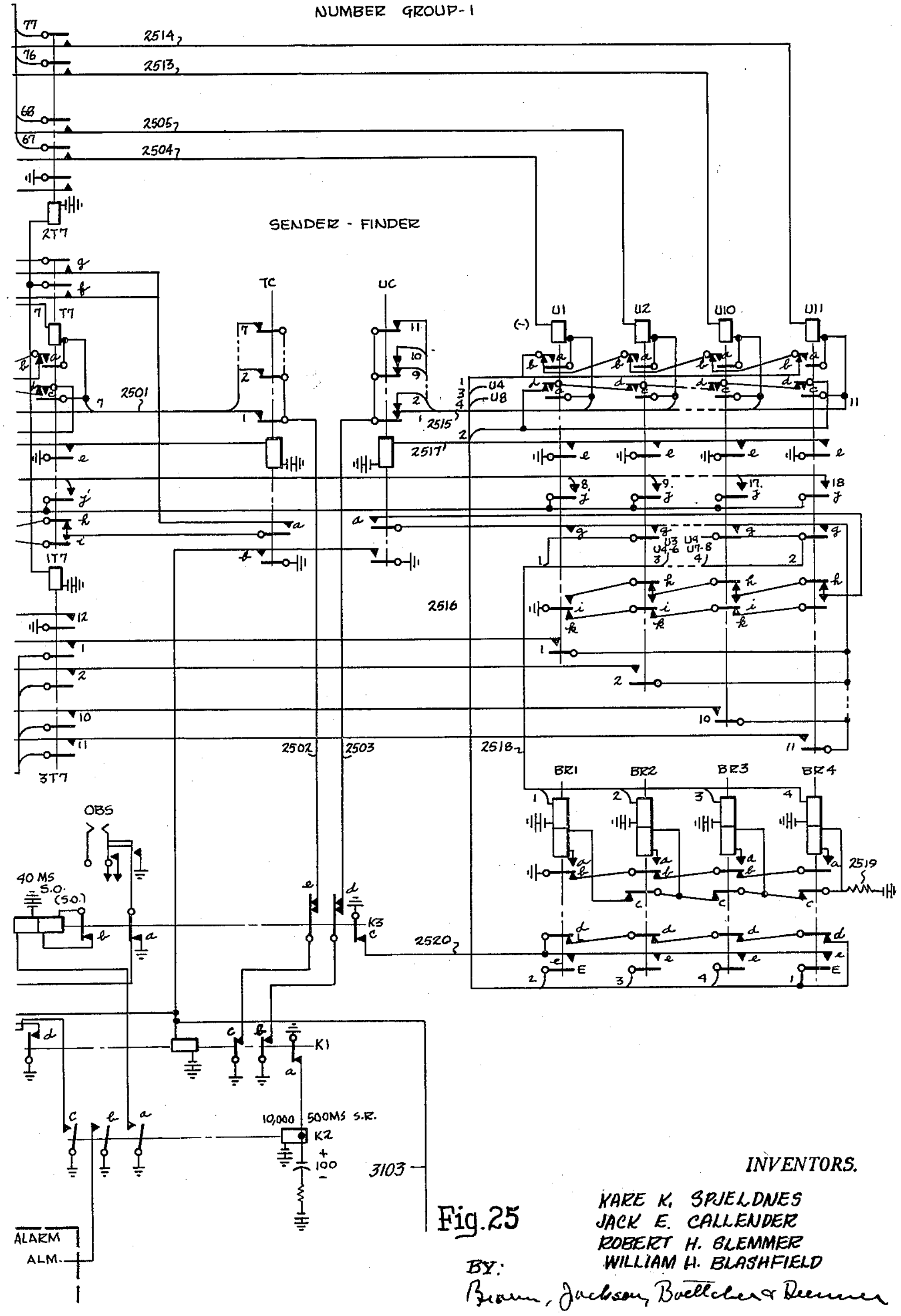
Figure 26:
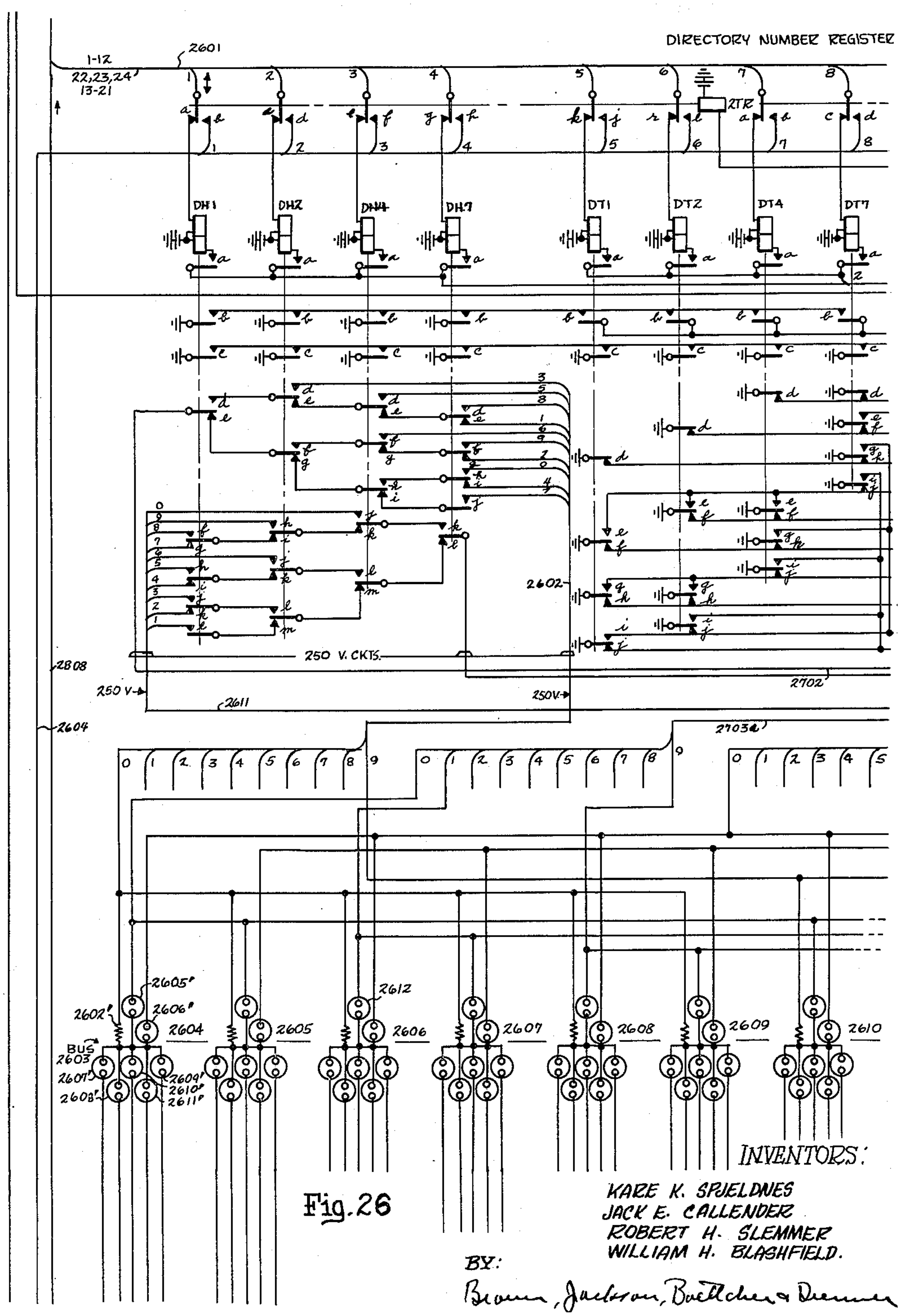

By this means, the twenty-four leads designated 1–24 from sender 1 entering cable 2207 and emerging from cable 2207 to individually engage the twenty four conducting bars designated 1–24 are extended through the respective contacts closed by the energizing of windings A1–S1 and B1–S1 to conductors designated 1–24 connected by the respective contacts to cable 2208 through which they transverse FIG. 24 and enter FIG. 26 to enter the number group circuitry proper, the circuitry of FIGS. 22–25 being constituted of identification, guard, and connect equipment.

Before advancing to a description of action in the number group circuitry proper, the equipment of FIGS. 22–25 will be further considered.

It was assumed that the first call was from sender 1 to number group 1 operating relays T1, 1T1, 2T1, TC, U1, AR1, BR1, and K1.

It should be observed that relays T1, 1T1 and 1T2 are associated with senders 1–11; relays T2, 1T2, and 2T2 with senders 12–22, etc.; and that relays T7, 1T7 are associated with senders 67–77. Accordingly certain conductors and contacts of relay 1T1 are numbered 1–11 and certain conductors and contacts of 2T1 are numbered 1–11. Similarly for relays T2, 1T2, 2T2, etc.

It should also be observed that the operation of relay 2T1 on a call from any sender 1–11 extends a lead from each of these senders through the corresponding contacts 1–11 to coils of relays U1–U11 respectively; that the operation of 2T2 extends a lead from each of senders 12–22 through the corresponding contacts 12–22 to coils of relays U1–U11, etc.

Accordingly relays T1–T7 and their adjacent above and below auxiliary relays are associated with seven groups of senders of eleven senders each; and relays U1–U11 are associated with the eleven senders of the group determined by the operation of relays T1 to T7 and their associated relays.

Thus the 48 volt negative battery on lead 2201 results in relays T1, 1T1 and 2T1 being operated and the 48 volt negative battery on lead 2202 results in relay U1 being operated.

Potentials on corresponding leads for sender 2 results in relays T1, 1T1, 2T1 and U2 being operated.

Potentials on corresponding leads for sender 11 results in relays T1, 1T1, 2T1 and U11 being operated.

Potentials on corresponding leads for sender 77 results in relays T7, 1T7, 2T7, and relay U11 being operated.

While sender 1 is connected to number group 1, if any other of the senders 12–77 should try to seize number group 1 by placing 48 volt negative battery on its associated leads in cable 2401 in an attempt to operate any of the relays T2 to T7, none of these relays will operate with their operating circuits being opened by relay TC.

However if another sender 2–11 in the same group of senders places 48 volt negative battery on its associated leads in cable 2401 in an attempt to operate relay T1, relay T1 is already operated. If this sender is sender 2, for example, its lead 2210 otherwise indicated as lead 2 extending through cable 2204, cable 2207, conductor 2, contacts 2 of operated relay T1, conductor 2505, winding of relay U2, conductor 2, to to open contacts of relay UC is not able to use its 48 volt negative battery potential to operate relay U2.

As the passage of a call through the number group circuit takes only about 125–140 milliseconds, when the number group and connect relays release, the waiting sender automatically enters its call.

Now let us suppose that two senders energize their seizing leads simultaneously operating relays T1 and T2 for example. A holding circuit for relay T1 can be traced from the winding of relay T1, make contacts *a* of relay T1, conductor 1, cable 2402, conductor 1, break contacts *d* of relays AR4 to AR1, break contacts *a* of relay K3 to ground, holding relay T1. Also, a holding circuit for relay T2 can be traced from the winding of relay T2, the make contacts *c* of relay T2, break contacts *d* of relays T3 to T7, conductor 2, cable 2402, conductor 2, only as far as the unoperated contacts *e* of relay AR1.

Relay TC operates from ground through contacts *e* of relay T1 and T2. But, relay AR1 cannot operate with two relays (T1 and T2) operated simultaneously as can be appreciated by tracing the circuit from battery through the upper winding of relay AR1, conductor 1, cable 2405, contacts *g* of relays 2T1 and 2T2, contact *a* of relay TC, break contacts *h* of relays T7 to T3, make contacts *i* of relay T2 to open contacts *k* of relay T1.

Had AR1 operated, it might have closed the holding circuit aforetraced as far as contacts *e* of relay AR1, to ground through break contacts *a* of relay K3; and opened the traced holding circuit of T1. But with relay AR1 nonoperated, relay T2 releases, relay AR1 operates, and relay T1 locks from its winding through make contacts *c* of relay T1, break contacts *d* of relays T2–T7, conductor 2, cable 2402, conductor 2, make contacts *e* of relay AR1, and break contacts *a* of relay K3 to ground.

Let us suppose senders 1 and 2 again energize relays T1 and T2 simultaneously. With AR1 operated, relay T1 finds one of its locking circuits open at open contacts *d* of relay AR1 and the other locking circuit open at open contacts *d* of relay T2. Relay T2 however finds a locking circuit from the winding of relay T2, closed contacts *c* of relay T2, break contacts *d* of relays T3 to T7, conductor 2, cable 2402, conductor 2, closed contacts *e* of relay AR1, conductor 2403, and contacts *a* of relay K3 to ground.

It should be observed that relay AR1 is operated from contacts *g* of relays 2T1 and 2T2; relay AR2 from contacts *g* of relays 2T6 and 2T7; relay AR3 from contacts *g* of relays 2T3 and 2T4; and AR4 from make contacts *g* of relay 2T5.

If with the circuit cleared out and relay AR1 locked operated, a sender in the group 56–66 energizes its two seizing and identification leads corresponding to 2201 and 2202, relay T6 operates, or if a sender in the group 67–77, relay T7 operates.

Relay AR2 becomes operated from battery over its upper winding, conductor 2, cable 2405, conductor 2, contact *g* of relay T6 or T7, contacts *a* of relay TC, break contacts *h* of relay T7, make contacts *i* of relay T6 (if it is the one operated), and break contacts *k* of relays T5 to T1 to ground. Relay AR2 in operating, releases AR1 when its contacts *b* open. Relay AR2 then locks from ground, through contacts *b* of relay AR1, contacts *a* of relay AR2, lower winding of relay AR2, break contacts *c* of relays AR3 and AR4, resistor 2406 to battery.

It should be observed that the locking circuit of relays T1–T7 involving contacts *a* and *b*, form a ring from relay T1 to relay T2, to relay T3, to relay T4, to relay T5, to relay T6, to relay T7, and back to relay T1, which we shall call a clockwise ring in that order. When any relay T1–T7 operates, it tries to establish a locking circuit back over this ring in the counter-clockwise direction. Thus when any relay succeeds in locking, it opens the locking circuits of all other relays in the clockwise direction from it between itself and the point of application of locking ground to the ring. Ground through contacts *a* of relay K3, break contacts *d* of relays AR1 to AR4, conductor 1, cable 2402, and lead 1 enters this ring between relay T7 and T1. With ground entering at this point, if T1 locks, it holds the locking circuits of relays T2–T7 through the *a* and *b* contacts open. If T2 locks, it holds the locking circuits of relays T3 to T7 open. If relay T7 locks, it does not hold the locking circuit through *a* and *b* contacts of any other relay T1–T6 open. Thus a priority in locking is established from T1 to T7.

However with relay AR2 operated and locked, ground to the *a* and *b* contacts locking chain extends from ground through break contacts of relay K3, contacts *e* of relay AR2, conductor 3, cable 2402, conductor 3, to the *a* and *b* locking chain between contact *b* of relay T2 and *a* of relay T3. Under these circumstances a priority of locking over the *a*—*b* contacts is established with T3 having first priority, T4 next, T5 next, T6 next, T7 next, T1 next, and T2 having no priority.

If the next call results in relay T3 or T4 being operated, relay AR3 operates over the *g* contacts of relay T3 or T4. Relay AR3 releases AR2 and closes a locking ground to the *c*—*d* contacts counter-clockwise locking circuit between contacts *c* of relay T5 and *d* of relay T6.

Whereas with ground from relays AR1–AR4 on conductor 2, the locking priority on this counter-clockwise locking path was from T7 with highest priority, to T1 with no priority; now with ground on conductor 4, the priority is from T5 with highest priority to T4, T3, T2, T1, T7, with T6 having no priority.

If the next call results in relay T5 being operated, relay AR4 operates over the *g* contacts of relay T5. With AR4 operated, locking ground on lead 1 gives relay T1 highest priority of locking over the *a*—*b* contact loop; T2 next, etc. with T7 having lowest priority.

The path for lead 1 through break contacts *d* of relays AR1–AR4 provides a starting circuit when the circuit is first installed, or after a fuse has blown and been replaced, or for any reason battery is removed and replaced.

It should be observed that relays T1 to T7 are operated in a random fashion and accordingly that relays AR1–AR4 are operated, not necessarily in the order described, but in a random fashion as a result of the random operation of relays T1–T7. Accordingly, the locking ground on leads 1, 2, 3, and 4 is shifted between these leads in a random fashion, and accordingly priority of locking is shifted in a random fashion. This tends to equalize opportunity for senders to engage the number circuit.

It should be observed that locking ground appears on only one of the locking conductors 1, 2, 3, and 4 at a time.

Also it should be observed that there is a counter-clockwise locking circuit (*a*—*b* contacts of relays T1 to T7) with priority of locking being from highest to lowest in the clockwise direction; and that there is a clockwise locking circuit (*c*—*d* contacts of relays T1 to T7) with priority of locking being highest to lowest in the counter-clockwise direction.

Thus at any given time either the counter-clockwise locking circuit or the clockwise locking circuit is effective but not both and that ground enters the locking circuit in effect of each at either of two points but not both simultaneously.

With this system of random operation and locking priority, quite a degree of equalization in opportunity to engage the number group circuit is effected.

A similar scheme of locking grounds is operative relative to relays BR1 to BR4.

Also, before proceeding with the sequence of operations, it might be observed that the leads for operating relays T1 to T7 and U1 to U11 are bunched according to 4-sender groups in the upper left portion of FIG. 24. In summarizing, any sender in group 1–11 operates relay T1; any sender in group 12–22 operates relay T2; etc. Also, the first sender in any group such as 1–11; 12–22; etc., operates relay U1; the second sender in any group U2; etc.

Also, it might be observed that the energization of windings A1–S1 and B1–S1 results in sender 1 being connected to number group 1; energization of A2–S1 and B2–S1 in sender 1 being connected to number group 2; etc.; and that the energization of windings A10–S1 and B10–S1 results in the connection of sender 1 to number group 10. Furthermore, the energization of windings A1–S2 and B1–S2 results in the connection of sender 2 to number group 1; windings A2–S2 and B2–S2 results in the connection of sender 2 to number group 2; etc.; and windings A10–S2 and B10–S2 results in the connection of sender 2 to number group 10; etc.

B. *Registration of the directory number in the number group*

When winding A1–S1 was energized, the associated contacts 1–12 were closed to the conducting bars 1–12 of which 1 and 12 are shown, thus extending conductors 1–12 from sender 1 to number group 1. Also when winding B1–S1 was energized, the associated contacts 13–24 were closed to the conducting bars 13–24 of which 13 and 24 are shown, thus extending conductors 13–24 from sender 1 to number group 1. These conductors 1–24 enter cable 2208 which extends through FIG. 24 into FIGURE 26 where a cable 2601 containing cables 1–12, 22, 23, and 24 emerges from cable 2208.

Conductors 1–6 emerge individually from cable 2601, and individually connect to associated levers of relay 2TR; conductors 7–12 emerge individually and individually connect to associated levers of relay 3TR (FIG. 27); conductor 22 emerges and connects to the winding of relay 1TR; conductor 23 emerges and connects to the *b* contacts of relay TST; and conudctor 24 emerges, and passes through the break contacts of relay 1TR to the right hand winding of the relay T2H.

Diverging, the sender selectively places ground on leads 1–4 in combinations to operate relays DM1, DM2, DM4, and DM7 (FIG. 26) in combinations as follows to register the directory hundreds digit:

| Hundreds digit | Lead(s) | Relay(s) operated |
|---|---|---|
| 1 | 1 | DM1. |
| 2 | 2 | DM2. |
| 3 | 1 and 2 | DM1 and DM2. |
| 4 | 4 | DM4. |
| 5 | 1 and 4 | DM1 and DM4. |
| 6 | 2 and 4 | DM2 and DM4. |
| 7 | 7 | DM7. |
| 8 | 1 and 7 | DM1 and DM7. |
| 9 | 2 and 7 | DM2 and DM7. |
| 0 | 4 and 7 | DM4 and DM7. |

The sender similarly places ground on leads 5–8 in combinations to operate relays DT1 to DT7 in combinations to register the directory tens digit.

Also, the sender similarly places ground on leads 9–12 in combinations to operate relays DU1 to DU7 in combinations to register the directory units digit.

In the example postulated, it was assumed that the hundreds, tens, and units directory digits of the called number are 000 and that the translated equipment location digits transmitted by the sender to the code receiver in the subscribers line marker are hundred digit 4, tens digit 6, and units digit 7.

Accordingly, relay DM4 operates from ground on conductor 3, break contacts *e* of relay 2TR, upper winding of relay DM4 to battery, and DM7 operates from ground on conductor 4, break contacts *g* of relay 2TR, upper winding of relay DM7 to battery. Relays DT4 and DT7 operate from ground on the respective leads 7 and 8 through contacts *a* and *c* of relay 3TR, upper winding of each relay DT4 and DT7 to battery. Relays DU4 and DU7 operate from ground on leads 11 and 12, contacts *i* and *k* of relay 3TR, upper winding of relays DU4 and DU7 to battery.

C. *Translation from directory number to terminal location*

Figure 27:
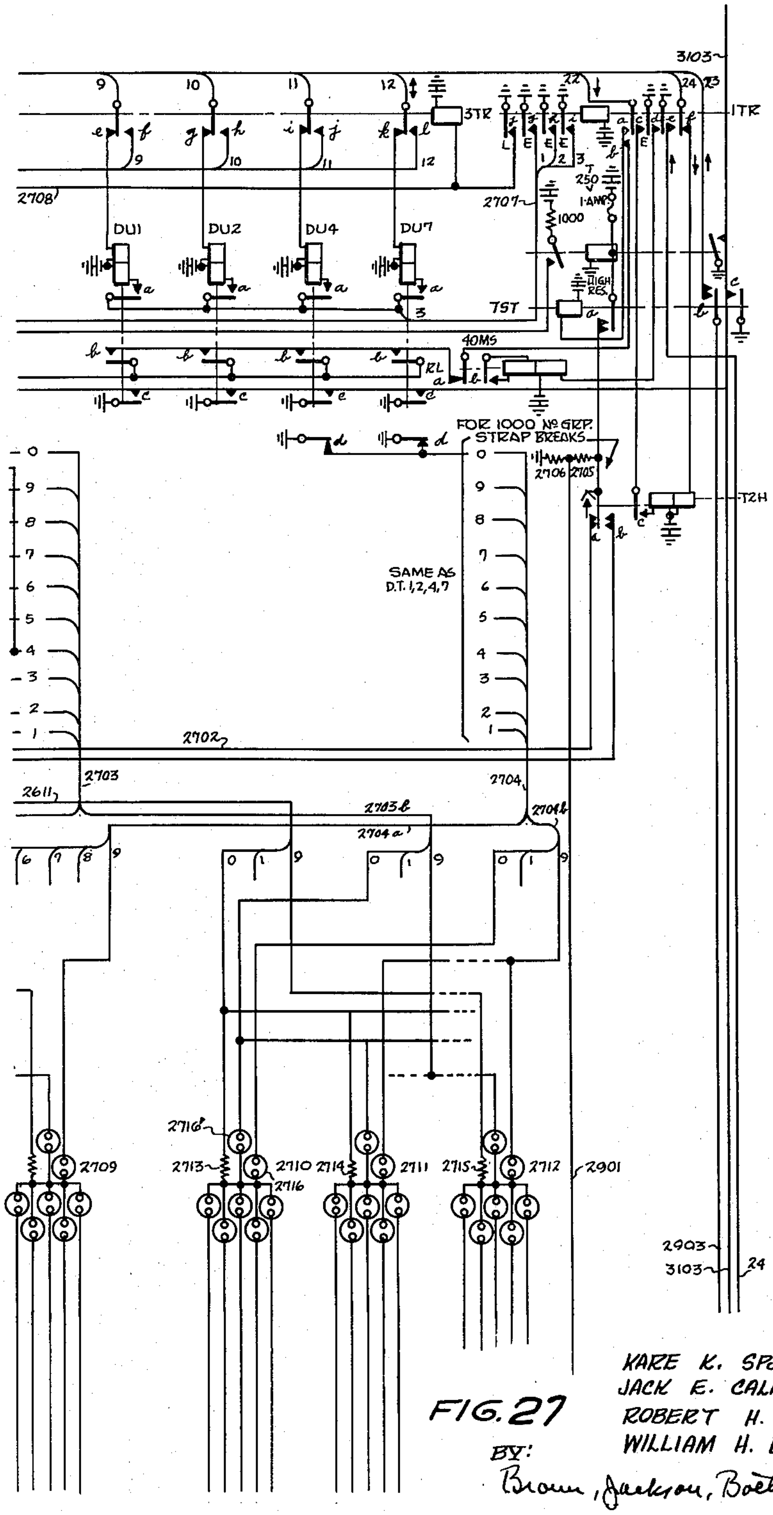
Figure 28:
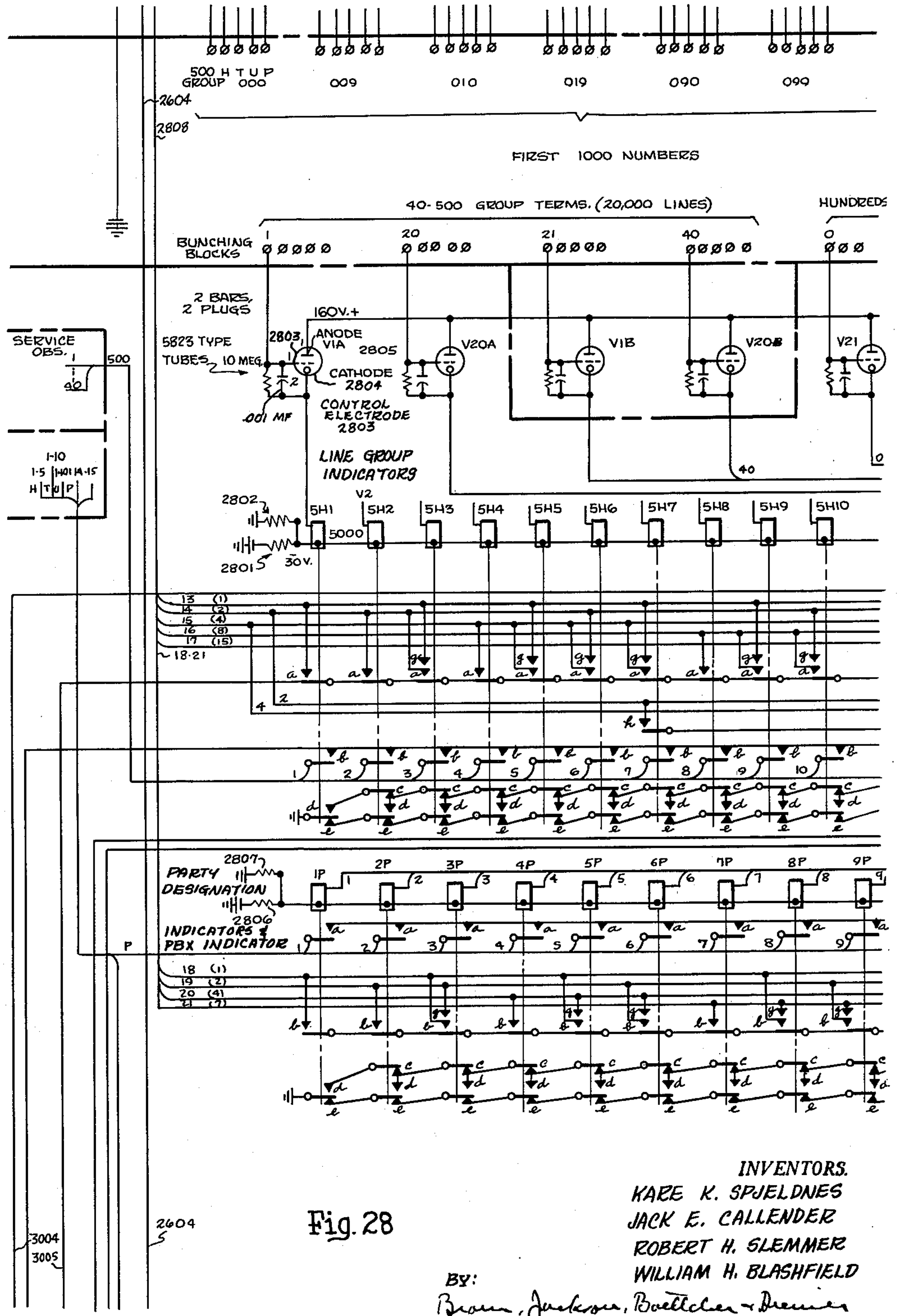

When at least one relay in each of the hundreds register relays DM1 to DM7, the tens register relays DT1 to DT7, and the units register relays DU1 to DU7 are operated a circuit is completed to operate relay TST (FIG. 27).

In the assumed example, relay TST is operated over a circuit extending from ground over contacts *b* of relays DM4 and DM7, contacts *b* of relays DT4 and DT7, contacts *b* of relays DU4 and DU7, break contacts *a* of relay RL, break contacts *b* of relay 1TR, and winding of relay TST to battery.

Relay TST closes a circuit from 250 volt positive battery over a 1 ampere fuse, contacts *a* of relay TST, break contacts of relay T2H or shunt strapping around these contacts, conductor 2702, contacts *e* of relay DM1, contacts *g* of relay DM2, contacts H of relay DM4, contacts *h* of relay DM7, conductor 0, cable 2602, conductor 0, to resistor 2602′ and the illustrated tube network 2604.

In order to describe the operation of the tube circuit designated generally as 2604, we shall digress from our supposition that relays DT4, DT7, DU4, and DU7 are operated and suppose initially that they are not operated. Ground through contacts *d* of relays DT4 and DT7 on conductor 0, cable 2703, conductor 0, would be connected to one element of neon tube 2605′ and ground through contacts *d* of relays DU4 and DU7, conductor 0, cable 2704, and conductor 0 would be connected to one element of neon tube 2606′. With 250 volt positive battery through resistor 2602′ connected to bus 2603 to which the other elements of neon tubes 2605′ and 2606′ are connected, at least one of these tubes will be fired (both can fire simultaneously, but the one to fire first usually inhibits the other because both are connected directly to 250 volt positive battery—not through resistance).

With at least one of the tubes 2605′ and 2606′ fired, the potential of bus 2603 is held at a low enough point that neon tubes 2607′, 2608′, 2609′, 2610′, and 2611′ cannot fire. This will be considered further hereinafter.

Also if any ground obtains through contacts *d* of relay DT4, DT7, DU4, or DU7 by any one of these relays being operated, one of the tubes 2605′ or 2606′ will be fired, inhibiting tubes 2607′–2611′ from firing.

Furthermore, even though tubes 2605′ and 2606′ receive no ground through contacts *d* of relays DT4, DT7, DU4, and DU7, tubes 2607′–2611′ would be prevented from firing, if no potential was connected to resistor 2602′ through contacts *h* of relays DM4 and DM7.

In other words for the tubes 2607′–2611′ to fire, a particular combination of relays in the set DM1 to DM7, a particular combination of relays in the set DT1 to DT7, and a particular combination of relays in the set DU1 to DU7 must be operated (although in the given example these combinations are the same, this is usually not the case).

Looking now at the tube group 2604 with terminals "500", "H," "T," "U," and "P" extending from the lower electrodes of tubes 2607′–2611′, toward cooperating terminals across a cross-connect panel, it will be observed, in line with our assumed example, that terminal "500" is cross-connected to one of a string of connected terminals "1" associated with the first 500 line group in which the called line is found; terminal "H" is cross-connected to one of a string of connected terminals "4" associated with the hundred line group in which the called line is found; terminal "T" is cross-connected to one of a string of terminals "6" associated with the tens group in which the called line is found; terminal "U" is cross-connected to one of a string of connected terminals "7" associated with the line in the tens group which is the called line; and that terminal "P" is cross connected to one of a string of connected terminals "1" associated with party 1 on the line.

It should be observed that simultaneously with the connection of 250 volt positive potential to resistor 2602′ by the operation of relay TST (FIG. 27), 160 volts positive potential is connected to the anodes of tubes V1A to V60 over conductor 2901 by the connection of 250 volt positive battery through contacts *a* of relay TST to one end of the voltage divider comprising this positive battery, resistor 2705, and resistor 2706 to ground, to which conductor 2901 is connected between the resistors, the values of the resistors being so chosen to give 160 volts potential and to allow the correct current flow.

Digressing, if tubes 2607′–2611′ do not fire when 160 volt potential is placed on the anodes of tubes V1A–V60 (of the 5823 type), tube V1A, for example, does not fire. It should be observed that the cathode of tube V1A is connected to the winding of associated relay 5H1, the other end of the winding being connected to the 30 volt negative position of a voltage divider, comprising negative battery through resistor 2801 and resistor 2802 to ground. Also its control electrode is connected to its cathode through a ten megohm resistor and 0.001 microfarad condenser in parallel whereby the control electrode is given the potential of the cathode until another source of potential is connected to it.

If 250 volt positive potential is connected to the resistor 2602′ and tubes 2605′ and 2606′ are non-fired in accordance with the assumed example, a circuit may be traced from the source of 250 volt positive potential, the one ampere fuse, contacts *a* of relay TST, contacts *a* of relay T2H or the shunting strapping, conductor 2702, contacts *e* of relay DM1, contacts *g* of relay DM2, contacts *h* of relay DM4, contacts *h* of relay DM7, conductor 0, cable 2602, conductor 0, resistor 2602′, bus 2603, through the space path of tube 2607, over terminal "500" cross-connected to terminal "1," to the control electrode 2803 of tube V1A, through the control gap to the cathode 2804, through the winding of relay 5H1, to the negative 30 volt position of the voltage divider comprising resistors 2801 and 2802, the values of which are chosen to cooperate with the associated circuitry.

Tube 2607′ fires, in turn raising the voltage of the control (or starter) electrode above the firing point. The starting condition may be defined as an approximately 80 volt potential between cathode and anode. Accordingly, with the cathode at thirty volts negative potential, the control electrode must be raised to some value above 50 volts positive potential. After tube V1A fires, the voltage between cathode 2804 and anode 2805 becomes approximately 60 to 65 volts, elevating the voltage on the end of the winding of relay 5H1 opposite the voltage divider to a positive potential adequate to operate relay 5H1.

Similarly tube 2608′ fires, in turn firing tube V25; tube 2610 fires, in turn firing tube V32; tube 2611 fires, in turn firing tube V43; and tube 2609 fires, in turn firing tube V46.

The firing of tube V25 (FIG. 29) operates associated relay 4H (FIG. 30) associated with the hundreds called equipment group over the circuit from the cathode of relay V25, conductor 4, cable H, cable 2902, cable H, conductor 4 (FIG. 30), winding of relay 4H, to the negative 30 volt point on the voltage divider comprising the circuit from negative 48 volt battery, resistor 3001, resistor 3002, to ground.

The firing of tube V32 operates relay 6T (FIG. 32) associated with the tens called equipment group over the circuit from the cathode of relay V32, conductor 6, cable T, cable 2902, cable T, relay 6T, to the negative 30 volt point on the voltage divider comprising the circuit from negative 48 volt battery, resistor 3003, resistor 3004, to ground.

The firing of tube V43 operates relay 7U (not shown) associated with the line in the tens group over the circuit from cathode, conductor 7, cable U, cable 2902, cable U, winding of relay 7U (not shown) to the negative 30 volt point on the voltage divider comprising the circuit from 48 volt battery, resistor 3101, resistor 3102, to ground.

Also, the firing of tube V46 operates relay 1P (FIG. 28) over the circuit from cathode, conductor 1, cable P, cable 2902, cable P, conductor 1, winding of relay 1P to the negative 30 volt point on the voltage divider comprising the circuit from 48 volt negative battery, resistor 2806, and resistor 2807 to ground.

Relay 5H1 (FIG. 28) operates relay 5B (FIG. 30) from battery over the winding of relay 5B, break contacts *c* of relays 5H20 to 5H2, contacts *d* of relay 5H1 to ground. The *c—d—e* contact arrangement of relays 5H1 to 5H20 insures that relay 5B operates if only one relay 5H1 to 5H20 is operated. If more than one relay 5H1 to 5H20 is operated, the circuit to ground through contacts *c—d—e* is open.

Relay 4H (FIG. 30) operates relay HB from battery through the winding of relay HB, make contacts *d* of relay 4H and break contacts *e* of relays 3H to 0H to ground. This also is an "only one operated" guard.

Relay 6T (FIG. 31) operates relay TB (FIG. 30) from battery over winding of relay TB, break contacts *c* of relays 9T to 7T, make contacts *d* of relay 6T, break contacts *e* of relays 5T to 0T to ground. This also is an "only one operated" guard.

Relay U7 (not shown) operates relay UB over a similar "only one operated" guard circuit.

Relay 1P (FIG. 28) operates relay PB (FIG. 31) from battery over the winding of relay PB, break contacts *c* of relay PBX, break contacts *c* of relays 14P to 2P, make contacts *d* of relay 1P to ground.

Relays HB, TB, UB, and PB (FIGS. 30 and 31) connect ground through their *a* contacts to conductors S, T, U, and P respectively to observation equipment.

Figure 29:
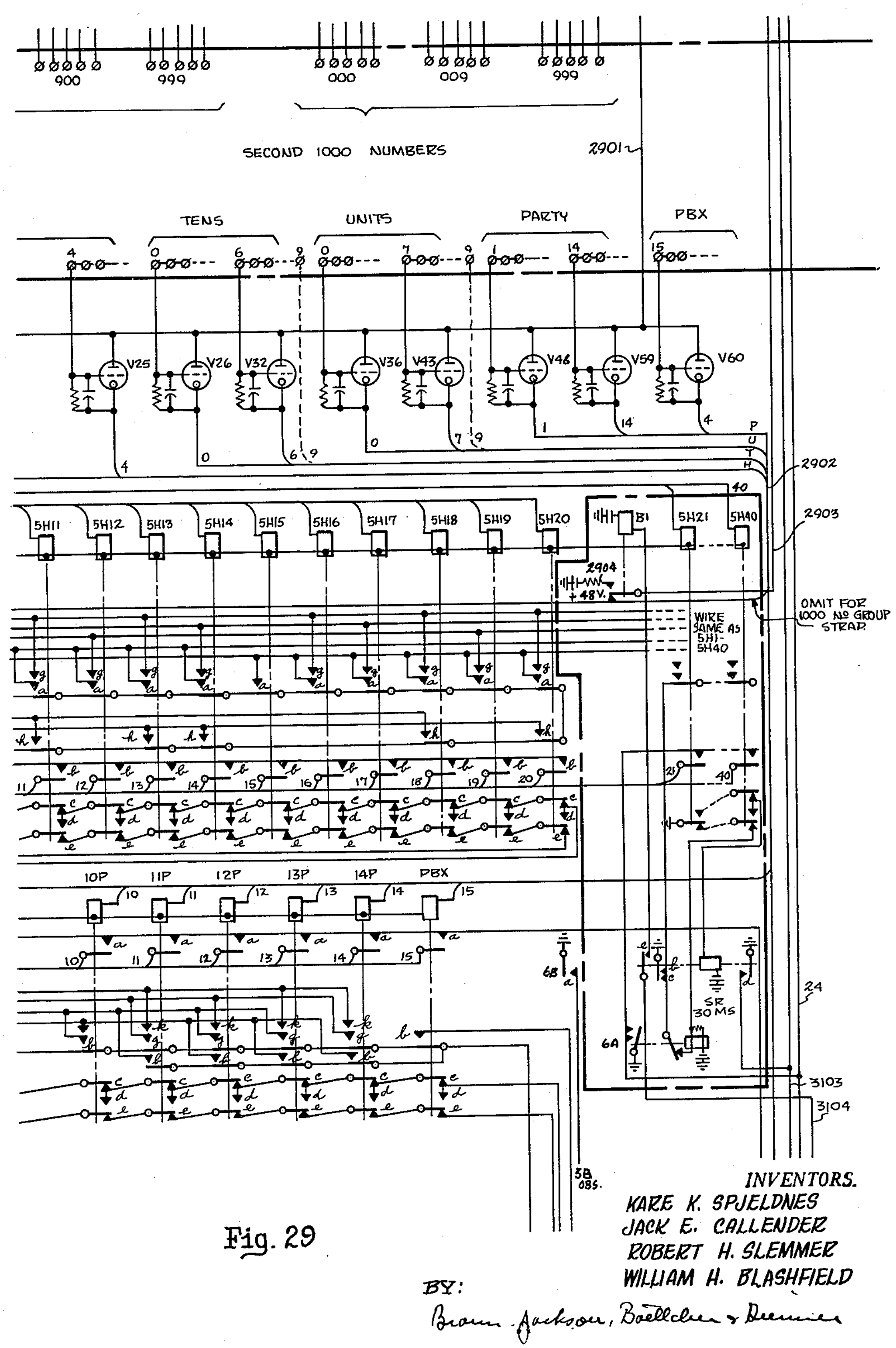
Figure 30:
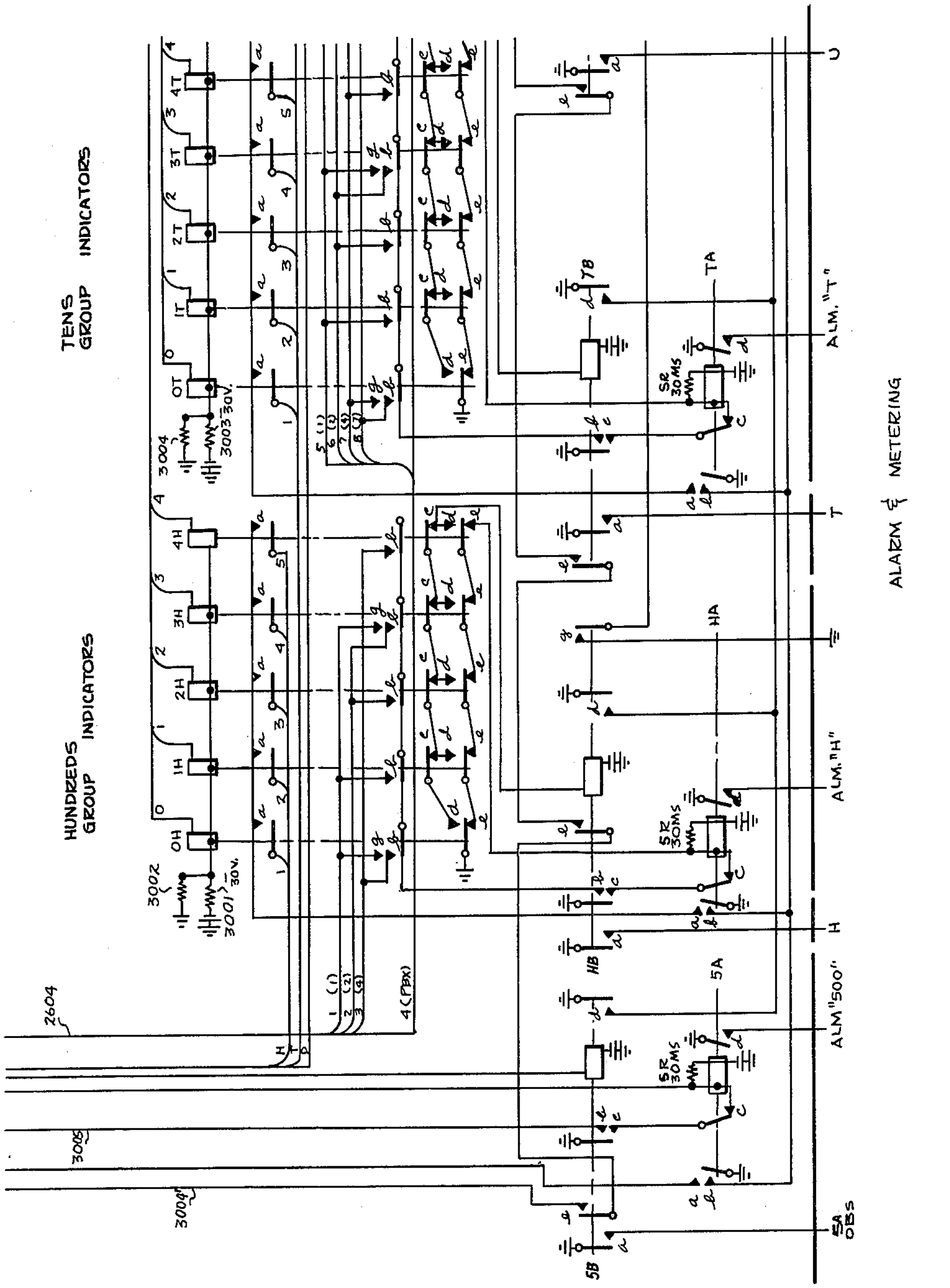
Figure 31:
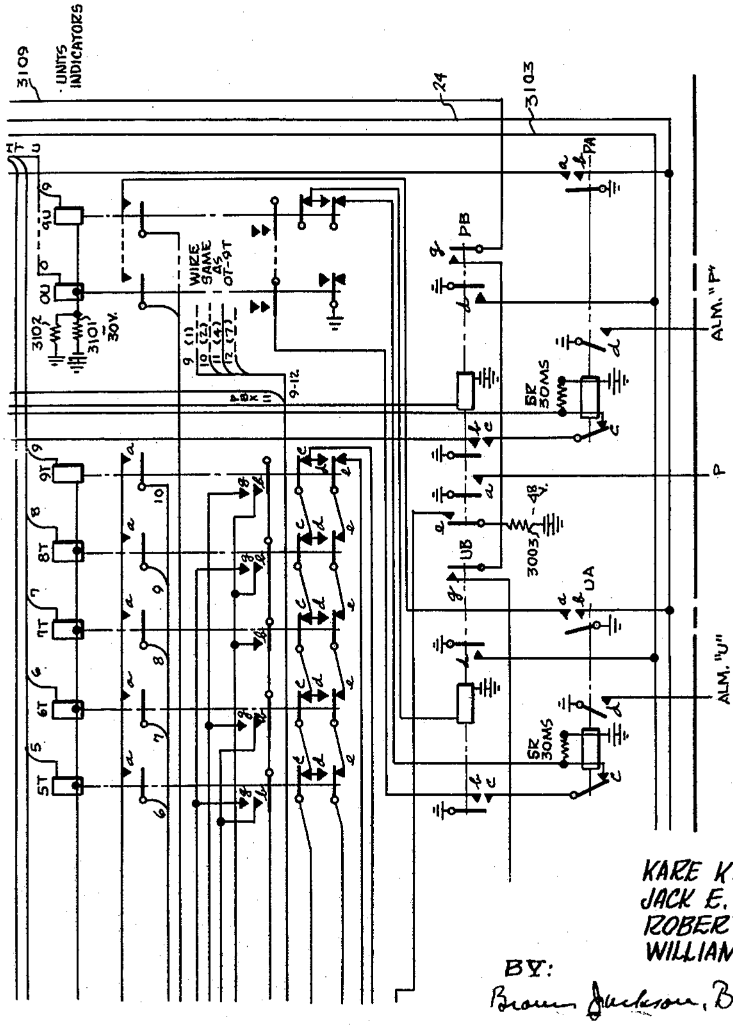

Relays HB, TB, UP, and PB connect ground through their *b* contacts to supply ground to their associated and respective groups of relays 5H1 to 5H20 (FIG. 28), 0H to 4H, (FIG. 30), 0T to 9T (FIG. 30), 0U–9U (FIG. 31), and 1P 14P (FIG. 28), and PBX (FIG. 29).

Relays 5B, HB, TB, UB, and PB (FIGS. 30 and 31) connect ground through their *c* contacts to hold their associated and respective relays 5A, HA, TA, UA, and PA (FIGS. 30 and 31) operated when the regular holding circuits to ground of these relays through break contacts *e* of their respective chains are open. If must be noted that relays 5B, HB, TB, UB and PB will not operate unless only 1-relay of each group, 5H1–5H20, 0H–4H, 0T–9T, 1P–PBX is operated. Consequently, if more than 1-relay in each group operates, relay 5A, HA, TA, UA or PA will release and provide for release of the number group by signaling the sender over lead 24 through contact of relay 1TR, and also provide alarm and observation. A 30 millisecond release time is provided for each relay 5A, HA, TA, UA and PA to cover the time ground is removed from the windings until it is replaced by a holding circuit from relays 5B, HB, TB, UB and PB.

Relays 5B, HB, TB, UP, and PB connect ground through their *d* contacts to a common conductor 3103 to hold relay K1 operated (FIG. 25).

At this point it should be observed that relay HB (FIG. 30) when operated closes a circuit from battery through resistor 3003, make contacts *e* of relays PB, UB, TB, HB, and 5B in series, conductor 3004, break contacts *a* of relay B1 or strapping, conductor 2903, make contacts *b* of relay TST, conductor 23, cable 2601, cable 2208, closed contacts 23 (not shown) of the multiple relay associated with energized winding B1–S1, contact bar 23 (not shown), conductor 23 (not shown), cable 2207, conductor 23 (not shown) to sender 1.

The sender 1 acknowledges by placing ground on conductor 22 (not shown) which passes through cable 2207 and emerges to bar 22 of the multiple relay associated with energized winding B1–S1, contacts 22 (not shown), cable 2208, cable 2601, conductor 22, winding of relay 1TR to battery, operating relay 1TR.

Relay 1TR extends its operating ground over its contacts *a* to relay TST and disconnects the original energizing circuit of relay TST from *a* contacts to *b* contacts of 1TR, the operation of contacts *a* mechanically opening contacts *b*. Relay 1TR also connects ground through its contacts *g*, conductor 1, cable 2707, conductor 1, contacts *a* of relay DM4, lower winding of relay DM4, to battery to provide a holding circuit for relay DM4 and through contacts *a* of relay DM7 holds DM7; the ground through its contacts *h*, conductor 2, cable 2707, conductor 2, contacts *a* of relays DT4 and DT7, lower windings of these relays to battery to hold these relays; and ground through its contacts *i*, conductor 3, cable 2707, conductor 3, contacts *a* of relays DU4 and DU7, lower winding of relays DU4 and DU7 to battery to provide a holding circuit for these relays.

Relay 1TR connects ground through contacts *d* and winding of 40 millisecond slow release relay RL to battery; at contacts *e* extends alarm lead 24 to the sender in preparation for an alarm signal if one should be forthcoming.

Also, relay 1TR closes ground through its contacts *j*, conductor 2708, through the windings of relays 2TR and 3TR in parallel to battery, operating these relays.

It should be noted that the E and L contacts of relay 1TR provide for holding relays DM4 and DM7, DT4 and DT7 and DU4 and DU7 before the original energizing circuits of these relays are opened.

Relay 2TR at its break contacts *a, c, e, g, i,* and *k* disconnects leads 1–6, which emerged from cable 2601, from the upper windings of relays DML, DM2, DM4, DM7, DT1, and DT2; and at its make contacts *b, d, f, h, j,* and *l* connects these leads into cable 2604. Similarly, relay 3TR at its break contacts *a, c, e, g, i,* and *k*, disconnects leads 7–12, which emerged from cable 2601, from the windings of relays DT4, DT7, DU1, DU2, DU4, and DU7; and at its make contacts *b, d, f, h, j,* and *l* connects these leads into cable 2604.

The sender receives information from the number group circuit as follows:

With relay 5H1 (FIG. 28) operated to indicate that the called 500 line group is the first 500 group, ground through the *b* contacts of relay 5B, conductor 3005, make contacts *a* of relay 5H1, conductor 13, cable 2808, cable 2208, conductor 13, associated contacts of winding B1–S1, cable 2707, to conductor 13 extends to sender 1 as the indication that the called subscriber is in the first 500 group.

With relay 4H (FIG. 28) operated to indicate that the called subscriber is in the fifth hundred line group of the selected 500 group, ground through make contacts *b* of relay HB, make contacts *b* of relay 4H, conductor 3, cable 2604, conductor 3, make contacts *f* of relay 2TR, cable 2601 over a circuit previously traced to the sender indicated to the sender that the called subscriber is in the fifth hundreds group.

With relay 6T (FIG. 29) operated, ground through contacts *b* of relay TB, contacts *b* and *g* of relay 6T, conductors 6 and 7, cable 2604, conductors 6 and 7 (FIG. 26), make contacts *l* of relay 2TR and *b* of relay 3TR, cable 2601 over a circuit previously traced to the sender indicates to the sender where conductors 6 and 7 individually emerge that the called subscriber is in the seventh tens group of equipment.

With relay 7U (FIG. 29) operated, ground through contacts *b* of relay UB, contacts *b* of relay 7U (not shown—see similar arrangement for 7T), conductor 12, cable 2604, conductor 12 (FIG. 27), make contacts *l* of relay 3TR, cable 2601 to the sender indicates to the sender that the called subscriber is on the eighth line.

With relay 1P operated, ground through contacts *b* of relay PB, contacts *b* of relay 1P, conductor 18, cable 2808, cable 2208 over a circuit previously traced to sender 1 where conductor 18 individually emerges indicated to the sender that the called party is party 1.

It may be observed that the relays 5H1–5H20 place ground on signal leads 13, 14, 15, 16, and 17 of cable 2808 which represents numerical values of 1, 2, 4, 8, and 15 respectively to the sender which adds the values to determine the 500 line group 1–20 represented by relays 5H1–5H20 respectively. This may be summarized by the following table:

| Relay operated | Leads grounded | Digital value of leads | Total value |
|---|---|---|---|
| 5H1 | 13 | 1 | 1 |
| 5H2 | 14 | 2 | 2 |
| 5H3 | 13 and 14 | 1 and 2 | 3 |
| 5H4 | 15 | 4 | 4 |
| 5H5 | 13 and 15 | 1 and 4 | 5 |
| 5H6 | 14 and 15 | 2 and 4 | 6 |
| 5H7 | 13, 14, and 15 | 1, 2, and 4 | 7 |
| 5H8 | 16 | 8 | 8 |
| 5H9 | 13 and 16 | 1, 8 | 9 |
| 5H10 | 14 and 16 | 2, 8 | 10 |
| 5H11 | 13, 14, and 16 | 1, 2, 8 | 11 |
| 5H12 | 15 and 16 | 4, 8 | 12 |
| 5H13 | 13, 15, and 16 | 1, 4, 8 | 13 |
| 5H14 | 14, 15, and 16 | 2, 4, 8 | 14 |
| 5H15 | 17 | 15 | 15 |
| 5H16 | 13, 17 | 1, 15 | 16 |
| 5H17 | 14, 17 | 2, 15 | 17 |
| 5H18 | 13, 14 and 17 | 1, 2, 15 | 18 |
| 5H19 | 15, 17 | 4, 15 | 19 |
| 5H20 | 13, 15, and 17 | 1, 4, 15 | 20 |

Also, it may be observed that relays 0H to 4H place ground on signal leads 1, 2, and 3 of cable 2604 which represent numerical values of 1, 2, and 4 respectively to the sender which adds the value to determine the hundreds group 1–5 represented by relays 0H–4H respectively. This may be summarized by the following table:

| Relay operated | Leads grounded | Digital value of leads | Total value | Called hundreds group represented |
|---|---|---|---|---|
| 0H | 1 and 3 | 1 and 4 | 5 | 1 |
| 1H | 1 | 1 | 1 | 2 |
| 2H | 2 | 2 | 2 | 3 |
| 3H | 1 and 2 | 1 and 2 | 3 | 4 |
| 4H | 3 | 4 | 4 | 5 |

Also, it may be observed that relays 0T to 9T place ground on signal leads 5, 6, 7, and 8 of cable 2604 which represent numerical values of 1, 2, 4, and 7 respectively to the sender which adds the value to determine the tens group 1–10 represented by relays 0T–9T respectively. This may be summarized by the following table:

| Relay operated | Leads grounded | Digital value of leads | Total value | Called tens group represented |
|---|---|---|---|---|
| 0T | 7 and 8 | 4 and 7 | 11 | 1 |
| 1T | 5 | 1 | 1 | 2 |
| 2T | 6 | 2 | 2 | 3 |
| 3T | 5 and 6 | 1 and 2 | 3 | 4 |
| 4T | 7 | 4 | 4 | 5 |
| 5T | 5 and 7 | 1 and 4 | 5 | 6 |
| 6T | 6 and 7 | 2 and 4 | 6 | 7 |
| 7T | 8 | 7 | 7 | 8 |
| 8T | 5 and 8 | 1 and 7 | 8 | 9 |
| 9T | 6 and 8 | 2 and 7 | 9 | 10 |

Similarly for relays 0U to 09 which place ground on signal leads 9–12 of cable 2604 which represent numerical values of 1, 2, 4, and 7 respectively to the sender which adds the values to determine the units group 1–10 represented by relays 0U to 9U respectively.

And lastly, it may be observed that relays 1P–14P place ground on signal leads 18, 19, 20, and 21 of cable 2808 one at a time, two at a time, and three at a time to the sender which interprets the signals as follows:

| Relays operated | Leads grounded | Called party on the line represented thereby |
|---|---|---|
| 1P | 18 | 1 |
| 2P | 19 | 2 |
| 3P | 18 and 19 | 3 |
| 4P | 20 | 4 |
| 5P | 18 and 19 | 5 |
| 6P | 19 and 20 | 6 |
| 7P | 21 | 7 |
| 8P | 18 and 21 | 8 |
| 9P | 19 and 20 | 9 |
| 10P | 20 and 21 | 10 |
| 11P | 18, 19 and 20 | 11 |
| 12P | 19, 20 and 21 | 12 |
| 13P | 18, 20, and 21 | 13 |
| 14P | 18, 19, 21 | 14 |

It should be observed that if the individual terminal P is crossconnected to P.B.X terminal 15, instead of to a party terminal 1–14, tube V60 fires operating P.B.X relay 15 which connects ground through contacts *b* of relay PB, make contacts *b* of P.B.X relay 15, P.B.X lead 4, to cable 2604 which emerges in FIG. 26 as lead 4 and passes through make contacts *h* of relay 2TR to conductor 4 entering cable 2601 to the sender which is the signal to the sender that a call to a P.B.X is in progress and causes the sender to add 5 to the hundreds digit signal sent to the code receiver of the subscribers line marker.

Although the indications are on conductors 13–21 in cable 2808 from the number group to signal to the sender, the sender awaits the indications on leads 1–12 in cable 2601 after relays 2TR and 3TR operate before releasing the sender-finder and number group circuits.

The sender (sender 1 in the assumed example) releases the sender-finder and number group circuits by removing ground from conductors 2201, 2202 and lead 22 of cable 2601, cable 2208, etc.

The order of removal of ground from these leads is immaterial as relay K1 (FIG. 25) remains operated until everything clears out holding the original operating circuits of relays T1–T7 and U1–U11 open. The removal of ground from these leads can be simultaneous. It is noted that the number group circuit cannot be reentered until relay K1 releases.

Removal of ground from conductor 2201 releases relay T1 which releases relays 1T1, 2T1 and TC. Removal of ground from conductor 2202 releases relay U1 which releases relay UC. Relays TC and UC remove their ground circuit from the winding of relay K.

Removal of ground from conductor 22 releases relays 1TR and TST. Relay RL however closed its *b* contacts when 1TR originally operated it through contacts *d* of relay 1TR and now with the *d* contacts of 1TR open, relay RL takes 40 milliseconds to release. Open contacts *a* of relay RL prevent relay TST from reoperating. Relay TST removes its ground from conductor 3103 connected to the winding of relay K1.

Relay 1TR opens the holding circuits of relays DM1 to DM7, DT1 to DT7, and DU1 to DU7 so that the operated ones of these relays (DM4, DM7, DT4, DT7, DU4, and DU7 in the assumed example) release.

Relay 1TR releases relays 2TR and 3TR which disconnect the reporting leads through their contacts and reconnect the upper windings of relays DM1 to DM7, DT1 to DT7, and DU1 to DU7 to cable 2601 in preparation for their reoperation, but the sender has disconnected ground from these operating circuits.

The release of relay TST disconnects the 250 volt positive battery supply from the resistors such as 2602′ associated with the gas tube groups (such as 2604) and simulaneously disconnects the 250 volt positive battery supply from the voltage-divider which supplies 160 volts positive potential to tubes V1A to V60. Any fired tubes cease conducting and any associated operated relays of the groups 5H1–5H20, 0H–4H, 02–9T, 0U–9U, 1P–14P and PBX release. Accordingly as per the assumed example relays 5H1, 4H, 6T, 7U, and 1P release.

Thereupon, the circuits of the associated relays 5B, HB, TB, UB, and PB release, removing their ground circuits from conductor 3103 to relay K1 of FIG. 25.

When relay K1 releases, it reconnects ground through its break contacts *c* and *b* to the original operating circuits of relays T1 to T7 and U1 to U11 in preparation for the next calling sender to engage the sender-finder and number group circuit.

It should be observed that the circuit of windings A1–S1 and B1–S1 are opened by the release of relays 1T1, U1 and UC, causing these relays to open their contacts 1–12 and 13–24 respectively disconnecting the leads from the sender to the sender-finder and number group circuits.

It should be observed that conductors 1–0 in cable 2602 fan out with conductor 0 being connected to the resistors of all individual tube groups in the first thousands group, the hundreds digit of which is 0; conductor 1 being connected to the resistors of all individual tube groups the hundreds digit of which is 1; etc.

In larger installations, number group circuits may comprise 2000 instead of 1000 directory numbers.

It should also be observed that the corresponding conductors 1–0 in cable 2611 fan out with conductor 0 being connected to the resistors of all individual tube groups in the second thousand group, the hundreds digit of which is 0; conductor 1 being connected to the resistors of all individual tube groups the hundreds digit of which is 1; etc.

It should also be observed that conductors in cable 2703 from the common contact fan of relays DT1 to DT7 divide into parallel conductors of cables 2703*a* and 2703*b* and that the conductors individually emerge with conductor 0 from 2703*a*, for example, being connected to tube 2605′ (and to all corresponding tubes in individual tube groups whose tens digit is 0) in the first thousand group; and that the parallel conductor from cable 2703*b* emerges and is connected to the tube 2716′ (and to all corresponding tubes in individual tube groups whose tens digits is 0) in the second thousand group; that conductor 1 from cable 2703*a*, for example, is connected to tube 2612 (and to all corresponding tubes in individual tube groups whose tens digit is 1) in the first thousand group and that parallel conductor 1 emerges from cable 2703*b* and is connected to a corresponding tube (not shown and to all corresponding tubes in individual tube groups whose tens digit is 1) in the second thousand group; etc.

Similarly, the conductors 1–0 of cable 2704 from the common contact fan of relays DU1 to DU7 divide into parallel conductors of cables 2704*a* and 2704*b* and that the conductors individually emerge conductor 0 from the cable 2704*a*, for example, being connected to tube 2606′ (and to all corresponding tubes in individual tube groups whose units digit is 0) in the first thousands group; and that parallel conductor 0 emerges from cable 2704*b* and is connected to tube 2716 (and to all corresponding tubes in individual tube groups whose units digit is 0) in the second thousand group; etc.

Calls from a sender to the first thousand directory numbers are essentially the same as that already described.

If the call from a sender is to the second thousand directory numbers, the sender operates relay T2H at the same time or slightly before the operation of relays of the groups DM1 to DM7, DT1 to DT7, and DU1 to DU7.

With no strap shunting its break contacts *a*, relay T2H prepares a circuit for 250 volt positive battery source to the lower fan of contacts of relays DM1 to DM7 and thence to the second thousand tube group represented by the individual tube groups 2710, 2711, and 2712 (FIG. 27) instead of the first thousand tube group represented by the individual tube groups 2604 to 2709 (FIGS. 26, 27).

When the operation of relays in the groups DM1 to DM7, DT1 to DT7, and DU1 to DU7 operates relay TST, this circuit may be traced from the positive 250 volt supply over the one ampere fuse, contacts *a* of relay TST, contacts *b* of relay T2H, lower contact fan of relays DM1 to DM7, to the resistors such as 2713, 2714, and 2715 of the individual tube groups associated with the second thousand directory numbers.

It should be observed that corresponding tubes such as 2605′ of the first thousand group and 2716′ of the second thousand group are both connected together and run through to cable 2703 to the common contact fan of relays DT1 to DT7. Also that corresponding tubes 2606′ and 2716 of the first and second thousand groups are similarly tied together and run through the cable 2704 to common contact fan of relays DU1 to DU7.

Accordingly, with relay T2H nonoperated, 250 volt positive battery reaches the individual tube groups associated with the first thousand called directory numbers only, whereas with T2H operated, the 250 volt positive battery reaches the individual tube groups associated with the second thousand called directory numbers only.

Accordingly, ground through the common contact fans of relay groups DT1 to DT7 and DU1 to DU7 is only effective in those individual tube groups which have ground connected to their resistors.

The terminals from the individual tube groups corresponding to the second thousand directory numbers are cross-connected in similar manner to those for the first thousands group. That is, the 500 line group terminal of each individual tube group may be cross-connected to the one of the forty 500 group terminals defining the 500 group in which the called line is situated. It should be noted that the firing of tubes V1B to V20B result in relays 5H21 to 5H40 operating. The "M" terminal may be crossconnected to the one of the hundreds terminals defining the hundred group of the 500 group containing the called line. The "T" terminal may be crossconnected to the one of the tens terminals defining the tens group of the hundreds group containing the called line. The "U" terminal may be crossconnected to the one of the units terminals defining the unit of the tens group containing the called line. The "P" terminal may be connected to the party terminal defining the party on the line which is the called party. In the case of calls to P.B.X lines the "P" terminal is connected to P.B.X terminal 15 which defines that the call is a P.B.X call and results in a signal via lead 4 in cable 2601 etc., to the sender.

The 500 line group signal to the sender enables the sender to transmit two successive decimal representing signals to the group selector marker code receiver to enable the associated marker to select an idle CRB circuit on the said 500 group level of the GSB crossbar switches (in the case where there is only one group selection stage).

The hundreds, tens, and units signal to the center enable the sender to transmit three successive decimal signals accordingly to the code receiver of the subscriber's line marker which indicates to the marker the one line out of 500 lines which is the called line. The subscriber's line marker in accordance with the signals received chooses one out of 20 SLA circuits, chooses the combination horizontal magnet involved, and selects the line selective horizontal magnet involved.

The party signal to the sender enables the sender to transmit to the CRB circuit a signal (one out of 14) to indicate which party on the line is to be rung out of the CRB circuit.

The P.B.X signal to the sender enables the sender to transmit a hundreds digit to the code receiver in the subscriber line marker which is just "5" above what it otherwise would be, to inform the subscribers line marker that the call is to a P.B.X or multiple line group and to treat it accordingly. In this case, the CRB not receiving a selective ringing code, rings the P.B.X line or line in a multiple line group with a predetermined frequency.

If one of the relays 5H21 to 5H40 representing the 21st to 40th 500 line group of called lines equipment-wise is operated over cable 2903 by the firing of one of the tubes V1B to V20B instead of one of the relays 5H1 to 5H20 by the firing of one of the tubes V1A to V20A, relay 6B operates over the "only one operated" associated contact chain, in turn placing ground on observation lead HA through its *a* contacts; connecting ground to its signaling fan at contacts *b*; placing a holding ground on associated relay 6A through contacts *c* of relay 6B; and connects a ground circuit through its contacts *d* to lead K1 via cable 3103.

Relay B1 operates over a circuit extending from ground over make contacts *g* of relays HB, TB, UB and PB via conductor 3104, contacts *e* of relay 6B, and the winding of relay B1 to battery.

Relay B1 operates to place positive 48 volt battery over resistor 2904 and conductor 2903 to the sender in contra-distinction to the negative 48 volt battery through resistor 3003, make contacts *e* of relays PB, UB, TB, HB, and 5B, conductor 3004, and break contacts of relay B1 or strapping placed on conductor 2903, to the sender by the operation of relay 5B incident to the operation of one of the relays 5H1 to 5H20. The sender is thereby informed that the signals on leads 13–17 which are multipled between the relays 5H1 to 5H20 and 5H21 to 5H40 apply to the 21st to 40th 500 line groups instead of to the 1st to 20th 500 line groups.

XII. MORE DETAILED DESCRIPTION OF GROUP SELECTION ARRANGEMENTS

Referring now to FIGURE 32, from left to right are seen the front and back of two switchboard frames; each frame containing on the front, three jack and plug removably mounted GSA switches, four jack and plug removably mounted GSB switches, and one jack and plug removably mounted relay marker. Each frame on the back side thereof locates three more jack and plug removably mounted GSA switches, and four jack and plug removably mounted GSB switches.

The mechanical mounting and the jack and plug arrangement is of the nature of that seen in FIGURES 10 and 10–A and described in section V–A. Each GSA, GSB, and marker panel is supported in a slot in the frame on both the left and right and has its plug and jack members on the right. The conductors to and from each GSA, each GSB, and each marker panel pass through the plug and jack members. It is of worthy consideration therefore to keep the number of conductors passing through these plug and jack members to a minimum.

Each GSA and each GSB switch has six plug and jack units associated therewith; and each marker has twenty-two plug and jack units associated therewith.

FIGURE 33 schematically illustrates six GSA and GSB frames each frame comprising both front and back sections as shown on FIGURE 32 and comprising six GSA switches and eight GSB switches. There are as many markers as there are frames. Each marker serves its associated frame; but the markers of two frames in pairs as shown in FIGURE 33 can serve another associated frame.

In general there will be as many group selector frames as there are 500 groups of lines.

As indicated in FIGURE 44–A, and as will be described in more detail hereinafter, a frame comprises six GSA switches including 60 verticals which are inputs; and eight GSB switches comprising 80 verticals and 400 outlets. The same figure also indicates that when the size of the switchboard and the traffic so dictates, 40 GSA verticals might be used with 80 GSB verticals (i.e., 4 GSA switches with 8 GSB switches); or 20 GSA verticals might be used with 80 GSB verticals (i.e., 2 GSA's with 8 GSB's), or 20 GSA verticals might be used with 40 GSB verticals (i.e., 2 GSA's might be used with 4 GSB's).

However the group selector stage should not be considered as related to any specific 500 input groups but should be considered as a means of providing routing from so many required inlets to so many required outlets in groups on levels; the total number of inlets on the GSA switches being the maximum possible number of simultaneous connections through the group selector stage. Each level leads to a distinct destination such as a local 500 line group or a trunk group, such as inter-office trunks, toll trunks, free service trunks, service trunks, etc.

Each connection through the group selection stage comprises four wires.

Referring now to the left side of FIGURE 34 which we shall call the top of the switch, ten inputs of four wires each enter the GSA switch and branch in parallel to the HA and HB horizontal contacts.

Energization of the HA coil attracts the HA portion of the armature associated with horizontal bar 501 (FIGURE 5) thus preparing the four left contacts of each crosspoint of the vertical pileup; whereas energization of the HB coil attracts the HB portion of the armature associated with the horizontal bar 501, thus preparing the four right contacts of each crosspoint.

Energization of each horizontal coil attracts the associated armature portion of the associated horizontal bar thus preparing the associated contacts as described hereinbefore (see FIGURE 5).

The horizontal contacts of the ten vertical pileups prepared by the energization of the horizontal 1 coil are shown in FIGURE 34.

It should be noted that corresponding horizontal contacts associated with inputs 1 to 5 are multipled; also corresponding horizontal contacts associated with inputs 6 to 10 are multipled.

Thus with the HA coil and the horizontal 1 coil energized all contacts associated with combination coil HA and horizontal 1 are prepared for operation. When the vertical 1 magnet associated with input is operated, only the contacts of those prepared associated with vertical 1 are operated and the four conductors of input 1 are routed through the HA contacts, through the left horizontal 1 contacts to cable 1.

If vertical 2 magnet associated with input 2 had been operated instead of the vertical 1 magnet, the four conductors of input 2 would be routed to trunk 1; similarly for inputs 3, 4, and 5 to cable 1.

With the HB coil and the horizontal 1 coil energized, followed by the energization of the vertical 1 magnet; the four conductors of input 1 are routed through the HB contacts, through the right horizontal 1 contacts to cable 41.

If vertical 2 magnet had been operated, the four conductors of input 2 would be routed to cable 41; similarly for inputs 3, 4, and 5.

With the HA coil and the horizontal 1 coil energized, followed by the energization of the vertical 6 magnet associated with input 6, the four conductors of input 6 are routed through the HA contacts, through the left horizontal 1 contacts to cable 2.

If vertical 7 magnet associated with input 7 had been operated instead of the vertical 6 magnet, the four conductors of input 7 would be routed to cable 2; similarly for inputs 8, 9, and 10 to cable 2.

With the HB coil and the horizontal 1 coil energized, followed by the energization of the vertical 6 magnet, the four conductors of input 6 are routed through the HB contacts, through the right horizontal contacts to cable 42.

If the vertical 7 magnet had been operated instead of the vertical 6 magnet, the four conductors of input 7 would be routed to cable 42; similarly for the inputs 8, 9, and 10 to cable 42.

As all inputs and outputs of the GSA switches pass through the jack and plug units shown in FIGURE 32, it should be appreciated that with the multipling of cables to five different verticals, the number of leads which must be passed through the jack and plug units does not exceed the number of leads which it is practical to pass through the jack and plug units. For example cable 1 requires four connections through the jack and plug units to reach inputs 1–5. Thus the method of arranging the wiring of the crossbar GSA switches and the method of multipling allow plug-and-jack detachable GSA units. Also all GSA switches are identically wired internally and to the plug so that they are interchangeable.

It should be noted that cables 1, 41, 2, 42, and other cables from GSA switches enter the cable designated K.

Referring now to FIGURE 35, cable K will be found to sub-divide into cables 1–10 which are inputs to the GSB–1 switch.

Each of these cables comprises four conductors.

With the HA coil and the horizontal 1 coil energized and the vertical magnet associated with input No. 1 operated, the No. 1 input (vertical) comprising four conductors is extended to trunk on level 1, the term trunk being used in the generic sense.

If the vertical magnet associated with input No. 2 had been operated instead of the vertical magnet associated with the No. 1 input, the No. 2 input comprising four conductors would have been extended to trunk 1 on level 1; similarly for inputs No. 3 and 4 to trunk 1 on level 1.

With the HB coil and the horizontal 1 coil energized and the vertical magnet associated with input No. 1 operated, the No. 1 input comprising four conductors is extended to trunk 1 on level 11.

If the vertical magnet associated with input No. 2 had been operated instead of the vertical magnet for input No. 1, the input No. 2 would have been extended to trunk 1 on level 11. Similarly for inputs No. 3 and 4 to trunk 1 on level 11.

With the HA coil and the horizontal 1 coil energized and the vertical magnet associated with input No. 5 operated, the input No. 5 comprising four conductors is extended to trunk 2 on level 1.

If the vertical magnet associated with input No. 6 had been operated instead of the vertical magnet associated with input No. 5, the No. 6 input comprising four conductors would have been extended to trunk 2 on level 1. Similarly for inputs No. 7 and 8 to trunk 2 on level 1.

With the HB coil and the horizontal 1 coil energized and the vertical magnet associated with input No. 5 operated, input 5 would be extended to trunk 2 on level 11.

If the vertical magnet associated with input No. 6 had been operated instead of the vertical magnet associated with input No. 5, the No. 6 input would be extended to trunk 2 on level 11. Similarly for inputs No. 7 and 8 to trunk 2 on level 11.

With the HA coil and the horizontal 1 coil energized and the vertical magnet for input No. 9 operated, the No. 9 input comprising four conductors will be extended to trunk 3 on level 1.

If the vertical magnet for input No. 10 had been operated instead of the vertical magnet for input No. 9, the input No. 10 comprising four conductors would be extended to trunk 3 level 1.

With the HB coil and the horizontal 1 coil energized and the vertical magnet for input No. 9 operated, the No. 9 input would be extended to trunk 3 level 11.

If vertical coil 10 had been operated instead of vertical coil 9, input No. 10 would be extended to trunk 3 level 11.

Certain leads from the GSB–2 switch of unit No. 1 are seen connected to the corresponding leads of the GSB–1 switch of unit No. 1 via conductors 3501 and 3502. This will be explained in more detail hereinafter.

It should be understood that while only one set of horizontal contacts representing horizontals 1 and 11 of a GSA switch and similarly of a GSB switch have been shown, nine more sets of horizontal contacts in each GSA switch and in each GSB switch are similarly arranged.

The multipling horizontally of corresponding contacts associated with verticals 1, 2, 3, and 4 reduces the number of contacts passing through jack and plug units; so also the multipling horizontally of corresponding contacts associated with verticals 5, 6, 7, 8; and similarly for verticals 9 and 10. This minimizing of leads passing through the jack and plug units is a very pertinent factor in making possible detachable plug and jack group selector switches.

Referring now to FIGURES 37–43 and arranging them according to the pattern of FIGURE 36 which is an assembly diagram for FIGURES 37–43, we find a more generalized schematic as to how the GSA and GSB switches are arranged and interconnected to switch from 60 inputs to 400 outputs, i.e. 30 outputs per level on 20 levels.

More specifically, in the upper left of FIGURE 37 we find ten inputs (from GRA's or trunks, the term trunk here used in the more restricted sense) to the ten vertical pileups of the GSA–1 switch of unit 1. Each input comprises four conductors which may be switches through the cross point contacts of the GSA and GSB switches to outputs which are generically indicated as trunks. Each vertical shown represents these four conductors which descend to the cross point contacts through which they are switched to horizontals, each horizontal comprising four conductors.

For simplicity each vertical, while comprising four conductors is shown as a single vertical line and each horizontal while comprising four conductors is shown as a single horizontal line. Each cross-point while comprising contacts for switching the four input conductors of the associated vertical to the four conductors of the associated horizontal, is shown as the intersection of the vertical and horizontal line.

The GSA switch is divided electrically and vertically into two sections.

Thus the first five inputs, by the energization of horizontal combination and select magnets and the operation of associated vertical hold magnets as described hereinbefore are selectively extended to one of twenty different cables leading via a common cable K to various GSB switch inputs.

Similarly the last five inputs, by the energization of combination and select magnets and operation of the associated vertical magnets are selectively extended to one of twenty more different cables leading via a common cable K to various GSB switch inputs.

It should be understood that by operation of two combination coils and ten select coils twenty different horizontal levels are determined, and in FIGURES 37–43 these twenty levels are simply drawn as twenty horizontal lines. Furthermore the twenty horizontal lines are split in the middle in the GSA switches giving two outputs on each level. Similarly the twenty horizontal lines are slipped into these sections in the GSB switches giving three outputs on each level. To the left of the twenty horizontals are indicated the coils which determine the various horizontals.

From the diagram of FIGURES 37–43 it can be seen that any of inputs 1–5, of switch GSA–1 of unit 1, by the operation of coils HA and 1 are selectively extended to cable 1.

Similarly any of inputs 1–5 of switch GSA–2 of unit 1 by the operation of coils HA and 1 are selectively extended to cable 1.

Similarly any of inputs 1–5 of switch GSA–3 of unit 1 by the operation of coils HA and 1 are selectively extended to cable 1.

It should be understood that the four conductors of cable 1 which emerge from cable K, divide in parallel and enter switches GSA–1, GSA–2, and GSA–3. Looked at from the other direction, each of the four conductors entering cable 1 from switches GSA–1, GSA–2, and GSA–3 join respectively in parallel and pass as four conductors through cables 1 and K and emerge from cable K as the No. 1 input to switch GSB–1. Of course, in FIGURES 37–43 single lines represent four conductors.

Returning now to the GSA–1 switch, the energization of coils HA and 1 and the operation of the vertical magnet of any input 6–10 extends this input to cable 2 which is joined by similar cables from GSA–2 and GSA–3, which pass through cable K and emerge from cable K as the No. 2 input to GSB–1.

Similarly the energization of coils HA and 4 and the operation of the vertical magnet of any input 1–5 extends this input to cable 11 which is joined by corresponding cables from GSA–2 and GSA–3, which pass through cable K and emerge from cable K as the No. 11 input to the GSB–2 switch. This is the first input to switch GSB–2 of unit 1 labeled 1 on the second switch from the top of unit 1 of FIGURE 44.

The energization of coils HA and 4 and the operation of the vertical magnet of any input 6–10 extends this input to cable 12 which is joined by similar cables from GSA–2 and GSA–3, which pass through cable K and emerge from cable K as the No. 12 input to GSB–2.

The energization of coils HB and 1 and the operation of the vertical magnet of any input 1–5 extends this input to cable 41 which is joined by corresponding cables from GSA–2 and GSA–3, which pass through cable K and emerge as input 41 to GSB–1 of unit 2. This is the first input to switch GSB–1 of unit 2, labeled 1 on switch 1 of unit 2 of FIGURE 44.

In other words corresponding outputs of GSA–1, GSA–2, and GSA–3 are in multiple.

Turning now to the GSB–1 crossbar switch of FIGURE 39, we find inputs 1–10 to the GSB–1 switch emerging from cable K. As before stated, these inputs each comprise four conductors from the GSA switches but each inlet is shown as a single line. While two combination coils and ten select coils determine twenty horizontals electrically in each GSB switch arranged as indicated in FIGURE 35, the twenty horizontals are shown in FIGURE 39 on twenty different levels.

As will be appreciated from the description of FIGURE 35, on a given level, the contacts associated with inputs (verticals) 1–4 are mutlipled and emerge as a trunk (the term trunk being used in the generic sense); the contacts associated with inputs (verticals) 5–8 are multipled and emerge as a trunk; and the contacts associated with inputs 9 and 10 are multipled and emerge as a trunk; thus giving three trunks (outputs) in one GSB switch on a given level.

To the left of the horizontals (see FIGURE 39) are given the coils which when energized determine the horizontal.

Thus with the operation of coils HA and 1 (see FIGURE 39) and the operation of any vertical magnet of verticals 1–4, any input 1–4 is connected to trunk 1 level 1.

Similarly with the energization of coils HA and 1 and the operation of either vertical magnet 9 or 10 associated with inputs 9 and 10 the associated input is connected to trunk 3 level 1.

With the energization of coils HA and 2 and the operation of the vertical magnet associated with any input 1–4, the associated input is connected to trunk 1 level 2.

Similarly with the energization of coils HA and 2 and the operation of any vertical magnet associated with inputs 5–8, the determined input is connected to trunk 2 level 2.

Similarly with the energization of coils HA and 2 and the operation of either vertical magnet 9 or 10, the associated input is connected to trunk 3 level 2.

With the energization of coils HB and 1 and the operation of any vertical magnet 1–4, the associated input is connected to trunk 1 level 11.

Similarly with the energization of coils HB and 1 and the operation of any vertical magnet 5–8, the associated input is connected to trunk 2 level 11.

Similarly with the energization of coils HB and 1 and the operation of either vertical magnet 9 or 10, the associated input 9 or 10 is extended to trunk 3 level 11.

It will be seen in FIGURE 40 that inputs 11–20 emerging from conductor K enter the GSB–2 switch of unit 1. These inputs are those labeled 1–10 respectively of switch 2 unit 1 in FIGURE 44.

In this switch by the energization of coils HA and 1 and the operation of appropriate vertical magnets, inputs 11–14 are connected to trunk 4 level 1; inputs 15–18 are connected to trunk 5 level 1; and inputs 19 and 20 are connected to trunk 3 level 1 in multiple with the connection from inputs 9 and 10 of switch GSB–1 to trunk 3 level 1. These last connections are shown in FIGURE 35 as involving four wires designated 3502.

Similarly by the energization of coils HB and 1 and the operation of appropriate vertical magnets, inputs 1–4 are connected to trunk 4 level 11; inputs 5–8 are connected to trunk 5 level 11; and inputs 9 or 10 are connected to trunk 3 level 11. These last connections are shown in FIGURE 35 as involving four conductors and are designated 3501.

It should be observed that the following cables emerging from cable K are connected as inputs to the GSB switches as follows:

| | | |
|---|---|---|
| 1–10 | GSB–1 | Unit 1 |
| 11–20 | GSB–2 | Unit 1 |
| 21–30 | GSB–3 | Unit 1 |
| 31–40 | GSB–4 | Unit 1 |
| 41–50 | GSB–1 | Unit 2 |
| 51–60 | GSB–2 | Unit 2 |
| 61–70 | GSB–3 | Unit 2 |
| 71–80 | GSB–4 | Unit 2 |

While one cable K interconnecting the GSA's and GSB's has been shown, it should be understood that a plurality of cables may be used.

It should also be observed that each GSB switch has twenty levels, with outputs to three trunks of each level.

It should be further observed that the GSB switches are paired so that the third trunk on each level is shared by the two GSB switches in the pair.

This becomes clearer by reference to FIGURES 41–43.

The output trunks connected to the switches are summarized in the following table. Thus on each level we find trunks connected to the GSB switches as follows:

| Switches | Trunks |
|---|---|
| GSB–1 Unit 1<br>GSB–2 Unit 1 | 1– 5 |
| GSB–3 Unit 1<br>GSB–4 Unit 1 | 6–10 |
| GSB–1 Unit 2<br>GSB–2 Unit 2 | 11–15 |
| GSB–3 Unit 2<br>GSB–4 Unit 2 | 16–20 |

A very succinct way of summarizing the connections through the GSA and GSB switches is given in FIGURE 44.

The GSA switches are represented by six rectangular boxes arranged in two groups of three each, the left group comprising unit 1 and the right group, unit 2.

The GSB switches are represented by eight irregular rectangular boxes, the four upper boxes comprising unit 1 and the four lower, unit 2.

Inside the boxes, the circles represent inputs or verticals which are numbered.

The short line connected to each circle represents all twenty of the horizontals accessible to that vertical.

Thus keeping FIGURES 37–43 in mind, the interpretation of FIGURE 44 is as follows:

The five inputs or verticals 1–5 of switch GSA–1, unit 1 each have access through the twenty horizontals of GSA–1 to each of the verticals 1, 5, and 9 of GSB–1 unit 1; 1 and 5 of GSB–2 unit 1; 1, 5, and 9 of GSB–3 unit 1; 1 and 5 of GSB–4 unit 1; 1, 5, and 9 of GSB–1 unit 2; 1 and 5 of GSB–2 unit 2; 1, 5, and 9 of GSB–3 unit 2; and 1 and 5 of GSB–4 unit 2.

The five inputs or verticals 1–5 of switches GSA–2 of unit 1 and GSA–3 of unit 1 are in multiple with the associated verticals of GSA–1 unit 1 and have access to the same GSB verticals related above to which verticals 1–5 of GSA–1 unit 1 have access.

The five inputs 6–10 of each switch GSA–1, GSA–2, and GSA–3 of unit 1 each have access through their associated twenty horizontals to verticals 2, 6, and 10 of switch GSB–1 unit 1; 2 and 6 of switch GSB–2 unit 1; 2, 6, and 10 of switch GSB–3 unit 1; 2 and 6 of switch GSB–4 unit 1; 2, 6, and 10 of GSB–1 unit 2; 2 and 6 of GSB–2 unit 2; 2, 6, and 10 of GSB–3 unit 2; and 2 and 6 of GSB–4 unit 2.

Similarly each of the inputs or verticals 1–5 of each switch GSA–1, GSA–2, and GSA–3 of unit 2 have access through their associated twenty horizontals in parallel to each of the verticals 3 and 7 of GSB–1 unit 1; 9, 3, and 7 of GSB–2 unit 1; 3 and 7 of GSB–3 unit 1; 9, 3, and 7 of GSB–4 unit 1; 3 and 7 of GSB–1 unit 2; 9, 3, and 7 of GSB–2 unit 2; 3 and 7 of GSB–3 unit 2; and 9, 3, and 7 of GSB–4 unit 2, etc.

Referring now to the GSB's, each of the inputs (verticals) 1, 2, 3, and 4 of GSB–1 unit 1 have access through their associated twenty horizontals to each of twenty outputs or trunks (used in the generic sense). These twenty trunks are the first trunk on each of the twenty levels of switch GSB–1 unit 1. It should be appreciated that trunk 1, for example, connected horizontal defined by HA, 1 (FIGURE 39) is multipled horizontally to each of verticals 1–4.

Each of verticals 5–8 of GSB–1 unit 1 have access to each of twenty outputs or trunks which are the second trunk on each of the twenty levels of switch GSB–1 unit 1.

Each of verticals 9 and 10 of GSB–1 unit 1 and 9 and 10 of GSB–2 unit 1 (numbered 19 and 20 in FIGURE 40) have access through their associated twenty horizontals to each of twenty trunks. These trunks are trunk 3 on each of the twenty levels of switches GSB–1 and GSB–2 of unit 1.

Each of verticals 1–4 of GSB–2 unit 1 (numbered 11–14 in FIGURE 40) have access to each of twenty trunks. These trunks are trunk 4 on each of the twenty levels of GSB–2 unit 1, etc.

Thus, for example, input (vertical) 6 of switch GSA–3 unit 2 through one of the horizontals to which it has access can reach input (vertical) 8 of GSB–4 unit 2 which can be connected through one of the horizontals to which it has access, to trunk 20 in each of twenty levels.

It should be observed that the trunks of any level are distributed across the GSB switches.

If the size of the installation so warrants, only GSA–1 of unit 1 and GSA–1 of unit 2 may be initially equipped and GSB–1, GSB–2, GSB–3, and GSB–4 of unit 1, giving access from 20 inlets to ten trunks on each of twenty levels. Also the levels may be combined in pairs so that twenty trunks over two levels may be used to enter a particular 500 line group for example. In this case, the group selector marker tests the ten trunks on the first level of the pair and then the ten trunks on the second level of the pair. In effect two levels may be used as one level. Also, three or four levels may be combined to give one level of 30 or 40 trunks for example.

Referring now to FIGURE 44–B, an alternate arrangement adapted to small systems is presented. The interpretation of this schematic is as follows.

Looking at FIGURE 44–B now and not trying to associate all details of FIGURES 37–43 with FIGURE 44–B inasmuch as FIGURES 37–43 show in detail what is shown in abbreviated form in FIGURE 44, it should be recalled with reference to FIGURES 37–44 that each GSA switch has split horizontals, i.e. a left group of twenty horizontals and a right group of twenty horizontals. Each of the first five verticals 1–5 (inlets) of switch GSA–1 has access to the left group of twenty associated horizontals (see FIGURE 37). The first ten of these horizontals (see FIGURES 37 and 44–B) have access individually and respectively to verticals 1, 5, and 9 of switch GSB–1; verticals 1 and 5 of switch GSB–2, verticals 1, 5, and 9 of switch GSB–3; and to verticals 1 and 5 of switch GSB–4. The last ten of these horizontals (see FIGURES 37 and 44–B) have access individually and respectively to verticals 2, 6, and 10 of switch GSB–1; verticals 2 and 6 of GSB–2; verticals 2, 6, and 10 of GSB–3; and to 2 and 6 of GSB–4. Each of the last five verticals 6–10 (inlets) of switch GSA–1 has access to the right group of twenty associated horizontals (see FIGURE 37). Thus the GSA switches are split electrically into left and right sections in the same fashion as the GSA switches of FIGURE 44 and FIGURES 37–43.

The first ten horizontals of the right side of the GSA switch (see FIGURES 37 and 44–B) have access individually and respectively to verticals 3 and 7 of GSB–1; 9, 3, and 7 of GSB–2; 3 and 7 of GSB–3, and 9, 3, and 7 of GSB–4.

The last ten horizontals of the right side of the GSA switch (see FIGURES 37 and 44–B) have access individually and respectively to verticals 4 and 8 of GSB–1; 10, 4, and 8 of GSB–2; 4 and 8 of GSB–3; and 10, 4, and 8 of GSB–4.

It should be recalled that with reference to FIGURES 37–44, the GSB switch has split horizontals; a left group of twenty horizontals being accessible from verticals 1–4; a center group of twenty horizontals being accessible from verticals 5–8; and a right set of twenty horizontals being accessible from verticals 9 and 10.

Referring back to FIGURE 44–B and keeping FIGURE 39 in mind, the first four verticals (1–4) of GSB–1 have access through the left group of twenty horizontals to trunk No. 1 on each of twenty levels; the next four verticals (5–8) have access through the center group of twenty horizontals to trunk No. 2 on each of twenty levels; and the last two verticals 9 and 10 through the right group of twenty horizontals to trunk No. 3 on each of twenty levels. With four GSB switches equipped, ten trunks on each of twenty levels are accordingly provided.

The three GSA switches GSA–1, GSA–2, and GSA–3 are in multiple in similar fashion to that explained with reference to FIGURES 37–44.

GSB–1 and GSB–2 share trunk 3 in similar fashion to that explained with reference to FIGURES 37–44.

When a group selector having less than 30 inlets is required, it is possible to start with one GSA switch of 10 inlets and to add inlets by plugging in one cross bar switch GSA at a time.

Also it is possible to start with say two GSB switches and to add additional GSB switches by plugging them in when additional trunks are required by traffic considerations. If two GSB switches only are equipped, the levels can be used in pairs giving a total of ten trunks on levels 1 and 2 in combination. Levels 1 and 2 then lead to the same line group or outgoing trunk group.

Summarizing: Inlets are added by adding GSA switches. Trunks per level are added by the addition of GSB switches.

Thus the methods of trunking at the group selector stage permit a flexibility on a plug-in basis so that the group selection stage is adaptable to small or exchanges as well as large and can grow with increased demand.

XIII. MORE DETAILED DESCRIPTION OF CERTAIN OTHER CIRCUITS LEO, SLA, LEP, SLB, SRL, SLC, CRB, LCT

The origination of a call and its extension through the SLA circuit was described in section V–B which was part of section V on the subscriber's link A. It should be recalled that section V discussed both the mechanical aspects and circuitry of the plug-in SLA unit.

At this point the call is traced through additional detailed circuitry which for purposes of simplification was not included in section II.

When a calling subscriber lifts his receiver, closing his line loop, line relay LR17 (FIGURE 12) operates.

Relay LR17 at its make contacts 12, closes a circuit from 20 cycle alternating current over lead 4601 (FIGURE 46), break contacts 4602 of relay AV, 10,000 ohm resistor, lead 1201 to SLA–1 (FIGURE 12), break contacts *a* of manual busy key BK (FIGURE 13), lead 1201*a*, contacts 12 of relay LR17 (FIGURE 12), lead 1202, break contacts *a* of relay 3L1 (FIGURE 46), break contacts *c* of relay 2AW, break contacts 4603 of relay AV, winding of polarized relay AG to ground, a condenser and resistor being in parallel with the winding of relay AG.

Relay AG vibrates in synchronism with the 20 cycle alternating current and connects ground alternately over contacts 4604 to conductor 4606 to subscriber's line marker SLM–1 and over contacts 4605 and lead 4607 to subscriber's line marker SLM–2.

Conductor 4606 leads through a relay in SLM–1 which is connected back over conductor 4608 and a 1000 ohm resistor to battery. Similarly conductor 4607 leads through a relay in SLM–2 which is connected back over conductor 4608 and 1000 ohm resistor to battery.

The 1000 ohm resistor so reduces the current that if two such relays in the markers try to operate successively the first to operate, will close conductor 4608 to its locking ground, inhibiting the other.

The relay in the subscriber's line marker which successfully operates, locks, and results in ground being placed on lead 4609 in the marker, thus operating relay AV.

At the same time that relay AV is operated, the marker places ground on lead 4619 shunting relay AG.

Relay AV opens the circuit of relay AG at contacts 4603 and disconnects the 20 cycle alternating current at contacts 4602.

Relay AV then signals the marker SLM–1 that the call is proceeding through the first crossbar switch i.e. SLA–1 by closing the following circuit: ground, contacts 4610, break contacts *c* of relay 2AW, break contacts *a* of relay 3L1, conductor 1202 associated with line 17, contacts 12 of relay LR17 (FIGURE 12), conductor 1201*a*, break contacts *a* of busy key (FIGURE 13), conductor 1201, and conductor 4611 (FIGURE 46) to the marker. It should be observed that if SLA switch No. 2 were signalling, this path would extend over conductors 4612 and 4613 to the subscriber's line marker SLM–1, so informing SLM–1, etc. It should also be noted that certain multiple circuits exist to SLM–2 so that the line group may be secured by either subscribers line marker.

Subscribers line marker SLM–1 then places ground over cable 4614, to lead 4615 (otherwise labeled 11), operating relays 1AW, 2AW, and 3AW in parallel to battery; and places ground on lead 4616 (otherwise labeled 1), operating relays 1L1, 2L1, 3L1, and 4L1 in parallel to battery. It should be noted that relays 1AW, 2AW and 3AW are common to all twenty SLAs; that relays 1L1, 2L1, 3L1, and 4L1 are common to SLA–1 and SLA–2; etc.; and that relays 1L10, 2L10, 3L10, and 4L10 are common to SLA–19 and SLA–20.

Ground placed on conductor 4611 by SLM–1 via conductor 1201, break contacts *a* of the busy key conductor 1201*a*, make contacts 12 of relay LR17, conductor 1202, make contacts *b* of relay 3L1, to conductor 4617 notifies the marker that the call is from line 17. If the call had been from line 24, ground on conductor 4611, conductor 1201, break contacts *a* of the busy key, conductor 1201*a*, make contacts 12 of line relay LR24 (not shown), make contacts *b* of relay 4L1, to conductor 4618 would have notified the marker that the call was from line 24.

As a result of being informed that the first SLA circuit is calling, SLM–1 places ground on lead 1302, which through break contacts *c* of the busy key operates relays 1A, 2A and 3A in parallel over fuse 3 to battery. These relays extend circuits from the coils of horizontal magnets H1–H0 and HA, HB, and HC over conductors 1–12 as indicated in FIGURES 12 and 13 through cable 1305, through twelve sets of contacts on relay 3A over conductors 251 to 262 into cable 1309 to marker SLM–1. It can be seen that a multiple from each conductor of this cable extends to marker SLM–2. It should be observed that a multiple exists from leads 1308, 1309, and 1310 to other SLA switches in the same 500 line group.

Relay 1A (FIGURE 13), at its contacts extends vertical magnet, test and operating circuits from vertical magnets V1 to V5 into cable 1310 to SLM–1. Relay 2A at its contacts extends vertical magnet, test and operating circuits from vertical magnets V6 to V0 into cable 1310 to SLM–1. Relay 1A also extends the sleeve test wire 1308 from SLM–1 to conductor 1307 to contacts of relays HA, HB, and HC and thence through make contacts of magnets H1–H9 which is effective later to indicate to the marker SLM–1 the type of calling line, and to provide a circuit for the marker to apply ground to operate the cut-off relay CO17 when the marker encounters a congestion busy. This release line LR17 which releases the marker. The calling line then goes on lockout.

Relay 2A also closes ground via lead LHP to the line horizontal pull circuit of FIGURE 48, operating relays 1S1 and 2S1. This circuit may be traced as follows: ground through contacts 25 of relay 2A, conductor LHP through FIGURE 47 into FIGURE 48, windings of relays 1S1 and 2S1 in parallel to battery. Relay 1S1 operates relays 1S11 and 2S11 from ground through make contact *a* of relay 1S1, windings of relays 1S11 and 2S11, 500 ohm resistor to battery.

The marker SLM–1 places ground on conductors 9*a* and 12*a* in cable 1309, which conductors emerge from cable 1309, pass through contacts 12 and 21 of relay 3A respectively, pass into cable 1305 as conductors 9 and 12 respectively, emerge from cable 1305 to horizontal coils H9 and HC respectively, and pass through the winding of these magnets to battery, operating these magnets.

Thereby a circuit passes from the S-wire of line 17, contacts 11 of magnet H9, make contacts of relay HC, conductor 1307, contacts 26 of relay 1A, conductor 1308 to SLM–1. (If line 17 is a coin box line, a connection from the sleeve through a 20 ohm resistor and .1 mfd. condenser in series to ground exists, so notifying the marker, which is the indication mentioned above.)

If the calling line had been a P.B.X line, say, line 20, the S-wire of line 20, would be extended over make contacts of relays H2 and HB to conductor 1307, etc. to SLM–1.

The marker SLM–1 receives an indication as to the operated or non-operated condition of the vertical magnet such as V1 illustrated in detail from battery over fuse 1, break contacts 11 of magnet V1, contacts 32 of relay 1A, conductor 1303 and conductor 1310 to SLM–1. If magnet V1 is operated, this battery will be absent from conductor 1303. If magnet V1 is non-operated, indicating an idle vertical, this battery will be on conductor 1303.

Similarly the marker examines the verticals V2–V0 via conductors of cable 1310 and contacts of relays 1A and 2A.

Battery on leads in cable 1310 operate associated relays in the marker. By this means, the marker ascertains which verticals may be used to extend the calling line.

Also the marker, according to rotation in the marker examines first the registers associated with one SRL. If no idle register is found, the marker then examines the registers associated with the next SRL in the rotation. If no idle register is found, the marker then examines the registers associated with the last SRL in the rotation. If no idle register is found, the marker drops the connection. The next SRL in rotation is then the first one mentioned above.

Assuming the SRL shown in FIGURES 52, 53, and 54 to be the SRL through which associated registers are being examined, the marker places potentials on leads 1, 2, 3, and 4 of cable MCT, operating relays 1RL1, 2RL1, 3RL1, 4RL1, 5RL1, and 6RL1 (FIGURE 53).

The relays extend circuits from horizontal magnets HO–HA (FIGURE 52) to SLM–1 via cable MVO; extend test and operate circuits from vertical magnets V1–V0 (FIGURE 53) to the marker via cable MRT; and extend test conductors CB, SP, and MB (FIGURE 54) from the ten associated registers via cable MRT to the marker SLM–1.

If marker SLM–2 had been involved, relays 1RL2, 2RL2, 3RL2, 4RL2, 5RL2, and 6RL2 would have been operated, performing similar functions relative to marker SLM–2.

If register 1 for example is idle, 1600 ohm resistance battery on the B conductor (see FIGURE 14), through break contacts 5301 of vertical magnet V1 (see FIGURE 53), make contacts of relay 2RL1, conductor 31, and cable MRT so notify the marker. Similarly for the other register tests. (Refer also to FIGURE 14.)

The marker then according to the rotation in the marker places ground on conductor 21 of cable MRT (assume that register 1 is assigned) which emerges as conductor 21 and passes through make contacts 1 of relay 4RL1 and conductor MB to register 1, operating relay MB in the register, thus seizing the register over the "by-path". Relay MB operates, removing 1600 ohm resistance battery from lead B, making the register busy to other calls.

The marker over lead CB notifies the register if the call is a coin box call.

Referring now to FIGURE 9 and suppose that the SRL shown in FIGURES 52, 53 and 54 is the one containing at least one idle register. If all verticals of SLA–1 are idle, twenty idle paths may exist to the SRL. If vertical V1 only is idle, only two idle paths may exist to the SRL switch, these two being as follows: (1) vertical V1 of SLA–1, left horizontal 1 of SLB–1, vertical V1 of SLB–1, horizontal H1 of SRL (observe that this horizontal may connect with any SRL vertical which may be idle); (2) vertical V1 of SLA–1, left horizontal 1 of SLB–1, vertical V2 of SLB–1, horizontal 11 of SRL.

Similarly for other idle SLA–1 verticals.

Accordingly, the marker knowing which SLA–1 verticals are idle, tests which paths from these verticals to the SRL are available, and according to the rotation in the marker chooses one of these paths.

This is accomplished as follows. Each idle vertical of SLA–1 such as V1 illustrated in FIGURE 13, results in a discrete closed circuit to the marker such as the one shown from battery, fuse 1, alarm contact arrangement closed, break contacts 11 of magnet V1, contacts 32 of relay 1A, conductor 1303, and cable 1310 to the marker whence lead 1303 emerges and passes through a relay to ground, which relay operates. Accordingly, each idle vertical of SLA–1 will be represented in the marker by an operated relay. Assume vertical magnet V1 of SLA–1 to be idle and so represented.

Each idle SLB vertical associated with vertical magnet V1 of SLA–1 such as vertical V1 of FIGURE 50 for example will have the following circuit: battery through contacts 1436 (FIGURE 14) break contacts 1498, break contacts 1421, 1600 ohm resistor, lead B (FIGURE 50), contacts of busy key BK, break contacts 12 of relay V1, fuse alarm contacts, conductor 5101 to SLM–1 and thence through make contacts of the relay in the marker associated with vertical magnet V1 of SLA–1, and through a test relay to ground. Similarly for other idle SLB vertical test paths associated with vertical magnet V1 of SLA–1 through other make contacts of the relay in the marker associated with vertical V1 of SLA–1 through other test relays to ground. Similarly for other idle SLB vertical test paths associated with other idle vertical magnets of SLA–1.

Accordingly, there will be a test relay operated in the marker for every idle SLB vertical of SLB's 1–5 associated with idle verticals of SLA–1. The marker, according to the rotation in the marker, selects one of these idle paths.

It should be appreciated that there may be idle SLA verticals but no associated idle SLB verticals, inasmuch as these SLB verticals may be busy due to being engaged by originating or terminating calls through other SLA verticals.

Digressing, if none of the test relays associated with idle SLB verticals in the marker operate, and this is the first SRL test, the marker disconnects the vertical test paths of SLB's 1–5 from the make contacts of the SLA idle vertical test relays in the marker, and directs similar test paths from the verticals of SLB's 6–10 through these make contacts of the SLA vertical test relays in the marker. Accordingly, there will be a test relay operated in the marker for each idle vertical of SLB's 6–10 associated with the idle SLA–1 verticals and the marker will select one of these according to the rotation in the marker.

If none of the test relays associated with idle SLB verticals for SLB's 6–10 operate, the marker disconnects the vertical test paths of SLB's 6–10 from the make contacts of the SLA idle vertical test relays in the marker, and directs similar test paths from the verticals of SLB's 11–15 through these make contacts of the SLA vertical test relays in the marker. Accordingly, there will be a test relay operated in the marker for each idle vertical of SLB's 11–15 associated with the idle SLA–1 verticals and the marker will select one of these according to the rotation in the marker.

If none of the test relays associated with idle SLB verticals for SLB's 11–15 operate, the marker drops the connections placing the calling line on lockout whereby it receives busy tone through the line circuit.

Returning from the digression, let us assume, however, that vertical V1 of SLA–1 in FIGURE 13 and vertical V1 of SLB–1 in FIGURE 50 are idle, and that the associated test relay for V1 of SLB–1 through contacts of the associated test relay for V1 of SLA–1 has operated, and that the rotation in the marker is such that the marker selects the path involving these verticals.

It should be recalled that the marker has already energized horizontal coils H9 and HC of FIGURES 12 and 13 and the associated armatures have positioned their select fingers in preparation for the operation of the vertical magnet V1 to close the associated contacts to switch line 17 through SLA–1.

Also it should be recalled that relay 2A of SLA–1 operated relays 1S1 and 2S1 of FIGURE 48, and that relay 1S1 operated relays 1S11 and 2S11. Thereby, the circuits of SLB–1 horizontal coils H1 and HA (FIGURE 49) are extended over conductors 1 and 11, cable LHP, and contacts of relays 1S1 and 1S11, lead 1 and cable MVA to the marker.

Similarly circuits from horizontal coils H1 and HA of all other SLB's, SLB–2 to SLB–15 are extended over contacts of relays 1S1 and 1S11 and leads 2–15 and cable MVA to the marker.

It should be observed with reference to FIGURE 9 that any SLA is represented by horizontal No. 1, which is a split horizontal. Thus SLA–1 is represented on SLB–1 by horizontal 1.

Additionally, it should be observed that a specific SLB vertical is uniquely associated with a particular SRL horizontal which no other SLB vertical shares. Accordingly, when the marker chooses a path by choosing an SLA vertical and an SLB vertical, the choice of an SLB vertical concomitantly results in the choice of an SRL horizontal in the marker.

It can be seen that horizontal H1 (FIGURE 9) is associated with vertical V1 of SLB–1. In FIGURE 52 therefore the operation of horizontal magnets H1 and HA would determine horizontal H1 of SRL–1 (which we assume it that of FIGURES 52, 53, and 54).

The marker simultaneously closes circuits to operate SLB horizontal magnets H1 and HA of FIGURE 49 and SRL horizontal magnets H1 and HA of FIGURE 52, and simultaneously starts a timing interval in the marker. It should be recalled that horizontal magnets must be operated before vertical magnets in a given crossbar switch.

SLB–1 horizontal select magnet H1 (FIGURE 49) operates from battery (FIGURE 50) over a fuse 5, conductor 5102, winding of magnet H1, conductor 1, cable LHP, conductor 1 to the associated closed make contacts of relay 1S1, conductor 1, cable MVA to ground in the marker.

Horizontal combination magnet HA (FIGURE 49) operates from battery (FIGURE 50) over fuse 5, conductor 5102, winding of HA, conductor 11, cable LHP, conductor 11 to closed make contacts of relay 1S11, conductor 1 and cable MVA to ground in the marker.

Horizontal magnet H1 (FIGURE 52) operates from battery, fuse 11, winding of magnet H1, conductor 1, cable 5201, conductor 1, associated contacts of relay 1RL1 and cable MVO–A to ground in the marker.

Horizontal magnet HA (FIGURE 52) operates from battery, fuse 11, winding of magnet HA, conductor 11, cable 5201, conductor 11 and associated closed make contacts of relay 1RL1, cable MVO–A to ground in the marker.

It should be observed that ground through make contacts 12 of relay H1 (FIGURE 49) and make contacts 12 of relay HA to conductor MVO to the marker operates a relay in the marker to indicate that the SLB horizontal magnets have operated. Also ground through make contacts 5202 of relay H1 (FIGURE 52) and 5203 of relay HA, via conductor 5204 and make contacts 5205 of relay 2RL1, via cable MVO–A to the marker operates a relay in the marker to indicate that the SRL horizontal magnets have operated.

If these two indication relays in the marker both operate before the timing interval referred to in the marker has expired, the marker completes circuits to operate vertical magnets V1 of SLA (FIGURE 13), V1 of SLB–1 (FIGURE 50), and V1 of SRL–1 (FIGURE 53), assuming that the marker has operated relay MB in register 1 associated with V1 of SRL–1 (FIGURE 52), as follows:

The marker operates vertical magnet V1 of FIGURE 13 from battery over fuse 1, 200 ohm winding of relay V1, contacts 12 of relay 1A, conductor 1, cable 1310 to ground in the marker. Relay V1 locks over its 2000 ohm winding and its make contacts 14 to ground on the H lead (when ground is subsequently placed on the H lead). Magnet V1 closes the crosspoints prepared by horizontal magnets H9 and HC, extending the tip, ring, and sleeve conductors of line 17.

The marker SLM–1 operates vertical magnet V1 of SLB–1 (FIGURE 50) from battery over fuse 1, the 200 ohm winding of magnet V1, conductor 5102, cable 5103, to ground in the marker.

Magnet V1 locks from battery over fuse 1, its 2000 ohm winding, its No. 14 make off-normal contacts, K-wiring (assume K-wiring connected in sleeve, ring, and tip circuits), make contacts 13 of relay R1 (when the R1 operates upon closure of the SRL cross point contacts to the register), winding of impedance coil R3, to ground. Magnet V1 of SLB–1 opens the aforedescribed test circuit at break contacts 12 and closes ground through its contacts 16 and conductor 5103 to a metering circuit. Magnet V1 of SLB–1 also closes the cross-points prepared by horizontal magnets H1 and HA (FIGURE 49). Thereupon the tip, ring, sleeve, and hold conductors T, R, S, and H respectively of SLA–1 (FIGURE 13) are extended through SLB–1 into the SRL circuit (FIGURE 52). This might be illustrated by starting with the tip conductor T of line 17 (FIGURE 12) and tracing over make contacts T of magnet H9, make contacts of relay HC, conductor 1311 through FIGURES 47 and 48 into FIGURE 49, make contacts of magnets H1 and HA, conductor 4901, K-wiring, conductor 5001 to the SRL–1 circuit of FIGURE 52.

The marker operates vertical magnet V1 of SRL–1 (FIGURE 53) from battery over fuse 1, the 200 ohm winding of magnet V1, associated contacts 5302 of relay 2RL1, conductor 41, cable MRT, to ground in the marker. Magnet V1 locks over its 2000 ohm winding, contacts 5306 to ground on the H-wire from the register, which holding ground was established when the marker operated relay MB in the register (see FIGURE 14). Relay V1 opens the test circuit through contacts 5301 so that this vertical tests busy to other calls. Magnet V1 also closes ground through contacts 5307 to a metering circuit.

Vertical magnet V1 of FIGURE 3 also closes the crosspoint contacts prepared by horizontal combination magnet HA and horizontal select magnet H1 of FIGURE 52 extending conductors RC, SR, ST, RR, and RT from the SLB–1 and CRA–1 circuit to register 1.

These connections can be illustrated for example by continuing the tracing of lead 5001 through make contacts of magnet H1, make contacts of magnet HA, conductor 5205 which becomes the RT conductor to register 1.

When these crosspoints close, relay R1 of the SLB–CRA circuit (FIGURE 50) operates from battery over fuse 1, winding of relay R1, lower winding of relay R2, conductors 5002 which is the RC conductor, make contacts of relay H1 (FIGURE 52), make contacts of HA (FIGURE 52), conductor 5206 which is the RC conductor to 1200 ohm ground in register 1 (see FIGURE 14). Relay R2 does not operate at this time over its low resistance lower winding.

Relay R1 (FIGURE 50; also FIGURE 14) connects ground through impedance coil R3 and make contacts 13 of R1, FIGURE 50 (contacts 1407 of FIGURE 14) and K-wiring to lead 5003 which passes through crosspoints of relays H*a* and H1 of FIGURE 49 to the H and S leads. This ground on the S lead operates the line cut-off relay which the line relay LR17 which opens its contacts 12 which opens the before described units identification loop, releasing the marker and all connect relays held operated by the marker. This ground on the H lead holds vertical magnet V1 of SLA–1. The ground on conductor 5003 holds vertical magnet V1 of SLB–1 until the S-lead circuit receives ground from forward switching stages.

The calling party receives dial tone from the register over the tip and ring circuits which have been switched into the register.

The calling party then dials the 2–5 number of the called party into the register over the calling loop which is extended into the register.

When the register has received all digits to be dialed as evidenced in the register by the kind and number of digits received, it calls in a sender, which calls in a number group which functions as per section XI.

When the sender is ready to start sending it operates relay 1430 (PR) (FIGURE 14) in the register circuit from battery over the winding of relay PR, lead 1430*a* to ground in the sender. Relay 1430 connects direct ground through contacts 1431 to lead RC which is lead 5206 in FIGURE 53, and passes through the SRL operated crosspoints to become lead 5002, through the lower winding of relay R2 and the winding of R1, over fuse 1 to battery, operating relay R2 and holding R1.

Ground through impedance coil R3, make contacts 13 of R1 in FIGURE 50 (1407 in FIGURE 14), and make contacts 22 of relay R2 in FIGURE 50 (1412 in FIGURE 14) on the S-lead 5004 (which is the S-lead through call signal relay 1420 (L) (FIGURE 14) over contacts 1498 and 1436, to battery operates relay 1420 to call in a group selector marker.

Relay 1420 (FIGURE 14) transfers test battery from lead B (FIGURE 14 and FIGURE 51), further making vertical V1 of SLB–1 busy to other calls and extends this battery over contacts 1422 conductor 1499, through identifier equipment 1450*a* in the group selector marker 1450 to ground.

As a result of the identification of the calling SLB–CRA, connect relays 1450*b* in the group selector operate and extend the tip and ring connections into the code receiver 1450*c* of the group selector marker 1450, whereupon the code receiver places 24 volt negative battery on the tip conductor which signals the sender to start sending.

These tip and ring connections may be traced from the code receiver 1450*c* in FIGURE 14 through the connect relays 1450*b* to the ring and tip conductors R and T of FIGURE 14, which are the same conductors, FIGURE 51, from "1GSA." These conductors may be traced upward and to the right in FIGURE 51 through the SRL crosspoints of FIGURE 52 through FIGURE 54 where they become conductors SR and ST in FIGURE 55 in register 1 (on FIGURE 14 this connection can be traced over contacts *d* and *e* of SRL horizontals 1475 and 1480 which correspond to the contacts of relays H1 and HA of FIGURE 52). They may be picked up at the top of FIGURE 18 as SR and ST conductors.

Thereupon the sender, as described in section IX transmits codes to the code receiver in the group selector marker as to the line group or trunk group destination of the call, which enables the group selector marker by "by-path" principles to examine the various outlets in the required level and to select one.

We shall assume that the call is to a local line group in which case the group selector marker operates the appropriate horizontal magnets and then vertical magnets in the selected GSA and GSB switches, extending the S-wire ground (FIGURE 51) through these contacts to the S-lead of FIGURE 59 to the CRB circuit of FIGURES 57, 58, and 59, thus seizing the CRB circuit.

Digressing, at the top of the frames, front and back of FIGURE 32, are shown plug-in route-relay units which are the relays designated 112 of FIGURE 1 by means of which the group selector marker 110 of FIGURE 1 and 1450 of FIGURE 14 selects an idle outlet on the required level. It may be observed also in FIGURE 1 that the call signal relays of group 109 can alternatively be individually mounted on the respective GSA plug-in unit of FIGURE 32.

Continuing now with the previous description, the operated GSA and GSB crossbar switches also extend the R, T, and C leads to "1GSA" of FIGURE 51 through their crosspoints to the respective R, T, and C conductors of the selected CRB circuit of FIGURES 57, 58, and 59. Lead TB also extends from the group selector GSB switches to the CRB circuit of FIGURES 57, 58, and 59.

Thus the connections from the sender through register 1 to leads SR and ST (FIGURE 54), extend over the SRL crosspoints (FIGURE 52), over the R and T conductors to "1GSA" (FIGURE 51), through the GSA and GSB crosspoints (see FIGURE 1) into the CRB circuit through leads R and T of FIGURE 59 and extend to the code receiver of the CRB of FIGURES 57, 58, and 59.

The code receiver places 24 volts negative battery on the tip conductor to the sender which transmits codes to the CRB circuit.

Thereupon, the CRB closes a circuit as follows for polarized relay RAG of FIGURE 56 (which is analogous to polarized relay AG of FIGURE 46); ground, winding of relay RAG, break contacts *a* of relay 1RAV, break contacts *d* of relay RAW, break contacts *c* of relay 1C1, conductor 5784, cable 5962, conductor 5784, contacts *r* of relay 5940 (VO), contacts *k* of relay 5930 (CS), conductor 5785, cable 5962, conductor 5785, 10,000 ohm resistor, contacts *c* of relay 1RAV, 500 ohm resistor and conductor 5607 to 20 cycle alternating current in the marker.

Relay RAG operates and closes ground through its *a* contacts and *b* contacts to leads 5601 to SLM–2 and 5602 to SLM–1 which pass through seizure relays in the respective markers and thence in parallel over lead 5603 and 1000 ohm resistor to battery. This resistor insures that only one of the seizure relays can operate if they try to both operate at the same time (i.e. the one which establishes its locking ground, which locking ground decreases the current to a value which will prevent operation of the other).

When one of these relays in the marker (say in marker SLM–1) operates, it causes ground to be placed on lead 5604 shunting down relay RAG, causes ground to be placed on lead 5605 which operates relay 1RAV. Relay 1RAV opens the circuit of relay RAG and also at its *c* contacts opens the alternating current circuit.

Ground through make contacts *b* of relay 1RAV, break contacts *d* of relay RAW, break contacts *c* of relay 1C1, conductor 5784 and the aforetraced loop in the CRB circuit to conductor 5785 and conductor 5608 to SLM–1, operates a relay in the marker which indicates to the marker that the calling CRB is in the first group of ten CRB's (i.e. CRB's 1–10).

Thereupon, the marker places ground on leads 1 and 8 through cable 5606 over which circuits relays RAW, 1C1 and 2C1 operate to battery.

Thereupon a circuit is completed from the marker over conductor 5608, conductor 5785, cable 5962, conductor 5784, contacts *k* of relay 5930, contacts *r* of relay 5940, conductor 5784, conductor 5962, conductor 5784, make contacts *d* of relay 1C1, and lead 5609 to the marker, indicating to the marker that the calling CRB is the first CRB in the first tens group.

If the CRB had been the tenth in the first tens group this circuit would have extended, instead of over conductor 5784, over conductor 5710, contacts *b* of relay 2C1 and conductor 5711, so informing the marker.

If the CRB had been the 61st CRB, the tens identification circuit would have extended from ground over make contacts *b* of relay 1RAV, break contacts *d* of relay RAW, break contacts *c* of relay 1C7, conductor 5613, thence over the CRB loop circuit to conductor 5614 (which is common to the tens group 61–70), and conductor 5612 to the marker. After relays RAW, 1C1 and 2C1 operate, the units identification lead would have extended from conductor 5612 from the marker, conductor 5614, the CRB loop circuit, conductor 5613, make contacts *d* of relay 1C7, and conductor 5609 (which is common to all CRB's having units designation 1) to the marker.

The marker SLM–1 having been seized by CRB–1 and having been apprised that the calling CRB is CRB–1, places ground on lead 1 in cable 6001 (FIGURE 60), operating magnet M1 of multi-contact relay M1–M10 which closes its contacts associated with CRB–1 and CRB–2.

The marker also places ground on conductor in cable 6002 which operates magnet M39 of multi-contact relay M31–M40 which closes its contacts to extend the contacts SP2, SP1, RWC, VP, R, and T from CRB–1 through cable 6003 to marker SLM–1, the ring and tip conductors R and T respectively being extended into the code receiver of the subscriber's line marker SLM–1. It should be observed that if SLM–2 had been seized these circuits would have extended over the multiple to SLM–2.

Back tracking, it should be observed that conductors TB, C, S, R, and T extend from the GSB switch crosspoint contacts into the CRB circuit.

A more detailed description of the CRB circuit will follow, but at this point it should be observed that the ring and tip conductors R and T were extended to the code receiver of CRB–1, that the code receiver placed 24 volt negative battery on the tip to the sender, and the sender transmitted codes to the code receiver which gave information as to the origin of the call and as to the party on the line to be rung. This path into the code receiver extends over break contacts *b* and *d* of relay 5940 and break contacts *c* and *e* of relay 5930.

Subsequent to the reception of these codes, the CRB circuit operates relay 5940. The ring and tip conductors R and T then pass over make contacts *c* and *e* of relay 5930, and break contacts *k* and *m* of relay 5940 and conductors 5983 and 5982 (R and T respectively), over contacts R and T of relay M1 (FIGURE 60) and contacts R and T of relay M39 (FIGURE 60) through cable 6003 and contacts in the marker into the code receiver in subscriber's line marker SLM–1.

When the subscriber's line marker places 24 volt negative battery on the tip conductor T, this signal indicates to the marker to begin sending. Thereupon the sender transmits digits 4, 6, and 7 in that order to the code receiver in SLM–1. The code receiver of SLM–1 then seizes the marker SLM–1 when it is idle.

The marker translates the hundreds, tens and units codes into SLA unit, horizontal combination magnet and horizontal select magnet designations. The called line may be a line such as line No. 19 on the same SLA switch. A differnet SLA–1 vertical path to this line must be selected.

As we have assumed that the called line is line 19 (which is associated with SLA–1), the marker operates relays 1A, 2A, and 3A over conductor 1302 and places ground on conductors 9 and 11 via cable 1309, associated contacts of relay 3A (certain contacts of which only are shown), and conductor 1305 and conductors 9 and 11 respectively through the windings of horizontal select magnet H9 and horizontal combination magnet HB to battery over fuse 3, operating these magnets. Thereupon, the sleeve conductor of line 19 is extended over contacts 13 of relay H9, associated contacts of relay HB, conductor 1307, make contacts 26 of relay 1A, and conductor 1308 to the marker.

The marker is thereby apprised as to the condition of the called line as described hereinbefore.

Assuming the called line to be idle, the marker encounters approximately 360 ohm battery on the sleeve from the line circuit of line 19 (not shown but analogous to that of line 17). As the result of the called line being found idle, the marker proceeds to establish a path from the calling CRB to the called line.

Looking at FIGURE 9, the marker has the problem of finding an idle path from CRB–1 represented by vertical V1 on switch SLC–1 to the called line represented by a horizontal on switch SLA–1.

To do this the marker examines the circuits through the off-normal break contacts of the ten verticals of SLA–1 such as the circuit through break contacts 11 of magnet V1 FIGURE 13. Accordingly as before described, each idle vertical will be represented in the marker by a relay operated through the associated off-normal vertical contacts.

Referring to FIGURE 50, a circuit from battery over fuse 5 and alarm fuse contacts, break contacts 11 of vertical magnet V3 of SLB–1 associated with horizontal H1 of SLC–1, conductor 5005 to the marker, passes through open make contacts of the relay in the marker associated with SLA–1 vertical 1 which is busy with the same call. Also the test circuits of vertical magnets V4 and V5 of SLB–1 pass through open contacts of the relay in the marker associated with SLA–1 vertical 1.

But, assuming that SLB–1 vertical V8 is idle, test battery over the break off-normal contacts of magnet V8 passes through closed make contacts of a relay in the marker associated with vertical V2 of SLA–1 (assuming that this vertical is idle). Similarly, test circuits of the vertical magnets V9 and V10 of SLB–1 pass through make contacts of the relay in the marker associated with SLA–1 vertical 1.

Similarly test paths from verticals V3 and V4 of SLB–2 associated with horizontals H3 and H4, of switch SLC–1 pass over make contacts of relays in the marker associated with vertical 3 of SLA–1, etc.

It should be observed that the called line may be reached over any idle verticals of SLA–1 and that the calling CRB represented by vertical V1 of SLC–1 may be reached over any horizontals H1–H20 of SLC–1 associated respectively with idle verticals V3, V4 and V8 and V9 of SLB–1, SLB–2, SLB–3, SLB–4 and SLB–5.

Accordingly if all SLA–1 verticals are idle, twenty possible paths from the CRB to the called line exist.

If only V1 of SLA–1 is idle (assuming the call to have originated over another SLA–1 vertical) two possible paths exist, etc.

According to the rotation in the marker, the marker selects an idle path.

Let us assume that this idle path involves vertical V2 of SLA–1, and associated horizontal 1 of SLB1, and associated horizontal H2 of SLC–1.

It should be appreciated that when the marker released upon operation of cut-off relay CO17 on the origination of the call, it released relays 1A, 2A, and 3A of SLA–1 but that it reoperated them because the called line is associated with SLA–1. Relay 2A again operates relays 1S1 and 2S1 of FIGURE 48 and relay 1S1 again operates relays 1S11 and 2S11. Thereby the circuits of SLB–1 horizontal magnets H1 and HA are extended into the marker.

The marker thereupon places ground on conductor 1 through cable MVA, which ground through make contacts of relay 1S1 and conductor 1, and make contacts and conductor 11 through cable LHP, and conductors 1 and 11 through the coils of relays H1 and HA (FIGURE 49) to battery over fuse 5, operates these magnets.

Also the marker places ground on conductors 2 and 11 in cable 5502 of FIGURE 55, through associated contacts of relay EN1 (only certain contacts of this relay are shown) conductors 2 and 11 over cable 5501, through conductors 2 and 11 to operate horizontal magnets H2 (not shown) and HA (shown) to battery.

When the marker closes ground to operate the SLB and SLC horizontals, it starts a timing interval.

Ground through make contacts of relay H2 and HA and conductor 5503 operates a relay in the subscriber's line marker SLM–1. Also the operation of the SLB–1 horizontals close ground to a relay in the marker as before described.

If both relays operate before the timing interval in the marker is over, the marker proceeds to operate the SLA, SLB, and SLC vertical magnets.

Thereupon, the marker places ground on the appropriate lead of cable 1310 (FIGURE 13) to operate vertical magnet V2 (not shown). Referring to FIGURE 12, multiples are seen extending to verticals V2–V0 of SLA–1. Accordingly, the operation of horizontal magnets H9 and HB, followed by the operation of vertical magnet V2 results in the operation of associated crosspoints in the vertical V2 pileup which lead to the SLB–1 of FIGURE 49.

At the top of FIGURE 49 we find four leads (i.e. H, S, R, and T) entering as the horizontal multiple across vertical pileups V6 to V0 of SLB–1 in similar fashion to the four conductors (i.e. H, S, R, and T) from the vertical pileup associated with vertical magnet V1 of FIGURE 13 which enter FIGURE 49 as the horizontal multiple across verticals V1–V5 of SLB–1.

Also the marker SLM–1 places ground through a conductor in cable 5106 to operate vertical magnet V8, FIGURE 50, indicated. The functioning of magnet V8 is analogous to the functioning of magnet V3.

When magnet V8 operates, it effects the closure of the crosspoints in its vertical pileup prepared by the operation of horizontal magnets H1 and HA, extending the hold sleeve, ring and tip conductors H, S, R, and T from vertical V2 of SLA–1 across FIGURES 50, 51, 52, 53, and 54 to the horizontal multiple No. 2 across verticals V1–V0 of FIGURE 55.

Also the marker SLM–1 places ground on lead VP of cable 6003 which ground circuit passes through closed VP contacts associated with magnet M39 of multi-contact relay M31–M40 which contacts engage the VP conducting plate of relay M31–M40 which is connected through the corresponding conducting plates of intervening multi-contact relays to the VP conducting plate of multi-contact relay M1–M10, thence through closed VP contacts associated with magnet M1 to conductor VP through the CRB circuit and VP lead of FIGURE 56 to the VP lead of FIGURE 55, through the 200 ohm winding of vertical magnet V1 of SLC–1 and thence over the negative battery lead through FIGURE 56 to negative battery in the CRB–1 circuit.

It should be appreciated that the marker has previously operated magnets M1 and M39 as a result of the identification of CRB–1 in the marker by the CRB loop through the LET circuit of FIGURE 56. Magnet V1 (FIGURE 55) locks from this battery over its 2000 ohm winding and make off normal contacts 5505 to ground placed on the H lead by CRB–1.

The operation of magnet V1 effects the closure of the cross points prepared by horizontal combination magnet HA and horizontal select magnet H2 extending the conductors H, S, R, and T. Thus conductors S, R, and T are extended from line 19 to CRB–1. Ground through relay RS in CRB–1 placed on the S-lead by CRB–1 operates relay RS and the cut-off relay of line 19. Ground placed on the H-lead by CRB–1 extends to switches SLC–1, SLB–1 and SLA–1 to hold the vertical magnets thereof over the 2000 ohm winding.

Vertical magnet V1 of SLC–1 (FIGURE 55) closes ground through contacts 5504 to a metering circuit. Magnet V1 also places ground through make off-normal contacts 5507 on lead 5790 which extends across FIGURE 56 becoming the V0 lead in CRB–1, which ground through the winding of relay 5940 to battery operates this relay. Relay 5940 at its *r* contacts opens the loop circuit through the LET circuit of FIGURE 56 to SLM–1, releasing the subscriber's line marker and code receiver therein.

Back-tracking, if the marker encounters a busy line, the marker notifies the sender over the tip and ring connection and the sender releases the CRB by removing ground from the sleeve. The release of the CRB opens the original seizing loop, releasing the subscriber's line marker and code receiver and placing the calling line on lockout. If the marker encounters an idle line, this indication is passed over tip and ring connections back to the sender as the signal for the sender to release the register and the sender and to cut the tip and ring connection through the CRA to the CRB.

The LPX circuit of FIGURE 47 provides a test circuit to each P.B.X line in the 500 line group which test circuit is ground through the break contact of the lockout LO relay in the associated line circuits (see FIGURE 12). The maximum is 100 P.B.X lines for a 500 line group. The operation of the LPX circuit is such that one of 20 grounds is extended from the SLM–1 code receiver through the marker SLM–1 (for example over conductors in cable MLM) to indicate specifically which P.B.X group is being called. These ground circuits operate relays P1 through P20 in combinations according to the number of P.B.X trunks in the group.

Terminals 1–20 from cable MLM represent twenty different P.B.X groups.

Each relay P1–P20 represents five trunks, each trunk of which is located in a different SLA switch.

Strapping may be made from terminals 1–20 to relays P1 to P20 in various combinations, for example if twenty P.B.X trunk groups of five trunks less are equipped, leads 1–20 may be strapped to relays P1–P20 consecutively in one-to-one relationship. If only ten lines in one P.B.X trunk is required, terminal 1 may be strapped to relays P1 and P2. If 50 trunks are required in one group terminal 1 is strapped to relay D1 and ground through make contacts of relay D1 are strapped to relays P1 to P10. The operating circuits of guard relays in SLM–1 are extended to SLM–1 over break contacts of relay 1TR through 17TR and over leads 41–45 of cable MLM, the operation of which relays indicate which one of 20 SLA switches to select. After the SLA switch is determined, a circuit is extended from the marker to operate relay TR1 over conductor 46 of cable MLM.

Relay TR1 operates relays 1TR through 17TR which transfer the original ground used to identify the called SLA switch from break contacts of the LO relay, over make contacts of relays 1TR through 17TR, to guard relays within the marker whereby a specific guard relay operates to determine the specific P.B.X trunk within the group. The marker then functions to (1) close the proper SLA horizontal magnets which enable the marker to test for 360 ohm battery through the cut-off relay as an indication that the line circuit is in operative condition, (2) close the proper SLB and SLC horizontal magnets, (3) close the proper SLA, SLB, and SLC verticals which make connection to the called line.

For example, let us assume that a call is made to P.B.X trunks in the group. Ground from the marker SLM–1 on terminal 1 through cable MLM (FIGURE 47) operates P1 to battery over the cross-connect. Let us assume that all P.B.X lines of this group are busy except one, namely line 20 of SLA–1, FIGURE 12.

Relay P1 extends ground through fuse alarm contacts 3 and 4 of FIGURE 13, conductor 1311, through break contacts 24 of relay LO20, conductor 1313, over closed contacts of manual switch 4701, make contacts of relay P1, through break contacts 1TR, conductor 21, cable MLM to the marker which identifies the called line as being in switch SLA–1.

After this identification is completed, ground from the marker over conductors 46 in cable MLM, operates relay TR1 which operates relays 1TR to 17TR. The operation of relay 1TR transfers the original ground from the break contact of relay LO20 to conductor 41 through cable MLM to the marker which identifies the individual line 20 of the SLA switch. This enables the marker to complete the connections to this line.

A-wiring in the line circuit of line 20, FIGURE 12, is not equipped when a P.B.X line in an automatic P.B.X line which operates from ground placed on the ring from the P.B.X trunk. Without A-wiring, the seizure path for relay LO20 is as follows: ground placed on the ring conductors by the P.B.X trunk, break contacts of relay CO20, break contacts 21 of relay LO20, the winding of relay LR20, fuse 4, to battery. The holding circuit of LO20 may be traced from ground through fuse alarm contacts associated with fuses 3 and 4, make contacts 26 of relay LO20, break contacts of relay CO20, tip conductor, calling loop circuit, ring conductor, break contacts of relay CO20, make contacts 23 of relay LO20, upper winding of relay LO20, to battery through the busy tone circuit. A-wiring is equipped with a P.B.X line is a manual P.B.X line which operates from a loop placed across the tip and ring from the P.B.X trunk. With A-wiring, the seizure path for relay LR20 is as follows: ground through fuse alarm contacts associated with fuses 3 and 4, A-wiring, break contacts of relay CO20, calling loop; break contacts of relay CO20, break contacts 21 of relay LO20, winding of line relay LR20, fuse 4, to battery. The holding path for relay LO20 is the same as that traced above except that A-wiring is in parallel with make contacts 26 of relay LO20.

It might be further stated also that with regard to the two subscriber's line markers SLM-1 and SLM-2 which serve a particular 1000 line group:

(1) The two markers can be used simultaneously to originate calls from the two different 500 line groups of the 1000 line group but they cannot be used simultaneously to originate calls from the same 500 line group.

(2) The two markers can be used simultaneously for path finding purposes to terminate calls to the two different 500 line groups of the 1000 line group but they cannot be used simultaneously for path finding purposes to terminate calls to the same 500 line group.

(3) The two markers can be used simultaneously, one to originate a call from one 500 line group of the 1000 line group and the other for path finding purposes to terminate a call in the other 500 line group of the 1000 line group but they cannot be used for path finding purposes, one to originate a call and the other to terminate a call in the same 500 line group.

(4) The code receivers of the two markers serving a 1000 line group may receive codes simultaneously from GRB's in the same 500 line group and the path finding portion of one of these markers may be seized to terminate one of these calls while the code receiver of the other is being held.

XIV. MORE DETAILED DESCRIPTION OF THE CRB CIRCUIT

A more detailed discussion of the CRB circuit ensues. The functions of the CRB circuit are as follows:

(1) To receive marking code impulses identifying the type of call being handled by the CRB.

(2) To receive marking code impulses indicating the ringing combination to be used in signaling the called line.

(3) To provide a path to the marker code receiver for the transmission of marking code impulses for controlling the marker's operation.

(4) To provide a path from the marker for transmission of back-signals regarding the condition of the called line, link congestion, and reverting call.

(5) To send a completion signal to the sender which is in control, upon the completion of the marker's functions.

(6) To provide a holding circuit in the case of local calls.

(7) To provide a transmission battery feed circuit in the case of local calls, and to provide a cut-through or metallic circuit, i.e., a line conductor circuit which does not include condensers or repeat coils, for all other types of calls (except official lines).

(8) To provide an audible ringback tone when the called line is being signaled on any type of call except wire chief.

(9) To provide a path for transmission of a reverting call message to the calling subscriber when the marker indicates that the call is of a reverting nature, and to provide a distinctive tone to the called subscriber for a few seconds after a reverting call is answered.

(10) To withhold the ring-start test on a reverting call until the calling subscriber has hung up and the incoming switch train has been released.

(11) To release and return to normal on reverting calls if the ring-start test should fail.

(12) To release and return to normal within 30 to 60 seconds after disconnect of the called subscriber, in the case of local calls, and within 2 to 4 minutes in the case of an unanswered reverting call.

(13) To ignore a busy condition of the called line and cut-through a few milliseconds after delivery of the completion signal to the sender in control in the case of wire chief calls.

(14) To withhold the application of ringing current to the called line until a ring-start signal is received from the operator, in the case of delayed-ring calls.

(15) To establish a no-answer condition in the case of local or trunk calls to official telephone company lines, to permit free calls to these lines.

(16) To withhold the application of ringing current to the called line until a pick-up signal is received from the interrupter in the case of a two-ring signal, in order to prevent the mutilation of a two-ring signal.

(17) To test the continuity of the sleeve conductor of the called line and allow time for the operation of the cut-off relay in the called line circuit prior to the application of ringing current.

When the group selector has extended tip, ring, sleeve and control wire connections to a CRB circuit in a desired subscriber's line group, ground will be extended forward on the sleeve wire "S" (5959) from the group selector, operating relay MB (5920) in the CRB, which in turn prepares the CRB for the reception of the two code signals which it will receive to indicate the class of the call (as to origin) and the designation of the party on the line which is to be rung when the connection is eventually established. The relay MB (5920) prepares a number of ground circuits which will be later used for the holding of the various relays of the CRB, removes the 1600-ohm battery from the TB lead 5961 (test battery) to prevent another call from attempting to engage this circuit while it is occupied, and closes battery to the two potential dividers (one comprising resistors 5951 and 5954 and the other 5952 and 5953) to permit the operation of the code receiver portion of the CRB (represented by relays 5760, 5770, 5870, and 5880). The closing of the battery to the aforementioned potential dividers is recognized by the sender as a start-sending signal, comprising negative 24 volt battery on the tip. Actually 24 volt negative battery also is found on the ring.

Recalling at this point the example used earlier of a local subscriber making a call to another local subscriber whose terminal was located in line group 1, terminal 467, and whose party digit was 1, the operation of the CRB on such a call will be described. When the group selector has extended the tip, ring, sleeve, and control wires (T, R, S, and C to the CRB), relay MB operates as previously described. The operation of relay MB, at its make contacts 5920*b* and 5920*c* closes battery to the potential dividers aforedescribed, to cause a start signal to be recognized in the sender. The sender will now send a signal to the CRB advising the CRB of the fact that the call is coming from a local subscriber, that is, a subscriber in the same central office, by applying a potential of −48 volts on the tip conductor T (5957), which over the following path will operate relay R3 (5770): conductor T (5957), contacts 5940*d*, contacts 5930*e*, conductor 5963, rectifier 5770*a* in the proper direction, lower winding of relay R3 (5770), contacts 5760*b*, contacts 5750*b*, conductor 5966, to −24 volt battery at the midpoint of resistors 5952 and 5953.

Relay R3, in operating, completes an operating circuit for relay LC, indicating that the call is from a local subscriber and conditioning the CRB circuit for the requirements of a local call. Relay LC will operate over the following path: ground, contacts 5920*d*, conductor 5973, contacts 5770*b*, conductor 5781, upper winding of relay LC (5820), conductor 5974, contacts 5740*b* to battery. Relay LC (5820) operates and locks over the circuit extending from ground, contacts 5920*d*, conductor 5973, contacts 5820*a*, lower winding of relay LC (5820) to battery. The operation of relay LC completes an operating circuit for relay H (5910) which extends over contacts 5920*f*, conductor 5993, contacts 5820*c*, conductor 5991, and contacts 5930*h*, to relay H (5910). Relay H, in operating, serves no useful purpose at this time, but will be used later for circuit holding purposes.

Relay LC also completes two paths from the two windings of transmission battery feed relay B (5840) to the conductors 5994 and 5995 via contacts 5820*f* and 5820*e*, respectively. This function has no useful purpose at this time, but is used later on (after the ringing of the called line has been tripped) to supply the transmission battery to the called subscriber. When the sender terminates the signal just described, relay R3 (5770) releases, in turn causing the operation of relay RA (5740) over the following path: ground, contacts 5920*d*, conductor 5973, contacts 5890*c*, 5880*c*, 5870*c*, 5770*c*, 5760*c*, 5750*c*, conductor 5971, contacts 5820*b*, conductor 5972, upper winding of relay RA (5740) to battery. In addition, the release of relay R3 and the operation of relay RA place a ground shunt on relay CS (5940) to prevent its operation at this time. This ground shunt is traced as follows: ground, contacts 5920*d*, conductor 5973, contacts 5890*c*, 5880*c*, 5870*c*, conductor 5783, contacts 5770*c*, 5760*c*, conductor 5971, contacts 5820*b*, conductor 5972, contacts 5740*e*, conductor 5981, cable 5962, conductor 5981, winding of relay CS (5940), contacts 5930*g*, 5920*f* to ground.

A moment later the sender sends a signal informing the CRB that the party to be rung is party 1, by applying —48 volts to both the tip and ring conductors 5957 and 5958. This signal causes the operation of relays R3 (5770) and R4 (5870). The operating path of R3 is as follows: —48 volts on conductor 5957 (T) from the sender, contacts 5940*d*, 5930*e*, conductor 5963, rectifier 5770*a* in the proper direction, lower winding of relay R3 (5770), contacts 5760*b*, 5750*b*, conductor 5966, to —24 volts at the junction of resistors 5953 and 5952. Relay R4 operates in a similar manner from the —48 volt potential on the ring conductor 5958.

Relays R3 and R4 now lock, the path for R3 being traced as follows: ground, contacts 5920*d*, conductor 5973, contacts 5740*a*, 5770*d*, upper winding of relay R3 (5770), contacts 5740*c* to battery. Relay R4 locks over a similar circuit. The operation of the relays R3 and R4 also cause the somewhat slow operation of relay CS (5940), by removing the ground shunt which had earlier been placed across relay CS. The operating path for relay CS is as follows: ground, contacts 5920*f*, 5930*g*, winding of relay CS (5940), conductor 5981, cable 5962, conductor 5981, contacts 5740*e*, upper winding of relay RA (5740) to battery.

The operation of relay CS signals the subscriber's line group marker circuit that a terminating call is being made, and that the services of the subscriber's line group marker code receiving circuit are now required. This signal is given over the following path: conductor CS (5784), cable 5962, conductor 5784, contacts 5930*r*, 5940*k*, conductor 5785, cable 5962, conductor CS (5785). Also, relay CS extends the incoming tip and ring leads 5957 and 5958 to the marker code receiver circuit via the following path: incoming tip lead 5957, contacts 5940*e*, 5930*m*, outgoing tip lead 5982. The ring lead follows a similar pattern.

At this point, the CRB circuit becomes actionless, while awaiting the completion of the functions of the subscriber's line group marker. For continuity of the description, the sender now sends three coded digits to the marker code receiver circuit to notify the marker circuit of the location of the called line. The marker makes appropriate tests regarding the busy or idle condition of the called line, then searches for an applicable path between the CRB in question and the desired line, and finally causes the operation of the proper horizontal and vertical magnets in the SLA, SLB, and SLC switches to establish a circuit consisting of tip, ring, sleeve, and hold leads between the CRB, the aforementioned switches, and the subscriber's line circuit.

When the subscriber's line group marker has completed its operation and has caused the operation of the vertical magnet in the SLC switch, ground through contacts 5501 on the SLC vertical magnet structure is placed on conductor 5790, causing the operation of relay VO (5930) in the CRB. Relay VO, in operating, causes a number of things to take place: (1) at contacts 5930*r*, the call signal to the subscriber's line group marker is removed; (2) at contacts 5930*q*, opens the battery supply to the aforedescribed potential dividers, inasmuch as their services are no longer needed; (3) at contacts 5930*h* opens the original operating path of relay H (5910), allowing relay H to start its slow release, and at contacts 5930*j* closes a circuit extending ground (previously traced), allowing the relay H, through its make contacts 5910*a*, to maintain a ground on the incoming sleeve lead 5959; (4) at contacts 5930*m* and 5930*n* transfers the incoming tip lead 5957 from the marker code receiver lead 5982 to the grounded winding of battery feed relay A (5830) by way of conductor 5980 and contacts 5840*a*. Contacts 5930*k* and 5930*s* perform a similar task with respect to the ring lead 5958, connecting it to the battery winding of relay A. The transfer of these leads to the windings of relay A constitutes a signal to the sender indicating thereto that its services are no longer needed, whereupon the sender releases.

At this point, the calling subscriber becomes connected to the incoming tip and ring leads, 5957 and 5958 respectively, and through his line loop operates relay A (5830). At this time, relay H has not had sufficient time to release, and the operation of relay A causes a holding circuit for relay H to be established over the following path: ground, contacts 5920*f*, conductor 5993, contacts 5830*a*, conductor 5992, winding of relay H (5910) to battery. Relay H, therefore, remains operated and in turn maintains the aforementioned ground on the sleeve lead 5959 which serves to hold in an operated condition all equipment which is required for the duration of the conversation, according to well-known telephone practice.

Simultaneously with the appearance of ground on conductor 5790 at the completion of the operation of the subscriber's line group marker, a resistance battery will be found on the sleeve lead 5787 as a result of the connection which now exists between the CRB circuit and the called line. This battery is obtained from the subscriber's cut-off and lock-out relays, shown on FIGURE 12 as CO17 and LO17. This resistance battery causes the operation of the RS (5700) relay over the following path: resistance battery on the S lead (5787), contacts 5720*c*, upper winding of relay RS (5700), conductor 5795, contacts 5810*a*, conductor 5978, contacts 5920*e*, to ground. At the same time, the cut-off and lock-out relays aforementioned will also operate, in view of the fact that the circuit just traced includes the windings of these two relays.

Relay RS (5700) now locks, over the following path: ground, contacts 5920*h*, conductor 5998, contacts 5700*e*, lower winding of relay RS to battery. The operation of relay RS (ring start) extends the called line tip and ring conductors int othe CRB circuit to prepare for ringing the called line. The tip conductor can be traced as follows: tip 5789, contacts 5700*b*, 5710*j*, conductor 5701, contacts 5850*c*, to ground. The ring conductor can be traced as follows: ring 5788, contacts 5700*c*, 5710*f*, conductor 5704, contacts 5850*a*, conductor 5797, upper winding of relay RT (5710), conductor 5796, contacts 5800*a* to battery. The ringing circuit is now set up. However, actual ringing does not take place until the operation of relay RP (5800) occurs. The purpose of the RP relay is to delay the start of ringing in the case of two-ring signals until it can be assured that a two-ring signal will not be started in the middle and thus be mutilated. In the case of a one-ring signal, relay RP operates immediately over the following path: ground, contacts 5920*h*, conductor 5998, contacts 5850*a*, wiring option "A," contacts 5800*d*, conductor 5794, contacts 5700*a*, 5710*b*, conductor 5793, winding of relay RP (5800) to battery. In the case of a two-ring signal, relay RP will operate when a pick-up signal is received from the common ringing interrupter indicating that a complete two-ring signal is about to start. This path is traced as follows: ground arriving from the ringing interrupter on lead RPU (5703), contacts 5850*b* (relay RR, 5850, will be operated in this case), wiring option "A," contacts 5800*d*, conductor 5794, contacts 5700*a*, 5710*b*, conductor 5793, winding of relay RP (5800), to battery. With the operation of relay RP, conductor 5796 is transferred from battery through contacts 5800*a*, to the interrupted ringing lead designated "1" (5706) as follows: conductor 5796, contacts 5800*b*, 5850*c*, 5860*a*, 5870*b* conductor 5705, contacts 5770*e*, conductor 5706, to the particular ring interrupter lead designated "1" which supplies the necessary ringing current to cause to the signaling of party "1" on the called line.

The operation of relay RP also causes the calling subscriber to receive an audible ring back tone as an indication of the fact that the called line is being rung. This tone may be traced as follows: tone from the ringing interrupter arriving on lead RBI (5707), contacts 5850*d*, wiring option "A," contacts 5800*e*, 5810*d*, tone winding of relay B (5840), conductor 5711, to "dial tone ground" labelled DTG. This causes ringback tone currents to be set up in the tone winding of relay B, and by transformer action these currents cause induced voltages in the two talking windings of relay B, and through the tip and ring condensers T and R (5801 and 5802) these induced tone voltages are transmitted to the calling subscriber's telephone receiver, where they appear as an audible indication of the ringing of the called line.

When the called party answers, he causes the operation of the ring trip relay RT (5710) over the ringing circuit previously traced. Because of the slow-operate characteristics of relay RT, it could not operate due to the ringing current inasmuch as the time integral of the ringing current is substantially zero. The called subscriber, however, creates a direct-current path through his line loop when he answers, resulting in a time integral greater than zero, permitting the RT relay to operate. This is familiar to those skilled in the art. Relay RT now locks over the following path: ground, contacts 5920*h*, 5930*b*, conductor 5708, contacts 5730*a*, 5720*a* 5710*e*, lower winding of relay RT (5710) to battery. The operation of relay RT opens the ringing circuit previously traced at contacts 5710*f* and 5710*j* and closes a talking circuit as follows: called tip lead 5789, contacts 5700*b*, 5710*k*, conductor 5799, contacts 5820*f*, lower winding of relay B (5840) to ground. A similar path may be traced from the called ring lead 5788 to the battery winding of relay B. Relay B now operates over the called subscriber's line loop, and a talking path is established by means of the coupling action of condensers T and R (5801 and 5802) as is well known by those skilled in the art. Relay RT, in operating, opens the circuit of relay RP at contacts 5710*b*, and the release of relay RP then removes the aforementioned ringback tone by opening its contacts 5800*e*.

As previously mentioned, all circuits which are needed for the duration of the conversation are held in an operated condition by the presence of a ground on the sleeve lead, as is common practice in many types of automatic telephone switching systems. Subsequent to the release of the sender, this ground is maintained on the sleeve lead by the H relay (5910) in the CRB, which in turn is held by relay A (5830), which in turn is held under control of the calling subscriber's line loop. Therefore, the calling subscriber controls the holding of the aforementioned equipment. At the termination of the conversation, the called subscriber may or may not release immediately, which is of no consequence inasmuch as his supervisory relay, relay B (5840), is not capable of holding relay H in an operated condition. The calling subscriber, however, causes the release of all equipment used on the call when he hangs up, by causing the release of relay A, which in turn releases relay H, which in turn removes ground from the sleeve lead, releasing all equipment which has been held by this ground. These circuits have all been traced at the time they first became effective, and their retracing is not considered necessary.

The foregoing detailed description of the operation of the CRB assumed a call from a local subscriber. In addition to this category of call, the CRB is also arranged to handle the following types of calls: (2) call from an immediate ring trunk circuit; (3) call from a trunk requiring delayed ringing facilities; (4) call from a testman's trunk or operator's verification trunk; (5) call either from a local subscriber or a free service trunk, which call is destined to a telephone company official telephone or PBX, for which no message charge is to be made; (6) Reverting call.

A description of operation of the CRB in each of these cases follows, with particular emphasis given to those points of operation which differ from the case of a local call.

*Call from an immediate ring trunk circuit*

The description of a call from a trunk other than one requiring delayed ringing facilities is now set forth. Ground will be extended forth on the sleeve lead 5959, operating relay MB (5920), energizing the two potential dividers 5951–5954 and 5952–5953. The resulting start signal to the sender causes the sender to send the first code to the CRB which informs the CRB that the call is coming from a normal trunk circuit. This code consists of —48 volts on the ring conductor 5958, which operates relay R4 (5870) over the following path: —48 volts on ring conductor 5958, contacts 5940*b*, 5930*c*, conductor 5964, rectifier 5870*a* in the proper direction, lower winding of relay R4 (5870), contacts 5880*d*, 5890*d*, conductor 5965, to —24 volts at the midpoint of potential divider 5951–5954. Relay R4, in operating, causes the operation of relay TK (5900), over the following path: ground, contacts 5920*d*, conductor 5973, contacts 5870*e*, conductor 5967, upper winding of relay TK (5900), conductor 5974, contacts 5740*b*, to battery. Relay TK locks in a manner similar to that previously described for the LC (5820) relay. Upon the termination of the signal from the sender, relay R4 releases, causing the operation of relay RA. The next signal from the sender apprises the CRB of the party to eventually ring, and is received and stored on the receiving relays R1 through R7 as previously described. Relay CS operates to extend circuits to the subscriber's line group marker as previously described.

It should be noted at this point, however, that relay H has not been operated as it was in the case of a local call. This is due to the fact that the operating path for the H relay (5910) is left open by a make contact of relay LC (5820) which relay is not operated on this class of call. The subscriber's line group marker performs its duties and when finished, it causes the operation of relay VO. In addition to the functions performed by relay VO as previously described, relay VO also causes relay CS to start its slow release, by opening the circuit to the winding of relay CS at contacts 5930*g* (H and LC relays are not operated on this class of call).

Relay CS, in releasing, removes the windings of the A relay (5830) from the incoming tip and ring leads by opening contacts 5940*c* and 5940*e*, inasmuch as the transmission battery feed will be provided by the truck circuit, and therefore the services of relay A are not needed. Relays RS and RP operate as previously described, and ringing of the called line now takes place.

At this time, the windings of relay B (5840) are still connected to the incoming tip and ring leads 5957 and 5958, to permit the transmission to the calling party of the audible ring-back tone. This path is traced as follows: ground, lower winding of relay B (5840), conductor 5798, contacts 5710*m*, conductor 5994, contacts 5930*f*, 5940*d*, incoming tip conductor 5957. A similar path can be traced from the battery winding of relay B to the incoming ring conductor. Because the trunk circuit which is connected to the incoming tip and ring leads of the CRB does not present loop conditions to the CRB, relay B does not operate. When the called party answers, he operates the ring trip relay RT as previously described, and his tip and ring conductors are now connected directly through the CRB to the incoming tip and ring leads, obtaining his transmission battery feed from the trunk circuit. The tip conductor can be traced as follows: called tip lead 5789, contacts 5700*b*, 5710*k*, conductor 5994, contacts 5930*f*, 5940*d*, incoming tip lead 5957. The ring conductor may be similarly traced. Conversation may now occur between the calling and called parties, the CRB circuit being held in an operated condition by a ground presented to it on the incoming sleeve lead 5959, said ground being supplied by the trunk circuit involved on the call and holding operated relay MB in the CRB. Relay MB, in turn, maintains the operated condition of all relays in the CRB circuit which are required for the duration of the call. When the calling party releases, the trunk circuit associated wtih the call removes the ground from the sleeve lead 5959, permitting the release of relay MB, in turn releasing all operated relays in the CRB.

The description of a call from a trunk circuit requiring delayed ringing facilities is now set forth. As previously described, when the CRB is seized by an incoming call, ground is extended forward on the sleeve lead 5959, operating relay MB (5920). In addition to those functions of relay MB which have already been described, it also causes the operation of relay RT (5710) over the following path: ground, contacts 5920*h*, 5930*a*, 5940*a*, conductor 5712, lower winding of relay RT (5710) to battery. In reality, relay RT always operates in this fashion, however, it normally obtains sufficient time to release on local, trunk, and official line calls, so that it was not mentioned previously. When the sender has recognized the start signal, it sends to the CRB circuit a coded signal indicating that the call is of a delayed ring nature by placing ground on the tip lead 5957. This causes the operation of relay R2 over the following path: ground on tip lead 5957, contacts 5940*d*, 5930*e*, conductor 5963, contacts 5770*f*, rectifier 5760*a* in the proper direction, lower winding of relay R2 (5760), contacts 5750*b*, conductor 5966, to —24 volts at the mid-point of potential divider 5952–5953. Relay R2, in operating, causes the operation of relay DR (5730) over the following path: ground, contacts 5920*d*, conductor 5973, contacts 5890*c*, 5880*c*, 5870*c*, conductor 5783, contacts 5770*c*, 5760*d*, upper winding of relay DR (5730), contacts 5740*b*, to battery. Relay DR locks over the following path: ground, contacts 5920*d*, conductor 5973, contacts 5730*c*, lower winding of relay DR (5730) to battery. Relay DR establishes now a locking path for relay RT, prior to the opening of the original operating path of relay RT. This locking path is traced as follows; ground arriving on the control lead C (5960) from the delayed ring trunk circuit, conductor 5999, contacts 5730*b*, 5720*a*, 5710*e*, lower winding of relay RT (5710) to battery. Then follows a sequence of operations identical to those previously described, namely: the sender terminates the class marking signal, relay R2 releases, relay RA operates, the sender sends the ringing designation code, the receiving relays R1 to R7 operate in a corresponding combination, relay CS operates, a call signal is given to the subscriber's line group marker, tip and ring leads are extended to the marker code receiver circuit, code signals are sent to the marker code receiver, the marker tests the called line, sets up the SLA, SLB, and SLC switches, and relay VO in the CRB operates. The operation of relay VO (5930) starts the slow release of relay CS and transfers the incoming tip and ring leads 5957 and 5958 from the subscriber's line group marker code receiver leads 5982 and 5983 to the two windings of the A battery feed relay, as previously described.

The impending release of relay CS removes the windings of relay A from the incoming tip and ring leads at its contacts 5940*e* and 5940*c*, and connects the incoming tip and ring leads directly through to the called line. The tip lead may now be traced as follows: incoming tip lead 5957, contacts 5940*d*, 5930*f*, conductor 5994, contacts 5710*k*, 5700*b*, called tip lead 5789. The ring conductor follows a similar path. During the time elapsing between the operation of relay VO and the release of relay CS, the incoming tip and ring leads are connected to the windings of the battery feed relay A, as mentioned above. The purpose of this momentary connection is to apprise the sender of the fact that all equipment necessary for the call has been set up, whereupon the sender releases. At this point, the delayed ring trunk, from which this call has been set up, is now connected to the desired line circuit, and the ring tripping relay has been pre-operated and locked so as to prevent ringing from taking place. When the operator desires to ring the called subscriber, the trunk is signalled by operation of the operator ringing key, which in turn causes the trunk circuit to momentarily open the ground on the C lead 5960, in turn allowing the release of relay RT (5710). This causes the operation of the RP relay (5800) at the proper time by closing contacts 5710*b* and ringing ensues as previously described. The remainder of the CRB circuit operation does not differ from the case of a call from a trunk.

A test call from the wire chief or busy verifications operator is now considered in the following description. As before, ground arrives at the CRB circuit on sleeve lead 5959, relay MB operates, relay RT operates, and a start signal is sent to the sender. The sender, in this case, will send a marking code signal consisting of ground on the ring lead 5958. This causes the operation of relay R5 over the following path: ground on ring lead 5958, contacts 5940*b*, 5930*c*, conductor 5964, contacts 5870*d*, rectifier 5880*a* in the proper direction, lower winding of relay R5 (5880), contacts 5890*d*, conductor 5965, to —24 volt battery at the mid-point of potential divider 5951–5954. Relay R5 in turn operates relay WC over the following path: ground, contacts 5920*d*, conductor 5973, contacts 5890*c*, 5880*b*, conductor 5799, upper winding of relay WC (5720), contacts 5740*b*, to battery. Relay WC locks in a manner similar to LC, TK, and DR, as previously described. Relay WC, in operating, establishes a holding circuit for the RT relay before the original operating path of relay RT is opened, over the following path: ground, contacts 5920*h*, conductor 5998, contacts 5720*b*, 5710*e*, lower winding of relay RT (5710) to battery. Thus, the ringing signal is permanently tripped for the duration of the test call. Relay WC, in operating, also disables the sleeve continuity testing circuit represented by the upper winding of relay RS (5700), by opening contacts 5720*c*, and connects the sleeve of the line under test, 5787, to the control lead from the testman's trunk, 5960, by means of contacts 5720*d*. At contacts 5720*j*, a ground is placed on conductor 5968, which informs the subscriber's line group marker circuit via lead RWC (5985) that the call is a test call and that the marker should disregard any busy condition which may be found on the called line. When the sender terminates the class marking signal, relay R5 releases, relay RA operates, the sender then sends the ringing code signal, the ring receiving relays operate in combination, relay CS operates, a call signal is given to the subscriber's line group marker code receiver, and tip and ring connections are extended thereto for the purpose of sending codes to the marker, as previously described. When the necessary codes have been sent to the subscriber's line groupmarker and the marker has completed its task, relay VO operates, as previously described, and the windings of relay A are connected to the incoming tip and ring leads 5957 and 5958 via contacts 5930*n* and 5930*s* as a signal to the sender that its services are no longer needed. The sender releases. Relay VO, in operating, also starts the slow release of relay CS, and upon the subsequent release of realy CS a circuit is formed to permit the operation of relay RS (5700) over the following path: ground, contacts 5920*e*, 5940*h*, 5930*p*, conductor 5976, contacts 5720*f*, lower winding of relay RS (5700), to battery. Relay RS, in operating, completes the path between the called line (under test) and the testman's test trunk or the operator's busy verification trunk, whichever may have originated the call. The CRB and all switches required for the duration of the test call are now held by means of the ground placed on the sleeve lead 5959 by the testman's trunk circuit. When the testman has completed his test, he disconnects from the trunk circuit which in turn removes the ground from the sleeve lead, releasing all switches and releasing relay MB in the CRB, relay MB in turn releasing all operated relays in the CRB.

The following description shows the manner of operation of the CRB circuit when a call is being made to an official telephone company telephone or PBX trunk. In this case, the number group will apprise the sender of the fact that the call is destined for a telephone company official number. This may occur by using one of the information jumpers in the number group in an unorthodox fashion. Since the translated hundreds, tens, and units information in the number group are always used, these jumpers may not be disturbed. However, there are more party designations provided than most customers need, and all line groups are not necessarily equipped, so either of these jumpers in the number group may be set up to an unequipped terminal.

For example, if parties 1 through 10 are equipped in a particular office, a call to an official telephone might be indicated by placing the number group jumper for this telephone on party 11. This will inform the sender of the fact that the call is destined for an official telephone, and appropriate signals may therefore be sent. Based on this example, the operation of the CRB will be continued. When the call has been extended to the CRB in previously described fashion, ground will be found on the incoming sleeve lead 5959, relay MB operates, relay RT operates, the sender receives a start signal, and the sender now sends a dual marking signal to the CRB indicating, in effect, that the call is both local and trunk by placing −48 volts on both the ring and tip leads 5958 and 5957. This causes the operation in the CRB of relays R3 (5770) and R4 (5870) over paths which have already been traced. These relays, in turn, cause the respective operation of relays LC (5820) and TK (5900). Relays LC and TK lock, relay H operates, the sender removes the −48 volts from tip and ring, relays R3 and R4 release, relay RA operates, the sender sends ring marking code combinations, the ring receiving relays R1 to R7 operate in combination, relay CS operates, a call signal is given to the subscriber's line group marker circuit, tip and ring leads are extended to the marker code receiver, and relay RT releases, all as previously described.

When the necessary codes have been sent to the marker code receiver, and the marker has performed its task, the VO relay in the CRB will operate. Relay VO, in operating, transfers the incoming tip and ring leads 5957 and 5958 from the marker code receiver leads 5982 and 5983 respectively to the windings of battery feed relay A. If the call is from a local subscriber, relay A operates and in turn holds relay H, which in turn holds a ground on the incoming sleeve 5959 as previously described. If the call is from a free service trunk, there will be no loop condition to operate relay A, therefore the H relay will eventually release; however, this has no effect, inasmuch as the CRB in this case will be held in an operated condition by the ground which the free service trunk will be forwarding on the incoming sleeve lead 5959. At the time the marker completed the operation of the SLA, SLB, and SLC switches, the ring start relay RS will operate, and in proper time the RP relay will operate to cause the signalling of the called line.

When the called subscriber answers his telephone, relay B will operate, as previously described. However, no answer supervision will be given to the calling telephone, inasmuch as the TK relay, in operating has opened, at its break contacts, the path through contacts 5940*g*, conductor 5990, contacts 5840*e*, conductors 5989 and 5988, contacts 5820*g*, conductor 5993, contacts 5920*f*, to ground over which ground answer supervision is normally supplied to the C lead 5960, and at its middle and lower transfer contact sets has caused the reversing of the incoming tip and ring leads by the B relay to be ineffective. Thus no answer supervision is in any way given to the calling subscriber or trunk circuit and therefore no charge will result due to the answer of the call. The holding and release of the CRB circuit is the same as hereinbefore described for the case of local or trunk calls, depending on the origin of the call.

The following is a description of the sequence of operations in the CRB in the case of a person calling another telephone on his own line, i.e., a reverting call. When the call arrives at the CRB circuit, ground on the sleeve lead 5959 operates relay MB, in turn operating relay RT and giving a start signal to the sender. The sender sends a class marking indication that the call is from a local subscriber, relay R3 operates, relay LC operates, the sender removes the class marking indication, relay R3 releases, relay RA operates, the sender sends the ringing information, the ring receiving relays operate in combination, relay CS operates, relay RT releases, a call signal is given to the subscriber's line group marker circuit, tip and ring leads are extended to the marker code receiver circuit, the sender sends information to the subscriber's line group marker code receiver, and the marker tests the called line.

At this point, the marker will find the called line busy, inasmuch as the call is of a reverting nature. Therefore, the marker will proceed to test the continuity of the sleeve lead to determine whether or not the calling and called sleeves are identical. This test is made by means of a tone oscillator which uses the sleeve lead as its feedback path. In this case the call is of a reverting nature, so the oscillator will be able to oscillate, and the marker is therefore informed to disregard the busy condition of the called line and proceeds to set up the crossbar switches SLA, SLB, and SLC as though the called line had been idle. At the same time, the marker informs the CRB of the fact that the call is of a reverting nature by placing a ground on the RWC lead 5985. This causes the operation of relay RV (5810) over the following path: ground on lead RWC (5985), conductor 5986, contacts 5720K, conductor 5780, lower winding of relay RV (5810), to battery. Relay RV locks over the following path: ground, contacts 5920*e*, 5940*j*, conductor 5975, contacts 5700*g*, conductor 5892, contacts 5810*e*, upper winding of relay RV (5810) to battery.

When the marker has finished setting up the crossbar switches, relay VO operates, in turn connecting the windings of relay A to the incoming tip and ring leads. This causes a completion signal to be sent to the sender, which releases. Relay A operates, in turn holding relay H, which in turn holds a ground on the incoming sleeve to maintain in an operated condition all equipment necessary until the calling subscriber hangs up. Relay RV, at its break contacts 5810*d*, opens the normal ringback tone path to the tone winding of relay B, and at its make contacts 5810*e* provides a circuit from the tone winding of relay B to the reverting call message lead RCM, from which lead the calling subscriber hears a recorded message or tone advising him he has called a number on his own line and gets instructions to hang up for a sufficient time to permit the telephone he is calling to ring. This message persists until the calling subscriber hangs up. Relay RV also holds open, at its break contacts 5810*a*, the circuit through the upper winding of relay RS, therefore the ring start sleeve lead continuity test will not be made at this time. Relay RV at its make contacts 5810*b*, prepares to relay MB in an operated condition, inasmuch as the CRB must not release when the calling subscriber hangs up.

When the calling subscriber hangs up, relay A releases, which in turn releases relay H. Relay H removes the ground from the incoming sleeve, permitting all equipment connected to the incoming side of the CRB to release. At this time, however, the MB relay is held operated by means of its lower winding and the RV relay contacts previously mentioned. Therefore, the CRB is maintained in an operating state, and the crossbar switches between the CRB and the called line are held in an operated condition by virtue of the ground maintained on the H lead 5786 by the MB relay. The release of relay H, at its make contacts shown just above contacts 5910*a*, permits the release of relay CS. Relay CS, at its break contacts 5940*h*, completes a circuit to the upper winding of relay RS to permit the ring start sleeve continuity test to be made. Relay RS operates, and in proper time relay RP operates, which causes ringing of the called telephone to begin.

No further action takes place in the CRB until either the called person or the calling person answers his telephone (both parties being on the same line). When one of the parties does answer, relay RT operates, preparing a talking circuit between the called or calling subscriber and the windings of the B relay, and talking may take place. Relay B, through its make contacts 5840*e*, operates relay H to establish a holding circuit for relay MB which becomes effective upon the subsequent release of relay RV. Relay RT, at its contacts 5710*a*, starts the slow release of relay RV. This slow release is timed to require about 5 seconds, during which time the answering party hears a short message asking him to remain on the line until his telephone companion answers. This message is traced over the following path: DTG lead 5711, tone winding of relay 5840, contacts 5810*e*, conductor 5709, contacts 5710*d*, lead RCT, to reverting call tone (or message) which may be coming either from a recorded announcement or a special tone generator.

The CRB remains in an operated condition until the release of both subscribers, at which time relay B release, in turn releasing relay H, which releases relay MB to restore the circuit to normal.

MISCELLANEOUS COMMENTS

There is set forth hereat a brief systematic description of response of the equipment in the system as various types of busy and idle conditions are encountered.

(1) If the group selector marker encounters a congestion busy, it places +48 volt battery on the ring SR to the sender, operating relay CBY which closes ground to release circuitry which in turn places ground on lead 1495*l* of FIG. 14, operating relay 1495*j* as the signal to the register to release all connections. Relay 1495*j* opens its contacts 1495*k*, releasing relays 1405 and 1410, and also opens the holding circuit of relay MB which is slow to release. As no holding ground is on the S-wire from a CRB or trunk, the line cut-off relay and switches SLA, SLB, and group selector marker release. After an interval relay MB releases, opening its contacts 1425*a*, releasing the vertical magnet of the SRL switch, opening the SRL crosspoints. (On a call from a trunk over a TRL circuit, a busy lead BY extends from the trunk over TRL crosspoints through the register and register-sender connect relays into the sender. In this case, +48 volt battery placed on the ring SR by the group selector markers operates relay CBY in the sender which connects ground to actuate release circuitry. The release circuitry places ground on a lead such as lead 1495*l* to operate a relay such as 1495*j* which opens its contacts such as 1495*k* to release a relay or relays in the trunk corresponding to relays 1405 and 1410 in the CRA of FIG. 14. An interval after the opening of contacts such as 1495*k* the register opens other contacts such as 1425*a* which releases the TRL vertical magnet such as V1 opening the TRL crosspoints, and at the same time the sender places ground on the BY lead to mark the trunk which actuates the trunk to return 120 i.p.m. busy tone to the calling party, and 120 i.p.m. busy flash to a calling operator.)

(2) If the group selector marker seizes a trunk in the dial stop condition, −48 volt battery placed on the tip ST by the trunk operates sender completion relay C which places ground through closed translator contacts (the translator knows that this call requires outpulsing) on lead SI, operating relay S which locks. Relay S transfers the tip and ring connections into the dial pulse sender. When the trunk places −48 volt battery on the ring conductor SR, the dial pulse sender starts sending. When all sending has ceased, the dial pulse sender connects ground over lead CK to completion circuitry which places ground on lead 1495*l* of FIG. 14, operating relay 1495*j* which releases relays 1405 and 1410 (FIG. 14). The register opens contacts 1425*a* dropping SRL. However, in this case the trunk when seized previously placed ground on the S-lead which holds the connection.

(3) If the group selector marker seizes a trunk normally in the dial start condition, −48 volt battery on the ring from the trunk operates relay D. If the trunk seized does not require outpulsing, ground through make contacts of relay D through closed translator contacts actuates completion circuitry which places ground on lead 1495*l* of FIG. 14 which operates relay 1495*j* which opens its contacts 1431 releasing relays 1405 and 1410. Relay 1495*j* also opens the circuit of relay 1425 which releases after an interval opening its contacts 1425*a* which releases the SRL vertical which releases the SRL circuit. Ground previously placed on the S-lead by the trunk holds the connections when relays 1405 and 1410 release. If the trunk requires outpulsing, ground through make contacts of relay D and translator contacts effects the operation of relay S in the sender and the sequence is as found in item 2 after dial starts.

(4) If the SLM marker encounters a busy line, it places +48 volts on the tip to the sender which operates relay LBY. The operation of relay LBY closes ground to release circuitry which places ground on lead 1495*l*, FIG. 14, operating relay 1495*j* which opens contacts 1495*k*, releasing relays 1405 and 1410. On calls from trunks, the sender also places 1200 ohm ground on the BY lead over TRL crosspoints to signal the trunk which then returns 60 i.p.m. busy tone to the calling party. A moment later sender relay 1425 releases, opening its contacts 1425*a*, which releases the vertical magnet of the SRL circuit releasing the SRL circuit on a call from a local subscriber. On a call from a trunk, the release of a sender relay such as 1425 opens its contacts such as 1425*a* which releases the vertical magnet of the TRL circuit, releasing the TRL circuit.

(5) If the SLM marker encounters an all paths busy, it places +48 volts on the ring conductor SR to the sender operating relay CBY which closes ground to release circuitry. On a call from a trunk, the release circuitry places direct ground on the BY lead through TRL crosspoints to the calling trunk, causing the trunk to return 120 i.p.m. busy tone to the calling party and 120 i.p.m. busy flash to a calling operator. In either case the release circuitry places ground on lead **1495*l* (FIG. 14) operating relay 1495*j* which opens contacts 1495*k*. This releases relays 1405 and 1410 in the CRA circuits (or similar relay or relays in the calling trunk circuit). An interval later, relay 1425 releases opening its contacts 1425*a*** which releases SRL or TRL as the case may be.

(6) If SLM marker encounters a busy line it performs a loop continuity test over S-wires to see if the calling and called S-wires are the same and if they are formed to be the same indicating a reverting call (i.e. calling and called parties on the same line), it places ground on lead RWC to the CRB. Also it operates switches SLA, SLB, and SLC. When vertical of SLC operates, it signals CRB that the call has been successfully advanced. CRB then puts holding ground on the S-wire and places battery feed coils on tip and ring. With + on tip and − on ring relay D in the sender operates closing ground to completion circuitry which places ground on lead **1495*l*, FIG. 14, operating relay 1495*j*** which initiates release of R1, R2, and subsequently SRL crosspoints.

(7) If the subscribers line marker encounters a line on lockout, it places +48 on tip to the sender which releases relays 1405, 1410 and opens the SRL crosspoints (or TRL crosspoints) as the CRB has not placed ground on the S-wire, the connection releases, placing the calling line on lockout whereby it receives busy tone from the line circuit.

(8) If the SLM marker encounters an idle line, it operates switches SLA, SLB, and SLC. When vertical of SLC operates, it signals CRB that call has been successfully advanced. CRB then puts holding ground on S-wire and places battery feed coil on tip and ring. With + on tip and − on ring, relay D operates, actuating completion circuitry which operates relay **1495*j* which opens its contacts 1495*k* resulting in the release of R1, R2. Relay 1495*j* also opens the holding circuit of relay 1425 which releases opening its contacts 1425*a*** which opens the holding circuit of the vertical magnet of the SRL (or TRL circuit), opening the SRL crosspoints (or TRL crosspoints). Ground on S-lead from CRB holds connections.

(9) A fourth wire "C" is carried through certain crosspoints to enable certain signalling to and from trunks.

There is also included hereat a brief description in summary of various ones of the signals used in the system.

(1) When a subscribers line marker places +48 volts on the tip conductor, this operates relay LBY in the sender, indicating line busy to the release circuitry in the sender.

(2) When a group selector marker places +48 volts on the tip conductor, this operates relay LBY in the sender, indicating alternate routing required to the sender.

(3) When a group selector marker or a subscriber's line marker places +48 volts on the ring conductor, this operates relay CBY in the sender, indicating congestion busy to the release circuitry.

(4) When a called trunk places ground on the tip and −48 volts on the ring, the −48 volts on the ring constitute a dial start signal to the sender.

(5) When a called trunk places −48 volts on the tip and ground on the ring conductor, the −48 volts on the tip constitute a dial stop signal to the sender.

(6) When a code receiver in a group selector marker, a CRB circuit, or a subscriber's line marker places −24 volts on the tip conductor, this constitutes a start signal to the sender. A group selector marker also places ground on the ring conductor. A CRB circuit also places −24 volts on the ring conductor. A subscriber's line marker also places ground on the ring conductor. However, it is the −24 volts on the tip conductor which constitutes the start signal to the sender.

It is noted that United States patent application having Serial Number 473,825, now Patent 2,956,127, which was filed December 8, 1954, and is assigned to the assignee of the present application, sets forth additional information concerning the electronic circuitry of the number group circuit.

While a particular embodiment of the invention has been shown and described, it is apparent that modifications and alterations may be made, and it is intended in the appended claims to cover all such modifications and alterations as may fall within the true spirit and scope of the invention.

What is claimed is:

1. In an automatic telephone system comprising a plurality of switching stages, each of which stages includes switching means for extending connections between calling and called lines, a first marker means connected for use by a first one of said stages, and a second marker means connected for use by a second one of said stages, each of said marker means being operative to extend a two wire connection through its associated stage to the next succeeding stage, and sender means operative to transmit a signal simultaneously over both of said wires to the seized one of the marker means of at least one of the marking stages to control the switching means associated therewith in the further extension of the connection toward the desired line.

2. An automatic telephone system as set forth in claim 1 in which at least one of said switching stages comprises at least one primary and at least one secondary crossbar switch connected for access by calling lines, and another one of said switching stages includes a set of group selector crossbar switches for further extending the connection to the proper switching group, and in which said sender is operative to send signals to said other stage to control said group selector switches in the extension of calls to local and remote subscribers.

3. In an automatic telephone system comprising a plurality of switching stages for extending connections between a plurality of lines, each stage comprising a plurality of groups of cross-bar switches including means for extending tip and ring connections thereover in the direction of called lines, a first stage being comprised of a plurality of primary switches and a plurality of secondary switches connected to be seized by certain of the calling lines in the extension of calls toward desired called lines, a second stage of switches comprising a plurality of groups of selector switches for further extending the tip and ring connections in the direction of called lines, a third stage of selection comprising a group of switches arranged to extend the tip and ring connections to the called lines over the secondary switches and primary switches of said first stage marker means for said second stage and said third stage, and sender means operative to simultaneously transmit separate signals over said tip and said ring conductors to the marker means of each of said second and third stages to control the switches thereat in the extension of the connection to called lines.

4. An arrangement as set forth in claim 3 in which said secondary switches include means for dividing same into two selector members, and means for connecting one of said selector members to extend calls from the first stage to the second stage, and means for connecting the other of said selector members to extend connections from the second stage to the first stage.

5. In an automatic telephone system comprising at least two switching stages for extending connections between calling and called lines, each stage comprising a plurality of groups of crossbar switches including means for extending connections thereover in the direction of desired called lines, marker means operative to extend a pair of conductors over each stage in succession, sender means, means for connecting said sender means to a pair of conductors extending to the second stage, means in said sender means for transmitting separate pulse signals over each of the two conductors to the marker means associated with the second switching stage, and means in the second stage marker means operative to set the switches of the second stage in accordance with the nature of the pulse signals received over each of said conductors.

6. In an automatic telephone system comprising a plurality of switching stages for extending connections between calling and called lines, each stage comprising a plurality of groups of crossbar switches including means for extending connections thereover in the direction of the desired called line, marker means operative to extend a connection over each stage in succession; sender means, means for connecting said sender means to the connections extending to one of said stages, means in said sender means for transmitting coded signals over the connections to the marker means associated with said one switching stage, subscriber terminating trunk means, means in the marker means for said one stage operative responsive to receipt of said coded signals to set the switches of said one stage to extend the connection to said subscriber terminating trunk means, and means in the sender means for sending coded signals indicative of the nature of the call over the connection thus established to the subscriber terminiating trunk means to enable same for use in completing the call.

7. An arrangement as set forth in claim 6 in which said means for sending coded signals to said subscriber terminating trunk means includes means for transmitting signals indicative of the called party ringing designation.

8. An arrangement as set forth in claim 7 in which said means for transmitting coded signals includes means for sending coded signals indicative of the equipment location of the called line to the marker means associated with a succeeding stage of a group.

9. In an automatic telephone system of the terminal per station type comprising a plurality of switching stages for extending connections between called and calling lines each stage comprising a plurality of groups of crossbar switches including means for extending connections thereover in the direction of a desired line, marker means operative to extend a connection over each stage to the next succeeding stage, sender means, directory number translator means connected for seizure by said sender means connector, means for connecting said sender means to one of said stages and means in the sender means for transmitting signals corresponding to the translated signals received from the number group translator over said connector means to the marker means associated with said one stage and each succeeding switching stage as engaged to control same in the proper extension of the connection to the desired line.

10. An arrangement as set forth in claim 9 which includes subscriber terminating trunk means for extending the connection to the called line, and means in said sender for transmitting signals corresponding to the signals provided by said translator means to said subscriber terminating trunk means to indicate the type of origin of the call and the called party ringing designation to enable same in the proper extension of the call.

11. In an automatic telephone system for extending connections between calling and called lines including toll-free originating lines comprising a plurality of switching stages accessible to the lines for extending connections therebetween, subscriber terminating trunk means, sender means, marker means connected to control at least one of said switching stages in the extension connections between said sender means and said subscriber terminating trunk means, detector means including means in said sender means operative to detect connections which are being established toward said toll free terminating lines, and signalling means in the sender means controlled responsive to the detection of said calls to transmit a predetermined signal set to the subscriber terminating trunk means to identify such calls thereto.

12. An arrangement as set forth in claim 11 in which said subscriber terminating trunk means includes means normally operative to provide a signal back to the calling line, and means operative responsive to receipt of said predetermined signal to render said return signal means inoperative.

13. In an automatic telephone system sender means for controlling an associated group selector marker, a subscriber terminating trunk and a subscriber line marker, comprising signal input means, means operative responsive to receipt of a first signal over said signal input means to transmit a first and a second code signal over outgoing conductors to said group selector marker to control same in effecting further extension of a call, means operative responsive to receipt of a second signal over other of said signal input means to transmit a first and a second signal to said subscriber terminating trunk to indicate thereto the nature of the origin of the call and the party on the line designation, and means operative responsive to receipt of a third signal over said signal input path means to transmit a set of three signals to said subscriber line marker which indicates the terminal location of the called line.

14. In an automatic telephone system subscriber terminating trunk for selectively preparing connections prior to extension thereof to the called line comprising input circuit means, means operative responsive to a first signal received over said input circuit means to prepare the connection to the called line in accordance with the nature of the origin of the call as indicated by such signal, and means operative responsive to receipt of a second signal over said input circuit means to prepare said subscriber terminating trunk to place ringing signals on the called line in accordance with the party designation information conveyed by said second signal.

15. In an automatic telephone system, subscriber terminating trunk means comprising an input means, means operative responsive to a coded signal received over said input means to prepare the connection being extended to a called line in accordance with the nature of the origin indicated by such signal including means operative responsive to a signal of a first code to insert calling and called battery feed coils in the connection, means operative responsive to receipt of a signal of a second code to extend a metallic connection to the called line, means responsive to receipt of a signal of a third code to extend a metallic connection to the called line and to withhold application of the ringing current to the connection pending receipt of a subsequent signal, and means operative responsive to receipt of a signal of a fourth code to extend a metallic connection to the called line and to permanently withhold application of the ringing current thereto.

16. In an automatic telephone system having switching stages for extending connections between calling and called lines, register means, means for seizing said register means and transmitting thereto the called party directory number for registration thereof, sender means, connector means for connecting said register means to said sender means, means in said sender means operative to route the call through further switching stages, and directory number translator means connected for seizure by said sender means including means for detecting calls as registered which are directed toward a private branch exchange group, and means in the directory number translator means for signaling the sender means whenever such type call is detected.

17. An arrangement as set forth in claim 16 in which said directory number translator means includes means for transmitting hundreds, tens, and units code signals indicative of the terminal location of the directory number and in which said sender means includes means operative responsive to the receipt of a signal to alter the value of the hundreds signal indicating a call to a private branch exchange transmitted thereto by the directory number translator means by a predetermined value.

18. In an automatic telephone system having switching stages for extending connections between called and calling lines, a plurality of register means, means for seizing one of said register means and transmitting the called party number thereto for registration thereon, a plurality of sender means, the total number of senders being less in number than the number of register means, connector means for selectively connecting each of said seized register means independently and directly to one of said sender means, and means in said sender means operative as connected to one of said register means to transmit coded information over said register means to further switching stages in the call routing to control the switches to route the call to the called line registered on said register means.

19. In an automatic telephone system having switching stages for extending connections between called and calling lines, a plurality of register means, means for seizing one of said register means and transmitting thereto the called party number for registration thereon, a plurality of sender means less in number than the total number of register means, connector means for selectively connecting each of said seized register means to a selected one of said sender means, means in said sender means operative as connected to one of said register means to transmit coded information over the connected one of the register means to succeeding switching stages to route the call through the subsequent switching stages in the switching sequence, and directory number translator means connected for seizure by said sender means operative to determine the terminal location of said called directory number and to provide the terminal location to said sender means for use in routing the call.

20. In an automatic telephone system as set forth in claim 19 in which said directory number translator means includes means for providing the party designation of the called party to said sender means for use in routing the call.

21. In an automatic telephone system for extending connections between calling and called lines comprising a series of switching stages, subscriber terminating trunk means, sender means, circuit extending means operative responsive to seizure of at least one of said switching stages and receipt of call extension signals in the extension of a call toward a local subscriber to extend a connection between said sender means and said subscriber terminating trunk means, and signalling means in said sender means operative to transmit marking signals over the connections to the subscriber terminating trunk means to indicate the nature of the origin of the call, and means in said subscriber terminating trunk operative responsive to receipt of said marking signals to provide certain predetermined line conditions for signalling of the called line.

22. An automatic telephone system as set forth in claim 21 in which said circuit extending means are operative to extend a tip and ring connection between said sender and said subscriber terminating trunk means, and said signalling means are operative to transmit said signals over said tip and ring connections.

23. In an automatic telephone system having a plurality of switching stages for extending communication paths between calling and called lines, subscriber terminating trunk means, sender means, means associated with at least one of said switching stages for extending a connection between said sender means and said subscriber terminating trunk means responsive to extension of a call over said one stage in the direction of a local subscriber, and means in said sender operative to transmit coded signals over the said connection to the subscriber terminating trunk means to indicate thereto the origin of the call and the called party designation.

24. In an automatic telephone system for establishing connections between calling and called lines comprising a plurality of switching stages connected to have access to said lines for extending connections therebetween, subscriber terminating trunk means, sender means, marker means for operatively controlling at least one of said switching stages in the extension of a connection between said sender means and said subscriber terminating trunk means, indicating means connected for coupling to said sender means to indicate the origin of the call, and means in the sender means operative to transmit a predetermined coded signal over the connection to said subscriber terminating trunk means to indicate that the call originated at a local subscriber line.

25. In an automatic telephone system for extending connections between calling and called lines comprising a plurality of switching stages, subscriber terminating trunk means, sender means, marker means associated with at least one of said switching stages for extending a connection between said sender means and said subscriber terminating trunk means in the extension of a call over said stage in the direction of a local subscriber line, indicating means for indicating to said sender means the origin of each of the calls, and means operative to transmit a predetermined coded signal over the connections to the subscriber terminating trunk means whenever the call is originated over a trunk line.

26. In an automatic telephone system for extending connections between calling and called lines comprising a plurality of switching stages accessible to the lines, subscriber terminating trunk means, sender means, marker means associated with at least one of said switching stages for extending a connection between said sender means and said subscriber terminating trunk means, means for indicating to said sender means the origin of each call, and means operative to transmit a predetermined coded signal over the connections to the subscriber terminating trunk means to identify calls which originate at a trunk requiring delayed ring.

27. In an automatic telephone system for extending connections between calling and called lines comprising a plurality of switching stages connected to have access to said lines, subscriber terminating trunk means, sender means, means associated with at least one of said switching stages for extending a connection between said sender means and said subscriber terminating trunk means in the extension of a call over said stage in the direction of a local subscriber, indicating means for indicating to said sender means the origin of the call, and means operative to transmit a predetermined coded signal over the connections to said subscriber terminating trunk means to indicate thereto that the call originated at a test trunk.

28. In an automatic telephone system comprising a plurality of switching stages for extending connections from calling lines in the direction of desired called lines, subscriber terminating trunk means, call determination means for ascertaining the nature of the origin of each call extended from the calling lines, signalling means, group selector marker means associated with one of said switching stages operative to effect extension of a connection between said subscriber terminating trunk means and said signalling means, means in said signalling means for selectively extending the coded signals over said connection to said subscriber terminating trunk means indicating the nature of the origin of the call as determined by said call determination means, and means in said subscriber terminating trunk means for controlling the nature of the connection extended to the desired line in accordance with the nature of the signal received from said signalling means.

29. An automatic telephone system as set forth in claim 28 in which the connection extended between said subscriber terminating trunk means and said signalling means comprises tip and ring conductors, and in which said signalling means transmits said signals over said tip and ring conductors.

30. In an automatic telephone system comprising a plurality of switching stages for extending connections between calling and called lines, subscriber terminating trunk means, call determination means for ascertaining the nature of the origin of the call, signalling means, marker means associated with at least one of said switching stages operative to effect extension of a tip and ring connection between said cord circuit means and said signalling means, means in said signalling means for transmitting a predetermined coded signal over said connection to indicate that the call is initiated by a local subscriber, and means in said subscriber terminating trunk means operative with the receipt of said predetermined coded signal to insert calling and called battery feed coils and a condenser bridge in the connection extended to the called line.

31. In an automatic telephone system comprising a plurality of switching stages for extending connections between calling and called lines, subscriber terminating trunk means, call determination means for ascertaining the nature of the origin of the call, marker means associated with one of said switching stages operative to effect extension of a connection between said subscriber terminating trunk means and said signalling means as a connection is extended over said switching stage, means in said signalling means for transmitting a predetermined coded signal over said connection to indicate the call is from a trunk line, and means in said subscriber terminating trunk means operative to extend a metallic connection in the direction of the desired subscriber line in response to receipt of said coded signal.

32. In an automatic telephone system comprising a plurality of switching stages for extending connections between calling and called lines, subscriber terminating trunk means, call determination means for ascertaining the nature of the origin of the call, signalling means including means for controlling connection thereof to said call determination means, marker means associated with one of said switching stages for effecting extension of a connection between said subscriber terminating trunk means and said signalling means, means in said signalling means operative responsive to the receipt of signals from said call determination means to transmit a predetermined coded signal over said connection to indicate that the call is from a trunk requiring delayed ring, ring tripping means, means in said subscriber terminating trunk means operative responsive to the receipt of said predetermined coded signal to operate said ring tripping means to prevent the extension of the ringing current to the connections, and to apply said ringing current thereto only responsive to the receipt of a subsequent signal from said trunk which requires a delayed ring, and means in said subscriber terminating trunk means operative responsive to receipt of said subsequent signal to release said ring tripping means.

33. In an automatic telephone system having switching means for extending connections between calling and called lines including switching stages having crossbar switches accessible to the lines for extending connections therebetween, subscriber terminating trunk means, marker means for providing a signal to the said subscriber terminating trunk means to indicate that the called subscriber is on the same line as the calling subscriber, and means in said subscriber terminating trunk means operative responsive to receipt of such signal to transmit a prerecorded message back to the calling party which message identifies the call as being directed to another party on the calling subscriber's line.

34. In an automatic telephone system of the crossbar type having crossbar switching means for extending connections between calling and called lines including switching stages accessible to the lines for extending connections therebetween, subscriber terminating trunk means, marker means for controlling extension of a call over certain of the crossbar switches to said trunk means and for extending a connection over others of the crossbar switches toward the called line including means for testing the condition of the called line and providing a signal to said subscriber terminating trunk means to indicate that the called subscriber is on the same line as the calling subscriber, and means in said subscriber terminating trunk means operative responsive to receipt of said signal to transmit a signal back to the calling party, to withhold ringing current from said line until the calling party replaces his receiver and to release at least one of said certain crossbar switches in the connection responsive to the restoration of the receiver by the calling party.

35. In an automatic telephone system having switching stages for extending connections between called and calling lines, directory number register means, means for seizing said directory number register means and transmitting thereto the called party number for registration thereon, sender means connected for seizure by said register means for operation in the extension of the call through certain of said switching stages, and directory number translator means connected for seizure by said sender means operative to determine the terminal location of the called directory number, each directory number being represented by a set of indicator devices, each set of which is crossconnected to terminal location representing registers, and means in said translator means operative responsive to the operation of any one of said sets of indicator devices to control the terminal location representing registers interconnected to the set to provide signals indicative of the terminal location of said directory number to said sender means.

36. An automatic telephone system as set forth in claim 35 in which each set of indicator devices comprises a resistor member for representing one digit of the directory number and a number of electronic tubes consistent with the number of remaining digits in the directory number cross-connected to said terminal location representing registers.

37. In an automatic telephone system for serving a plurality of subscriber lines, a cross-bar switch comprising a plurality of horizontal and vertical selection bars, means for preassigning a first set of said horizontal bars for combination selection operations, and a second set of said horizontal bars for line selection operations, and one of said bars for both operations, an output circuit associated with each vertical selection bar, and a plurality of sets of conductors connected in multiple associated with each vertical bar, means associated with each horizontal bar as operated as a line selection bar to prepare connection of each of a group of subscriber lines preassigned thereto to the conductors associated with at least one of said vertical bars, and means associated with each horizontal bar as operated as a combination selector bar for preparing only one of the subscriber lines selected by the horizontal bars for connection to the output circuit associated with a predetermined vertical bar.

38. An arrangement as set forth in claim 37 which includes means for multipling the subscriber lines conductors to each of the vertical conductor sets of the crossbar switch.

39. An arrangement as set forth in claim 37 which includes means operative with initiation of a call by a subscriber to simultaneously operate the combination selection bar and line selection bar assigned to prepare same for connection to one of said output circuits.

40. In an automatic telephone system for serving a plurality of subscriber lines, a cross-bar switch comprising at least one vertical bar and six horizontal selection bars, each horizontal bar having two operating magnets for operating said horizontal bar between each of two positions, means for presassigning three of said magnets for combination selection operations, and the remaining nine magnets for line selection operations; an output circuit associated with each vertical bar and a plurality of sets of conductors for each vertical bar connected in multiple to its output circuit, means operative to prepare connection of a predetermined three subscriber lines to the vertical conductor sets associated with said vertical bar in accordance with the particular line selecting magnet which is operated; and means operative to prepare one of the vertical conductor sets for connection to the vertical output circuit in accordance with the particular one of the combination selector bar magnets which is operated.

41. In an automatic telephone system for serving a plurality of subscriber lines, a cross-bar switch comprising ten vertical bars and six horizontal selection bars, each horizontal bar having two operating magnets for operating said horizontal bar between each of two positions, means for preassigning three of said magnets for combination selection operations, and the remaining nine magnets for line selection operations; an output circuit associated with each vertical bar, and three sets of conductors multipled thereto; means operative in accordance with the particular line selecting magnet which is operated to prepare connection of three preassigned subscriber lines to the three different vertical conductor sets associated with each vertical bar; means operative in accordance with the particular one of the combination selector bar magnets which is operated to prepare one of the vertical conductor sets for connection to the vertical output circuit in the conductor sets associated with each vertical bar; and individual operating means for each of said vertical bars, whereby any one of the twenty-five incoming subscriber lines may be connected to any one of the ten output circuits.

42. In an automatic telephone system including a crossbar switch stage having two groups of serially related crossbar switches, each switch having input circuits comprising a plurality of conductors and output circuits comprising a plurality of conductors, crosspoint contact pile-ups for interconnecting different input circuits to different output circuits, said switches of the first group having twenty outputs, each of which is multipled to the crosspoints associated with the first five inputs and twenty additional output circuits, each of which is multipled to the crosspoints associated with the last five inputs; each switch of the second group having twenty outputs, each of which is multipled to the crosspoints associated with the first four inputs thereof and a second set of twenty outputs, each of which is multipled to the crosspoints associated with a second set of four inputs and a third set of twenty outputs, each of which is multipled to the crosspoints associated with the last two inputs, the outputs from the first group of switches being connected to the inputs of the second group of switches according to a predetermined configuration, and certain of the outputs of the second group of switches being connected in multiple.

43. An arrangement as set forth in claim 42 in which the inter switch conections between the switches of the first and second groups, and the outputs of the second group of switches, organized as pluralities of trunks on pluralities of levels, are as shown in FIGURES 44, 44A, wherein circles represent input circuits to switches and each stub of the first group of switches emanating from the circles represents twenty outputs accessible from the associated input in the direction of the stub to twenty inputs respectively of the second group of switches represented by circles, and the twenty outputs of each stub in the second switch group have access in the direction of the stub to a trunk on each of twenty levels respectively.

References Cited in the file of this patent

UNITED STATES PATENTS

| | | |
|---|---|---|
| 1,863,376 | Kessler et al. | June 14, 1932 |
| 1,886,296 | Neir et al. | Nov. 1, 1932 |
| 2,541,362 | Jones | Feb. 13, 1951 |
| 2,572,027 | Horvitz | Oct. 23, 1951 |
| 2,582,959 | Bruce et al. | Jan. 22, 1952 |
| 2,585,904 | Busch | Feb. 19, 1952 |
| 2,595,944 | Hersey | May 6, 1952 |
| 2,674,657 | Bellamy et al. | Apr. 6, 1954 |
| 2,731,514 | Oberman | Jan. 17, 1956 |
| 2,761,012 | Murray et al. | Aug. 28, 1956 |